US011405204B2

(12) United States Patent
Maurer et al.

(10) Patent No.: US 11,405,204 B2
(45) Date of Patent: Aug. 2, 2022

(54) SCALABLE, SECURE, EFFICIENT, AND ADAPTABLE DISTRIBUTED DIGITAL LEDGER TRANSACTION NETWORK

(71) Applicant: Meta Platforms, Inc., Menlo Park, CA (US)

(72) Inventors: Benjamin D. Maurer, San Francisco, CA (US); Alistair Pott, San Carlos, CA (US)

(73) Assignee: Meta Platforms, Inc, Menlo Park, CA (US)

( * ) Notice: Subject to any disclaimer, the term of this patent is extended or adjusted under 35 U.S.C. 154(b) by 166 days.

(21) Appl. No.: 16/442,472

(22) Filed: Jun. 15, 2019

(65) Prior Publication Data
US 2020/0396072 A1    Dec. 17, 2020

(51) Int. Cl.
*H04L 29/06* (2006.01)
*H04L 9/30* (2006.01)
(Continued)

(52) U.S. Cl.
CPC ............... *H04L 9/30* (2013.01); *G06F 16/22* (2019.01); *G06F 16/2379* (2019.01);
(Continued)

(58) Field of Classification Search
CPC ..... H04L 9/30; H04L 9/0891; H04L 61/1511; H04L 2209/38; H04L 9/3236;
(Continued)

(56) References Cited

U.S. PATENT DOCUMENTS 6,598,078 B1   7/2003  Ehrlich et al.
8,291,197 B2  10/2012  Wu et al.
(Continued)

FOREIGN PATENT DOCUMENTS

CN   WO2018145357   *   2/2017
CN   WO2020156480   *   1/2019
WO   WO 2018130910 A1    7/2018

OTHER PUBLICATIONS

Cynthia Dwork, Nancy Lynch, and Larry Stockmeyer. Consensus in the presence of partial synchrony. Journal of the ACM (JACM), 35(2):288-323, 1988.
(Continued)

*Primary Examiner* — Taghi T Arani
*Assistant Examiner* — Lin Chang
(74) *Attorney, Agent, or Firm* — Keller Preece PLLC

(57) ABSTRACT

The present disclosure relates to systems, methods, and non-transitory computer readable storage media for implementing a scalable, secure, efficient, and adaptable distributed digital ledger transaction network. Indeed, the disclosed systems can reduce storage and processing requirements, improve security of implementing computing devices and underlying digital assets, accommodate a wide variety of different digital programs (or "smart contracts"), and scale to accommodate billions of users and associated digital transactions. For example, the disclosed systems can utilize a host of features that improve storage, account/address management, digital transaction execution, consensus, and synchronization processes. The disclosed systems can also utilize a new programming language that improves efficiency and security of the distributed digital ledger transaction network.

20 Claims, 51 Drawing Sheets

(51) Int. Cl.
*H04L 9/08* (2006.01)
*G06F 16/23* (2019.01)
*G06F 16/22* (2019.01)
*H04L 61/4511* (2022.01)
*H04L 9/32* (2006.01)
*H04L 9/00* (2022.01)

(52) U.S. Cl.
CPC ........ *H04L 9/0891* (2013.01); *H04L 61/4511* (2022.05); *H04L 9/3236* (2013.01); *H04L 9/50* (2022.05)

(58) Field of Classification Search
CPC ... H04L 51/28; H04L 63/0442; H04L 61/307; H04L 9/3239; G06F 16/2379; G06F 16/22; G06F 16/9024; H04W 12/77
See application file for complete search history.

(56) References Cited

U.S. PATENT DOCUMENTS

| | | | |
|---|---|---|---|
| 10,269,009 | B1 | 4/2019 | Winklevoss et al. |
| 10,536,846 | B1* | 1/2020 | Hennessy ............. H04W 12/03 |
| 10,721,060 | B1* | 7/2020 | Kaizer ................. H04L 61/1511 |
| 10,846,762 | B1* | 11/2020 | Dennis ................ G06Q 20/065 |
| 2003/0182332 | A1 | 9/2003 | McBrearty et al. |
| 2004/0249838 | A1 | 12/2004 | Hinshaw et al. |
| 2005/0210106 | A1* | 9/2005 | Cunningham .......... H04L 51/12 709/206 |
| 2008/0177756 | A1 | 7/2008 | Kosche |
| 2008/0256592 | A1 | 10/2008 | Schnell et al. |
| 2012/0185383 | A1 | 7/2012 | Demark et al. |
| 2013/0054577 | A1 | 2/2013 | Schwob |
| 2014/0280305 | A1* | 9/2014 | James ................. H04L 61/1511 707/769 |
| 2015/0347451 | A1 | 12/2015 | Lee et al. |
| 2016/0217452 | A1 | 7/2016 | Wong et al. |
| 2016/0292672 | A1 | 10/2016 | Fay et al. |
| 2016/0359817 | A1 | 12/2016 | Mullen et al. |
| 2017/0046694 | A1 | 2/2017 | Chow et al. |
| 2017/0091756 | A1 | 3/2017 | Stern et al. |
| 2017/0278080 | A1* | 9/2017 | Kruszka ............. H04N 1/32144 |
| 2018/0005186 | A1 | 1/2018 | Hunn |
| 2018/0101842 | A1 | 4/2018 | Ventura et al. |
| 2018/0137512 | A1* | 5/2018 | Georgiadis ............. H04L 9/3213 |
| 2018/0158034 | A1 | 6/2018 | Hunt et al. |
| 2018/0184296 | A1* | 6/2018 | Hunt ..................... G06K 7/1417 |
| 2018/0331837 | A1* | 11/2018 | Uhr ....................... H04W 12/08 |
| 2018/0349621 | A1 | 12/2018 | Schvey et al. |
| 2019/0019183 | A1 | 1/2019 | Karame et al. |
| 2019/0114626 | A1 | 4/2019 | Pogorelik et al. |
| 2019/0180275 | A1* | 6/2019 | Safak ................. G06Q 20/3827 |
| 2019/0180558 | A1* | 6/2019 | Merati ................. H04L 9/0637 |
| 2019/0188335 | A1 | 6/2019 | Boyd et al. |
| 2019/0228133 | A1 | 7/2019 | Ansari et al. |
| 2019/0251080 | A1 | 8/2019 | Lu et al. |
| 2019/0325114 | A1 | 10/2019 | Maughan et al. |
| 2019/0354397 | A1 | 11/2019 | Goel et al. |
| 2019/0356641 | A1* | 11/2019 | Isaacson ............. G06Q 20/384 |
| 2019/0361731 | A1 | 11/2019 | Qiu |
| 2019/0370250 | A1 | 12/2019 | Tipton et al. |
| 2019/0386969 | A1 | 12/2019 | Verzun et al. |
| 2020/0021569 | A1 | 1/2020 | Simons |
| 2020/0202350 | A1 | 6/2020 | Chan et al. |
| 2020/0220729 | A1* | 7/2020 | Hudson ................ H04L 9/3239 |
| 2020/0313859 | A1 | 10/2020 | Ateniese et al. |
| 2020/0320529 | A1* | 10/2020 | Lyadvinsky ......... G06Q 20/223 |
| 2020/0326973 | A1 | 10/2020 | Xie et al. |
| 2020/0334653 | A1 | 10/2020 | Sidhu |
| 2020/0366489 | A1 | 11/2020 | Assenmacher |
| 2021/0216522 | A1* | 7/2021 | Zhuo ....................... G06F 16/23 |

OTHER PUBLICATIONS

Giulio Malavolta, Pedro Moreno-Sanchez, Aniket Kate, Matteo Maffei, and Srivatsan Ravi. Concurrency and privacy with payment-channel networks. In Proceedings of the 2017 ACM SIGSAC Conference on Computer and Communica-tions Security, pp. 455-471. ACM, 2017.

Silvio Micali, Michael Rabin, and Salil Vadhan. Verifiable random functions. In 40th Annual Symposium on Foundations of Computer Science (Cat. No. 99CB37039), pp. 120-130. IEEE, 1999.

Gavin Wood. Ethereum: A Secure Decentralised Generalised Transaction Ledger EIP-150 Revision. http://gavwood.com/paper.pdf, 2016.

Maofan Yin, Dahlia Malkhi, Michael K Reiter, Guy Golan Gueta, and Ittai Abraham. Hotstuff: Bft consensus in the lens of blockchain. arXiv preprint arXiv:1803.05069, 2018.

The Libra Association, "Welcome to Libra." https://libra.org/en-us/whitepaper.

C. Catalini and J. S. Gans, "Some simple economics of the blockchain," WP No. 22952, National Bureau of Economic Research, 2016.

The Libra Association, "The Libra association." https://libra.org/en-us/association-council-principles.

The Libra Association, "The Libra reserve." https://libra.org/about-currency-reserve.

The Libra Association, "Moving towards permissionless." https://libra.org/permissionless-blockchain.

The Libra Association, "Libra developers." https://developers.libra.org/.

P. T. Devanbu, M. Gertz, C. U. Martel, and S. G. Stubblebine, "Authentic third-party data publication," in Data and Application Security, Development and Directions, IFIP TC11/ WG11.3 Fourteenth Annual Working Conference on Database Security, Schoorl, The Netherlands, Aug. 21-23, 2000, pp. 101-112, 2000.

M. Naor and K. Nissim, "Certificate revocation and certificate update," IEEE Journal on Selected Areas in Communications, vol. 18, No. 4, pp. 561-570, 2000.

R. Tamassia, "Authenticated data structures," in Algorithms—ESA 2003, 11th Annual European Symposium, Budapest, Hungary, Sep. 16-19, 2003, Proceedings, pp. 2-5, 2003.

R. C. Merkle, "A digital signature based on a conventional encryption function," in Advances in Cryptology—Crypto '87, A Conference on the Theory and Applications of Cryptographic Techniques, Santa Barbara, California, USA, Aug. 16-20, 1987, Proceedings, pp. 369-378, 1987.

M. Baudet, A. Ching, A. Chursin, G. Danezis, F. Garillot, Z. Li, D. Perelman, and A. Sonnino, "State machine replication in the Libra Blockchain." https://developers.libra.org/docs/state-machine-replication-paper.

P. A. Bernstein, V. Hadzilacos, and N. Goodman, "Concurrency control and recovery in database systems," Addison-Wesley, 1987.

D. P. Reed, Naming and synchronization in a decentralized computer system. PhD thesis, Masssachusetts Institute of Technology, Cambridge, MA, USA, 1978.

G. Bertoni, J. Daemen, M. Peeters, and G. V. Assche, "Keccak," in Advances in Cryptology—Eurocrypt 2013, 32nd Annual International Conference on the Theory and Applications of Cryptographic Techniques, Athens, Greece, May 26-30, 2013. Proceedings, pp. 313-314, 2013.

S. Josefsson and I. Liusvaara, "Edwards-curve digital signature algorithm (EdDSA)," RFC, vol. 8032, pp. 1-60, 2017.

A. Pfitzmann and M. Köhntopp, "Anonymity, unobservability, and pseudonymity—a proposal for terminology," in Designing privacy enhancing technologies, pp. 1-9, 2001.

B. C. Pierce, "Types and programming languages," ch. 19, MIT Press, 2002.

J. Girard, "Light linear logic," Inf. Comput., vol. 143, No. 2, pp. 175-204, 1998.

S. Blackshear, D. L. Dill, and S. Qadeer, "Specifying and verifying Move programs." https://developers.libra.org/docs/specifying-and-verifying-move-programs-paper.

R. Milner, M. Tofte, and R. Harper, "Definition of standard ML," MIT Press, 1990.

S. Nakamoto, "Bitcoin: A Peer-to-Peer Electronic Cash System." https://bitcoin.org/bitcoin.pdf, 2008.

(56) References Cited

OTHER PUBLICATIONS

S. A. Crosby and D. S. Wallach, "Efficient data structures for tamper-evident logging," in 18th USENIX Security Symposium, Montreal, Canada, Aug. 10-14, 2009, Proceedings, pp. 317-334, 2009.
L. Reyzin and S. Yakoubov, "Efficient asynchronous accumulators for distributed PKI," in Security and Cryptography for Networks—10th International Conference, SCN 2016, Amalfi, Italy, Aug. 31-Sep. 2, 2016, Proceedings, pp. 292-309, 2016.
B. Laurie, A. Langley, and E. Käsper, "Certificate transparency," RFC, vol. 6962, pp. 1-27, 2013.
J. R. Driscoll, N. Samak, D. D. Sleator, and R. E. Tarjan, "Making data structures persistent," J. Comput. Syst. Sci., vol. 38, No. 1, pp. 86-124, 1989.
C. Okasaki, "Purely functional data structures," Cambridge University Press, 1999.
L. Reyzin, D. Meshkov, A. Chepurnoy, and S. Ivanov, "Improving authenticated dynamic dictionaries, with applications to cryptocurrencies," in Financial Cryptography and Data Security—21st International Conference, FC 2017, Sliema, Malta, Apr. 3-7, 2017, Revised Selected Papers, pp. 376-392, 2017.
F. B. Schneider, "Implementing fault-tolerant services using the state machine approach: A tutorial," ACM Computing Surveys (CSUR), pp. 299-319, 1990.
R. Arora et al., "The Libra Blockchain." https://developers.libra.org/docs/the-libra-blockchain-paper.
"The libp2p project." https://libp2p.io/.
"The multiaddr project." https://multiformats.io/multiaddr/.
T. Perrin, "The noise project." https://noiseprotocol.org/noise.html, 2018.
"The yamux project." https://github.com/hashicorp/yamux/blob/master/spec.md, 2016.
"The gRPC project." https://grpc.io/.
The Libra Association, "Becoming a founding member." https://libra.org/becoming-founding-member.
I. Bentov, A. Gabizon, and A. Mizrahi, "Cryptocurrencies without proof of work," in Financial Cryptography and Data Security—FC 2016 International Workshops, Bitcoin, Voting, and WAHC, Christ Church, Barbados, Feb. 26, 2016, Revised Selected Papers, pp. 142-157, 2016.
J. R. Douceur, "The sybil attack," in Peer-to-Peer Systems, First International Workshop, IPTPS 2002, Cambridge, MA, USA, Mar. 7-8, 2002, Revised Papers, pp. 251-260, 2002.
The Libra Association, "The path forward—roadmap TODO: LINK." bitcoin.org, https://bitcoin.org/.
digiconomist.net, https://digiconomist.net/bitcoin-energy-consumption.
T. Rocket, "Snowflake to avalanche: A novel metastable consensus protocol family for cryptocurrencies," 2018. https://ipfs.io/ipfs/QmUy4jh5mGNZvLkjies1RWM4YuvJh5o2FYopNPVYwrRVGV.
V. Buterin and V. Griffith, "Casper, the friendly finality gadget," 2017. https://arxiv.org/abs/1710.09437.
M. Castro and B. Liskov, "Practical byzantine fault tolerance," vol. 99, pp. 173-186, 1999. pmg.csail.mit.edu/papers/osdi99.pdf; in USENIX Symposium on Operating Systems Design and Implementation (OSDI).
E. Buchman, J. Kwon, and Z. Milosevic, "The latest gossip on BFT consensus," 2018. http://arxiv.org/abs/1807.04938v2.
R. Pass and E. Shi, "Thunderella: Blockchains with optimistic instant confirmation," 2017. https://eprint.iacr.org/2017/913.pdf.
G. Danezis and D. Hrycyszyn, "Blockmania: From block dags to consensus," 2018. http://arxiv.org/abs/1809.01620.
"The swirlds hashgraph consensus algorithm: Fair, fast, byzantine fault tolerance," 2016. https://swirlds.com/downloads/SWIRLDS-TR-2016-01.pdf.
A. Kate and I. Goldberg, "Distributed key generation for the internet," in EEE international conference on distributed computing systems, 2009, pp. 119-128.
D. Boneh, B. Lynn, and H. Shacham, "Short signatures from the Weil pairing," in Advances in cryptology—asiacrypt 2001, 2001, pp. 514-532.
L. Lamport, R. E. Shostak, and M. C. Pease, "The byzantine generals problem," ACM Trans. Program. Lang. Syst., pp. 382-401, 1982.
S. Blackshear et al., "The Move Programming Language." https://developers.libra.org/docs/move-paper.
C. Cachin, R. Guerraoui, and L. Rodrigues, Introduction to reliable and secure distributed programming. 2011.
Separating Agreement from Execution for Byzantine Fault Tolerant Services. J. Yin, J. Martin, A. Venkataramani, L. Alvisi, and M. Dahlin. ACM Symposium on Operating Systems Principles (SOSP), 2003.
https://github.com/ethereum/wiki/wiki/Design-Rationale#gas-and-fees.
Maurice Herlihy. 2017. Blockchains and the Future of Distributed Computing. In PODC, Elad Michael Schiller and Alexander A. Schwarzmann (Eds.). ACM. https://doi.org/10.1145/3087801.
Neil D. Jones and Steven S. Muchnick. 1979. Flow Analysis and Optimization of LISP-like Structures. In POPL. ACM, 244-256.
Leslie Lamport. 1984. Using Time Instead of Timeout for Fault-Tolerant Distributed Systems. ACM Tram. Program. Lang. Syst. 6, 2 (Apr. 1984), 254-280.
Nick Szabo. 1997. Formalizing and Securing Relationships on Public Networks. First Monday 2, 9 (1997). https://ojphi.org/ojs/index.php/fm/article/view/548.
J. Girard, "Linear logic," Theor. Comput. Sci., 1987.
M. Saad et al., "Exploring the attack surface of blockchain: A systematic overview," CoRR, 2019.
bitcoin.org, "Bitcoin script.". https://en.bitcoin.it/wiki/Script.
bitcoin.org, "Multisignature.". https://en.bitcoin.it/wiki/Multisignature.
M. Bartoletti and R. Zunino, "BitML: A calculus for bitcoin smart contracts," in Proceedings of the 2018 ACM SIGSAC conference on computer and communications security, CCS 2018, toronto, on, Canada, Oct. 15-19, 2018, 2018.
bitcoin.org, "Colored coin.". https://en.bitcoin.it/wiki/Colored_Coin.
K. Crary and M. J. Sullivan, "Peer-to-peer affine commitment using bitcoin," in Proceedings of the 36th ACM SIGPLAN conference on programming language design and implementation, portland, or, usa, Jun. 15-17, 2015, 2015.
V. Buterin and F. Vogelsteller, "ERC20 Token Standard." 2015. https://theethereum.wiki/w/index.php/ERC20_Token_Standard.
I. Sergey and A. Hobor, "A concurrent perspective on smart contracts," in Financial cryptography and data security, 2017.
V. Buterin, "Critical update re DAO." 2016. https://ethereum.github.io/blog/2016/06/17/critical-update-re-dao-vulnerability.
"The parity wallet hack explained." 2017. https://blog.zeppelin.solutions/on-the-parity-wallet-multisig-hack-405a8c12e8f7.
E. Meijer, R. Wa, and J. Gough, "Technical overview of the common language runtime." 2000.
T. Lindholm and F. Yellin, The Java virtual machine specification. Addison-Wesley, 1997.
K. Mazurak, J. Zhao, and S. Zdancewic, "Lightweight linear types in system f," in Proceedings of TLDI 2010: 2010 ACM SIGPLAN international workshop on types in languages design and implementation, madrid, spain, Jan. 23, 2010, 2010.
C. Catalini, R. Jagadeesan, and S. D. Kominers, "Market design for a blockchain-based financial system," SSRN Working Paper No. 3396834, 2019.
L. Gudgeon, P. Moreno-Sanchez, S. Roos, P. McCorry, and A. Gervais, "Sok: Off the chain transactions," IACR Cryptology ePrint Archive, vol. 2019, p. 360, 2019.
U.S. Appl. No. 16/442,475, Jan. 25, 2021, Office Action.
U.S. Appl. No. 16/442,470, Feb. 28, 2021, Office Action.
U.S. Appl. No. 16/442,474, Mar. 30, 2021, Office Action.
Anonymous: "Distributed ledger—Wikipedia", Apr. 28, 2019 (Apr. 28, 2019), XP055711947, Retrieved from the Internet: URL:https://en.wikipedia.org/w/index.php?t itle=Distributedledger&oldid=894548161 [retrieved on Jul. 6, 2020] p. 1, paragraph 1.

(56) References Cited

OTHER PUBLICATIONS

Vitalik Buterin: "State Tree Pruning ; Ethereum Foundation Blog", Jun. 26, 2015 (Jun. 26, 2015), XP055728780, Retrieved from the Internet: URL:https://blog.ethereum.org/2015/06/26/s tate-tree-pruning/ [retrieved on Sep. 8, 2020] p. 1, paragraph 1 Figure on p. 1 p. 3, paragraph 5 p. 3, paragraph 6 p. 3, paragraph 4-p. 4, paragraph 1 Figure on p. 2 p. 3, paragraph 2 bullet point 2; p. 3, last paragraph p. 1, paragraph 2 bullet points 2 and 3; p. 3, last paragraph.
Partial International Search Report as received in PCT/US2020/036769 dated Sep. 18, 2020.
International Search Report as received in PCT/US2020/036769 dated Nov. 9, 2020.
Malik et al., "A Parallel Proof of Work to Improve Transaction Speed and Scalability in Blockchain Systems", IEEE, pp. 1-10 (Year: 2018).
Sarah Rutherford, 4 types of bank account data errors that may be causing payment failure, Fraud Prevention, accessible at:https://www.experian.co.uk/blogs/latest-thinking/fraud-prevention/4-types-of-bank-account-data-errors-may-causing-payments failure/ (last visited on Apr. 2, 2021) (Year: 2014).
U.S. Appl. No. 16/442,475, Apr. 30, 2021, Notice of Allowance.
U.S. Appl. No. 16/442,470, Jul. 7, 2021, Office Action.
U.S. Appl. No. 16/442,473, Apr. 23, 2021, Office Action.
U.S. Appl. No. 16/442,476, May 7, 2021, Office Action.
Office Action dated Aug. 4, 2021 for U.S. Appl. No. 16/442,473, filed Jun. 15, 2019, 27 Pages.

\* cited by examiner

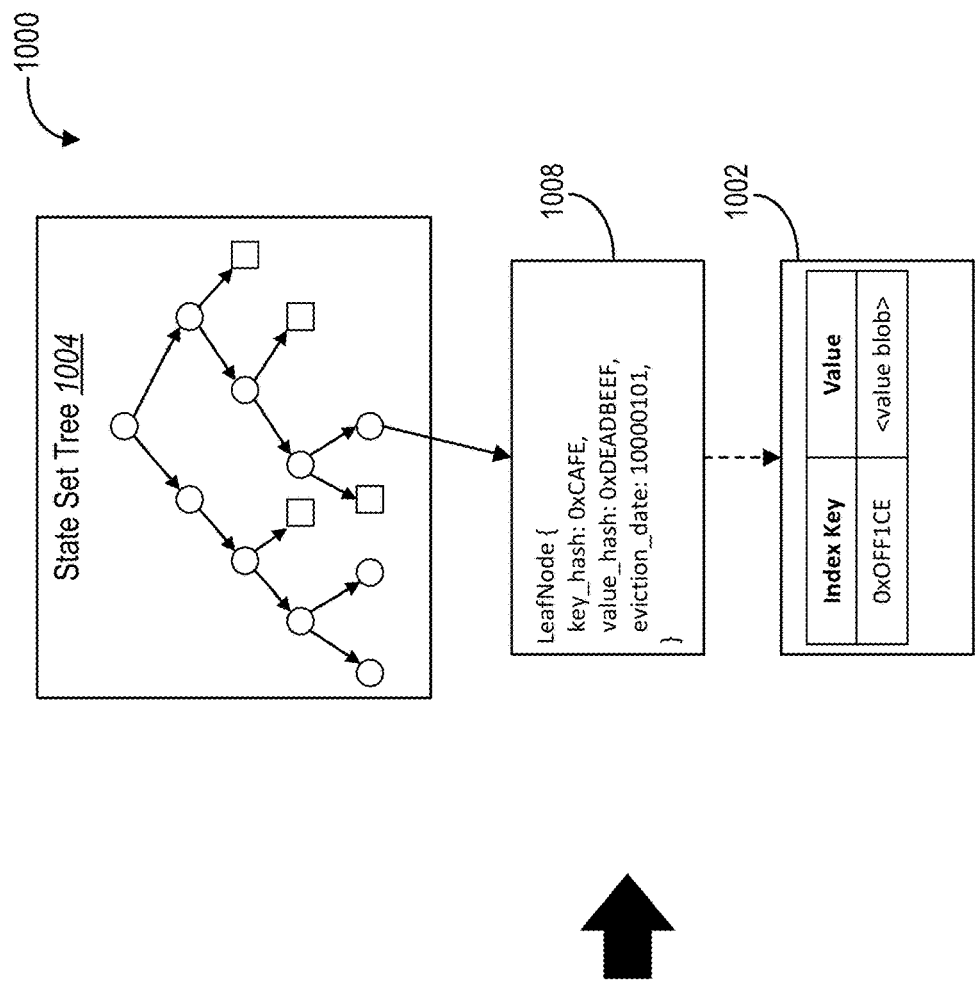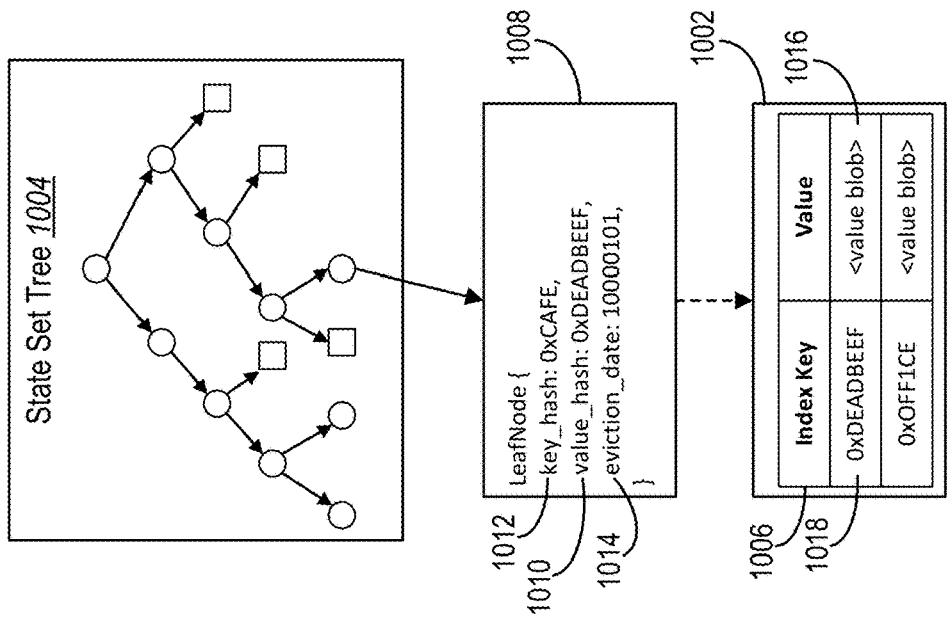
Fig. 10

SCALABLE, SECURE, EFFICIENT, AND ADAPTABLE DISTRIBUTED DIGITAL LEDGER TRANSACTION NETWORK

BACKGROUND

Recent years have seen significant advancements in hardware and software platforms for managing distributed ledger databases across a network of computing devices. Indeed, so-called "blockchain" systems can manage a consensus ledger via a network of entities distributed throughout the world and without a central entity that can be corrupted or otherwise manipulated to undermine the security and performance of the digital ledger. Specifically, conventional blockchain systems can decentralize control by maintaining a digital ledger on many replicated servers, or validator nodes. Algorithms, cryptography, and incentives enable such networks of validator nodes to maintain a collective, tamper-resistant ledger of transactions or other digital information.

Despite these advances, however, conventional blockchain systems suffer from several technological shortcomings that undermine efficiency, scalability, flexibility, and security of the implementing computing devices and corresponding distributed databases. For example, conventional blockchain systems often require significant processing and storage for validator nodes and client devices that interact across the implementing network. As mentioned above, many conventional blockchain systems maintain a duplicate database across replicated servers that store a history of digital transactions. Moreover, many conventional blockchain systems sequentially analyze transactions across the validator nodes to achieve consensus on the transactions and ultimately to update the distributed and duplicated ledger. This approach can place exorbitant storage and processing demands on computing devices. Indeed, the demand for certain processing devices has skyrocketed in recent years in proportion to the increased computing demand required by conventional blockchain systems in storing and analyzing transactions across distributed computer networks.

The inefficiencies of conventional blockchain systems have also hampered the scalability of these systems. For example, processing and storage burdens imposed by conventional blockchain systems undermine transaction throughput across the network and thus limit the rate and number of transactions that conventional systems can manage. Accordingly, conventional blockchain systems generally lack the scalability to provide a global distributed computing solution for managing digital transactions. Indeed, to date, conventional blockchain systems have generally been limited to a small population of niche users, excluding billions from accessing and utilizing blockchain technology.

In addition to efficiency and scalability concerns, conventional blockchain systems are also rigid and inflexible. For example, conventional blockchain systems provide limited options with regard to different programs, transactions, contracts, assets, and/or resources that can be accommodated or executed via a distributed database. Moreover, conventional blockchain systems provide limited control for storage at validator nodes, limited flexibility in executing transactions at validator nodes, and limited options over authentication keys and validation approaches for account holders and users of client devices accessing the network.

As mentioned above, conventional blockchain systems are also susceptible to inaccuracies and/or digital security attacks. For example, groups of validator nodes can agree on different versions of digital ledgers, resulting in inaccuracies, hard-forks, and insecurity of the underlying digital information. Some conventional systems perform consensus on transaction blocks, assuming execution of the transactions will be deterministic; thus, any non-deterministic execution behavior can result in inaccurate results at individual devices (or inaccuracies propagated across the digital ledger). Further, many conventional systems utilize bloom filters when providing transaction details in response to a query, risking false positives and failing to provide the ability for negative proofs to confirm accuracy of account data. Further, conventional blockchain systems often provide unrestricted digital asset access to user accounts storing digital assets, leading to exposure of all assets to malicious attacks upon loss of a private key associated with a user account. Additionally, as many conventional systems perform reference safety analysis on source code while programs are executed at the machine code level, many such systems inaccurately identify reference safety issues and/or introduce vectors for malicious attacks.

These, along with additional problems and issues, exist with regard to conventional blockchain systems.

SUMMARY

One or more embodiments described herein provide benefits and/or solve one or more of the foregoing or other problems in the art with systems, methods, and non-transitory computer readable storage media for implementing a scalable, secure, efficient, and adaptable distributed digital ledger transaction network. Indeed, the disclosed systems can reduce storage and processing requirements, improve security of implementing computing devices and underlying digital assets, accommodate a wide variety of different digital programs (or "smart contracts"), and scale to accommodate billions of users and associated digital transactions.

For example, the disclosed systems can make data storage more scalable and efficient by treating the blockchain in consensus as a single data structure that records the history of transactions and states over time. This implementation simplifies the work of computing devices accessing the blockchain, allowing them to read data from any point in time and verify integrity using a unified framework. Similarly, to obtain agreement among validator nodes, the disclosed systems can utilize a unique Byzantine-fault-tolerant consensus protocol. This approach provides high transaction throughput, low latency, and a more computationally-efficient method for achieving consensus relative to other blockchains.

In addition, the disclosed systems can utilize a new programming language to implement smart contracts on the blockchain. In particular, this new programming language makes it inherently easier to write code to fulfill user intent, thereby avoiding unintended bugs or security incidents (e.g., preventing asset cloning). Specifically, the disclosed systems can utilize a programming language that enables a linear data type that constrains digital assets to properties of a physical asset (e.g., a single owner, can only be spent once, restrictions against creation of new resources). In some embodiments, the disclosed systems also utilize an implementing programming language having a tree structure memory model for improved reference safety analysis. Using this programming language, the disclosed systems can implement a static-dynamic reference safety analysis at the bytecode level, reducing vectors for malicious attacks.

Furthermore, the disclosed systems provide a host of additional features that improve storage, account/address management, digital transaction execution, consensus, and synchronization processes. For example, with regard to storage, the disclosed systems can implement flexible storage deletion and/or storage consolidation policies that allow individual computer nodes to delete distributed data structures while retaining sufficient ledger information to accurately achieve consensus across the distributed digital ledger transaction network. The disclosed systems can also implement lazy account eviction policies that allow for more flexible storage management based on the individual preferences and/or the availability of computer memory or processing power at individual computing devices. The disclosed systems can also utilize a unique scratch pad data structure that flexibly tracks variations of the digital ledger while waiting for consensus.

Similarly, the disclosed systems can provide a variety of improvements with regard to user accounts, addresses, and account data accessible on a digital ledger. To illustrate, the disclosed systems can utilize re-encrypted sub-addresses to avoid tracing of account activity across the network. The disclosed systems can reduce barriers to initiate transactions by utilizing e-mail addresses (or other user identifiers) to determine and encrypt main address and sub-address identifiers corresponding to the distributed ledger. In addition, the disclosed systems can separate smart contract code from smart contract data within user accounts, allow individual accounts to store multiple smart contracts, delegate account permissions to other user accounts on the digital ledger, and decouple account addresses from cryptographic keys (allowing accounts to flexibly rotate authenticated keys to improve security across the network).

Furthermore, the disclosed systems can improve digital transactions executed across a distributed digital ledger transaction network. For example, the disclosed systems can implement transactions on the network using arbitrary transactions scripts and configurable smart contracts to manage tasks surrounding transaction execution. To illustrate, in some embodiments, the disclosed systems can utilize configurable smart contracts to accept/reject transactions, deduct gas payments, increment sequence numbers, and distribute gas to computer nodes (and flexibly modify these processes by consensus as needs of the distributed digital ledger transaction network change over time). In some embodiments, the disclosed systems further improve transaction execution by performing speculative parallel execution of transactions to reduce the time and computing overhead needed to execute a block of transactions, utilizing access limits to reduce exposure of digital assets resulting from theft or loss of an access key, and using transaction event counters to accurately identify transaction event details and perform negative proofs.

In addition to improvements in digital transaction execution, the disclosed systems can also improve consensus processes relative to conventional systems. For example, the disclosed systems can improve accuracy by performing consensus on state data structures reflecting execution results (rather than performing consensus on potentially non-deterministic transactions). The disclosed systems can also implement consensus pipeline rules to ensure that committed ledgers accurately reflect the state of the digital ledger. In some embodiments, the disclosed systems further implement system restart protocols to maintain consensus safety of the network (e.g., even when all nodes experience a shutdown). Moreover, the disclosed systems can efficiently, flexibly, and accurately control validator nodes participating in consensus by managing epochs of voting rights via smart contracts.

In addition to the foregoing improvements, the disclosed systems can also improve synchronization processes across the distributed digital ledger transaction network. For instance, the disclosed systems can improve the efficiency of synchronization across the distributed digital ledger transaction network by implementing incremental and parallel verification at various computer nodes synchronizing to the network. In addition, in some embodiments the disclosed systems utilize waypoints (e.g., published indicators of particular ground-truth reference states) to facilitate synchronization of computer nodes to the network (e.g., to correct conflicting digital ledger states, to generate a hard fork, or implement a genesis block).

In sum, the disclosed systems can implement a distributed digital ledger transaction network with high transaction throughput, low latency, and an efficient, high-capacity storage system. Moreover, the disclosed systems can securely manage a wide variety of digital assets, flexibly accommodate a variety of different customizable programs and smart contracts, and scale to execute and manage digital transactions for users across the globe.

BRIEF DESCRIPTION OF THE DRAWINGS

This disclosure will describe one or more embodiments of the invention with additional specificity and detail by referencing the accompanying figures. The following paragraphs briefly describe those figures, in which:

FIG. 10 illustrates the ledger transaction system performing account eviction in accordance with one or more embodiments;

DETAILED DESCRIPTION

Figure 1:
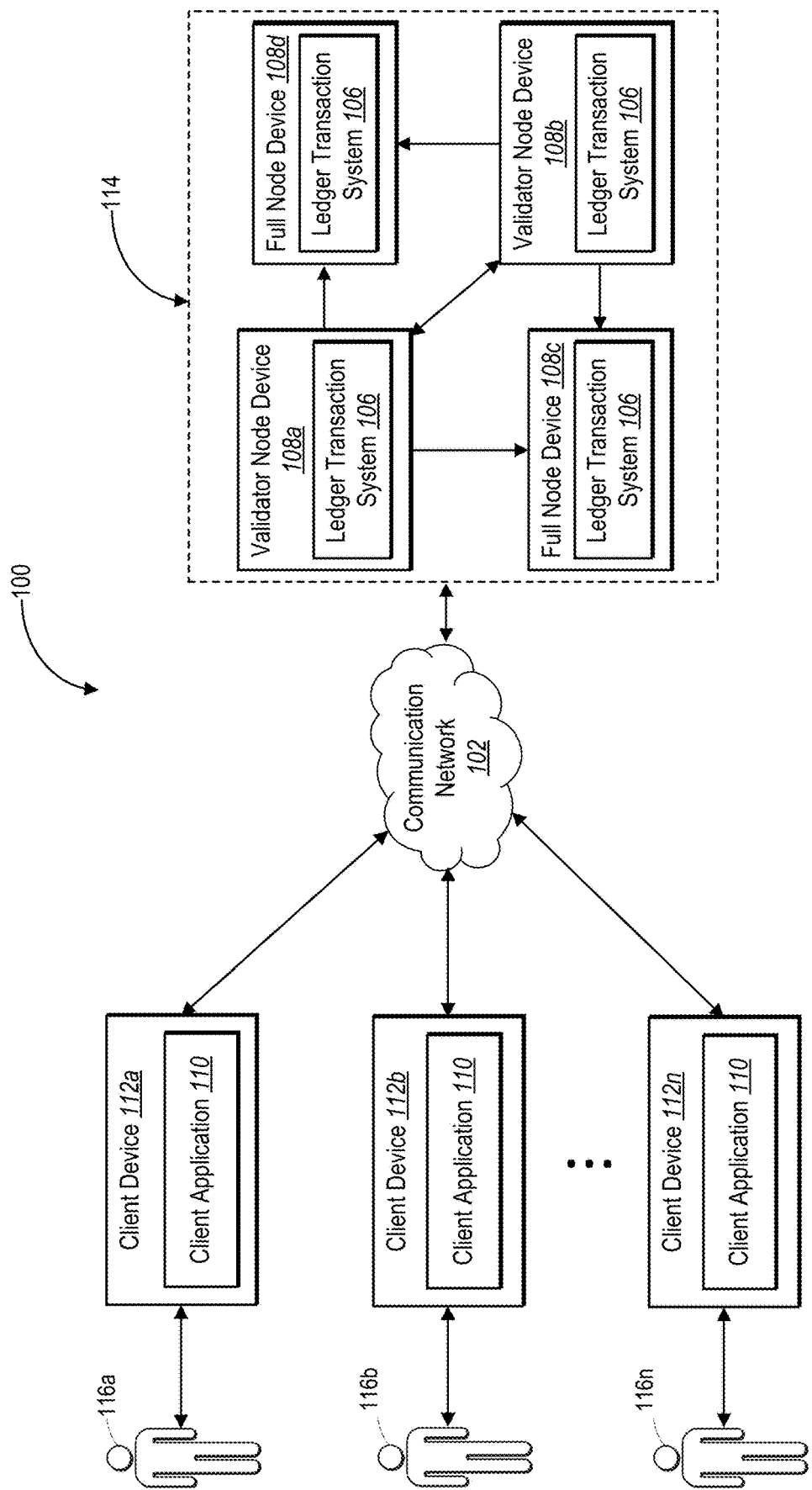
FIG. 1 illustrates an example distributed digital ledger transaction network in which a ledger transaction system can operate in accordance with one or more embodiments.

One or more embodiments described herein include a ledger transaction system for implementing a scalable, secure, efficient, and adaptable distributed digital ledger transaction network. For example, the ledger transaction system can manage a programmable database to support low-volatility digital assets (e.g., digital cryptocurrency) accessible around the world. To illustrate, the ledger transaction system can be implemented as part of a decentralized network in which a set of validator node devices jointly maintain a database of programmable resources (e.g., digital assets). The ledger transaction system can utilize an authenticated data structure that maps a logical data model of these databases to a set of tree structures (e.g., Merkle trees). The ledger transaction system can then utilize validator node devices to execute transactions and communicate via consensus to agree on the state of the authenticated data structures. In particular, the ledger transaction system can utilize a unique Byzantine fault tolerant consensus protocol that allows the network (even with potentially malicious validators) to maintain a consistent database over time by executing transactions via a new programming language and coming to agreement on their execution using the authenticated data structures.

As mentioned above, the ledger transaction system can provide a variety of improvements relative to conventional blockchain systems. For instance, in one or more embodiments, the ledger transaction system utilizes a new programming language that improves security, efficiency, and flexibility. In particular, the ledger transaction system can utilize a programming language that enables flexible transactions via arbitrary transaction scripts and allows user-defined code and datatypes, including "smart contracts" via modules.

Specifically, the programming language provides the ability to define custom resource types that enforce linearity. For example, the ledger transaction system can utilize linear data types to represent digital assets associated with the distributed digital ledger transaction network. By representing the digital assets as linear data types, the ledger transaction system subjects the digital assets to linear typing rules. For example, a digital asset represented as a linear data type must be used exactly once within a transaction and cannot be copied. By representing digital assets as linear data types, the ledger transaction system provides more flexible and more secure management of digital assets.

In some embodiments, the ledger transaction system uses a verifiable bytecode language as the executable representation of this programming language. This allows the ledger transaction system to utilize a combined static-dynamic reference safety analysis of transaction scripts and modules submitted for execution on the distributed digital ledger transaction network. Indeed, the ledger transaction system can perform the bulk of a reference safety analysis statically at the bytecode level using load-time bytecode verification (on structured memory tree models) and perform the remainder of the analysis dynamically at runtime. This approach improves security and reduces vectors for malicious attacks (e.g., attacks that seek to exploit or bypass a compiler). This approach also results in fewer instructions than a higher-level source language, reducing the overall footprint and making it easier to spot and avoid implementation errors.

In addition to improvements with regard to the implementing programming language, the ledger transaction system can improve a variety of other processes across a distributed digital ledger transaction network. For example, the ledger transaction system can improve storage, addressing and account management, transaction execution, consensus, and synchronization processes. For example, with regard to storage, the ledger transaction system can implement a variety of features to improve the efficiency, flexibility, and security of data structures maintained across a distributed digital ledger transaction network.

To illustrate, as mentioned above, the ledger transaction system can maintain a plurality of authenticated data structures that store the data of the digital ledger. In particular, an authenticated data structures can include a tree data structure (e.g., a sparse Merkle tree or Merkle accumulator) with nodes mapped to entries in a versioned database. For example, the authenticated data structures can include a state data structure (e.g., a state tree mapped to a state database reflecting user account states), an event data structure (e.g., an event tree mapped to event data for a particular transaction), and a transaction data structure (e.g., a transaction tree reflecting transactions together with states and events resulting from the transactions). By utilizing an authenticated tree data structure, the ledger transaction system can efficiently encode current and historical states, events, and/or transactions reflected in databases storing programmable resources. For example, the ledger transaction system can utilize a transaction tree structure, where the root value of the transaction state tree provides a unique representation of the current and historical states, events, and transactions recorded in corresponding databases. Moreover, the ledger transaction system can efficiently obtain consensus across the distributed digital ledger transaction network with reference to this root value.

In addition, in some embodiments, the ledger transaction system implements a set of storage deletion rules and/or a set of storage consolidation rules to manage the storage of the computer nodes of the distributed digital ledger transaction network. For example, the ledger transaction system can apply configurable storage deletion rules that allow different computer nodes to identify what (or what portions) of data structures to maintain. Moreover, the ledger transaction system can automatically remove portions of data structures to reduce storage and processing demands. For instance, the ledger transaction system can delete sub-trees of authenticated tree structures upon identifying that the sub-trees include full (e.g., populated) leaf nodes. Similarly, the ledger transaction system can store multiple different versions of a data structure by re-using unchanged portions of a previous version. In particular, the ledger transaction system can generate sub-tree components (reflecting only modified nodes) together with pointers referring unchanged nodes within historical tree structures. Thus, the ledger transaction system can efficiently and flexibly manage storage on the distributed digital ledger transaction network.

In some embodiments, the ledger transaction system can also improve storage by performing lazy account eviction. In particular, the ledger transaction system can delete, at a computer node, account data associated with expired user accounts based on user preferences and/or the computing resources available at that computer node. For example, the ledger transaction system can delete expired account data at a computer node without executing a transaction on the distributed digital ledger transaction network. Moreover, by embedding eviction dates in authenticated data structures, the ledger transaction system can maintain consistent query responses for data across the distributed digital ledger transaction network (even while providing each client device flexibility to delete expired data at its leisure). Furthermore, in one or more embodiments, the ledger transaction system can securely re-cache evicted accounts based on data representations remaining in the authenticated data structure. In this manner, the ledger transaction can securely and flexibly delete storage at computer nodes for more efficient storage management.

Additionally, one or more embodiments of the ledger transaction system improves storage processes by utilizing a scratch pad data structure to track execution results before committing them to storage. In particular, the ledger transaction system can utilize the scratch pad data structure to temporarily store execution results of conflicting transaction blocks and how those execution results affect the state of user accounts maintained on the distributed ledger. The ledger transaction system can then commit execution results stored in the scratch pad data structure based on the consensus protocol. Accordingly, the ledger transaction system can flexibly execute conflicting transaction blocks to ensure that computer nodes accurately reflect the consensus digital ledger.

In addition to improvements in storage, as mentioned above the ledger transaction system can also improve management of addresses and/or accounts within a distributed digital ledger transaction network. For example, in some embodiments, the ledger transaction system generates encrypted sub-addresses unique to a particular transaction in order to securely protect the sub-address from identification by external entities. For example, the ledger transaction system can encrypt a sub-address associated with a user account using a public cryptographic key associated with the user account. In one or more embodiments, the ledger transaction system utilizes a public document (e.g., a billboard), digital visual codes, email addresses (and/or DNS records), telephone numbers, or user IDs to identify account addressing information and/or public encryption keys. In this manner, the ledger transaction system can flexibly initiate and execute transactions without leaving traceable information linked to sub-addresses on the digital ledger.

Additionally, in one or more embodiments, the ledger transaction system can separate smart contract code from smart contract data within user accounts (in contrast to conventional systems that use singleton-like objects to execute smart contracts). The ledger transaction system can utilize a module (smart contract code) to define the attributes of a resource (smart contract data/values) owned by a corresponding user account, where the module defines the procedures that can be used to modify, create, delete, or otherwise interact with the resource. The ledger transaction system can utilize the module to generate one or more resources sharing the same attributes and governed by the same set of procedures. Further (in contrast to conventional systems that generally store a single smart contract with regard to an account), the ledger transaction system can implement an addressing scheme for storing multiple modules and/or resources under a single user account address.

The ledger transaction system can further improve account management by storing and transferring variety of digital assets. For example, in one or more embodiments, the ledger transaction system can generate a resource corresponding to withdraw permissions of a user account. The ledger transaction system can then delegate the withdraw permissions to another user account by executing a transaction sent from the user account transferring the withdraw permissions (i.e., as a digital asset). Thus, the ledger transaction system can flexibly provide access to the digital assets of a user account to another account according to the needs of the user associated with the user account.

Additionally, the ledger transaction system can improve management of accounts across the distributed digital ledger transaction network by decoupling authentication keys associated with user accounts from the addresses of the user accounts. For example, the ledger transaction system can replace the authentication key of a user account without requiring the contents of the user account be moved to a new address. To illustrate the ledger transaction system can generate a new authentication key for a user account if one of the cryptographic keys—such as the private encryption key—associated with the user account leaks. Thus the ledger transaction system can modify authentication keys to provide flexible security solutions for user accounts.

As mentioned above, in addition to storage and account/addressing improvements, the ledger transaction system can also improve transaction execution within a distributed digital ledger transaction network. For example, in some embodiments, the ledger transaction system utilizes arbitrary transaction scripts for executing transactions on the distributed digital ledger transaction network. Indeed, the ledger transaction system can utilize transaction scripts containing an arbitrary bytecode program that can invoke multiple procedures from various modules, use conditional logic, and perform local computation in a single script. The transaction script can invoke the module procedures to modify, create, destroy, or otherwise interact with one or more resources corresponding to that module. In other words, the ledger transaction system can utilize transaction scripts to interact with resources based on the procedures defined in the corresponding module. Indeed, in one or more embodiments, the ledger transaction system limits interaction with the resources to the corresponding module's procedures in order to provide for data abstraction. Thus, the ledger transaction system can utilize transaction scripts to more flexibly execute transactions on the distributed digital ledger transaction network.

The ledger transaction system can further improve transactions by utilizing modules (i.e., smart contracts) as part of the process of transaction execution. For example, the ledger transaction system can utilize a smart contract to perform checks on transactions and reject the transactions if necessary. In addition, the ledger transaction system can utilize a smart contract to perform post-execution tasks, such as incrementing a sequence number stored at a user account and deducting a transaction fee from the user account. Additionally, the ledger transaction system can utilize a smart contract to distribute gas payments to computer nodes participating on the distributed digital ledger transaction network. In one or more embodiments, these modules are configurable, such that they can be replaced or updated as needed. Thus, the ledger transaction system utilize smart contracts to execute transactions and flexibly modify the rules governing transactions by consensus over time.

In one or more embodiments, the ledger transaction system also improves execution of transactions by performing speculative parallel execution of a plurality of transactions. For example, the ledger transaction system can identify a first state data structure of the distributed digital ledger transaction network (i.e., a first state of the digital ledger) and a plurality of transactions associated with user accounts of the distributed digital ledger transaction network. The ledger transaction system can then perform a preliminary execution of the transactions in parallel relative to the first state data structure to determine a plurality of transaction results and dependencies among the transactions with regard to the user accounts. The ledger transaction system can then modify the first state data structure to a second state data structure by applying the plurality of transaction results based on the dependencies of the transactions. By executing transactions in parallel, and committing transactions to storage based on determined dependencies, the ledger transaction system executes transactions more flexibly and efficiently than conventional systems.

The ledger transaction system can also improve security and flexibility of transaction execution by utilizing access limits to control access to digital assets associated with a user account. For example, in one or more embodiments, the ledger transaction system can implement access limits that must be satisfied before granting access to digital assets. In some embodiments, the ledger transaction system can require a threshold number of access keys from a group of keys before providing access to a user account. Moreover, in some embodiments, the ledger transaction system 106 utilizes rate/value limited access keys and corresponding key limits to limit the access provided to the digital assets of a user account in executing transactions. For example, the ledger transaction system can limit the time for which an access key is valid and/or the amount of digital assets (e.g., the value of digital currency) accessible by that access key. Using these access limits, the ledger transaction system provides more security with regard to digital assets. Specifically, the ledger transaction system can utilize access limits to prevent unlimited access to digital accounts from a malicious actor in the event that an access key is leaked or stolen.

The ledger transaction system can also improve transactions across the distributed digital ledger transaction network by utilizing transaction event counters to track and report transaction event details. For example, upon executing a transaction associated with a user account, the ledger transaction system can generate one or more transaction events corresponding to that user account (within an event data structure). The ledger transaction system can then increment count values of transaction event counters corresponding to those transaction events (within a state data structure). Client devices implementing the ledger transaction system can monitor (e.g., poll) the transaction event counters to determine when events have occurred, and then utilize count values to request and verify transaction details (from the transaction data structure). Thus, the ledger transaction system can more accurately indicate when a transaction event has occurred and more efficiently provide event data. The ledger transaction system can also poll transaction event counters to perform negative proofs establishing that account data has not changed.

As mentioned above, in addition to improving execution of transactions, the ledger transaction system can also improve the process of obtaining consensus across the distributed digital ledger transaction network. For example, in one or more embodiments, the ledger transaction system utilizes the validator node devices of the distributed digital ledger transaction network to perform consensus based on the execution results corresponding to a transaction block, rather than the performing consensus only on the transactions themselves. In other words, the ledger transaction system can have validators collectively sign the full resulting state of a block, rather than a sequence of transactions. In this manner, the ledger transaction system anticipates non-deterministic execution behavior and ensures that the validator nodes commit an accurate representation of the digital ledger to storage upon the transaction blocks reaching consensus.

In addition, the ledger transaction system can also improve consensus processes by utilizing a method for pipelining the consensus protocol. Indeed, in one or more embodiments, the validator node devices of the distributed digital ledger transaction network vote on the execution results of a transaction block in several rounds of voting before the ledger transaction system commits those execution results to storage. For example, the ledger transaction system can apply a contiguous 3-chain commit rule by committing a first state of the digital ledger to memory after three contiguous rounds (the first state of the digital ledger and two subsequent states of the digital ledger) have obtained consensus across the distributed digital ledger transaction network. In this manner, the ledger transaction system can ensure the accuracy of committed data structures.

Further, the ledger transaction system can also improve consensus safety of validator node devices upon a system restart. For example, before a validator node device submits a vote for a transaction block, the ledger transaction system can store, at each validator node device, the consensus state for that validator node device (including the last voted round and the preferred block round). Upon a system restart, the ledger transaction system can load the consensus state at the validator node device to continue participating in consensus without issue. In this manner, even if all validator nodes shut down, the ledger transaction system can ensure consensus safety when the validator nodes restart.

As mentioned above, consensus can include voting amongst a plurality of validator nodes for a particular ledger state. In one or more embodiments, the ledger transaction system improves this consensus process by managing the voting rights of the validator node devices via smart contract. For example, the ledger transaction system can implement a proof-of-stake protocol to allow user accounts of the distributed digital ledger transaction network to manage participation in the set of validator node devices. The ledger transaction system can further manage changes to the set of validator node devices via a smart contract. In one or more embodiments, the ledger transaction system utilizes modules to manage the proof-of-stake protocol and/or the changes to the set of validator node devices. Indeed, the ledger transaction system can utilize a module to enforce a change to the set of validator node devices at the boundary of an epoch.

In addition to consensus, the ledger transaction system can also provide technical benefits with regard to synchronization processes of the distributed digital ledger transaction network. For example, in some embodiments, the ledger transaction system uses incremental verification at a computer node in synchronizing to the distributed digital ledger transaction network. Indeed, a synchronizing computer node can download data associated with the digital ledger together with data proofs (e.g., a Merkle proof) in segments. The ledger transaction system can then verify, at the client device, that the received data is accurate before downloading more data. Thus, the ledger transaction system can more efficiently synchronize computer nodes to the distributed digital ledger transaction network.

Additionally, the ledger transaction system can improve synchronization efficiency utilizing a parallel synchronization approach. Indeed, the ledger transaction system can download different segments of data and corresponding proofs associated with the digital ledger (e.g., different snapshots of the state of the digital ledger) on separate verification devices. The ledger transaction system can then use each verification device to verify the segment of data downloaded to that device in parallel with the other verification devices. Accordingly, the ledger transaction system can more efficiently synchronize computer nodes to the distributed digital ledger transaction network.

In one or more embodiments, the ledger transaction system also facilitates synchronization across the distributed digital ledger transaction network utilizing waypoints. In particular, the ledger transaction system can generate and use a waypoint to indicate the correct/preferred version of a digital ledger to utilize across the distributed digital ledger transaction network. By utilizing waypoints, the ledger transaction system can also facilitate acceptance of certain transaction (i.e., FTVM transactions) that may otherwise be rejected. For example, the ledger transaction system can utilize waypoints to facilitate acceptance of FTVM transactions that establish a genesis block or create a hard fork on the distributed digital ledger transaction network.

As illustrated by the foregoing discussion, the present disclosure utilizes a variety of terms to describe features and benefits of the ledger transaction system. Additional detail is now provided regarding the meaning of these terms. For example, As used herein, the term "digital ledger" (or "distributed digital ledger" or "public ledger") refers to common data maintained across a plurality of computing devices. In particular, a digital ledger can include one or more common data structures maintained by a plurality of computing devices that reflects states, transactions, events, and/or account data. To illustrate, a digital ledger can include one or more data structures reflecting the state of the network (i.e., the state of the user accounts of the network), data associated with transactions executed across the network, data corresponding to transaction events, and/or data relating to consensus of the digital ledger. The digital ledger can include, but is not limited to, the following properties: publicly-available (i.e., viewed by anyone), tamper-resistant (i.e., data manipulation is detectable), transparent (i.e., anyone can view the history of the digital, including executed transactions), and replicated (i.e., every computer node has a copy).

Additionally, as used herein, the term "distributed digital ledger transaction network" refers to a network of computing devices for maintaining a digital ledger. In particular, a distributed digital ledger transaction system can include a collection of computing devices, associated peripherals, communication protocols, and communication mediums that can implement and/or interact with a system implementing a digital ledger (e.g., the ledger transaction system). For example, a distributed digital ledger transaction network can include one or more client devices and computer nodes communicating via a network to implement and/or interact with the ledger transaction system. As the distributed digital ledger transaction network can implement a digital ledger, in one or more embodiments, the terms "state of the distributed digital ledger transaction network" and "state of the digital ledger" are used synonymously.

Further, as used herein, the term "computer node" refers to a computing device participating in the distributed digital ledger transaction network. In particular, a computer node can refer to a computing device that stores and maintains, at least part of, the digital ledger. For example, a computer node can include a full node device (e.g., a "full node") or a validator node device (e.g., a "validator node").

Additionally, as used herein, the term "user account" refers to an account of the distributed digital ledger transaction network. In particular, a user account can refer to a collection of code and/or data (i.e., modules and/or resources) stored within a state data structure of the distributed digital ledger transaction network. A user account can be associated with a user of the distributed digital ledger transaction network but is not limited to such an account. For example, a user account can also include an administrative account, or an account otherwise used to store code or data unassociated with a particular user. Similarly, a user account can include custodial wallets that act on behalf of their users.

As used herein, the term "public key" (or "public cryptographic key," or "public encryption key," or "asymmetric key") refers to a publicly visible cryptographic key. In particular, a public key can refer to a cryptographic key associated with a user account meant to be sent to and/or used by entities unassociated with the user account. For example, a public key can be sent with a transaction from a user account to a validator node device of the distributed digital ledger transaction network. A public key can have a corresponding private key.

As used herein, the term "private key" (or "private cryptographic key," or "private encryption key") refers to a privately kept cryptographic key. In particular, a private key can refer to a cryptographic key associated with a user account (and corresponding to a public key of the user account) that is maintained in secrecy. An example use of a private key includes signing (e.g., encrypting) a transaction sent from a user account using a private key corresponding to the user account.

Additionally, as used herein, the term "authentication key" refers to a value authenticating a user account. In particular, an authentication key can refer to a value stored at a user account used to authenticate the user account when the user account sends a data (e.g., a transaction request) across the distributed digital ledger transaction network (e.g., to a validator node device). For example, an authentication key can include the account address or hash of the account address of the corresponding user account or a hash of the public key of the corresponding user account. As described below, in some embodiments the ledger transaction system creates a modified authentication key that is divorced from the account address.

Further, as used herein, the term "main public address identifier" (or "main address identifier" or "public address identifier") refers to an identifier for the main address of a user account of the distributed digital ledger transaction network. In particular, a main public address identifier can include the main public address itself or a value associated with a user account that indicates the main address of the user account. As used herein, the term "main public address" or "main address" or "public address" or "address" refers to an account address of a user account on the distributed digital ledger transaction network. In particular, a main public address can refer to an account address directly associated with and tracked by the digital ledger.

Relatedly, as used herein, the term "sub-address identifier" refers to an identifier for a sub-address associated with a user account of the distributed digital ledger transaction network. In particular, a sub-address identifier can refer to a sub-address itself or a value indicating a sub-account associated with a user account of the distributed digital ledger transaction network. Indeed, in one or more embodiments, a user account of the distributed digital ledger transaction network maintains an internal database of one or more sub-accounts. The user account can identify a particular sub-account using the corresponding sub-address.

Additionally, as used herein, the term "consensus" refers to a confirmation of a digital ledger (e.g., confirmation of a ledger reflecting a state and/or transactions). In particular, consensus can refer to acceptance of a digital ledger (e.g., state reflecting a transaction or block of transactions) via a consensus protocol. In some embodiments, consensus refers to acceptance of the execution results corresponding to a transaction or transaction block. Consensus can be determined using a variety of different consensus protocols, including various members of the Byzantine fault tolerant family of consensus protocols. To illustrate, consensus can be determined using a HotStuff consensus protocol, a proof-of-work consensus protocol, a proof-of-stake consensus protocol, and/or a delegated proof-of-stake consensus protocol. For example, consensus can be determined based on a number of votes provided by a set of validator nodes confirming that a block of transactions (or the execution results corresponding to the block of transactions) is valid.

As used herein, the term "epoch" refers to a period that a set of validator node devices participate in consensus. In particular, an epoch can refer to a minimum delay between changes in the set of validator node devices. Epochs can, for example, be measured by time or a number of transaction blocks that have gone through consensus (e.g., a number of voting rounds).

Further, as used herein, the term "request" refers to a transmission to a computer node of the distributed digital ledger transaction network. In particular, a request can refer to a transmission to a computer node requesting performance of an action. For example, a request can include a transaction request or a query for information retrieval. Though the following disclosure will generally discuss requests as submitted by client devices, requests are not so limited. In some embodiments, requests can be sent by an administrator device or another computer node of the distributed digital ledger transaction network (e.g., in the processing of sharing requests among computer nodes).

Specifically, as used herein, the term "transaction request" (or "transaction event request" or "request for a transaction") refers to a request corresponding to a transaction (e.g., a request to execute or commit a transaction to the digital ledger). In particular, a transaction request can refer to a transmission, received by a computer node, requesting execution of a transaction via the distributed digital ledger transaction network. A transaction request can include a transaction to be executed (e.g., as detailed within a transaction script). In some embodiments, a transaction request includes additional detail, such as a sequence number corresponding to the requested transaction, an account address of the sending user account, a public key of the sending user account, etc. Though the following disclosure will generally discuss transaction requests as submitted by client devices, transaction requests are not so limited. Transaction requests can be sent by an administrator device or another computer node (e.g., in the processing of sharing transaction requests among computer nodes) of the distributed digital ledger transaction network.

Specifically, as used herein, the term "account reinstatement request" refers to a transaction request to reactivate a user account. In particular, an account reinstatement request can refer to a request to re-cache, within an account state data structure, account data associated with an expired user account. An account reinstatement request can include proposed account data for the requested re-caching.

Further, as used herein, the term "transaction" refers to a program or action performed on the distributed digital ledger transaction network. In particular, a transaction can include the performance of at least one operation (e.g., by a computer node) that modifies the state data structure of the distributed digital ledger transaction network. For example, a transaction can include a transfer of one or more digital assets between user accounts or an account reinstatement.

As used herein, the term "execution" or "execution of a transaction" refers to one or more acts carried out with regard to a transaction. In particular, the term execution can refer to running a transaction script with its arguments and the current ledger state as input to produce a transaction output. In performing execution of a transaction, the ledger transaction system can perform a collection of acts that includes, but is not limited to, performing initial checks upon receiving a transaction, analyzing the transaction (e.g., verifying transaction script and modules), publishing modules (e.g., publishing models corresponding to the transaction within impacted user accounts), running transaction script, and running epilogue (e.g., charging for gas used and incrementing user sequence number).

As used herein, the term "dependencies" or "dependencies of transactions" refers to a relation between two or more transactions. In particular, dependencies can refer to two or more transactions within the same transaction block that are associated with one or more of the same user accounts. More specifically, two or more transactions can be dependent when the execution of one transaction depends on the execution of another transaction. For example, two transactions can be dependent where one transaction writes to a user account and another transaction reads from the user account. The dependencies can refer to a variety of different relations corresponding to a variety of granularities of the account data. For example, dependency can refer to utilization of any common resource stored in a user account and identified by two or more transactions.

Additionally, as used herein, the term "transaction event" or "event" refers to a result of a transaction. In particular, a transaction event can refer to side effects (e.g., updates or modifications) produced by executing a transaction. Examples of transaction events include, but are not limited to, a withdrawal of a digital asset from a user account or a deposit of a digital asset to a user account. As used herein, the term "transaction event detail request" refers to a query for information that requests event data corresponding to a transaction event. A transaction event detail request can include a request for event data corresponding to a single transaction event or event data. Additionally, a transaction event detail request can include a transaction event sequence request for event data corresponding to a sequence of events.

Further, as used herein, the term "event type" or "event class" refers to a transaction event category. In particular, an event type can refer to a classification applicable to a set of transaction events having one or more common characteristics. For example, an event type can refer to transaction events corresponding to payments received by a user account or transaction events corresponding to payments sent by a user account.

As used herein, the term "event data" or "transaction event data" refers to digital data associated with a transaction event. For example, event data can include details of the transaction event (referred to as "transaction event details"), an access path corresponding to a transaction event counter corresponding to the transaction event, and a sequence number corresponding to the count value of the transaction event counter associated with the transaction event.

As used herein, the term "transaction event counter" refers to a counter (e.g., stored at a user account) that tracks events associated with a user account. For example, a transaction event counter can include a resource, stored at a user account, generated to track events associated with the user account. A transaction event counter can store a count value that indicates a number (or volume) of events associated with the user account that have been generated. As used herein, the term "event count request" refers to a query for information regarding the count value of a transaction event counter.

Further, as used herein, the term "account state" or "user account state" refers to a condition of a user account of the distributed digital ledger transaction network at a particular period, iteration, version, or time. In particular, an account state can refer to the values (e.g., key-value pairs) associated with a user account at a particular time, iteration, or version of a digital ledger. An account state can include any values relevant to or associated with a user account. For example, an account state can include the resources (e.g., digital assets) and modules associated with a user account. An account state can include other values as well, such as an eviction date association with a user account.

Additionally, as used herein, the term "data structure" or "authenticated data structure" refers to a collection of data. In particular, an authenticated data structures can refer to a collection of data that allows a verifier to measure accuracy of the data. For example, an authenticated data structure can include one or more tree structures that maps to entries of one or more corresponding databases. A verifier can analyze a short authenticator of the tree structure to verify the accuracy of the tree structure and/or the corresponding database. As mentioned above (and described in greater detail below), a data structure can include, but is not limited to, a state data structure, an event data structure, a transaction data structure, and a signature data structure.

In particular an authenticated data structure can allow a verifier, V, to hold a short authenticator, a, which forms a binding commitment to a data structure D. An untrusted prover P, which holds D computes and returns both r, the result of the computation for some function F, as well as $\pi$, a proof F(D)→r of the correct computation of the result to the verifier. V can run Verify(a, F, r, $\pi$) which returns true if an only if F(D)=r. As mentioned, authenticated data structures can include tree structures used to store maps between integers and string values.

Further, as used herein, the term "data tree," "tree structure," or "tree data structure" refers to data represented as a set of linked nodes (with a root node and one or more subtrees of parent nodes and children nodes) mapped to one or more entries of a database (e.g., mapping integers of the nodes to string values of the database). A data tree can include, but is not limited to, a binary tree. For example, a data tree can include a Merkle tree, such as a sparse Merkle tree or Merkle accumulator. A tree can refer to a state tree, an event tree, or a transaction tree.

For example, in a Merkle tree of size $2^k$, D maps every integer key $i \in [0, 2^k)$, to a string value $s_i$. The authenticator is formed from the root of a full binary tree created from the strings, labeling leaves as $H(i\|s_i)$ and internal nodes as $H(left\|right)$ where H is a cryptographic hash function (or "hash"). The function F the prover wishes to authenticate relates to lookups of key-value pairs, e.g., F: (k, v)∈D, where r=(k, v). P authenticates lookups for an item i in D by returning a proof $\pi$ consisting of the labels of the siblings of each of the ancestors of node i.

As used herein, the term "database" or "database structure" refers to a collection of data (e.g., string values). For example, a database can include a versioned database comprising account values, event details, transactions details, signatures or other information. Accordingly, a database can include, but is not limited to, a state database, an event database, a transaction database, or a signature database. In some embodiments, the ledger transaction system can combine a state database, event database, transaction database, and/or signature database into a single database (e.g., a single digital file).

Relatedly, as used herein, the term "intermediate state data structure" refers to an uncommitted state data structure. In particular, an intermediate state data structure can refer to a state data structure that has not been written into storage (i.e., permanent storage). For example, an intermediate state data structure can include a state data structure that is stored in temporary storage as a result of preliminarily executing transactions in a transaction block before consensus has been achieved.

As used herein, the term "data representation" or "account state representation" refers to node values (e.g., integers) in a data structure representing corresponding entries (e.g., strings) in a database. For example, an account state representation can refer to digital data stored within a node (e.g., a leaf node) of a state tree that reflects account data corresponding to the node within a state database. For example, a data representation can include a hash of entries (e.g., an account value) stored within an entry of a database (e.g., a state database). A data representation can further include an authentication key and/or an eviction date of the corresponding user account.

As used herein, the term "account data" refers to digital data stored in a state database. In particular, account data can refer to digital data stored within one or more entries of a database, the entries being associated with a particular user account. Account data can include, but is not limited to, an account value (e.g., the digital assets owned by the user account) and a hash of the account value that provides a mapping between the database entries and the account state representation of the user account.

Additionally, as used herein, the term "lazy deletion" refers to an asynchronous deletion among computer nodes of the distributed digital ledger transaction network. In particular, lazy deletion can include marking an element as deleted/expired (without deleting the underlying data until a later time selected at the leisure of the computing device). For example, the act of deleting can occur based on user preferences set at the computer node or based on availability of computing resources of the compute node. The act of deleting can occur independent of when other computer nodes of the distributed digital ledger transaction network delete the corresponding database entries stored at those computer nodes.

As used herein, the term "scratch pad data structure" refers to a collection of (temporary) data storing execution results until the ledger transaction system has determined whether consensus has failed or succeeded with regard to those execution results. The scratch pad data structure can store the execution results of multiple transaction blocks, some of which may conflict, representing alternative possible additions to the digital ledger.

Additionally, as used herein, the term "eviction date" refers to an expiration time of a user account. In particular, an eviction date can refer to a time at which a user account is no longer considered active. To illustrate, an eviction date can include a timestamp associated with a user account. If a time of the distributed digital ledger transaction network is greater than the time included in the timestamp, that user account has expired.

Further, as used herein, the term "rent deposit amount" refers to a payment for storage on the distributed digital ledger transaction network. In particular, a rent deposit amount can refer to currency paid to use storage on the distributed digital ledger transaction network to store digital data corresponding to a user account of the distributed digital ledger transaction network. A rent deposit amount can refer to a value paid in digital currency (i.e., gas or other digital currency exchanged on the distributed digital ledger transaction network).

As used herein, the term "module" refers to smart contract code. In particular, a module can refer to a code value. More specifically, a module can refer to an object on the distributed digital ledger transaction network that contains code defining and declaring types and procedures used in implementing the module. For example, a module can define a class of objects that implement that module. To illustrate, a module can include bytecode that declares resource types and procedures. In some embodiments, a module is defined by an address of an account where the module is declared.

As used herein, the term "resource" refers to smart contract data. In particular, a resource can refer to a data value. Indeed, a resource can refer to an object that provides a specific instance or implementation of a module, subject to the data type(s) defined therein and manipulated using the procedures defined therein. For example, a resource can include a language feature that that enables implementation of digital assets (such as a digital currency, from a class of digital assets defined within a module), data structures, and logic. In one or more embodiments, a resource includes a record that binds name fields to simple values (i.e., integers) or complex values (i.e., other resources embedded inside the particular resource).

As used herein, the term "digital asset" refers to digital data associated with (e.g., owned by or belonging to) a user account. In particular, a digital asset can refer to a resource that is owned by a user account and generated from a module defining a class of digital assets. For example, a digital asset can include a title representing ownership of a physical asset or another digital asset, or one or more units of a digital currency or a fraction of a unit of digital currency. In one or more embodiments, the ledger transaction system represents a digital asset as a linear data type, subject to associated linear typing rules.

Additionally, as used herein, the term "linear data type" refers to a programming value. In particular, a linear data type can refer to a programming value used to enforce linearity with regard to a resource on the distributed digital ledger transaction network. For example, a linear data type can represent units of digital currency or other digital assets on the distributed digital ledger transaction network. Relatedly, as used herein, the term "linear typing rules" refer to one or more rules associated with linear data types, the rules enforcing linearity. For example, the linear typing rules can include a linear typing rule that requires that a digital asset of a linear data type be used exactly once during a transaction in which the digital asset is referenced. Additionally, the linear typing rules can include a linear typing rule that prohibits a digital asset from being duplicated (i.e., copied).

As used herein, the term "in parallel" (when referring to processes performed by one or more computing devices) means performing processes with some overlap with regard to time (e.g., simultaneously or near simultaneously). In particular, the term "in parallel" can refer to a plurality of processes performed in a way so that at least two of the processes overlap in some way so that at least part of the at least two process occur at the same time. For example, the at least two processes can overlap entirely so that they both begin and end concurrently. In parallel can include, but is not limited to, executing transactions, downloading data, or verifying data.

Further, as used herein, the term "access path" refers to an identifier of a location of digital data within a data structure. In particular, an access path can refer to a location of a module or resource within a user account of the distributed digital ledger transaction network. For example, an access path can include an address (e.g., a main address) associated with a user account and an identifier corresponding to the resource or module.

Additionally, as used herein, the term "nonce" (or "cryptographic nonce") refers to a character set. In particular, a nonce can refer to a non-deterministic (e.g., random one or pseudo-random) number. For example, a nonce can include a single character (e.g., a single numeric value) or a string of characters.

As used herein, the term "digital visual code" refers to an image that encodes digital data. In particular, a digital visual code can refer to image (e.g., a pattern) that can be decoded to obtain digital data associated with a user account of the distributed digital ledger transaction network. For example, a digital visual code can include a quick response ("QR") code but can also include any other image from which digital data can be determined.

Additionally, as used herein, the term "DNS record" refers to an entry in a Domain Name System ("DNS"). In particular, a DNS record can refer to an entry in a DNS database that maps an email address to account identification information (e.g., a main public address identifier and/or a public encryption key) for a user account on the distributed digital ledger transaction network. For example, a DNS record can include a DNS text record ("TXT record"). Relatedly, as used herein, the term DNSSEC (or "Domain Name System Security Extensions") refers to a set of security extensions to DNS that can assist in authenticating or otherwise validating data stored on a DNS.

Further, as used herein, the term "gas" refers to a digital asset used for fee payments. In particular, gas can refer to a digital currency associated with a user account used to pay fees for actions taken on the distributed digital ledger transaction network. For example, gas can include digital currency used to pay transaction fees, an account startup fee, an account reinstatement fee, or a rent deposit. Gas can include a distinct digital asset or can be extracted from other digital assets associated with a user account.

I. System Overview

A. Computing Environment

Additional detail regarding the ledger transaction system will now be provided with reference to the figures. For example, FIG. 1 illustrates a schematic diagram of a distributed digital ledger transaction network 100 in which a ledger transaction system 106 can be implemented. As illustrated in FIG. 1, the distributed digital ledger transaction network 100 includes a communication network 102, computer nodes 114 (which include validator node devices 108a-108b and full node devices 108c-108d), and client devices 112a-112n (having corresponding users 116a-116n).

Although the distributed digital ledger transaction network 100 of FIG. 1 is depicted as having a particular number of components, the distributed digital ledger transaction network 100 can have any number of additional or alternative components (e.g., any number of computer nodes, client devices, or other components in communication with the ledger transaction system 106 via the communication network 102). Similarly, although FIG. 1 illustrates a particular arrangement of the communication network 102, the computer nodes 114, the client devices 112a-112n, and the users 116a-116n, various additional arrangements are possible.

The communication network 102, the computer nodes 114, and the client devices 112a-112n may be communicatively coupled with each other either directly or indirectly (e.g., through the communication network 102 discussed in greater detail below in relation to FIG. 50). Moreover, the computer nodes 114, and the client devices 112a-112n may include a computing device (including one or more computing devices as discussed in greater detail below with relation to FIG. 50).

As mentioned above, the distributed digital ledger transaction network 100 includes the computer nodes 114. In general, the computer nodes 114 can generate, store, receive, and/or transmit data, including data corresponding to a digital ledger. For example, the computer nodes 114 can receive transaction requests and transmit transaction execution results. In one or more embodiments, at least one of the computer nodes 114 comprises a data server. In some embodiments, at least one of the computer nodes 114 comprises a communication server or a web-hosting server. In further embodiments, one or more of the computer nodes 114 include personal computing devices operated by a user.

In one or more embodiments, as shown in FIG. 1, the computer nodes can transmit data to one another. For example, a given computer node can transmit data to a particular computer node (i.e., one computer node) using point-to-point communication. A given computer node can also transmit data to all other computer nodes using broadcasting techniques. For example, in one or more embodiments, a computer node broadcasts data by transmitting the data to a random or semi-random subset of computer nodes with voting power (e.g., validator node devices). The recipient validator node devices can then reshare (i.e., retransmit) to other computer nodes in the same way until the data know to (i.e., stored at) every computer node stabilizes.

In one or more embodiments, a computer node transmits data to other computer nodes in several steps. For example, at a first step, the transmitting computer node can make the data available (i.e., passively publish the data). The transmitting computer node can then send a notification to each potential recipient computer node, indicating that the data is now available. Subsequently, the transmitting computer node can let the potential recipient computer nodes connect to the transmitting computer node and retrieve the available data.

As shown FIG. 1, the computer nodes include the validator node devices 108a-108b and the full node devices 108c-108d. As will be discussed in greater detail below, the validator node devices 108a-108b and the full node devices 108c-108d can perform different functions; though, in some embodiments, the validator node devices 108a-108b and the full node devices 108c-108d perform, at least some, overlapping functions. For example, in one or more embodiments, both the validator node devices 108a-108b and the full node devices 108c-108d can service queries for information regarding transactions, events, or states of user accounts.

Additionally, as shown in FIG. 1 the computer nodes 114 include the ledger transaction system 106. In particular, in one or more embodiments, the ledger transaction system 106 utilizes the computer nodes 114 to execute transactions and service queries for information. For example, the ledger transaction system 106 can use the validator node devices 108a-108b to execute transactions and implement a consensus protocol. Further, the ledger transaction system 106 can utilize the full node devices 108c-108d to receive and service queries for information.

For example, in one or more embodiments, the ledger transaction system 106 implements a Byzantine-fault-tolerant consensus approach. Specifically, in some embodiments, the validator node devices 108a-108b implement a modified HotStuff consensus protocol. In particular, in one or more embodiments, the computer nodes 114 select a lead validator node device to drive consensus for a transaction block. In one or more embodiments, the lead validator node device is selected deterministically (e.g., via a round-robin selection from a pre-defined list). In some embodiments, the lead validator node device is selected non-deterministically (e.g., candidate validator node devices attempt to solve a cryptographic puzzle or participate in a cryptographic lottery, and the winner becomes the lead validator node device). When selected, a lead validator node device can assemble a transaction block containing transactions received from one or more of the client devices 112a-112n and propose the transaction block to the other validator node devices. The other validator node devices execute the transactions within the transaction block and then vote on the execution results.

For example, assume that there exists a fixed, unknown subset of malicious validator node devices (also known as "Byzantine validator node devices") within the current set of validator node devices. Assume further that all other validator node devices (known as "honest validator node devices") follow the consensus protocol scrupulously. Referring to the total voting power of all validator node devices as N and defining a security threshold f, the ledger transaction system 106 can operate so that N>3f. In other words, the ledger transaction system 106 can operate so that the combined voting power of the malicious node devices does not exceed the security threshold f.

A subset of nodes whose combined voting power M verifies a transaction block (i.e., M≥N−f) can be referred to as a quorum. In some embodiments, the ledger transaction system 106 can further operate under a "BFT assumption" that indicates, for every two quorums of nodes in the same epoch, there existsan honest node that belongs to both quorums.

Upon determining that a threshold number of votes confirming the execution results have been received, the lead validator node device can determine to finalize the block of transactions and transmit confirmation to the other validator node devices. As mentioned above, by utilizing a Byzantine failure model, the ledger transaction system 106 can accommodate validators that arbitrarily deviate from the protocol without constraint. Moreover, the ledger transaction system 106 can utilize a byzantine fault tolerance consensus approach to mitigate failures caused by malicious or hacked validators. Specifically, in one or more embodiments, the ledger transaction system 106 utilizes 2f+1 votes as the threshold number of votes, where f refers to a number of Byzantine voters (e.g., malicious, fraudulent, or untrustworthy validators) that can be accommodated by the consensus protocol. For instance, in some embodiments f reflects the number of Byzantine voters that can be accommodated while preventing attacks or other unsafe behaviors (e.g., double-spends or forks). In some embodiments, 2f+1 votes corresponds to just over two-thirds of the validator node devices participating in consensus.

Once the block of transaction is finalized, the validator node devices can commit the transaction results to storage. Indeed, in one or more embodiments, each validator node device generates data structures for storing data relevant to the digital ledger (e.g., a transaction data structure, a state data structure, and an event data structure). The validator node devices can update these data structures based on the execution results when the execution results achieve consensus. In particular, each validator node device can generate and maintain an independent copy of the data structures and then update the data structures stored at that validator node device based on the execution results.

To provide an additional example, in one or more embodiments, a full node device can receive a query for information. In response, the full node device can locate the relevant data within the data structures stored at the full node device and transmit the data to the requesting client device. Indeed, in one or more embodiments, each full node device can generate and maintain an independent copy of the data structures. The full node device can communicate with the validator node devices 108a-108b to identify the results of executing transactions and update the data structures stored at the full node device accordingly. In one or more embodiments, the full node device can further submit a proof (e.g., a Merkle proof) to demonstrate the accuracy of the provided data in response to receiving the query for information.

In one or more embodiments, the client devices 112a-112n include computer devices that allow users of the devices (e.g., the users 116a-116n) to submit transaction requests and queries for information. For example, the client devices 112a-112n can include smartphones, tablets, desktop computers, laptop computers, or other electronic devices (examples of which are described below in relation to FIG. 50). The client devices 112a-112n can include one or more applications (e.g., the client application 110) that allow the users 116a-116n to submit transaction requests and queries for information. For example, the client application 110 can include a software application installed on the client devices 112a-112n. Additionally, or alternatively, the client application 110 can include a software application hosted on one or more servers, which may be accessed by the client devices 112a-112n through another application, such as a web browser.

In some embodiments, a subset of the client devices 112a-112n (and/or a subset of the computer nodes 104) can have cryptographic keys to modify or manage features of the distributed digital ledger transaction network (referred to as "authorized devices"). In particular, smart contracts can be implemented that provide authorized devices (or authorized accounts corresponding to authorized devices) with permissions to make modifications through consensus protocols (and collective agreement among the authorized devices). For example, within the confines of smart contracts used to make modifications, authorized devices can manage changes to the set of validator node devices participating in consensus (i.e., voting rights), changes to the processes utilized in validating rejections or distributing transaction fees (i.e., gas) amongst the computer nodes 114, and/or changes to tangible monetary reserves (e.g., diverse real-world assets) utilized to back digital assets (e.g., a cryptographic currency) on the distributed digital ledger transaction network.

In one or more embodiments, the distributed digital ledger transaction network 100 further includes one or more reporting managers (not shown). The reporting manager can track and report actions taken by the components of the distributed digital ledger transaction network 100 (e.g., one of the validator node devices 108a-108b) for which rewards should be provided or fees extracted. Some actions that the reporting manager can track and report include, but are not limited to, a client device submitting a transaction request, a lead validator node device proposing or failing to propose a transaction block, a lead validator node device proposing an incorrect or malformed transaction block, validator node devices participating in consensus, validator node devices committing a block of transactions to storage, and general information dissemination (whether among the computer nodes 114 or to the client devices 112a-112n). In one or more embodiments, the reporting manager reports such actions to the computer nodes 114 to determine and carryout the corresponding reward or fee. The reporting manager can be implemented by any of the devices of the distributed digital ledger transaction network 100 shown in FIG. 1 (e.g., implemented by a computer nodes 114) or another computing device.

The ledger transaction system 106 can be implemented in whole, or in part, by the individual elements of the distributed digital ledger transaction network 100. Indeed, although FIG. 1 illustrates the ledger transaction system 106 implemented with regards to the computer nodes 114, different components of the ledger transaction system 106 can be implemented in any of the components of the distributed digital ledger transaction network 100. In particular, part of, or all of, the ledger transaction system 106 can be implemented by a client device (e.g., one of the client devices 112a-112n).

To provide an example, the ledger transaction system 106 can utilize the client devices 112a-112n to perform various functions. To illustrate, the ledger transaction system 106 can utilize a client device to poll one or more of the computer nodes 114 for transaction event updates and request data corresponding to a sequence of events. Additionally, the ledger transaction system 106 can utilize a client device to generate a transaction request. In particular, the ledger transaction system 106 can utilize a client device to identify a main public address identifier and sub-address identifier corresponding to a user account and then encrypt the sub-address identifier using an encryption key. The ledger transaction system 106 can then utilize the client device to generate and submit a transaction request associated with the user account using the main public address identifier and the encrypted sub-address corresponding to that user account.

B. Validator Components and Transaction Process

Figure 2:
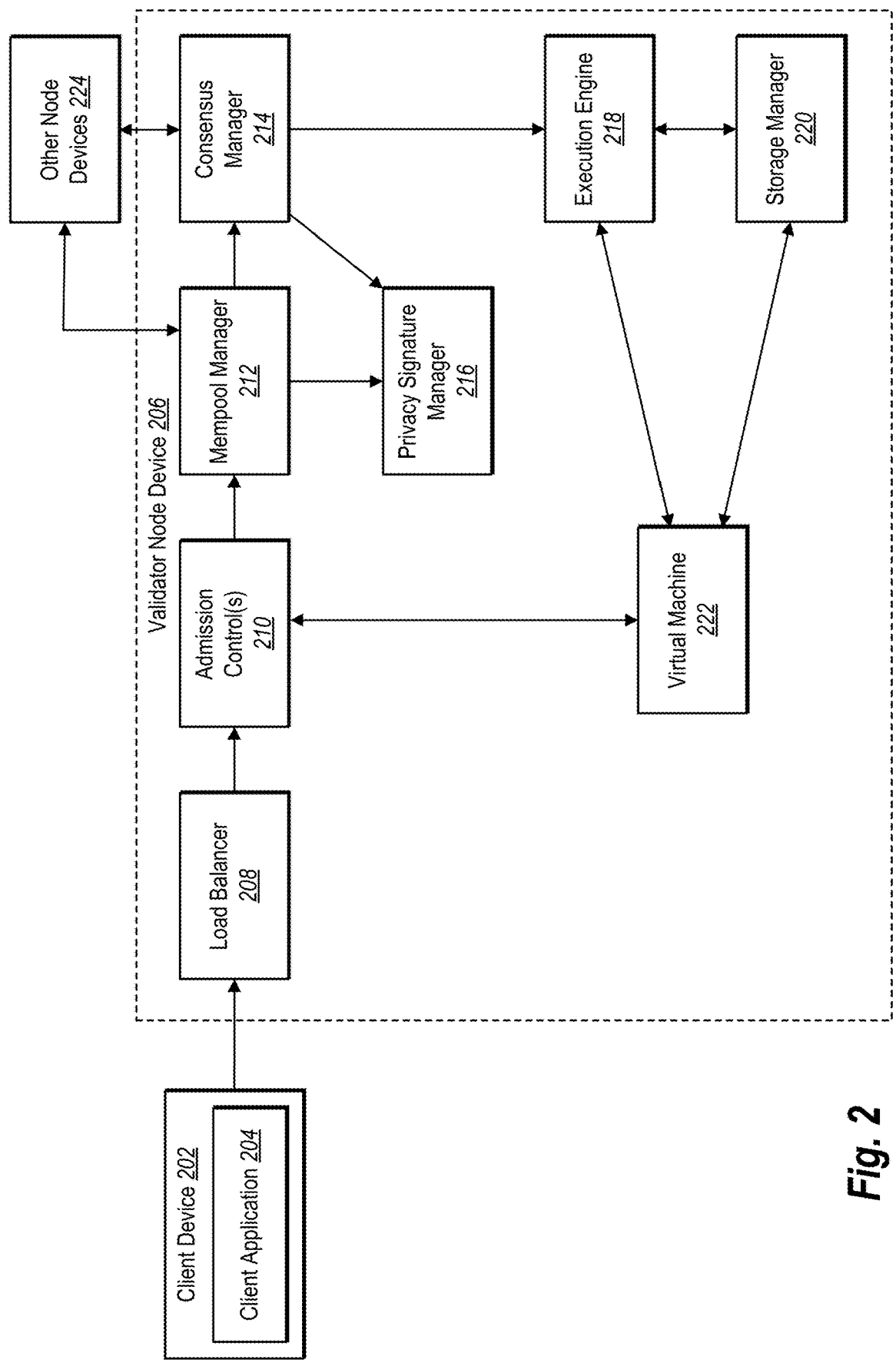
FIG. 2 illustrates a schematic diagram of components of a validator node device used in processing, executing, and committing transactions in accordance with one or more embodiments.

As mentioned above, a client device can submit a request for a transaction to one of the computer nodes. The validator node devices of the distributed digital ledger transaction network can then execute the transaction (as part of a block of transactions) and implement the consensus protocol. If consensus is achieved, the validator node devices (and the full node devices) can commit the execution results to permanent storage by updating the data structures stored therein (e.g., updating the ledger state). FIG. 2 illustrates a schematic diagram of the components of a validator node device used in processing received transactions, executing the transactions, and committing the transactions to storage based on whether consensus is achieved.

The following discussion in relation to FIG. 2 will provide details regarding the lifecycle of a transaction and additional details in the context of the illustrated validator node device components implementing the ledger transaction system 106. The validator node device components can communicate with one another using any appropriate communication protocol. For example, in one or more embodiments, the validator node device components communicate via GRPC streams with protobuf serialization.

As shown in FIG. 2, a client device 202 can utilize a client application 204 (e.g., the ledger transaction system 106 operating at the client device 202, an application accessing the ledger transaction system 106, or a third-party wallet application) to generate a transaction request. In one or more embodiments, the client application 204 generates a transaction request by generating a transaction script having various parameters. In one or more embodiments, the client application 204 utilizes a pre-defined transaction script accessible to the client application 204 and inserts the desired parameters into the pre-defined script. The resulting transaction script can provide details for the requested transaction, such as a transfer of one or more digital assets from a first user account (i.e., the user account associated with the user of the client device 202) to a second user account.

In one or more embodiments, the client device 202 further utilizes the client application 204 to add a sequence number to the transaction request. Indeed, in one or more embodiments, a validator node device rejects transaction requests having an incorrect sequence number. In some embodiments, computer nodes of the distributed digital ledger transaction network can store the current sequence number associated with a user account. The client application 204 can query one of the computer nodes to identify the current sequence number associated with the corresponding user account. The client application 204 can then increment the sequence number and add the incremented sequence number to the transaction request. The computer nodes can update the sequence number associated with the user account in storage upon Applications of the transaction (e.g., execution of the transaction or acceptance of the transaction into the mempool manager). In one or more embodiments, however, the client application 204 keeps track of the current sequence number associated with the user account to avoid querying the computer nodes.

Additionally, the client device 202 can utilize the client application 204 to sign the transaction request. For example, the client application can utilize a private key associated with the user of the client device 202 (i.e., associated with the sending user account) to apply a signature to the transaction request (e.g., by encrypting the transaction request). The client device 202 can then transmit the signed transaction request to the validator node device 206.

In one or more embodiments, the client device 202 submits the transaction to a particular address associated with the validator node device 206. For example, the client device 202 can submit the transaction to an address associated with an admission control component (e.g., the admission control(s) 210) of the validator node device 206. In one or more embodiments, the client device 202 utilizes the client application 204 to identify the address of the validator node device 206. For example, the client device 202 can utilize the client application 204 to contact the computer nodes of the distributed digital ledger transaction network and then identify the address of the validator node device 206 via a round-robin DNS implementation, optimized based on geographic location to reduce latency. In one or more embodiments, upon receiving the transaction request, the validator node device 206 signs the transaction request (e.g., using a private key stored in the privacy signature manager 216) and returns the signed transaction request back to the client device 202.

As shown in FIG. 2, the validator node device 206 can receive the transaction request at the load balancer 208. In particular, as shown in FIG. 2, the validator node device 206 includes admission control(s) 210, which can include multiple admission control units. The load balancer 208 can forward tasks to the admission control(s) 210 to avoid overwhelming the admission control units and improve the efficiency with which transaction requests are processed.

Indeed, the admission control(s) 210 can manage multiple request types. In particular, in addition to transaction requests, the admission control(s) 210 can manage queries for information. The admission control(s) 210 can direct a given request to the proper components of the validator node device 206 utilized to service that request. For example, the admission control(s) 210 can direct transaction requests to the mempool manager 212 and direct queries for information to the storage manager 220 to perform the requested reads. Accordingly, the admission control(s) 210 can prevent a query for information from interfering with components used to service a transaction request and vice versa.

Upon receiving a transaction request, the admission control(s) 210 can perform a series of initial checks. For example, in one or more embodiments, the admission control(s) 210 performs basic spam checks to limit the amount of data received from a given IP address. In doing so, the admission control(s) 210 can provide DDoS protection by performing blacklisting and filtering out invalid or high-volume input, preventing such input from wasting the resources of the subsequent components. Indeed, in some embodiments, the admission control(s) 210 blacklists IPs/user accounts that generate high volumes of traffic.

The admission control(s) 210 can then access the virtual machine 222 to perform a series of additional checks in order to determine whether the transaction request is properly formed. For example, admission control(s) 210 can check the input signature(s) on the transaction request to determine whether the transaction request is properly signed; check the authentication key of the user account (e.g., the address of the user account or the hash of the public key associated with the user account) sending the transaction request to confirm that the authentication key corresponds to the public key whose private key was used to sign the transaction; verify that the sequence number for the signed transaction is correct; verify that the transaction script included in the transaction request is not malformed; and verify that there is sufficient balance in the account to support the maximum amount of gas that may be consumed upon execution of the transaction. Upon determining that the transaction request satisfies the series of checks, the admission control(s) 210 can forward the transaction request to the mempool manager 212.

In one or more embodiments, the virtual machine 222 can implement a bytecode verifier and a bytecode interpreter for the programming language utilized by the ledger transaction system 106. Indeed, in one or more embodiments the ledger transaction system 106 utilizes a programming language with three different program representations: source code, intermediate representation (IR), and bytecode. Programmers can develop modules and transaction scripts in IR, which is high-level enough to write human-readable code, yet low-level enough to have a direct translation to bytecode. In some embodiments, both the source language and IR are compiled into bytecode.

The ledger transaction system 106 can use a verifiable bytecode language as the executable representation of the programming language for a variety of reasons. For example, in some embodiments the ledger transaction system 106 applies safety guarantees to all programs. Enforcing these guarantees in a compiler is often not sufficient inasmuch as an adversary could choose to bypass the compiler by writing malicious code directly in the bytecode language (unless running the compiler is part of transaction execution, but this would make execution slower and more complex). Thus, the ledger transaction system 106 can avoid trusting the compiler by enforcing safety guarantees via bytecode verification: type safety, reference safety, and resource safety.

Further, the virtual machine 222 can use a stack-based bytecode language that has fewer instructions than a higher-level source language. In addition, each instruction has semantics that can be expressed via an even smaller number of atomic steps. This reduces the specification footprint of the ledger transaction system 106 and makes it easier to spot implementation mistakes.

As mentioned above, the virtual machine 222 can implement a bytecode verifier and a bytecode interpreter for the bytecode language. The bytecode language can include a stack-based virtual machine with a procedure-local operand stack and registers. Unstructured control-flow can be encoded via gotos and labels.

A developer can write a transaction script or module in IR that can then be compiled into the bytecode language. Compilation converts structured control-flow constructs (e.g., conditionals, loops) into unstructured control-flow and converts complex expressions into a small number of bytecode instructions that manipulate an operand stack. The virtual machine 222 can execute a transaction by verifying then running this bytecode.

The virtual machine 222 can support various types and values: Booleans, unsigned 64-bit integers, 256-bit addresses, fixed-size byte arrays, structs (including resources), and references. In some embodiments, struct fields cannot be reference types, which prevents storage of references in the ledger state. In some embodiments the virtual machine 222 does not have a heap (local data is allocated on the stack and freed when the allocating procedure returns). Persistent data can be stored in the ledger state.

The mempool manager 212 can provide an in-memory buffer of transactions. In particular, the mempool manager 212 can receive transactions provided by the admission control(s) 210 of the validator node device 206 as well as the mempool manager of the other node devices 224 (e.g., other validator node devices). Indeed, the transactions managed by mempool include transactions that have been submitted but not yet executed and agreed upon via consensus.

Because the mempool manager 212 manages multiple transactions (possibly multiple transactions submitted by the same user account), the mempool manager 212 can perform a series of additional checks. Indeed, the mempool manager 212 can perform additional checks to validate the transaction request in light of the other manages transactions.

For example, in one or more embodiments, the mempool manager 212 checks whether the transaction request forwarded by the admission control(s) 210 conflicts with the transactions already stored. To illustrate, if the mempool manager 212 already stores one or more transactions sent by the same user account that sent the transaction request forwarded by the admission control(s) 210, the mempool manager 212 determines whether the user account has sufficient digital assets to fund the transactions already stored as well as the transaction request forwarded by the admission control(s) 210. If the mempool manager 212 determines there is a possibility that the transactions already stored will consume enough of the user account's digital assets so that the transaction request forwarded by the admission control(s) 210 cannot be funded, the mempool manager 212 can deny entry of the transaction request forwarded by the admission control(s) 210.

Upon satisfaction of the additional checks the mempool manager 212 can accept the transaction request (which will now be referred to as the "transaction"). In one or more embodiments, the validator node device 206 can transmit a notification to the client device 202 indicating that the transaction has been added to the mempool manager 212. In some embodiments, the validator node device 206 further transmits the current version of the digital ledger (e.g., the current version of the transaction data base or, more specifically, the transaction Merkle tree). In further embodiments, the validator node device 206 transmits an identifier to the client device 202, the identifier being uniquely associated with the validator node device 206. Indeed, in some embodiments, the client device 202 can include the identifier of the validator node device 206 in a query for the status of the transaction.

In one or more embodiments, upon entering the transaction into the mempool manager 212, the validator node device 206 broadcasts (i.e., transmits) the transaction to the other node devices 224. In one or more embodiments, the validator node device 206 broadcasts the transaction as soon as the transaction is entered into the mempool manager 212. In some embodiments, the validator node device 206 broadcasts the transaction as part of a periodic broadcast. In one or more embodiments, the validator node device 206 determines the likelihood that the transaction will be included in the next transaction block and broadcasts the transaction to the other node devices 224 based on that determination. For example, in some embodiments, the validator node device 206 broadcasts a transaction to the other node devices 224 only if the sequence number of the transaction is equal to or sequential to the next sequence number for the corresponding user account (e.g., broadcasts the transactions 2, 3, and 4 but not transactions with subsequent sequence numbers when the current sequence number of the user account is 2). In one or more embodiments, the mempool manager 212 maintains an ordered queue and determines the likelihood that a transaction will be included in the next transaction block based on the ordered queue.

In one or more embodiments, upon receiving a transaction from one of the other node devices 224, the validator node device 206 performs the same checks that are performed when receiving a transaction request from the client device 202. For example, the validator node device 206 can use the mempool manager 212 and/or the admission control(s) 210 to perform the same initial checks and additional checks. Accordingly, the validator node device 206 can prevent a malicious validator node device form sending an invalid or otherwise malicious transaction that could interfere with operation of the validator node device. In some embodiments, upon receiving a transaction from one of the other node devices 224, the validator node device 206 adds the transaction to the ordered queue maintained by the mempool manager 212.

In one or more embodiments, the mempool manager 212 includes a mapping between user account addresses and pending transactions with various indexes built on top. For example, as mentioned, the mempool manager 212 can maintain an index referred to as the ordered queue that includes transactions that are ready to be included in the next transaction block. In one or more embodiments, the mempool manager 212 orders the transactions within the ordered queue based on gas price, providing priority to transactions submitted by users willing to pay higher fees per transaction. In some embodiments, though the transactions in the ordered queue are ordered based on gas price, the mempool manager 212 can order the transactions submitted by the same account by sequence number within the mapping between account addresses and pending transactions.

In one or more embodiments, the mempool manager 212 includes transactions that are not ready to be included in the next block in a separate index referred to as the parking lot. The mempool manager 212 can move a transaction from the parking lot to the ordered queue once some event indicates that the transaction is ready to be included in a transaction block (e.g., the transaction having the immediately preceding sequence number was broadcast to the other node devices 224).

In one or more embodiments, the mempool manager 212 limits the number of total transactions stored therein. In some embodiments, the mempool manager 212 limits the number of transactions stored from the same user account.

In this manner, the mempool manager 212 can prevent a user account from constantly attacking the distributed digital ledger transaction network.

In one or more embodiments, the mempool manager 212 applies an expiration to the transactions stored therein. For example, the mempool manager 212 can apply a time to live (TTL) expiration to a transaction. The mempool manager 212 can check the TTL expiration of a transaction periodically. In some embodiments, the mempool manager 212 applies a client-specified expiration to a transaction. Indeed, in some embodiments, a client device submitting a transaction request can specify an expiration for that transaction. In one or more embodiments, the mempool manager 212 enforces a minimum time on client-specified expirations to prevent a client from overwhelming the validator node device 206 by submitting numerous transactions with low expiration times. Upon determining that the transaction has expired (i.e., either based on the TTL expiration or the client-specified expiration), the mempool manager 212 can remove the transaction. In one or more embodiments, the mempool manager 212 utilizes a separate component (e.g., a system TTL component) to check expirations and remove transactions accordingly.

As shown in FIG. 2, the validator node device 206 can utilize the consensus manager 214 to order blocks of transactions and agree on the results of execution. In other words, the consensus manager 214 applies the consensus protocol to a block of transactions either assembled at the validator node device 206 or received from one of the other node devices 224. For example, when the validator node device 206 is selected as the lead validating node device (i.e., via the consensus protocol), the consensus manager 214 can identify a transaction block including transactions stored in the mempool manager 212 (e.g., transactions included in the ordered queue). The consensus manager 214 can then transmit the transaction block to the other node devices 224.

Subsequently, the validator node device 206 can utilize the execution engine 218 to execute the transactions within the transaction block. The other node devices 224 similarly execute the transactions within the transaction block. As will be discussed in more detail below with regards to FIGS. 12-14B, the execution engine 218 can maintain a scratch pad data structure that stores portions of the data structures held in permanent storage that are relevant to the transactions in the transaction block. Indeed, the execution engine 218 can utilize the scratch pad data structure to store execution results for the block of transactions prior to committing the execution results to permanent storage until consensus is reached. For example, the execution engine 218 can utilize the scratch pad data structure to track the execution results for various potential paths (represented as "parallel transaction blocks") that the distributed digital ledger transaction network may take in adding transaction blocks to the digital ledger. Additional detail regarding the scratch pad data structure is provided below (e.g., in relation to FIG. 12).

In one or more embodiments, the execution engine 218 utilizes the virtual machine 222 to execute the transactions within a transaction block. In particular, the virtual machine 222 can verify the transaction script and modules, publish the modules (under the transaction sender's account), run the transaction script, determine the execution results, and run epilogue processes (e.g., charge the user for gas and increment the user's sequence number). In one or more embodiments, as will be discussed in more detail below with regard to FIGS. 27-28, the virtual machine 222 can perform parallel execution of the transactions within a transaction block by performing a preliminary execution and subsequently determining the dependencies between transactions. The virtual machine can then 222 further execute a subset of the transactions in parallel based on the determined dependencies.

The execution engine 218 can utilize the portions of the data structures in the scratch data pad and the execution results corresponding to the transactions within the transaction block to determine a proposed root value of the transaction tree (i.e., a "root hash"). The consensus manager 214 can then sign the proposed root value using a private key stored at the privacy signature manager 216 and attempt to reach agreement on the proposed root value with the other node devices 224. In one or more embodiments, if the validator node device 206 is selected as the lead validator node device, the validator node device 206 can communicate with the other node devices 224 about the proposed root value. Indeed, in some embodiments, the validator node device 206 (as the lead validator node device) communicates with the other node devices 224 in a series of messages that converge towards a final decision. In one or more embodiments, the lead validator node device participates in the communications but does not vote on the proposed root hash. The decision can include a final decision to accept or reject the transactions included in the transaction block.

If enough votes (e.g., at least 2f+1 votes) are provided for the same root value (e.g., the proposed root value determined by the validator node device 206), the consensus manager 214 can provide an indication, to the execution engine 218, that the transaction block (i.e., the previously determined result from executing the transaction block) is ready to be committed to storage. In one or more embodiments, the lead validator node device receives the consensus votes and determines whether the block has been finalized (i.e., whether enough votes have been received). The lead validator node can then transmit the indication based on this determination of finalization. In one or more embodiments, the indication includes the signatures of validator node devices from the other node devices 224 that voted to confirm the agreed upon root value. In response to receiving the indication, the execution engine 218 can send the corresponding execution results stored at the scratch pad data structure to the storage manager 220 to be written into permanent storage. Additionally, the execution engine 218 can clear out the values from the scratch pad data structure that are no longer needed (e.g., parallel transaction blocks that will not be committed to storage, as will be discussed in more detail below).

The validator node device 206 utilizes the storage manager 220 to add the execution results to the digital ledger. In particular, the storage manager 220 can commit the transactions within the transaction block, including the changes to the digital ledger based on the execution results. In one or more embodiments, the storage manager 220 further stores the signatures of the validator node devices that voted to confirm the agreed-upon root value. Upon committing a transaction from the transaction block, the storage manager 220 (or the execution engine 218) can assign a version to each transaction and store the transaction, the root value, and the version to the transaction database (e.g., the transaction tree). The storage manager 220 can then increase the version number for assignment to the next transaction. When a transaction has been committed to storage, the consensus manager 214 can notify the mempool manager 212, which can then delete the transaction from its internal storage.

In one or more embodiments, upon a failure in storing a transaction block, the storage manager 220 will "panic" (e.g., disconnect from the execution engine 218). Upon re-establishing a connection, the storage manager 220 and/or the execution engine 218 will determine the current state of the distributed digital ledger transaction network. For example, in one or more embodiments, the storage manager 220 sends, to the execution engine 218, the root value from the previously committed transaction block, and the execution engine 218 continues from there. Additional detail regarding consensus safety upon restart is provided below (e.g., in relation to FIG. 36).

In one or more embodiments, the validator node device 206 further includes a state sync manger component (not shown). In particular, the state sync manager can perform synchronization operations when the validator node device 206 restarts or is behind the currently proposed state of the distributed digital ledger transaction network. For example, if the consensus manager 214 identifies a transaction block that is based on a version of the digital ledger (i.e., a version of the transaction tree) that is unknown to the validator node device 206, the state sync manager can update the validator node device 206 to the latest state to allow for consensus participation. To illustrate, in one or more embodiments, the state sync manager pulls chunks of transactions and executes the chunks (e.g., using the execution engine 218) to determine a ledger state of the distributed digital ledger transaction network that is consistent with the currently agreed upon ledger state.

In some embodiments, the validator node device 206 further includes a system state machine manager. In particular, the system state machine manager can perform overall node management operations, such as node blacklisting and bad transaction handling.

As mentioned above, in addition to servicing transaction requests, the computer nodes of the distributed digital ledger transaction network can service queries for information. For example, upon receiving a query for information, the admission control(s) 210 of the validator node device 206 can connect directly to the storage manager 220. The admission control(s) 210 can receive, from the storage manager 220, the requested information along with the corresponding proof. The validator node device 206 can then forward the information to the submitting client device. Though the discussion of FIG. 2 is presented in the context of the validator node device 206, in one or more embodiments, full node devices of the distributed digital ledger transaction network service queries for information.

In one or more embodiments, the validator node device 206 (or other computer node of the distributed digital ledger transaction system) will restart upon encountering a technical problem (e.g., a crash). The components of the validator node device 206 can act accordingly in response to, or in anticipation of, technical problems. For example, in one or more embodiments, the admission control(s) 210 loses a transaction (e.g., submitted by the client device 202) on which initial checks are being performed upon crashing. Accordingly, the validator node device 206 may fail to respond to the client device 202 as expected (e.g., fail to notify the client device 202 that the transaction has been accepted by the mempool manager 212). Consequently, the client device 202 can then resubmit the transaction.

The mempool manager 212 can similarly drop all stored transactions upon a crash. In one or more embodiments, the mempool manager 212 implements walk-ahead logging (WAL) to avoid issues associated with dropping the transactions.

In one or more embodiments, the consensus manager 214 stores voting data to a WAL prior to submitting a vote corresponding to a transaction block. For example, in some embodiments, the consensus manager 214 utilizes the storage manager 220 to store and delete voting data as necessary. After a crash, the consensus manager 214 can retrieve the voting data to identify the transaction block voted on. In some embodiments, the consensus manager 214 avoids operating off blocks that conflicts with this voting data.

In one or more embodiments, upon restart after a crash, the execution engine 218 can re-establish a connection with the consensus manager 214 and retrieve transaction blocks corresponding to the voting data stored in the WAL by the consensus manager 214. The execution engine 218 can then re-execute the transaction blocks and provide an error if the resulting root value does not match the root valued stored in the WAL. Further, the consensus manager 214 can retrieve, from the storage manager 220, the latest committed version of the transaction tree. If there are enough votes for committing another block, the consensus manager 214 can request to commit the transaction block via execution.

If a crash occurs before adding a transaction block to permanent storage, the storage manager 220 can re-establish a connection to the execution engine 218. The execution engine 218 can then provide the next transaction block to the storage manager 220. In particular, the execution engine 218 can re-execute the transaction block to get the write-sets. In some embodiments, the validator node device 206 implements a callback upon completion of committing a transaction block or a synchronous call to the storage manager 220 from the execution engine 218, after which the execution engine 218 prunes the scratch pad data structure. Further, upon committing a transaction block to permanent storage, the storage manager 220 can delete the voting data corresponding to the transaction block stored in the WAL by the consensus manager 214.

Each of the components of computing devices described in relation to FIGS. 1-2, may be in communication with one another using any suitable communication technologies. It will be recognized that although these components are shown and/or described to be separate, any of these components may be combined into fewer components, such as into a single facility, divided into more components, or configured into different components as may serve a particular embodiment.

The components can comprise software, hardware, or both. For example, the components 204-222 can comprise one or more instructions stored on a computer-readable storage medium and executable by processors of one or more computing devices. When executed by the one or more processors, the computer-executable instructions of the ledger transaction system 106 can cause a client device and/or a server device to perform the methods described herein. Alternatively, the components 204-222 and their corresponding elements can comprise hardware, such as a special purpose processing device to perform a certain function or group of functions. Additionally, the components 204-222 can comprise a combination of computer-executable instructions and hardware.

Furthermore, the components 204-222 of the ledger transaction system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 204-222 may be implemented as a stand-alone application, such as a desktop or mobile application. Furthermore, the components 204-222 may be implemented as one or more web-based applications hosted on a remote server. The components 204-222 may also be implemented in a suite of mobile device applications or "apps."

II. Storage

A. Overview

As mentioned above, a number of technical problems exist with regard to storage of data across computing devices utilizing conventional blockchain systems. Indeed, conventional blockchain systems are rigid and inflexible (e.g., fail to provide individual computing devices with flexible storage management options) and utilize excessive computer resources. The ledger transaction system 106 can implement storage processes across computing devices of a distributed digital ledger transaction network in a manner that improves security and flexibility and reduces storage and processing requirements. Indeed, the ledger transaction system 106 can utilize various data structures and storage processes that reduce susceptibility to tampering, that allow for computer devices (e.g., validator nodes or full nodes) to flexibly modify storage of the digital ledger based on local features, and that allow for reduction of computer storage and processing overhead.

For example, in one or more embodiments, the ledger transaction system 106 generates a single versioned database (e.g., a database reflecting transactions, events, and accounts states at any particular iteration). A version number can include an unsigned 64-bit integer timestamp, which corresponds to the number of transactions the system has executed. At each version i, the database can hold a (transaction $T_i$, transaction output $O_i$, ledger state $S_i$) tuple. Given an execution function f, the tuple can indicate that executing transaction $T_i$ against ledger state $S_{i-1}$ produces output $O_i$ and a new ledger state $S_i$; that is $f(S_{i-1}, T_i) \rightarrow (O_i, S_i)$. To illustrate, FIGS. 3-6 illustrate data structures utilized by the ledger transaction system 106 in accordance with one or more embodiments. In particular, the ledger transaction system 106 can store transactions ($T_i$) in a transaction data structure, transaction outputs ($O_i$) as an event data structure, and a ledger state ($S_i$) as a state data structure that can be used to obtain consensus via the distributed digital ledger transaction network.

In one or more embodiments, the ledger transaction system 106 can, at a client device, verify that a particular ledger state is correct by re-executing each transaction $T_i$ in the ledger history corresponding to that ledger state and then comparing the resulting ledger state to the particular ledger state $S_i$ and transaction output $O_i$ in the verioned database. This allows client devices to audit the validator node device of the distributed digital ledger transaction network to ensure that transactions are being executed correctly.

Figure 3:
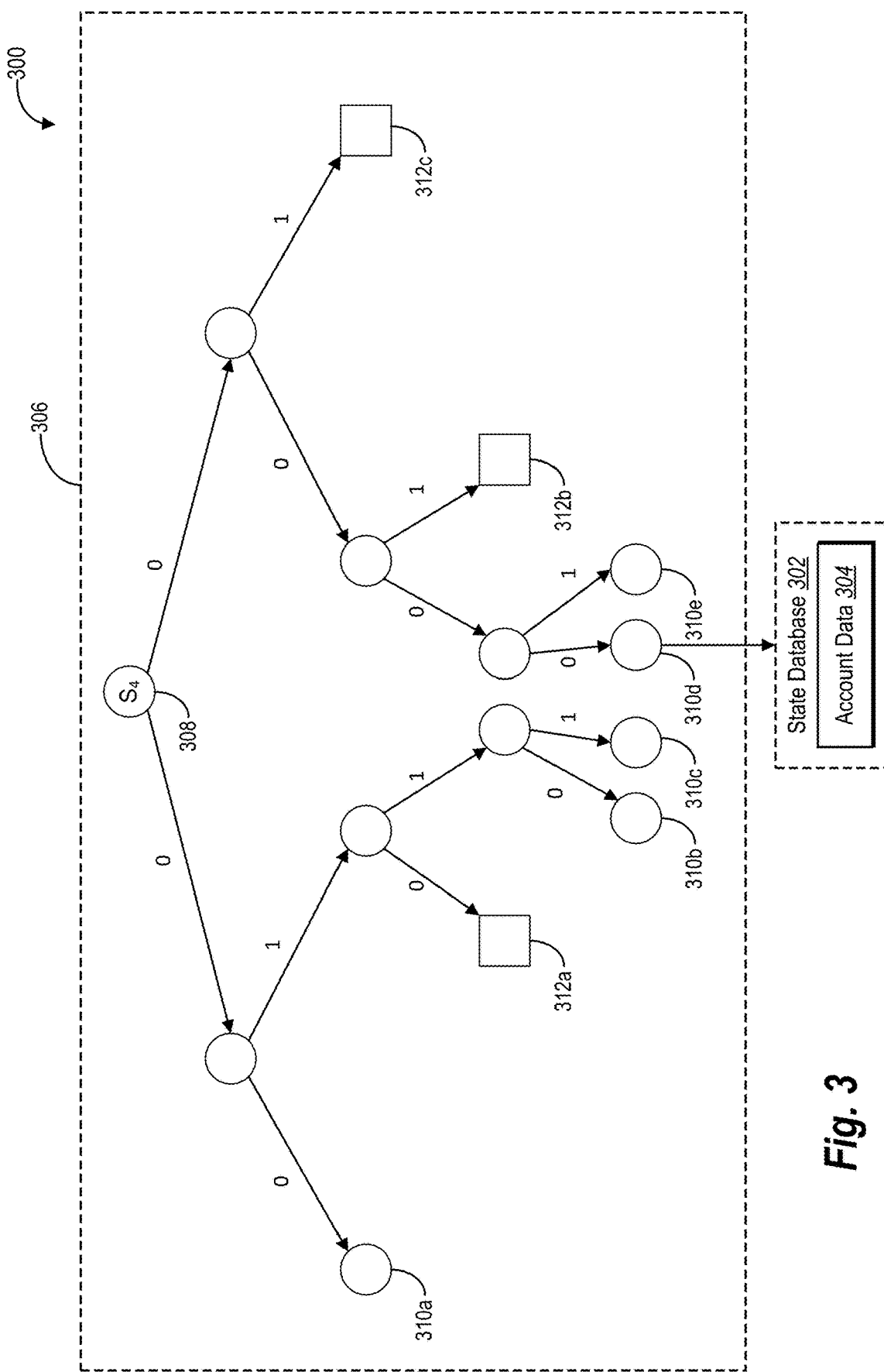
FIG. 3 illustrates a state data structure generated and maintained by the ledger transaction system in accordance with one or more embodiments.

For example, FIG. 3 illustrates a state data structure 300 generated and maintained by the ledger transaction system 106 in accordance with one or more embodiments. As shown in FIG. 3, the state data structure 300 includes a state database 302. In one or more embodiments, the state database 302 includes account data 304 associated with each user account of the distributed digital ledger transaction network. For example, the ledger transaction system 106 can generate the account data for a particular user account within the state database 302 by storing an account value of the user account and a hash of the account value within the state database 302. The account value of a given user account can include any type of data relevant to the user account (e.g., digital assets held by the user account, one or more transaction event counters corresponding to the user account, and other modules and/or resources stored in the user account, etc.). In one or more embodiments, the ledger transaction system 106 generates the hash of the account value by applying a hash function to the account value. As will be discussed, in one or more embodiments, the ledger transaction system 106 uses the account data (e.g., the account value) associated with a user account to generate an account state representation (e.g., a hash within a state Merkle tree) corresponding to that user account.

For instance, as further shown in FIG. 3, the state data structure 300 further includes a state tree 306. In one or more embodiments, the state tree 306 includes a state Merkle tree. For example, the state tree 306 can include a state Merkle tree (e.g., a sparse Merkle tree) having $2^n$ leaves where a path from the root of the state tree 306 (i.e., the state root 308) to a leaf node (i.e., one of the leaf nodes 310a-310e) represents an n-bit address key corresponding to the address of a user account. In one or more embodiments, the ledger transaction system 106 utilizes the n-bit address key as the address of the corresponding user account.

Where the address represented by the address key corresponds to an existing user account, the ledger transaction system 106 can store an account state representation within (i.e., as part of) the leaf node associated with that address key. In one or more embodiments, the ledger transaction system 106 generates an account state representation for a user account by applying a hash function to the account data associated with that user account to generate a hash value corresponding to the account data. Specifically, the ledger transaction system 106 can apply the hash function to one or more components of the account data. For example, in one or more embodiments, the ledger transaction system 106 applies the hash function to an account value of the user account to generate a hash of the account value (i.e., the same hash value that is stored as part of the account data for the user account). The ledger transaction system 106 can then store the hash of the account value as the account state representation. In some embodiments, the ledger transaction system 106 generates the account state representation by further combining the hash value corresponding to the account data (e.g., the hash of the account value) with additional data (e.g., an eviction date for the user account).

In one or more embodiments, if the address key corresponds to a non-existent user account, the ledger transaction system 106 stores a default value (e.g., an empty string) within the leaf node. As shown in FIG. 3, if all child nodes of an internal node correspond to non-existent user accounts, the ledger transaction system can store a default value within that internal node (represented by the default nodes 312a-312c of FIG. 3).

In one or more embodiments, the ledger transaction system 106 generates the root value of the state tree 306 by combining and hashing the node values stored within each pair of nodes within the state tree 306. Specifically, for each internal node of the state tree 306, the ledger transaction system 106 can combine (e.g., concatenate) the node values stored within the respective child nodes and then apply a hash function to the combined value. In some embodiments, the ledger transaction system 106 hashes the node values stored within the child nodes and then combines the hashed values to generate the node value for the corresponding internal node. The ledger transaction system 106 can iteratively combine and hash node values starting at the bottom of the state tree 306 and progressing towards the top, eventually generating the root value of the state tree 306. The ledger transaction system 106 can then store the root value in the state root 308 of the state tree 306. As such, the root value stored within the state root 308 represents the account state of every user account of the distributed digital ledger transaction network at a particular state of the distributed digital ledger transaction network. As will be discussed below, the ledger transaction system 106 can further store the root value of the state tree 306 within a transaction tree of the distributed digital ledger transaction network.

Further, in one or more embodiments, the ledger transaction system 106 generates a state tree for each state of the distributed digital ledger transaction network. In particular, for each transaction (or block of transactions) executed across the distributed digital ledger transaction network, the ledger transaction system 106 can generate a new state tree representing the state of the distributed digital ledger transaction network resulting from the transaction (or block of transactions). Specifically, the new state tree can represent the account state of every user account after executing a block of transactions (i.e., reflecting how the user accounts associated with those particular transactions have changed). In some embodiments, the ledger transaction system 106 updates the state tree after execution of every transaction (e.g., by updating the account state representations corresponding to the user accounts associated with the transactions).

In some embodiments, the ledger transaction system 106 represents the initial state of the distributed digital ledger transaction network as an empty state (e.g., an empty state database). The ledger transaction system 106 can then generate the genesis state through a special transaction $T_0$ that defines specific modules and resources to be created, rather than going through the normal transaction process. The ledger transaction system 106 can configure client devices and validator node devices to accept only ledger histories beginning with a specific $T_0$, which is identified by its cryptographic hash.

As mentioned above, in some embodiments, the ledger transaction system 106 reduces storage and processing requirements by storing a subset of modified nodes. For example, the ledger transaction system 106 can generate a state tree component having node values corresponding to changed user account states. These node values can point to the node values of previous state trees that correspond to unchanged user account states. In this manner, the ledger transaction system 106 can track changed nodes at different states without duplicating the entire state tree. In some embodiments, the ledger transaction system 106 utilizes this approach to track multiple states while awaiting consensus and committing consensus state data structures to memory. Additional detail regarding storing a subset of modified nodes to track different states is provided below (e.g., in relation to FIGS. 8-9, 14A-14B).

As both the account data 304 stored in the state database 302 and the account state representations stored in the state tree 306 include a hash of an account value of a user account, the state database 302 can include a mapping between account state representations and account values of user accounts. For instance, the ledger transaction system 106 can index the account value within the account data 304 using the corresponding hash of the account value. Indeed, the ledger transaction system 106 can then utilize the state tree 306 to locate the account value for a given user account. Specifically, the ledger transaction system 106 can locate the state root 308 of the state tree 306 and then traverse the state tree 306 (e.g., using the address of the user account) to find the leaf node for the user account. The ledger transaction system 106 can then identify the account state representation stored within the leaf node and use the mapping of the state database 302 to locate the account value of the user account based on that account state representation for the user account (i.e., based on the hash of the account value stored as part of the account state representation).

Figure 4:
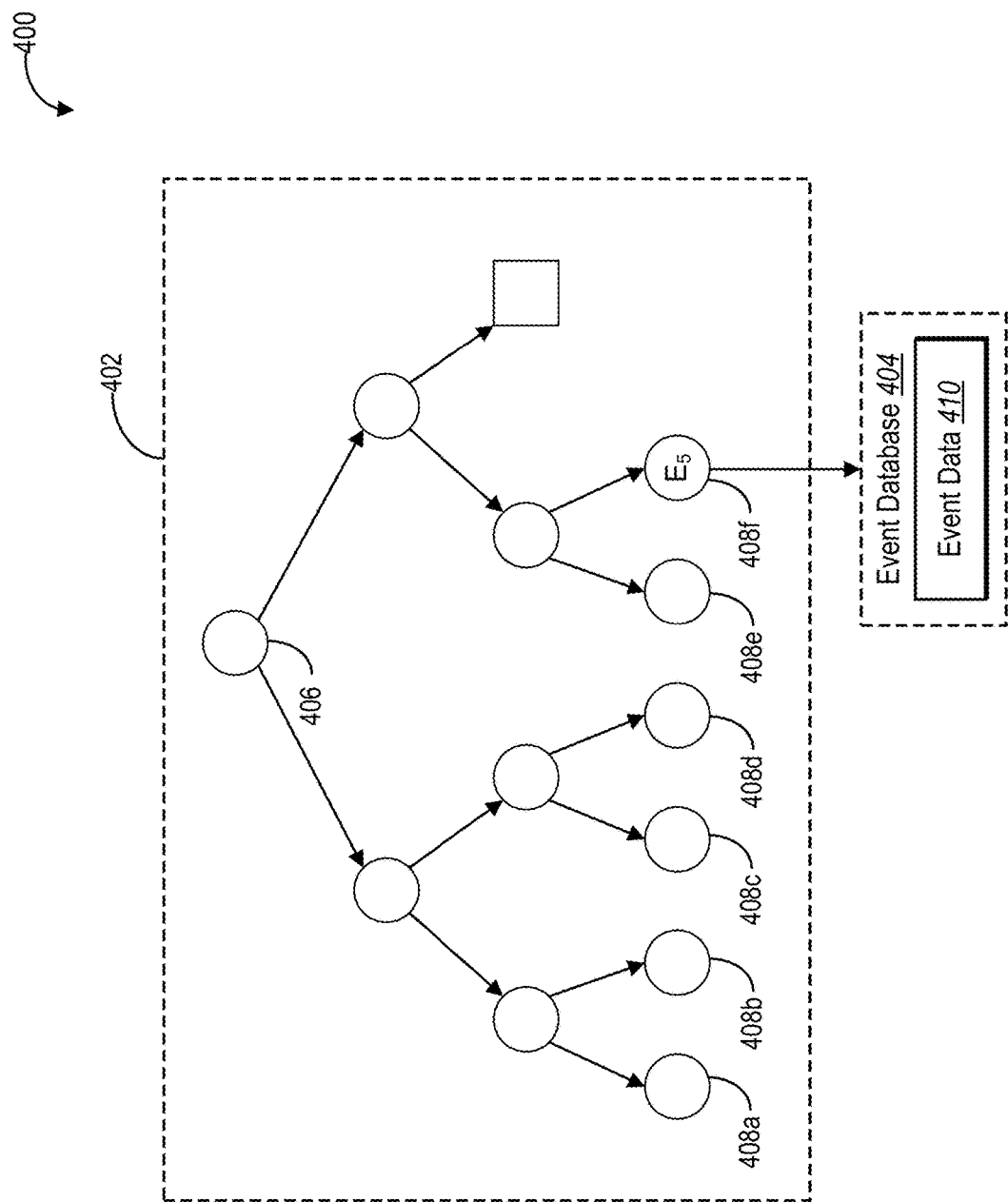
FIG. 4 illustrates an event data structure generated and maintained by the ledger transaction system in accordance with one or more embodiments.

In addition to generating a data structure storing data associated with account states, the ledger transaction system 106 can generate a data structure storing data associated with transaction events generated upon execution of transactions across the distributed digital ledger transaction network. FIG. 4 illustrates an event data structure 400 generated and maintained by the ledger transaction system 106 in accordance with one or more embodiments. As shown in FIG. 4, the event data structure 400 includes an event tree 402. In one or more embodiments, the event tree 402 includes an event Merkle tree (e.g., a Merkle accumulator).

In one or more embodiments, the event tree 402 corresponds to a particular transaction executed across the distributed digital ledger transaction network, and the leaf nodes 408a-408f correspond to the transaction events generated by execution of that transaction. In other words, upon executing a transaction across the distributed digital ledger transaction network, the ledger transaction system 106 can generate any number of transaction events (i.e., zero or more). Accordingly, the ledger transaction system 106 can generate an event tree that corresponds to that transaction and represents the transaction events generated upon its execution.

In particular, where the ledger transaction system 106 generates one or more transaction events upon execution of a transaction, the ledger transaction system 106 can generate a transaction event representation corresponding to each transaction event. The ledger transaction system can then store each transaction event representation within one of the leaf nodes 408a-408f of the event tree 402. The ledger transaction system 106 can generate a transaction event representation corresponding to a given transaction event by applying a hash function to one or more components of the event data associated with the transaction event.

Further, in one or more embodiments, the ledger transaction system 106 generates the root value of the event tree 402 as described above with reference to the root value of the state tree 306 of FIG. 3 (e.g., by iteratively combining and hashing node values). The ledger transaction system 106 can store the root value in the event root 406 of the event tree 402. As such, the root value stored within the event root 406 can represent every transaction event associated with a transaction executed across the distributed digital ledger transaction network. As will be discussed below, the ledger transaction system 106 can further store the root value of the event tree 402 within a transaction tree of the distributed digital ledger transaction network.

Additionally, as shown in FIG. 4, the event data structure 400 also includes an event database 404. In one or more embodiments, the event database 404 includes event data 410 corresponding to the transaction events represented by the event tree 402. Indeed, in some embodiments, the event data 410 includes event data corresponding to transaction events associated with transactions executed across the distributed digital ledger transaction network (i.e., every transaction event represented by any event tree generated by the ledger transaction system 106). The event data corresponding to a transaction event can include a variety of different types of data corresponding to the transaction event (e.g., the address within the state data structure of the user account associated with the transaction event, the count value of the transaction event counter of the user account after the transaction event was generated, details of the transaction event such as a transaction amount, etc.). As mentioned above, in one or more embodiments, the ledger transaction system 106 uses the event data corresponding to a transaction event to generate a transaction event representation (e.g., a hash) corresponding to that transaction event. In one or more embodiments, the event database 404 includes a mapping between transaction event representations and their corresponding event data, and the ledger transaction system 106 utilizes the event database 404 to find event data based on the corresponding transaction event representation and vice versa.

Figure 5:
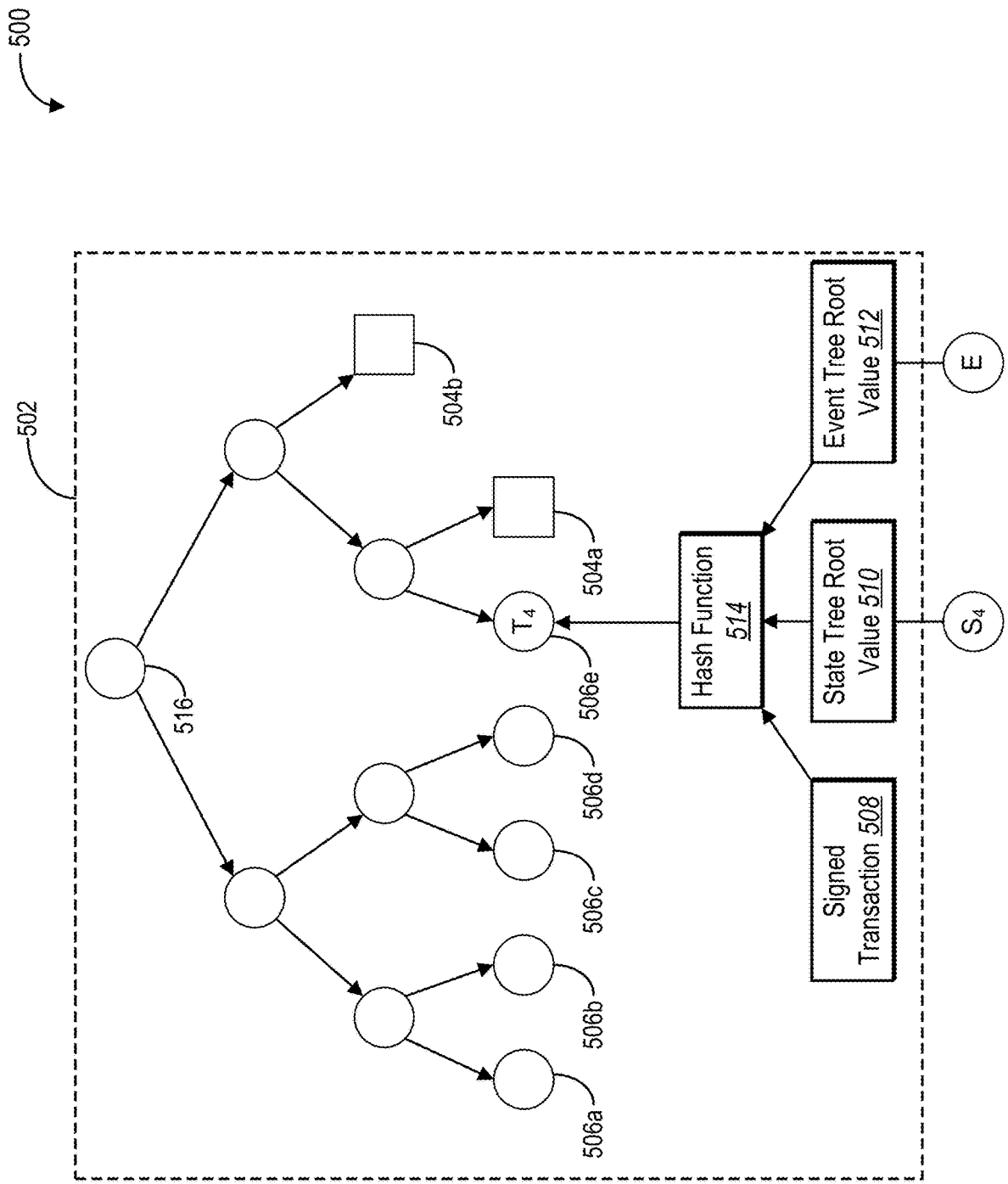
FIG. 5 illustrates a transaction data structure generated and maintained by the ledger transaction system in accordance with one or more embodiments.

In addition to data structures storing data associated with user accounts and transaction events, the ledger transaction system 106 can generate a data structure storing data associated with transactions executed across the distributed digital ledger transaction network. FIG. 5 illustrates a transaction data structure 500 generated and maintained by the ledger transaction system 106 in accordance with one or more embodiments.

As shown in FIG. 5, the transaction data structure 500 includes a transaction tree 502. In one or more embodiments, the transaction tree 502 includes a transaction Merkle tree. For example, the transaction tree 502 can include an append-only transaction Merkle tree (e.g., a Merkle accumulator) to which the ledger transaction system 106 appends a new leaf node for individual transactions executed across the distributed digital ledger transaction network. As the ledger transaction system 106 adds new leaf nodes, the transaction tree 502 continues to grow. In one or more embodiments, the structure of the transaction tree 502 with k objects is similar to a full binary tree of size $2^n$ where n is the smallest number such that $k \leq 2^n$. However, as shown in FIG. 5, in some embodiments, the ledger transaction system 106 replaces any empty subtree by a default node (as represented by the default nodes 504a-504b).

The ledger transaction system 106 can store, within each of the leaf nodes 506a-506e, a transaction representation corresponding to the transaction associated with the leaf node. In one or more embodiments, the ledger transaction system 106 generates a transaction representation corresponding to a particular transaction by combining several data components. For example, as shown in FIG. 5, the ledger transaction system can combine (e.g., concatenate) a signed transaction 508, a state tree root value 510, and an event tree root value 512.

The signed transaction 508 includes an authenticated representation of a particular transaction. For example, the signed transaction 508 can include data identifying the transaction (e.g., with a transaction identifier or other transaction details) that is signed utilizing a private key of a user account. To illustrate, a client device of a user associated with a user account can generate the signed transaction 508 by utilizing a private key corresponding to the user account to verify that the transaction is authorized.

As shown, the ledger transaction system 106 can also utilize the state tree root value 510 in generating a transaction representation within the transaction tree 502. The state tree root value 510 includes the root value stored within the state root of the state tree (e.g., the state root 308 of the state tree 306 of FIG. 3) generated upon execution of the transaction. In other words, the state tree root value 510 represents the state of the distributed digital ledger transaction network after the ledger transaction system 106 has executed that particular transaction.

In addition, the ledger transaction system 106 can also utilize the event tree root value 512 in generating a transaction representation within the transaction tree 502. The event tree root value 512 includes the root value stored within the event root of the event tree (e.g., the event root 406 of the event tree 402 of FIG. 4) generated upon execution of the transaction. In other words, the event tree root value 512 represents events generated upon execution of the transaction. In one or more embodiments, the ledger transaction system 106 includes less data, different data, or additional data as part of the combined data components. For example, the ledger transaction system 106 can include the execution status of the particular transaction or the gas used in executing the transaction.

As further shown in FIG. 5, the ledger transaction system 106 can apply a hash function 514 to the combined data components and store the resulting hash value as the transaction representation within one of the leaf nodes 506a-506e. In one or more embodiments, however, the ledger transaction system 106 can apply the hash function 514 to each of the data components individually and then combine the resulting hash values to generate the transaction representation.

Moreover, the ledger transaction system 106 can determine values for various nodes in the transaction tree 502, including a root value of a transaction root 516. In particular, the ledger transaction system 106 can combine node values corresponding to child nodes and then apply a hash function to the combined values to determine node values within the transaction tree 502. The ledger transaction system 106 can iteratively combine node values and apply a hashing function (working from the bottom of the tree to the top) to generate the root value of the transaction tree 502.

By building the transaction tree 502 in this manner, the root value of the transaction root 516 of the transaction tree 502 represents a combination of events, transactions, and states. Indeed, in one or more embodiments, by utilizing state root tree values and event tree root values to generate the root value of the transaction tree, the ledger transaction system 106 can generate a root value of the transaction tree that uniquely identifies transactions, events, and account states (historical and current) across the life of the digital ledger. In other words, modification to an event, account, or transaction would propagate through the various Merkle trees and result in a different root value of the transaction tree.

Though not shown in FIG. 5, in one or more embodiments, the transaction data structure 500 further includes a transaction database. The transaction database can include transaction data corresponding to the transaction representations stored within the transaction tree 502. In one or more embodiments, the transaction database can further include a mapping between the transaction data and the corresponding transaction representation.

Figure 6:
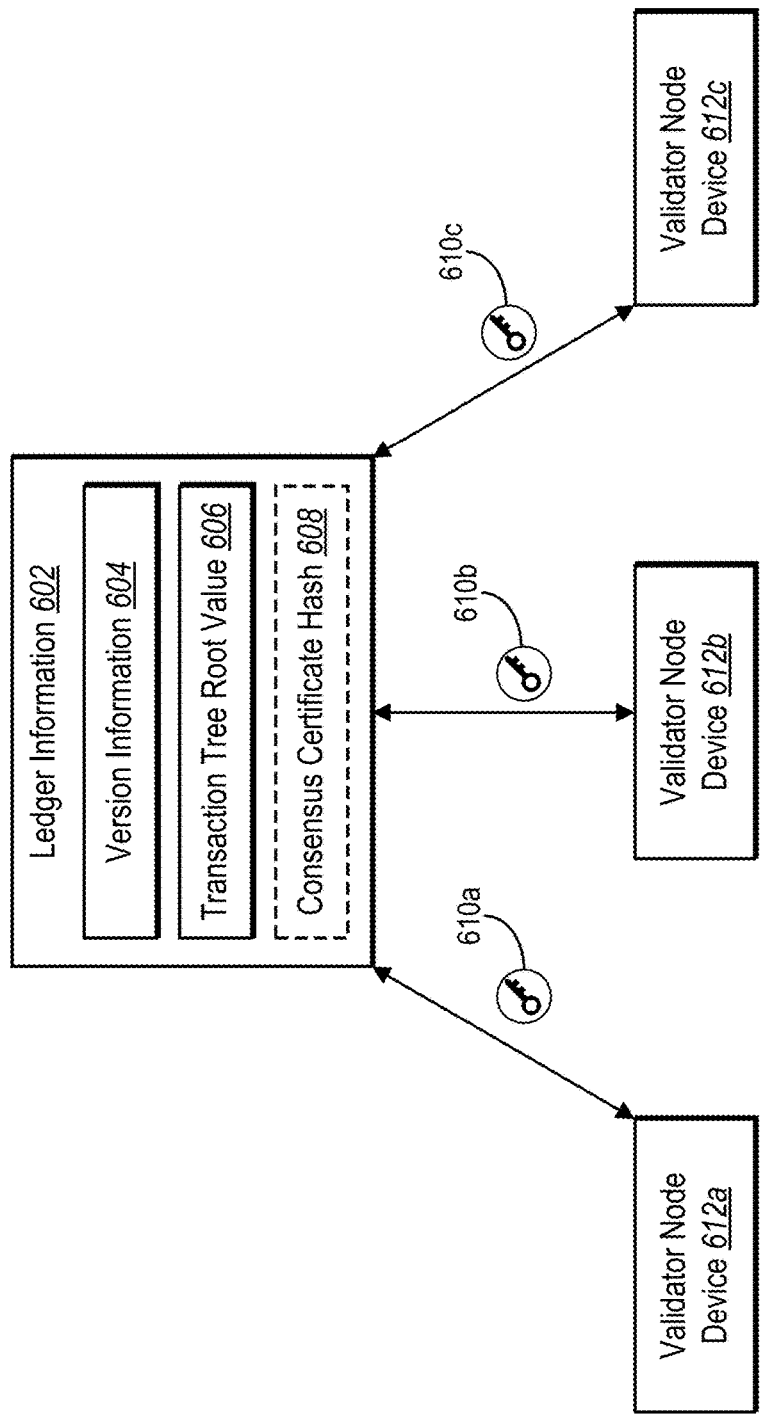
FIG. 6 illustrates a representation of ledger information for obtaining consensus in accordance with one or more embodiments.

In one or more embodiments, the ledger transaction system 106 utilizes a root value of a transaction data structure within a digital ledger to obtain consensus across the distributed digital ledger transaction network. For example, FIG. 6 illustrates a representation of ledger information for obtaining consensus in accordance with one or more embodiments. As shown in FIG. 6, the ledger transaction system 106 can gain consensus with regard to ledger information 602 that includes version information 604, a transaction tree root value 606, and a consensus certificate hash 608.

As illustrated by FIG. 6, the ledger information 602 can include version information 604. In particular, the version information 604 can include data representing the version of the latest transaction (or transaction block) executed across the distributed digital ledger transaction network. In other words, the data stored within version information 604 can represent the version of the transaction tree upon execution of the latest transaction.

As shown in FIG. 6, the ledger information 602 can also include the transaction tree root value 606. The transaction tree root value 606 includes the root value of the transaction tree (e.g., the root value of the transaction root 516 of the transaction tree 502 of FIG. 5) generated by the ledger transaction system 106 as described above (i.e., by combining and hashing node values of the transaction tree). In one or more embodiments, the ledger transaction system 106 utilizes the transaction tree root value 606 as a representation of the digital ledger. Indeed, as just mentioned, the root value of the transaction root 516 can represent transactions, events, and account states across the history of the digital ledger.

In one or more embodiments, the ledger transaction system 106 can store additional data in the ledger information 602. For example, the ledger transaction system 106 can store the current timestamp of the distributed digital ledger transaction network within the ledger information 602. The ledger transaction system 106 can provide such data (as well as the data described above) to a client device in response to a query received from the client device.

In one or more embodiments, the validator node devices of the distributed digital ledger transaction network utilize the ledger information 602 to generate a vote and achieve consensus on the current state of the distributed digital ledger transaction network. As shown in FIG. 6, the ledger transaction system 106 can generate validator signatures (represented by the keys 610a-610c) from the validator node devices 612a-612c. As mentioned above, upon reaching consensus regarding the ledger information 602, the ledger transaction system 106 generates validator signatures corresponding to the validator node devices that voted on the ledger information 602 (e.g., the validator node devices 612a-612c). For example, the ledger transaction system 106 can generate the validator signatures by utilizing the private keys associated with the validator node devices 612a-612c to encrypt the ledger information 602 corresponding to the transaction. Additional detail regarding obtaining consensus from validator nodes is provided below (e.g., in relation to FIGS. 32-33).

Upon generating the validator signatures for version N of the transaction tree, the ledger transaction system 106 can discard or overwrite the validator signatures for the previous version of the transaction tree. However, in some embodiments, if execution of a transaction marks a change to the set of validator node devices, the ledger transaction system 106 archives the validator signatures for the previous version of the transaction tree (i.e., corresponding to the previous set of validator node devices). For example, the ledger transaction system 106 can store the validator signatures corresponding to the previous set of validator nodes within a signature data structure.

Though not shown in the figures, the ledger transaction system 106 can utilize a signature data structure to store a validator set history and a signature history associated with the distributed digital ledger transaction network. In particular, the validator set history can include the validator node devices associated with each set of validator node devices able to vote on blocks of transactions (e.g., each set of validator node devices associated with a voting epoch). In one or more embodiments, the ledger transaction system 106 stores a complete set of validator node devices by storing the public key associated with each validator node device from the set. Effectively, the validator set history includes a history of changes to the set of validator node devices able to vote on blocks of transactions. The signature history can include the validator signatures associated with each transaction executed across the distributed digital ledger transaction network before the set of validator node devices changes (e.g., before the end of a voting epoch).

Additionally, as shown in FIG. 6, the ledger information 602 can include the consensus certificate hash 608. The ledger transaction system 106 can generate the consensus certificate hash 608 by applying a hash value to the consensus certificate generated by the lead validator node device upon gathering the votes necessary from the other validator node devices to reach consensus on the block of the transactions that includes the latest transaction. A consensus certificate may include a quourum certificate (referring to the "quorum" of validator node devices that vote to verify the block of transactions). Additional detail regarding obtaining consensus, validator nodes, voting, and voting epochs is provided below (e.g., in relation to FIGS. 31-32).

In one or more embodiments, the ledger transaction system 106 can chain transaction blocks. Indeed, the ledger transaction system 106 can chain transaction blocks by including, within the transaction block, the consensus certificate hash of another transaction block. For example, the ledger transaction system 106 can include the consensus certificate hash of a pervious (e.g., the immediately preceding) transaction block. In some embodiments, the ledger transaction system 106 can include a fixed consensus certificate hash value.

In one or more embodiments, each validator node device maintains a local tree of records (e.g., the transaction tree 502). The initial root of the tree can include a consensus certificate hash agreed upon by the current set of validator node devices as part of the setup for the current epoch. In particular, each branch of the local tree can include a chain of records alternating between transaction blocks and consensus certificates. In some embodiments, when selected, a lead validator node device proposes a new transaction block, usually extending the quorum certificate of (one of) the longest branch(es) of the local tree. If the proposal is successfully broadcast, honest validator node devices can verify the data, execute the transaction block, and send back a vote to the lead validator node device. Upon receiving enough votes that agree with the state of the digital ledger resulting from execution of the transaction block, the lead validator node device can create a consensus certificate for the transaction block and broadcast it to the other validator node devices, extending the chain length by one. Subsequently, the ledger transaction system 106 can select a new lead validator node devices that will drive another round of consensus, further extending the chain.

Thus, the ledger transaction system 106 can utilize data structures to store, validate, and distribute data representative of the digital ledger implemented and maintained by the distributed digital ledger transaction network. In particular, the ledger transaction system 106 can store, within the transaction data structure, data that describes every transaction executed across the distributed digital ledger transaction network, the transaction events resulting from those transactions, and how those transaction events change user accounts. Any unauthorized modification to an event, account, or transaction will modify the corresponding data structures, modify the ledger information, and fail to gain consensus across the distributed digital ledger transaction network.

B. Policy for Storage Deletion

As mentioned above, conventional blockchain systems generate and store a significant amount of data. For example, conventional systems may generate data regarding the transactions that have been executed across the network as well as data associated with user accounts of the network. Many of these conventional systems store the data on the network (i.e., on computer nodes participating in the network). The conventional systems can then use the data stored on the network to update the state of the network (i.e., update the digital ledger implemented on the network) and/or service queries for information.

As mentioned above, however, these conventional blockchain systems suffer from technological shortcomings that result in inefficient and inflexible operation. For example, conventional blockchain systems are often inefficient in that they store all data related to the digital ledger (i.e., the entire history of the digital ledger) on computer nodes participating in the network. As the digital ledger grows, the conventional systems require more computing resources (e.g., computing memory) from the computer nodes in order to maintain the data corresponding to the digital ledger.

In addition to efficiency concerns, conventional blockchain systems are also inflexible. In particular, many conventional blockchain systems rigidly require the computer nodes participating in the network to store the entire history of the digital ledger regardless of the role of that computing device. Consequently, the conventional systems may require some computer nodes to store more data than is necessary to fulfill their respective role. Accordingly, the conventional systems often fail to implement flexible storage requirements that accommodate the needs of the computer nodes.

One or more embodiments of the ledger transaction system 106 implement flexible storage deletion and consolidation to more efficiently manage the limited storage resources of computer nodes participating in the distributed digital ledger transaction network. In particular, the ledger transaction system 106 can utilize configurable data storage deletion rules to remove (all or a portion of) various data structures stored at various computer nodes across the distributed digital ledger transaction network. Indeed, the ledger transaction system 106 can implement different data storage deletion rules across different devices depending on user preferences, computing device roles or functions (e.g., validator node versus full node), or storage capabilities (e.g., remaining storage). For example, users of computer nodes can define what data structures to keep (what types, what portions, or at what frequency), or for how long (e.g., how old). To illustrate, the ledger transaction system 106 can receive (via a user interface of a computer nodes) user interaction indicating a selection to identify account balances at a particular time of day each week. The ledger transaction system 106 can traverse the data structures (e.g., the state database and/or state tree), identify the pertinent nodes for the requested information, and remove the remaining data. Accordingly, the ledger transaction system 106 can flexibly determine what events, transactions, states, and/or account data to retain and/or delete at various computing devices of the distributed digital ledger transaction network.

The ledger transaction system 106 can remove data while still retaining the ability to validate or accurately determine consensus of historical or proposed digital ledgers. For example, the ledger transaction system 106 can remove underlying data from a database, while retaining data representations (e.g., hashes) within an authenticated data structure. This approach allows the ledger transaction system 106 to confirm the validity of historical or proposed data structures without retaining the underlying data used to generate the structures themselves.

In some embodiments, the ledger transaction system 106 can remove different portions of data structures to reduce the storage burdens at the computer node. For example, in one or more embodiments, the ledger transaction system 106 deletes, at a computer node, data stored in a transaction tree that corresponds to a completed subtree. In some embodiments, the ledger transaction system 106 can also consolidates data structures (e.g., structures reflecting different states) to reduce size and memory requirements. To illustrate, upon updating the state of the distributed digital ledger transaction network, the ledger transaction system 106 can generate a state tree component (rather than an entire state tree) that points to the node values of previous state trees that correspond to unchanged user account states.

In one or more embodiments, the ledger transaction system 106 applies different storage deletion rules to different computing devices (e.g., different rules depending on whether the computer node is a full node device or a validator node device). In some embodiments, the ledger transaction system 106 deletes and/or consolidates data structures based on the capabilities or preferences of the particular computer node. In this manner, the ledger transaction system 106 can flexibly apply different storage deletion and consolidation rules to improve the efficiency of storage resources.

Figure 7:
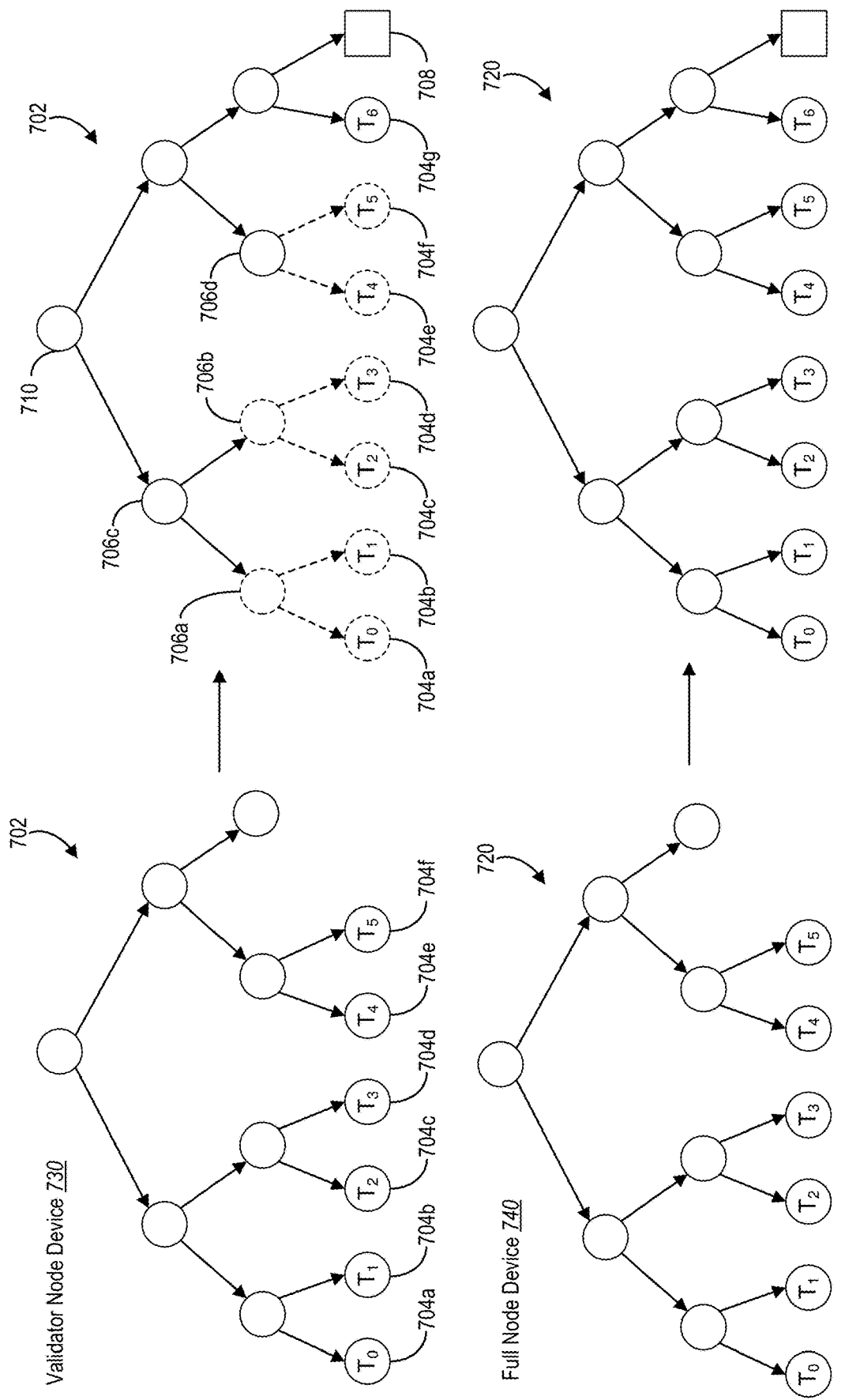
FIG. 7 illustrates the ledger transaction system deleting a portion of a transaction tree stored at computer nodes in accordance with one or more embodiments.

For example, FIG. 7 illustrates the ledger transaction system 106 deleting a portion of a transaction tree stored at computer nodes in accordance with one or more embodiments. As shown in FIG. 7, the ledger transaction system 106 analyzes a transaction tree 702 stored at a validator node device 730. As mentioned above, the leaf nodes 704a-704f of the transaction tree 702 correspond to individual transactions executed across the distributed digital ledger transaction network. Indeed, as new transactions are executed across the distributed digital ledger transaction network, the ledger transaction system 106 appends new leaf nodes corresponding to those transactions to the transaction tree 702.

In one or more embodiments, however, the ledger transaction system 106 can determine that the validator node device 730 will not service queries for information. For example, the ledger transaction system 106 can determine that there are a sufficient number of full node devices participating in the distributed digital ledger transaction network to respond to queries for information. In determining that the validator node device 730 will not service queries, the ledger transaction system 106 can determine to maintain only those nodes of the transaction tree 702 (e.g., maintain the data stored within those nodes) necessary for the validator node device 730 to perform the validation role. Thus, the ledger transaction system 106 can apply a set of storage deletion rules to delete the tree nodes (e.g., delete the data stored within those nodes) that are not necessary for validation in order to reduce the amount of storage utilized in storing the transaction tree 720.

For example, in one or more embodiments, the ledger transaction system 106 determines that a subtree is complete and deletes the child nodes included in that subtree while maintaining the root node of that subtree. In one or more embodiments, the ledger transaction system 106 determines that a subtree is complete when every node in that subtree has two child nodes (except for the leaf nodes).

For example, as shown in FIG. 7, the ledger transaction system 106 determines that the subtree from the internal node 706c is full (e.g., complete or populated). In response, the ledger transaction system 106 deletes the leaf nodes 704a-704d and the internal nodes 706a-706b (represented by the dashed lines) corresponding to the subtree. It will be appreciated the deleting the leaf nodes 704a-704d can also include deleting entries in a database corresponding to the transaction tree 702. The ledger transaction system 106 maintains the internal node 706c as the root node of that subtree.

Similarly, the ledger transaction system 106 determines that the subtree from the internal node 706d is full. In response, the ledger transaction system 106 deletes the leaf nodes 704e-704f (and/or corresponding database entries). The ledger transaction system 106 maintains the internal node 706d as the root node of that subtree. As can be seen in FIG. 7, the ledger transaction system 106 maintains the subtree that includes the leaf node 704g, because that subtree is not complete, as indicated by inclusion of the default node 708 within that subtree.

As the ledger transaction system 106 continues to append leaf nodes to the transaction tree 702 in response to transaction execution, the ledger transaction system 106 can continue to identify completed subtrees and delete the child nodes of those subtrees while maintaining their root nodes. In one or more embodiments, the ledger transaction system 106 further identifies subtrees consisting of exactly one leaf node and replaces those subtrees with a single node representing the leaf node. In one or more embodiments, the ledger transaction system 106 maintains the root nodes of a subtree to enable the validator node device 730 to participate in validating transaction blocks. Indeed, by maintaining the root nodes of the subtrees, the ledger transaction system 106 can re-evaluate the root value of the root node 710 of the transaction tree 702 after appending a new leaf node. By maintaining root nodes that contain hash values reflecting leaf nodes, the ledger transaction system 106 can still verify the accuracy of a transaction tree without storing the leaf nodes originally utilized to determine the hash values at the root.

As further shown in FIG. 7, the ledger transaction system 106 illustrates maintenance of a transaction tree 720 stored at a full node device 740. Indeed, as shown in FIG. 7, the ledger transaction system 106 implements a different storage approach for the full node device 740 when compared to the validator node device 730. For example, in one or more embodiments, the ledger transaction system 106 determines that the full node device 740 will service queries for information. Accordingly, the ledger transaction system 106 determines that the full node device 740 will store the transaction tree 720 in its entirety (e.g., store the entire history of the digital ledger). Thus, the ledger transaction system 106 can prevent the deletion of the transaction tree 720 or its nodes. Rather, as shown in FIG. 7, as transactions are executed across the distributed digital ledger transaction network, the ledger transaction system 106 appends, to the transaction tree 720, new leaf nodes corresponding to those transactions. Thus, the transaction tree 720 stored at the full node device 740 grows with newly executed transactions.

In addition to deleting or consolidating portions of transaction data structures, the ledger transaction system 106 can also delete or consolidate state data structures (or other data structures) stored at a computer node to reduce the amount of data stored at the computer node. For example, FIG. 8 illustrates the ledger transaction system 106 deleting or consolidating portions of a state tree stored at computer nodes in accordance with one or more embodiments.

Figure 8:
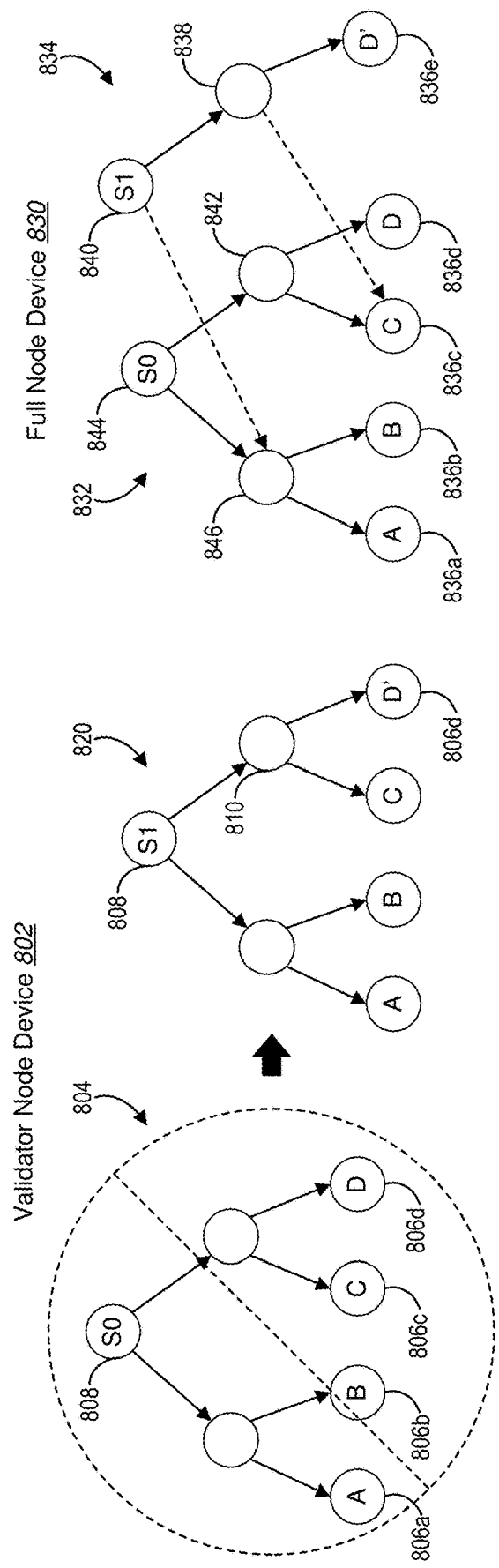
FIG. 8 illustrates the ledger transaction system deleting or consolidating portions of a state tree stored at computer nodes in accordance with one or more embodiments.

As shown in FIG. 8, the ledger transaction system 106 manages a state tree 804 stored at a validator node device 802. As discussed above, the leaf nodes 806a-806f of the state tree 804 store account state representations corresponding to user accounts, and the root value stored within the root node 808 of the state tree 804 represents the state of accounts across the distributed digital ledger transaction network. As further mentioned, as transactions are executed, one or more user accounts of the distributed digital ledger transaction network are modified. Therefore, the ledger transaction system 106 can generate a new state trees to represent the state of the distributed digital ledger transaction network resulting from each transaction (or block of transactions). Accordingly, in some embodiments, the ledger transaction system 106 stores, at the computer nodes of the distributed digital ledger transaction network, every state tree within the state data structure.

However, the ledger transaction system 106 can reduce the amount of storage utilized in storing the state data structure. In particular, in one or more embodiments, the ledger transaction system 106 determines that the validator node device 802 will not service queries for information, and therefore will not store state trees representing previous states of the distributed digital ledger transaction network. Indeed, as the validator node device 802 only requires the most current state of the distributed digital ledger transaction network to determine the next state, the ledger transaction system 106 can determine that the validator node device 802 will only store the most current state tree (or some other subset of data structures, such as the previous two state trees).

Accordingly, as shown in FIG. 8, the ledger transaction system 106 tree overwrites the state tree 804 to generate the state tree 820 upon execution of a transaction. Though FIG. 8 shows the state tree 804 and the state tree 820 as separate tree structures, this is merely for illustrative purposes to show the changes made to the state tree stored at the validator node device 802.

In particular, the ledger transaction system 106 overwrites the state tree 804 (and generates the state tree 820) by updating the node values stored at the state tree 804 that are modified by the transaction. As illustrated by FIG. 8, execution of the transaction modifies user account D corresponding to the account state representation stored at leaf node 806d. In response, the ledger transaction system 106 overwrites the state tree 804 by updating the account state representation corresponding to user account D stored at the leaf node 806d (now shown as user account D' under state tree 820). The ledger transaction system 106 further updates the node values stored at the nodes from which the leaf node 806d descends (i.e., the internal node 810 and the root node 808). Thus, the ledger transaction system 106 can store, at the validator node device 802, one state tree that is updated with every transaction (or block of transactions) to reflect the most current state of the distributed digital ledger transaction network.

In some embodiments, rather than overwriting a state data structure, the ledger transaction system 106 can generate a state data structure component that reflects changes to a prior version of a state data structure. In this manner, the ledger transactions system 106 can store multiple versions of a state data structure, without storing the entirety of the state data structures. For example, as further shown in FIG. 8, the ledger transaction system 106 manages a state tree 832 at a full node device 830. Indeed, as shown in FIG. 8, rather than storing two full state trees or overwriting a previous state tree with a subsequent tree, the ledger transaction system 106 consolidates two trees in a manner that preserves the data representations at different states.

For example, in one or more embodiments, the ledger transaction system 106 determines that the full node device 830 will service queries for information. Accordingly, the ledger transaction system 106 determines that the full node device 830 will store, within the state data structure, data corresponding to every state of the distributed digital ledger transaction network.

As shown in FIG. 8, the ledger transaction system 106 tree generates a state tree component 834 having node values corresponding to user account states modified by a transaction. Indeed, as shown in FIG. 8, a transaction modifies user account D corresponding to the account state representation stored at leaf node 836d. In response, the ledger transaction system 106 generates the state tree component 834 by generating nodes to store updated node values.

In particular, as shown in FIG. 8, the ledger transaction system 106 generates the state tree component 834 by generating the leaf node 836e and storing the modified account state representation for user account D (shown as user account D') therein. As shown, the ledger transaction system 106 further generates the internal node 838 and the root node 840. The ledger transaction system 106 stores updated node values in the internal node 838 (modified from the node values stored at the internal node 842 in the previous state) and stores updated node values in the root node 840 (modified from the node values stored at the root node 844 in the previous state tree). Thus, the ledger transaction system 106 utilizes the state tree component 834 to store the node values of the state tree 832 that have changed as a result of executing the transaction.

As shown in FIG. 8, the ledger transaction system 106 further associates nodes of the state tree component 834 with nodes of the state tree 832 that were not modified by the transaction. In particular, the internal node 838 of the state tree component 834 points to (i.e., is associated with) the leaf node 836c of the state tree 832. Therefore, the ledger transaction system 106 generates the node value of the internal node 838 of the state tree component 834 based on the unmodified node value stored at the leaf node 836c and the modified node value stored at the leaf node 836e. Similarly, the root node 840 of the state tree component 834 points to the internal node 846 of the state tree 832. Therefore, the ledger transaction system 106 generates the root vale of the root node 840 of the state tree component 834 based on the unmodified node value stored at the internal node 846 and the modified node value stored at the internal node 838. As shown in FIG. 8, the unmodified node value stored at the internal node 846 is based on the unmodified node values stored at the leaf nodes 836a-836b. Thus, the ledger transaction system 106 tracks modified and unmodified node values resulting from execution of the transaction without duplicating the state tree 832 entirely.

Figure 9:
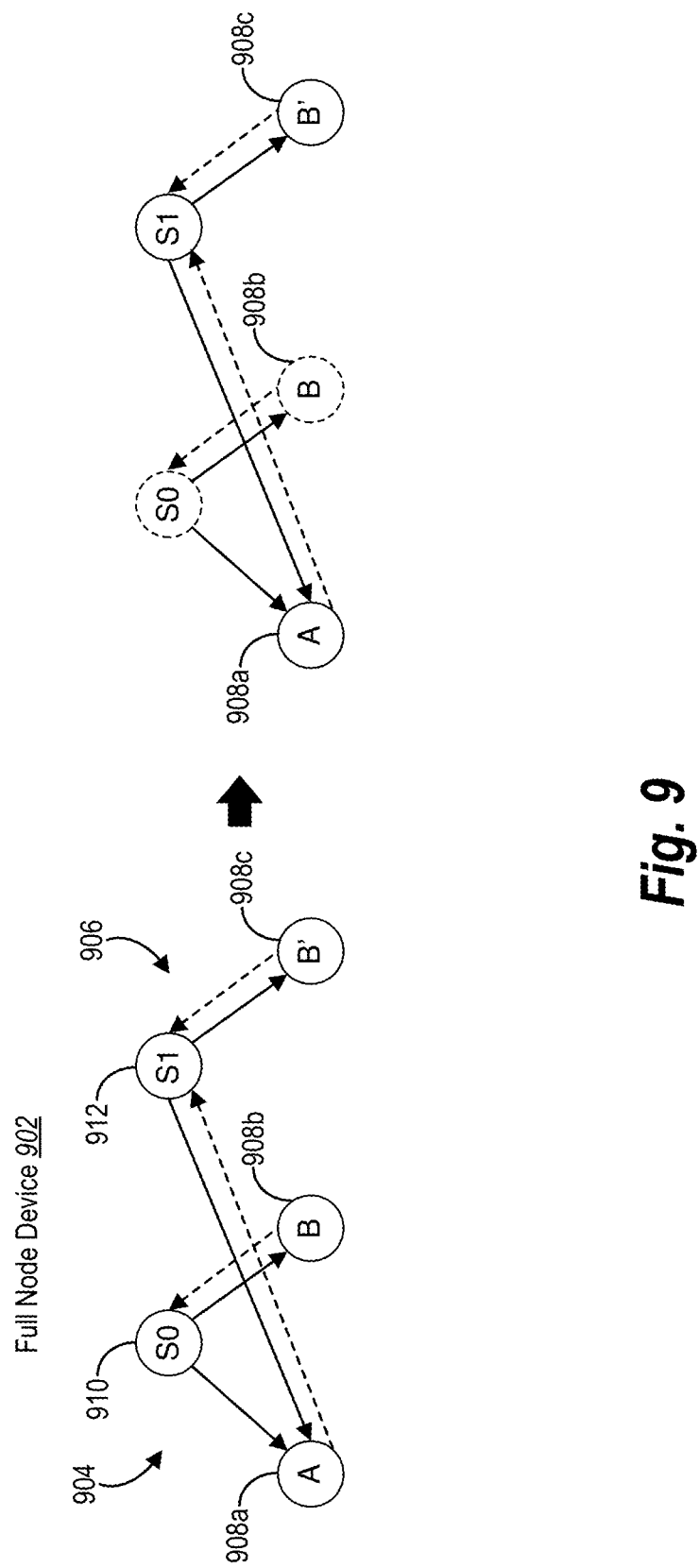
FIG. 9 illustrates the ledger transaction system deleting portions of a state tree with a state tree component reflecting multiple different state trees in accordance with one or more embodiments.

In one or more embodiments, the ledger transaction system 106 can utilize state tree components to store multiple states and then delete nodes within the state tree to reduce the amount of data stored at the computer node. For example, a computer node can decide to transition from storing multiple data structures reflecting multiple states to storing a state data structure reflecting fewer states. FIG. 9 illustrates the ledger transaction system 106 deleting portions of a state tree with a state tree component reflecting multiple different states trees in accordance with one or more embodiments.

As shown in FIG. 9, the ledger transaction system 106 manages a state tree 904 stored at a full node device 902. In particular, as shown in FIG. 9, the ledger transaction system 106 generates the state tree 904 corresponding to a first state (labeled "S0") and a state tree component 906 corresponding to a second state (labeled "S1"). Per the discussion above with regard to FIG. 8, the state tree component 906 includes node values corresponding to user account states that have changed between the first state and the second state. Further, the state tree component 906 points to nodes of the state tree 904 corresponding to unchanged user account states.

As shown in FIG. 9, the ledger transaction system 106 tracks the association between a particular node and its newest parent node. Indeed, while the solid lines shown in FIG. 9 represent a parent-child relationship, the dashed lines represent a child-parent relationship between a particular node and the most current associated parent node. For example, the ledger transaction system 106 associates the leaf node 908a corresponding to unmodified user account A with the root node 912 of the state tree component 906. The ledger transaction system 106 further associates the leaf node 908b corresponding to outdated user account B with the root node 910 of the state tree 904 and the leaf node 908c corresponding to the updated user account B' to the root node 912 of the state tree component 906. In one or more embodiments, the ledger transaction system 106 tracks the current associated parent node for a child node by appending a representation (e.g., an identifier or reference pointer) of the parent node to the node value stored at the child node.

As shown in FIG. 9, the ledger transaction system 106 can delete nodes (or subtrees) within the state tree 904 based on the parent-child relationships reflected in the state tree component 906. For example, the ledger transaction system 106 can determine that the full node device 902 is running out of storage space. In response, the ledger transaction system 106 can purge the full node device 902 of older data and free up memory space for newer data (e.g., delete previous states so that the state data structure reflects only the current state).

As shown in FIG. 9, the ledger transaction system 106 deletes all outdated nodes (i.e., nodes having node values that do not correspond to the current state of the distributed digital ledger transaction network). In particular, the ledger transaction system 106 identifies which nodes have outdated node values by identifying the nodes that do not have a parent corresponding to the current state of the distributed digital ledger transaction network. To illustrate, in order to purge the full node device 902 of the data that corresponds to the first state but does not correspond to the second state, the ledger transaction system 106 begins at the root node 910 of the state tree 904. The ledger transaction system 106 checks both children of the root node 910. As shown in FIG. 9, because the leaf node 908a is associated with the root node 912 corresponding to the second state, the ledger transaction system maintains the leaf node 908a. However, because the leaf node 908b is most currently associated with the root node 910, the ledger transaction system 106 deletes the leaf node 908b. As shown in FIG. 9, because the root node 910 of the state tree 904 only corresponds to the first state, the ledger transaction system 106 deletes the root node 910.

In one or more embodiments, the ledger transaction system 106 stores, at each node, the total number of associated parent nodes (e.g., by appending the total number of parents to the node value stored at the node). The ledger transaction system 106 can then delete nodes based on the total number of parent nodes. For example, the ledger transaction system 106 can identify nodes having a total number of parent nodes that indicate the node does not correspond to the current state of the distributed digital ledger transaction network. To illustrate, a node from a state tree corresponding to the first state is associated with only one parent node (i.e., the root node of that state tree). Accordingly, the ledger transaction system 106 can delete that node.

As mentioned, in one or more embodiments, the ledger transaction system 106 can delete all nodes having outdated node values. In some embodiments, however, the ledger transaction system 106 deletes all nodes that have outdated node values corresponding to a state that is earlier than a designated state. In other words, the ledger transaction system 106 can identify a designated state (e.g., via input from a user of the full node device 902 or via input from an authorized device) and delete all nodes corresponding to states that are previous to the designated state. In this way, the full node device 902 can maintain data corresponding to a desired subset of states of the distributed digital ledger transaction network.

In one or more embodiments, the ledger transaction system 106 can delete, consolidate, and store a variety of different data structures to efficiently manage storage at computer nodes. For example, in one or more embodiments, the ledger transaction system 106 uploads data corresponding to the most current state (or some other designated state) to another storage device and then stores all data corresponding to subsequent states to that storage device. In some embodiments, the ledger transaction system 106 determines to maintain snapshots of the history of states of the distributed digital ledger transaction network. As an illustration, the ledger transaction system 106 can determine to maintain data corresponding to one in every thousand states or data corresponding to one state out of every week. The ledger transaction system 106 can then delete data that does not correspond to those states. Accordingly, the ledger transaction system 106 can identify the implementing computer node as one that can only service queries for information regarding at least one of the maintained states.

Although FIGS. 7-9 describe specific storage implementations with regard to computer nodes of a specific classification or role, the ledger transaction system 106 can apply various storage configurations to a variety of computer nodes (e.g., validator nodes and/or full nodes). In some embodiments, the ledger transaction system 106 implements many particular storage configurations based on preferences at each individual computing device (e.g., based on interaction with user interface elements for setting storage preferences) and/or based on the resources (e.g., memory) available to that computer node. Further, although FIGS. 7-9 provide examples with respect to transaction data structures and state data structures, the ledger transaction system 106 can similarly manage storage for a variety of other data structure types (e.g., event data structures).

As mentioned, in one or more embodiments the set of storage deletion rules and the set of storage consolidation rules are configurable. In particular, the ledger transaction system 106 can change the deletion rules and consolidation rules based on the changing needs of the distributed digital ledger transaction network or based on the changing needs or preferences of individual computer nodes. In some embodiments, the ledger transaction system 106 configures the set of storage deletion rules and/or the set of storage consolidation rules based on input received from a user of a node device or from an authorized device. In some embodiments, the ledger transaction system 106 changes the storage deletion rules and/or the storage consolidation rules based on consensus (e.g., procedures of a smart contract executed across the distributed digital ledger transaction network).

By implementing the set of storage deletion rules and/or the set of storage consolidation rules, the ledger transaction system 106 operates more efficiently than conventional systems. In particular, the ledger transaction system 106 reduces the demand for storage placed on the computer nodes of the distributed digital ledger transaction network. Indeed, the ledger transaction system 106 reduces the computing resources utilized by the computer nodes while still allowing the computer nodes to maintain data corresponding to the digital ledger.

Further, the ledger transaction system 106 is more flexible than conventional systems. For example, by managing storage based on a classification or role of a computer node, the ledger transaction system 106 flexibly narrows the use of storage to the needs of particular nodes (e.g., serving queries or participating in consensus). Further, by allowing for configurable storage approaches, the ledger transaction system 106 can flexibly modify or update storage management to accommodate the changing needs of the distributed digital ledger transaction network.

C. Account Eviction

Many conventional blockchain systems store account data for users within storage managed by the conventional system (e.g., a separate database managed by each computer node participating in the system). As more users create accounts associated with the conventional systems, the demand for storage increases, exhausting storage resources at individual computing devices. To avoid these issues, many conventional systems purge their storage structures of unwanted (e.g., old) account data. For example, conventional blockchain systems may limit the time allotted to the storage of account data for a particular user. When the allotted time expires, the conventional systems may delete or overwrite the account data within the storage structure, allowing for the reuse of storage resources.

As mentioned above, however, despite these advances, conventional blockchain systems suffer from technological shortcomings that result in inflexible and inefficient operation. For example, conventional blockchain systems are often inflexible in that they rigidly require all participating computer nodes to delete account data associated with an expired user account synchronously. To illustrate, many conventional blockchain systems delete account data associated with an expired user account by broadcasting a transaction (e.g., originating from a computer node) that triggers the deletion to all computer nodes storing the account data. Consequently, a given computer node typically must wait for such a transaction before deleting the account data.

In addition to flexibility concerns, conventional blockchain systems are also inefficient. In particular, because conventional systems often utilize transactions to trigger the deletion of account data associated with expired user accounts, a computer node storing the account data may maintain the data within its database longer than necessary. Specifically, as mentioned, a computer node may maintain the account data while waiting for a transaction that triggers deletion even after having the computing resources (e.g., processing down-time) available to locate and delete the data. Accordingly, conventional systems often utilize a significant amount of computing resources (e.g., memory) to accommodate expired user accounts. Further, to delete an account, conventional systems generally broadcast a separate transaction to trigger deletion of the account data which further utilizes computer resources across the distributed digital ledger transaction network in executing and obtaining consensus on the transaction.

One or more embodiments of the ledger transaction system 106 utilize flexible account eviction to more efficiently manage the storage resources of computer nodes within the distributed digital ledger transaction network. In particular, as mentioned above, the ledger transaction system 106 can generate a state data structure that stores account data corresponding to user accounts as well as account state representations of the account data. The ledger transaction system 106 can allow for lazy deletion (e.g., marking items as expired or ready for deletion without imposing a requirement to delete the data) of account data across computing devices of the distributed digital ledger transaction network. For example, the ledger transaction system 106 can store an eviction date associated with each user account. Based on the eviction date, the ledger transaction system can determine expiration of a user account and subsequently delete the account data from the state data structure at a flexible time for each computing device (e.g., when computing resources become available for the device). In this manner, the ledger transaction system 106 enables each computer node of the distributed digital ledger transaction network to flexibly and efficiently delete expired account data.

As mentioned above, the ledger transaction system 106 can generate a state data structure that stores account data and account state representations corresponding to user accounts of the distributed digital ledger transaction network. FIG. 10 illustrates a state data structure 1000 generated by the ledger transaction system 106 for performing account eviction in accordance with one or more embodiments.

As described above, and as shown in FIG. 10, the state data structure 1000 includes a state database 1002 and a state tree 1004. In particular, the ledger transaction system 106 generates, within the state database 1002, account data 1006 corresponding to a user account of the distributed digital ledger transaction network. Further, the ledger transaction system 106 generates an account state representation 1008 corresponding to the user account within the state tree 1004 (i.e., as part of a leaf node of the state tree 1004).

As described above, in one or more embodiments, the account state representation 1008 includes a hash value 1010 corresponding to the account data 1006 (i.e., a hash of the account value 1016). In some embodiments, however, the account state representation 1008 includes additional data. For example, as shown in FIG. 10, the account state representation 1008 further includes a key hash value 1012 (e.g., corresponding to the authentication key of the user account). In one or more embodiments, the ledger transaction system 106 generates the key hash value 1012 by generating an authentication key (e.g., setting the key hash value 1012 to be the n-bit address key corresponding to the user account or applying a hash function to the public key associated with the user account).

As shown in FIG. 10, the account state representation 1008 can further include an eviction date 1014 associated with the user account. The ledger transaction system 106 can generate the eviction date 1014 based on one or more factors that determine how long the user account should remain active within the distributed digital ledger transaction network. For example, the ledger transaction system 106 can generate the eviction date 1014 based on one or more fees paid by the user account (e.g., rent), which may include fees to create the user account and/or fees paid to execute transactions sent by the user account on the distributed digital ledger transaction network.

In one or more embodiments, the ledger transaction system 106 can update (i.e., modify) the eviction date 1014 associated with the user account. For example, the ledger transaction system 106 can update the eviction date 1014 to extend the active status of the user account after detecting activity corresponding to the user account (e.g., after executing a transaction submitted by the user account on the distributed digital ledger transaction network). Additionally, the ledger transaction system 106 can update the eviction date 1014 upon re-caching the account data 1006 associated with the user account, as will be explained in more detail below. In one or more embodiments, the ledger transaction system 106 sets the eviction date 1014 based on a time of a last user account access (e.g., the time of the last activity of the user account with regard to the distributed digital ledger transaction network) and a threshold value that includes a predetermined minimum length of time that a user account may remain active before expiration. Similarly, the ledger transaction system 106 can set or update an eviction date based on rent deposit amount, a time of a transaction that transfers digital assets from the user account, or a time of a transaction that transfers digital assets to the user account.

When the ledger transaction system 106 determines to delete the account data 1006 (e.g., when sufficient computing resources become available), the ledger transaction system can access the account state representation 1008 to determine (or confirm) expiration of the eviction date 1014 (i.e., the user account). In response to determining expiration of the eviction date 1014, the ledger transaction system 106 can delete the account data 1006 (e.g., the account value 1016 and corresponding hash 1018) from the state database 1002. As shown in FIG. 10, however, the ledger transaction system 106 can still maintain the account state representation 1008 within the state tree 1004, allowing the ledger transaction system 106 to re-cache the account data 1006 (e.g., upon satisfaction of appropriate conditions, as discussed below).

Notably, in one or more embodiments, the ledger transaction system 106 initiates the deletion of account data associated with a given user account without submission of a transaction event request on the distributed digital ledger transaction network for deleting the account data. Rather, as mentioned, the ledger transaction system 106 can initiate deletion of the account data at any time after expiration of the user account (e.g., based on preferences, settings, or capabilities of individual computing devices).

The ledger transaction system 106 can determine when to purge account data based on a variety of factors. In one or more embodiments, the ledger transaction system 106 performs a periodic scan to identify expired user accounts and then delete the corresponding account data (and other associated data) from the state database 1002. The ledger transaction system 106 can optimize the frequency of this periodic scan in order to more efficiently manage the computing resources available at any given time. In some embodiments, the ledger transaction system 106 optimizes the periodic scan independently for each computer node (e.g., validator node device or full node device) of the distributed digital ledger transaction network. Specifically, for a given computer node, the ledger transaction system 106 can identify the computing resource of the computer node, determine the availability of those computing resources, and then determine how to optimize the frequency of the scan for locating expired user accounts.

In some embodiments, the ledger transaction system 106 provides selectable options for setting conditions for purging purge account data. For example, the ledger transaction system 106 can provide a user interface for selecting a time, frequency, or trigger for removing account data. In other embodiments, the ledger transaction system 106 automatically purges account data based on a pre-defined schedule or trigger (e.g., based on current processing power utilized by the computing device falling below a threshold level).

By deleting account data corresponding to an expired user account without requiring a transaction event request, the ledger transaction system 106 provides more flexibility for managing expired user accounts when compared to conventional systems. Specifically, the ledger transaction system 106 can flexibly delete account data based on individual user preferences and/or the availability of computing resources. Further, by optimizing account data deletion independently for each computer node within the distributed digital ledger transaction network, the ledger transaction system 106 can extend the flexibility to accommodate the computing resources available to each individual computer node.

Additionally, the ledger transaction system 106 operates more efficiently than conventional systems. As an initial matter, the ledger transaction system 106 avoids wasting computer resources across the distributed digital ledger transaction network in transmitting, analyzing, and executing separate transactions to remove outdated content. Indeed, each individual device can remove content without having to execute and gain consensus on an additional transaction. In addition, by allowing individual computing devices to remove account data at their leisure, the ledger transaction system 106 can efficiently locate and delete account data based on the available computer resources on individual devices. Accordingly, the ledger transaction system 106 can avoid overburdening computer resources of individual devices.

In some circumstances, allowing individual computer nodes to flexibly delete account data could potentially result in inconsistency across computer nodes. For example, a request by a client device for information from a user account could produce a different response depending on whether individual node had purged particular account data. In one or more embodiments, the ledger transaction system 106 provides flexibility while maintaining consistency by limiting access to accounts across the distributed digital ledger transaction network (e.g., even when the account data has not yet been deleted from a particular device).

For example, in one or more embodiments, the ledger transaction system 106 rejects requests (e.g., transactions, queries, etc.) associated with the user account that are received after expiration of the user account and prior to deleting the account data 1006. Specifically, in some embodiments, upon receiving a request associated with the expired user account, the ledger transaction system 106 can access the account state representation 1008 corresponding to the user account and determine that the eviction date 1014 (i.e., the user account) has expired. The ledger transaction system 106 can subsequently continue with processing of the transaction as if the account had expired. For example, the ledger transaction system 106 can respond to the request by sending an indication (e.g., to the client device that submitted the request) that the user account has expired. Said differently, even while maintaining the account data 1006 within the state database 1002, the ledger transaction system 106 can deny access to the account data 1006 (i.e., deny access to the user account itself) if the user account (i.e., the eviction date 1014) has expired. In this manner, the ledger transaction system 106 can give each computer node flexibility to delete account data (without initiating a separate transactions) while still ensuring consistent behavior (e.g., response to queries) across the entire distributed digital ledger transaction network.

Figure 11:
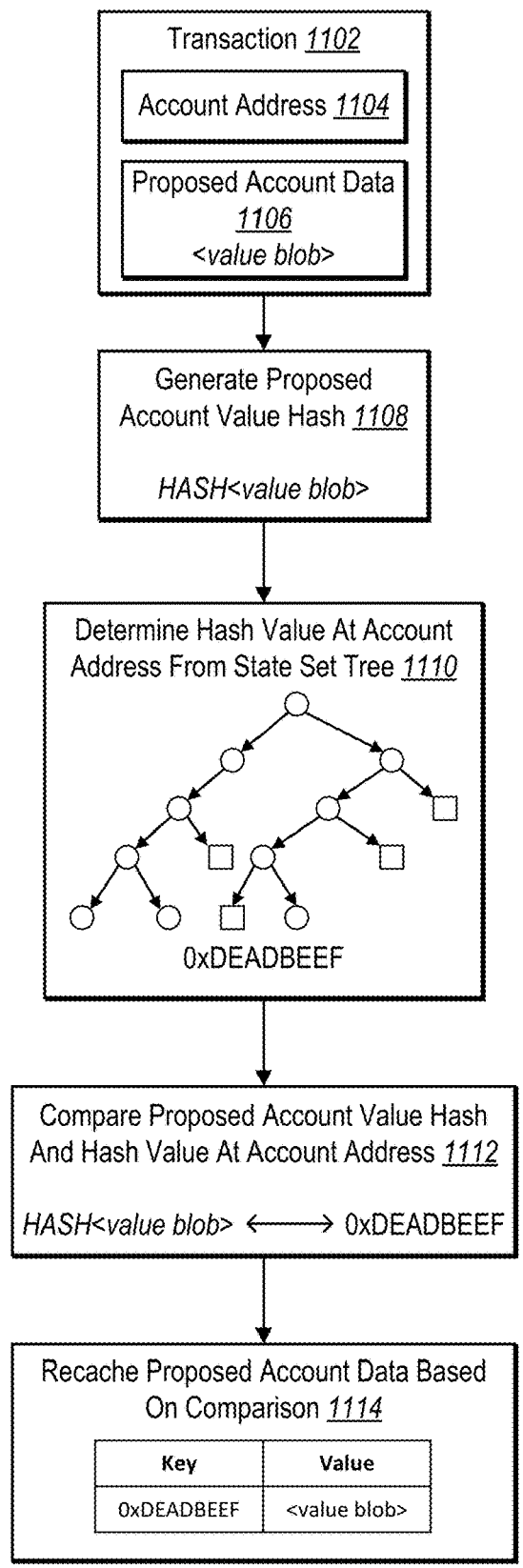
FIG. 11 illustrates a block diagram of the ledger transaction system re-caching account data corresponding to a user account in accordance with one or more embodiments.

As mentioned above, in one or more embodiments, the ledger transaction system 106 can re-cache account data that has previously been deleted from the state database. In particular, the ledger transaction system 106 can utilize a transaction to accurately re-cache the account data. FIG. 11 illustrates of block diagram of the ledger transaction system 106 re-caching account data corresponding to a user account in accordance with one or more embodiments.

As shown in FIG. 11, the ledger transaction system 106 can identify an account reinstatement request associated with an expired user account within a transaction 1102. The account reinstatement request can include an account address 1104 and proposed account data 1106 associated with the expired user account. Specifically, as shown in FIG. 11, the proposed account data 1106 can include a proposed account value associated with the expired user account.

Subsequently, the ledger transaction system 106 can compare the proposed account data 1106 to the account state representation of the user account stored within the state tree. For example, in one or more embodiments, the ledger transaction system 106 performs an act 1108 of generating a proposed account value hash. In particular, the ledger transaction system 106 can perform the act 1108 by applying a hash function to the proposed account value of the proposed account data 1106.

As shown in FIG. 11, the ledger transaction system 106 can then perform an act 1110 by determining the hash value at the account address from the state tree. For example, the ledger transaction system 106 can use the account address 1104 from the account reinstatement request to traverse the state tree and locate the leaf node associated with the user account. The ledger transaction system 106 can then access the account state representation stored within the leaf node and identify the hash value (i.e., the hash value previously generated by applying a hash function to account data corresponding to the user account).

As illustrated, the ledger transaction system 106 can also perform an act 1112 of comparing the proposed account value hash and the hash value at the account address. In particular, in one or more embodiments, the ledger transaction system 106 determines whether the proposed account value hash is equal to the hash value at the account address. This comparison allows the ledger transaction system 106 to validate or verify the accuracy of the proposed account data 1106. Indeed, if the proposed account value hash matches the hash value at the account address, the proposed account data 1106 matches the data deleted from the account. If, however, the proposed account value hash does not match the hash value at the account address, the proposed account data 1106 does not match the data deleted from the account (e.g., the data has been modified or otherwise corrupted).

As shown in FIG. 11, the ledger transaction system 106 can perform an act 1114 of re-caching the proposed account data based on the comparison. For example, in one or more embodiments, if the proposed account value hash does not equal the hash value at the account address, the ledger transaction system 106 rejects the account reinstatement request (and, possibly, the transaction 1102 entirely). However, if the proposed account value hash does equal the hash value at the account address, the ledger transaction system 106 can re-cache the proposed account data within the state database. In particular, in one or more embodiments, the ledger transaction system 106 generates an entry for the proposed account data 1106 within the state database. As mentioned, in some embodiments, based on re-caching the proposed account data 1106, the ledger transaction system 106 can update the eviction date associated with the reinstated user account. For example, the ledger transaction system 106 can update the eviction date upon execution of the transaction 1102 that included the account reinstatement request.

By maintaining the account state representation within the leaf node of the state tree that is associated with a user account, even after deleting account data corresponding to that user account, the ledger transaction system 106 manages storage resources more flexibly and efficiently than conventional systems. Specifically, the ledger transaction system can flexibly delete and reinstate account data associated with user accounts while maintaining accuracy and security of the digital ledger.

D. Tracking Multiple Writes in Memory

As mentioned above, conventional blockchain systems can receive blocks of transactions and (upon consensus) execute the transactions within the block. Indeed, through consensus protocols, such conventional systems can identify which blocks of transactions have been agreed upon by the other computer nodes in the network. Thus, the conventional systems can add transactions to the digital ledger based on which blocks of transactions have achieved consensus within the network.

As mentioned above, however, conventional blockchain systems are often inflexible and inaccurate at determining the order in which transactions (or blocks of transactions) are to be added to the digital ledger. For example, many conventional blockchain systems are often inflexible in that they rigidly add transaction blocks to the digital ledger in the order in which those transaction blocks were received. However, this can cause issues—especially for conventional systems implementing a leader-based consensus protocol—where multiple transaction blocks are received at or around the same time (e.g., due to communication delays) or a new transaction block has been received before the previous block has been committed to storage. For instance, in the circumstance of receiving a new transaction block before the previous block is committed to storage, a conventional system may execute the new transaction block based on the previous transaction block and then determine that the previous transaction block has been rejected by the network. This can require conventional systems to generate conflicting ledgers and result in a waste of computing resources in correcting inaccurate transaction blocks committed to storage.

In addition to flexibility concerns, the conventional blockchain systems may also operate inaccurately. In particular, due to the failure to flexibly accommodate various issues surrounding the order in which transactions are added to the digital ledger, many conventional blockchain systems may inaccurately represent the digital ledger. For example, one computer node participating in a network may add transactions to the digital ledger in a different order than another node in the network. Thus, the two computer nodes may disagree as to the current state of the digital ledger, and at least one of those computer nodes may be inaccurately representing that current state.

One or more embodiments of the ledger transaction system 106 utilize a scratch pad data structure to flexibly track multiple possible variations of the digital ledger while waiting for consensus on one or more transaction blocks. In particular, the ledger transaction system 106 can utilize the scratch pad data structure as temporary memory in which to store possible (e.g., speculative) branches of execution. For example, the ledger transaction system 106 can identify multiple transaction blocks containing distinct transactions. In one or more embodiments, the multiple transactions blocks include conflicting transactions (e.g., at least two of the transaction blocks includes a transaction that withdraws a digital asset from a user account, and the user account does not contain enough digital assets to satisfy both transactions). The ledger transaction system 106 can perform an execution for each of the transaction blocks and store the results of the execution in the scratch pad data structure. In particular, the ledger transaction system 106 can store, for each transaction block, how execution of that transaction block modifies the current state of the distributed digital ledger transaction network (i.e., the last state committed to permanent storage via consensus) independent of how execution of the other transaction blocks modifies that state. The ledger transaction system 106 can then commit the transaction blocks to permanent storage (or reject the transaction blocks altogether) based on the results of consensus. In this manner, the ledger transaction system 106 can flexibly track possible consensus outcomes in a manner that results in a more accurate representation of the digital ledger.

Figure 12:
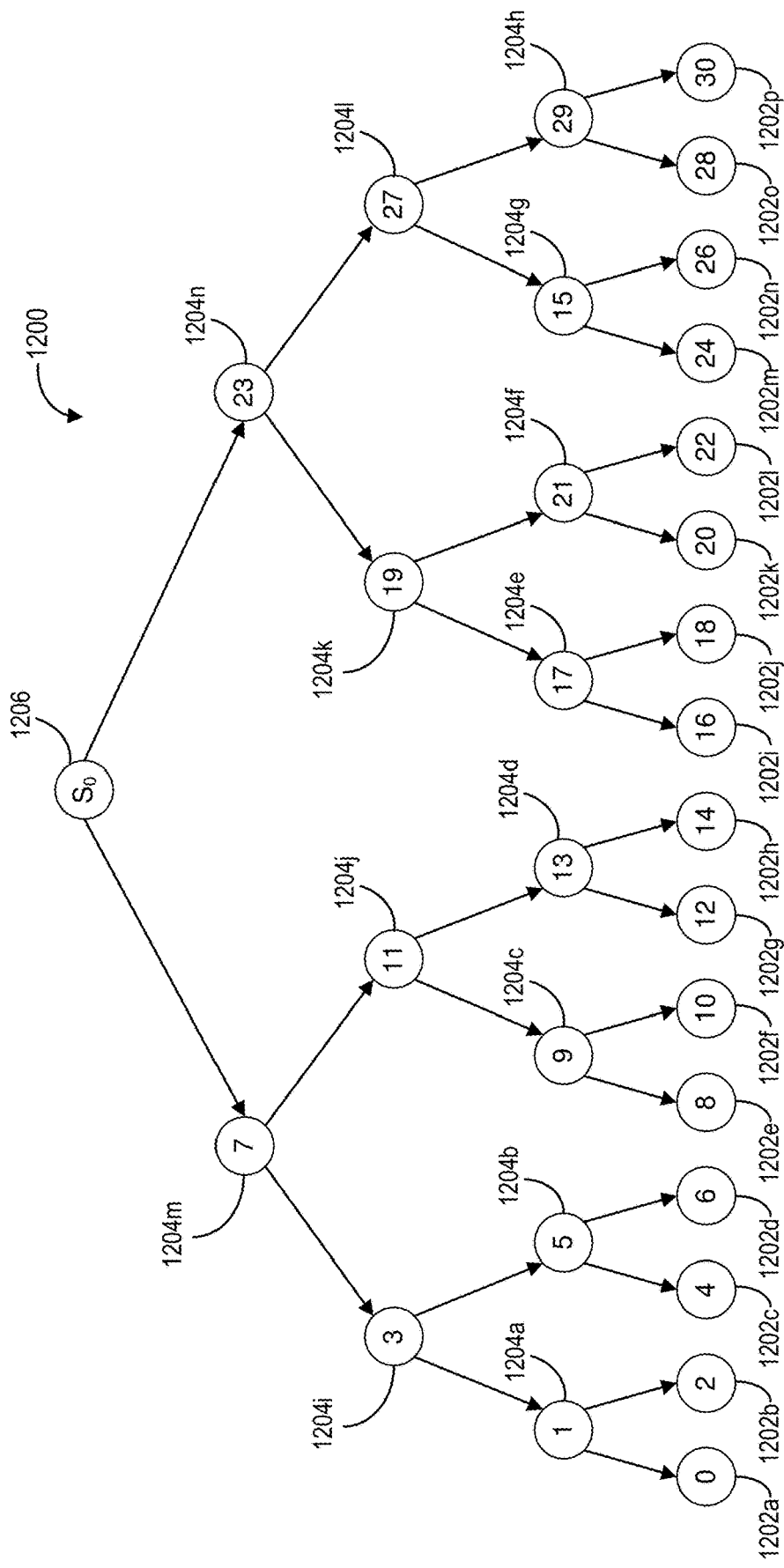
FIG. 12 illustrates a state tree from a state data structure, the state tree representing a currently committed state of the distributed digital ledger transaction network in accordance with one or more embodiments.

As mentioned above, the ledger transaction system 106 can utilize the scratch pad data structure to track how execution of a transaction block modifies the most current committed state of the distributed digital ledger transaction network. Indeed, the ledger transaction system 106 can utilize the state data structure in conjunction with the scratch pad data structure to track the various branches of execution. FIG. 12 illustrates a state tree 1200 from a state data structure, the state tree 1200 representing the most currently committed state of the distributed digital ledger transaction network in accordance with one or more embodiments.

As shown in FIG. 12, the state tree 1200 includes a binary tree (e.g., a state Merkle tree) similar to the state tree 306 discussed above with regard to FIG. 3. In particular, the state tree 1200 includes leaf nodes 1202a-1202p. The leaf nodes 1202a-1202p correspond to different user accounts of the distributed digital ledger transaction network and store account state representations corresponding to the user accounts. Further, the state tree 1200 includes the internal nodes 1204a-1204n having node values determined based on the node value of each associated child node. Additionally, the state tree 1200 includes the root node having a root value based on the node values of all other nodes within the state tree 1200. The root value represents the most currently committed state (labeled "S0") of the distributed digital ledger transaction network. The nodes of the state tree 1200 are indexed in FIG. 12 to simplify the discussion provided below.

Figure 13:
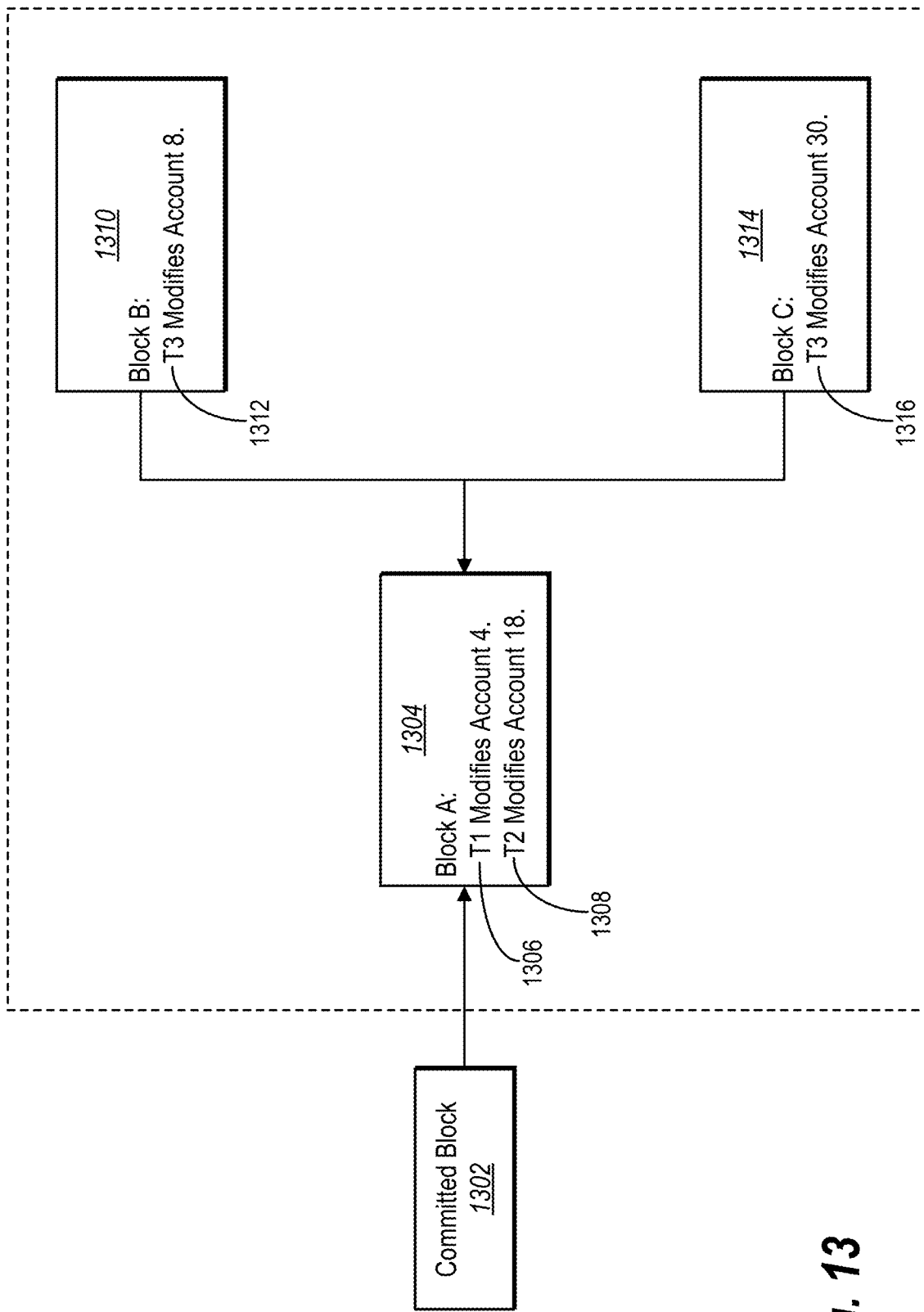
FIG. 13 illustrates a block diagram of transaction blocks identified by the ledger transaction system in accordance with one or more embodiments.

FIG. 13 illustrates a block diagram of transaction blocks identified by the ledger transaction system 106 in accordance with one or more embodiments. Specifically, the transaction block 1302 represents the most recently executed and committed transaction block reflected in the state representation and/or transaction representation on the distributed digital ledger transaction network. Indeed, the state tree 1200 of FIG. 12 corresponds to the state of the distributed digital ledger transaction network after the transaction block 1302 is committed to storage. As shown in FIG. 13, after committing the transaction block 1302 (within the state tree 1200) the ledger transaction system 106 identifies additional transaction blocks for modifying the committed transaction block 1302 reflected in the digital ledger.

Specifically, FIG. 13 illustrates the ledger transaction system 106 identifying the transaction block 1304, which includes two transactions. As shown, the first transaction 1306 modifies the account corresponding to the leaf node of the state tree 1200 having the index of "4" (i.e., the leaf node 1202c of FIG. 12). The second transaction 1308 modifies the account corresponding to the leaf node of the state tree 1200 having the index of "18" (i.e., the leaf node 1202j of FIG. 12). As shown in FIG. 13, the ledger transaction system 106 adds the transaction block 1304 to the digital ledger after the transaction block 1302. In other words, the ledger transaction system 106 modifies the state of the distributed digital ledger transaction network that resulted from committing the transaction block 1302 based on the transaction block 1304.

As shown in FIG. 13, the ledger transaction system 106 further identifies the transaction block 1310 and the transaction block 1314. The transaction block 1310 includes a first variation 1312 of a third transaction that modifies the account corresponding to the leaf node of the state tree 1200 having the index of "8" (i.e., the leaf node 1202e of FIG. 12). The transaction block 1314 includes a second variation 1316 of the third transaction that modifies the account corresponding to the leaf node of the state tree 1200 having the index of "30" (i.e., the leaf node 1202p of FIG. 12). Thus, as shown in FIG. 13, the ledger transaction system 106 identifies two possible transaction blocks that could be committed to storage after directly committing the transaction block 1304 (i.e., two possible branches of execution).

Figure 14A:
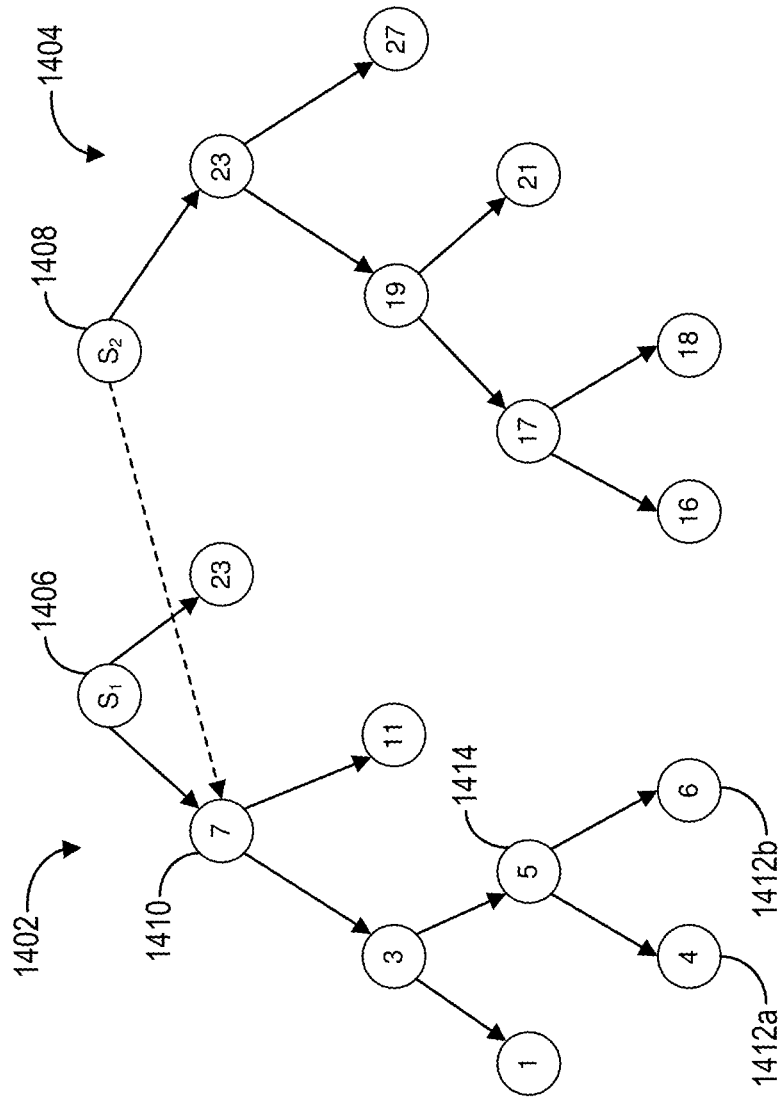
FIGS. 14A-14B illustrate the ledger transaction system utilizing a scratch pad data structure to track execution results in accordance with one or more embodiments.
Figure 14B:
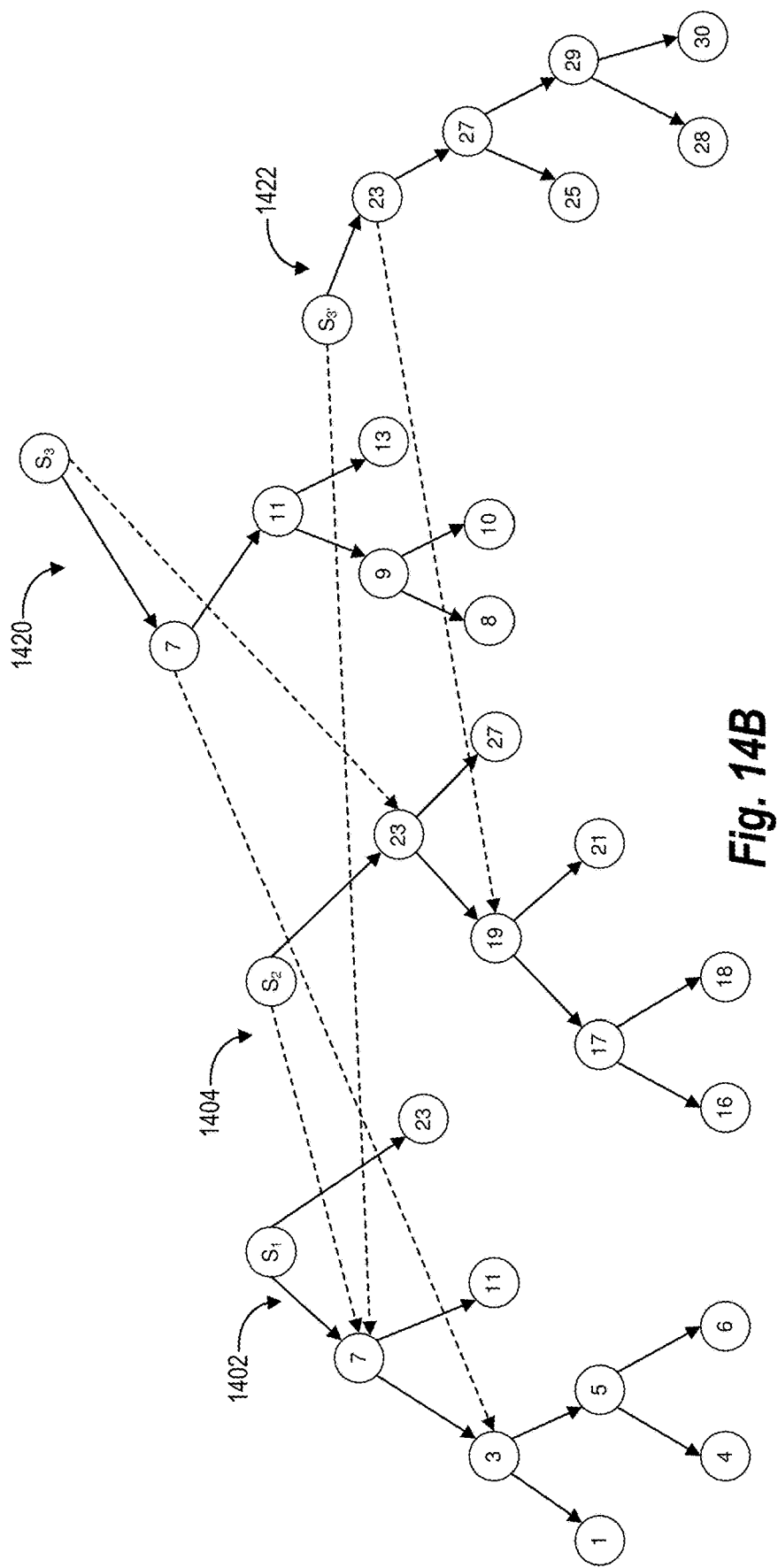

FIGS. 14A-14B illustrate the ledger transaction system 106 utilizing a scratch pad data structure to track the various possible results of executing the transaction blocks 1304, 1310, 1314 of FIG. 13 in accordance with one or more embodiments. In particular, FIG. 14A illustrates the ledger transaction system 106 utilizing the scratch pad data structure to track the results of executing the transaction block 1304 of FIG. 13. FIG. 14B illustrates the ledger transaction system 106 utilizing the scratch pad data structure to track the possible outcomes from executing the transaction block 1310 or the transaction block 1314 of FIG. 13.

As shown in FIG. 14A, the ledger transaction system 106 generates the state tree component 1402 and the state tree component 1404. In particular, the state tree component 1402 represents the state of the distributed digital ledger transaction network (labeled "S1") resulting from the first transaction 1306 of the transaction block 1304 of FIG. 13. Similarly, the state tree component 1404 represents the state of the distributed digital ledger transaction network (labeled "S2) resulting from the second transaction 1308 of the transaction block 1304 of FIG. 13. As shown, the root node 1408 of the state tree component 1404 points to the internal node 1410 of the state tree component 1402, indicating that the internal node 1410 has a node value that remained unchanged between execution of the first transaction 1306 and the second transaction 1308 (as explained in more detail above with reference to FIG. 8).

As shown in FIG. 14A, the state tree components 1402, 1404 include only those nodes needed to determine the root value of the root nodes 1406, 1408, respectively. In other words, the ledger transaction system 106 does not duplicate the state tree corresponding to the most currently committed state (e.g., the state tree 1200 of FIG. 12) within the scratch pad data structure. Rather, the ledger transaction system 106 only generates the nodes associated with node values changes (i.e., nodes having changed node values or nodes having node values used to determine the changed node values).

To illustrate, the state tree component 1402 includes the leaf node 1412a, which corresponds to the user account modified by the first transaction 1306. The state tree component 1402 also includes the leaf node 1412b. Though the user account corresponding to the leaf node 1412b remains unchanged from the first transaction 1306, the ledger transaction system 106 utilizes the node value of the leaf node 1412b to determine the node value of the internal node 1414, which is further used to determine the root value of the root node 1406. In one or more embodiments, the ledger transaction system 106 generates, within the scratch pad data structure, an entire state tree corresponding to the state resulting from a transaction, rather than a state tree component.

In one or more embodiments, because the first transaction 1306 and the second transaction 1308 indicate the user accounts modified by those transactions, the ledger transaction system 106 can preload the account states corresponding to those user accounts before using the virtual machine to initiate execution. Indeed, in one or more embodiments, the ledger transaction system 106 preloads the account states to the virtual machine from storage in parallel, improving execution time as the virtual machine does not need to wait for the account states for execution.

As shown in FIG. 14B, the ledger transaction system 106 further generates the state tree component 1420 and the state tree component 1422. In particular, the state tree component 1420 represents the state of the distributed digital ledger transaction network (labeled "S3") resulting from the first variation 1312 of the third transaction included in the transaction block 1310 of FIG. 13. Similarly, the state tree component 1422 represents the state of the distributed digital ledger transaction network (labeled "S3") resulting from the second variation 1316 of the third transaction included in the transaction block 1314 of FIG. 13. As with FIG. 14A, the dashed lines illustrated in FIG. 14B represent a state tree component pointing to a node of a previous state tree component, indicating that the node value of that node remains unchanged from execution of the corresponding transaction.

Indeed, as shown in FIG. 14B, the state tree components 1420, 1422 provide alternative states that could represent the state of the distributed digital ledger transaction network that follows the state resulting from committing the transaction block 1304 to storage. Indeed, the ledger transaction system 106 can identify an indication that one of the transaction blocks 1310, 1314 has achieved consensus (i.e., after identifying an indication that the transaction block 1304 has achieved consensus). Accordingly, the ledger transaction system 106 can commit that transaction block to storage based on the execution results tracked within the scratch pad data structure. For example, upon achieving consensus for one of the transaction blocks 1310, 1314, the ledger transaction system 106 can generate a vector of transaction values corresponding to the agreed upon transaction block based on the state tree components stored in the scratch pad data structure. The ledger transaction system 106 can then utilize the vector of transaction values to commit the execution results to storage by modifying or updating the state data structure, the event data structure, and the transaction data structure accordingly.

Upon committing a transaction block to storage, the ledger transaction system 106 can deallocate the corresponding state trees (e.g., remove from the scratch pad data structure). The ledger transaction system 106 can further deallocate any remaining nodes that do not have an associated parent node in the scratch pad data structure. In one or more embodiments, if one or both of the transaction blocks 1310, 1314 fail to achieve consensus, the ledger transaction system 106 can remove the corresponding state tree component from the scratch pad data structure. In one or more embodiments, the ledger transaction system 106 clears the scratch pad data structure entirely whenever a block of transactions is committed to storage.

By using the scratch pad data structure to track the various possible branches of execution, the ledger transaction system 106 accommodates the reception of multiple transaction blocks more flexibly than conventional systems. Specifically, the ledger transaction system 106 can flexibly execute the transaction blocks and then temporarily store the execution results until consensus fails or is achieved for at least one of the blocks. Further, by temporarily storing execution results, the ledger transaction system 106 can flexibly accommodate the delay between executing a transaction block and obtaining consensus. Indeed, by utilizing the scratch pad data structure, the ledger transaction system 106 can continue to execute transaction blocks based on the execution results of a given transaction block waiting to be committed into storage.

Additionally, the ledger transaction system 106 operates more accurately than conventional systems. Indeed, due to the flexibility offered by the scratch pad data structure, the ledger transaction system 106 can more accurately represent the digital ledger. Specifically, because the ledger transaction system 106 can use the scratch pad data structure to temporarily store the execution results of a transaction block, the ledger transaction system 106 can postpone committing the execution results to storage until the consensus on those results are achieved. Accordingly, the ledger transaction system 106 ensures that the computer nodes of the distributed digital ledger transaction network commit transaction blocks in the same order.

E. Proofs and Verification

As mentioned above, in one or more embodiments, a computer node (e.g., a full node device) responding to a query for information can transmit a proof, along with the requested information, to the requesting client device. Indeed, in one or more embodiments, the distributed digital ledger transaction network represents a trustless system in which a client device does not trust the computer node from which it receives data. Accordingly, the ledger transaction system 106 can provide, from a computer node, a proof as evidence of the accuracy of the data.

For example, the ledger transaction system 106 can provide proof of a signed transaction at a specified version of the transaction data structure. Additionally, the ledger transaction system 106 can provide proof of the state of a user account at a particular state of the distributed digital ledger transaction network using the state data structure. In further embodiments, the ledger transaction system 106 can provide proof of a particular transaction event emitted as part of the execution of a particular transaction using the event data structure. As discussed above, the transaction data structure, the state data structure, and the event data structure can each include a tree, such as a Merkle tree. Accordingly, in one or more embodiments, the proofs provided by the ledger transaction system 106 include Merkle proofs.

In one or more embodiments, a proof includes three parts: a partial proof, transaction info, and a common proof. For a partial proof corresponding to a signed transaction, the ledger transaction system 106 can provide the raw data of the signed transaction. For a partial proof corresponding to a user account state, the ledger transaction system 106 can provide proof from the leaf node of the state tree corresponding to the user account to the root node (including the associated intermediate nodes and sibling nodes in between) as well as the account data (e.g., the account value). For the partial proof corresponding to a transaction event, the ledger transaction system 106 can provide proof from the leaf node of the corresponding event tree to the root node (including the associated intermediate nodes and sibling nodes in between) as well as the event data (e.g., the transaction event details). For the transaction info part of the proof, the ledger transaction system 106 can provide the data stored within the corresponding leaf node of the transaction tree. And for the common proof, the ledger transaction system 106 can provide the proof from the leaf node to the root node of the transaction tree (including the associated intermediate nodes and sibling nodes in between).

Upon receiving a proof of data, a client device (i.e., the ledger transaction system 106 operating at a client device) can verify the root value of the transaction tree root node against the signatures of the ≥2f+1 validator node devices that signed off on that root value. For example, the ledger transaction system 106 can deserialize the data from the applicable data structure. The ledger transaction system 106 can then determine whether the deserialized data matches an expected value. For proofs corresponding to user account states or transaction events, the ledger transaction system 106 can then iteratively hash the list of nodes (i.e., sibling nodes) provided as part of the partial proof to obtain the root value of the corresponding tree. The ledger transaction system 106 can then compare the raw data of the signed transaction, the root value of the state tree, or the root value of the event tree (whichever is applicable) to the data stored within the corresponding leaf node of the transaction tree. The ledger transaction system 106 can then iteratively hash the list of nodes (i.e., sibling nodes) provided as part of the common proof to get the root value of the transaction tree. If the determined root value of the transaction tree has at least 2f+1 signatures with the correct set of validator node devices, the ledger transaction system 106 can verify the accuracy of the data. If, however, the comparisons fail at any step of verification, or if the root value of the transaction tree does not have the required signatures from the correct set of validator node devices, the ledger transaction system 106 can determine that the proof is invalid.

III. Addressing and Accounts

A. Overview

Figure 15:
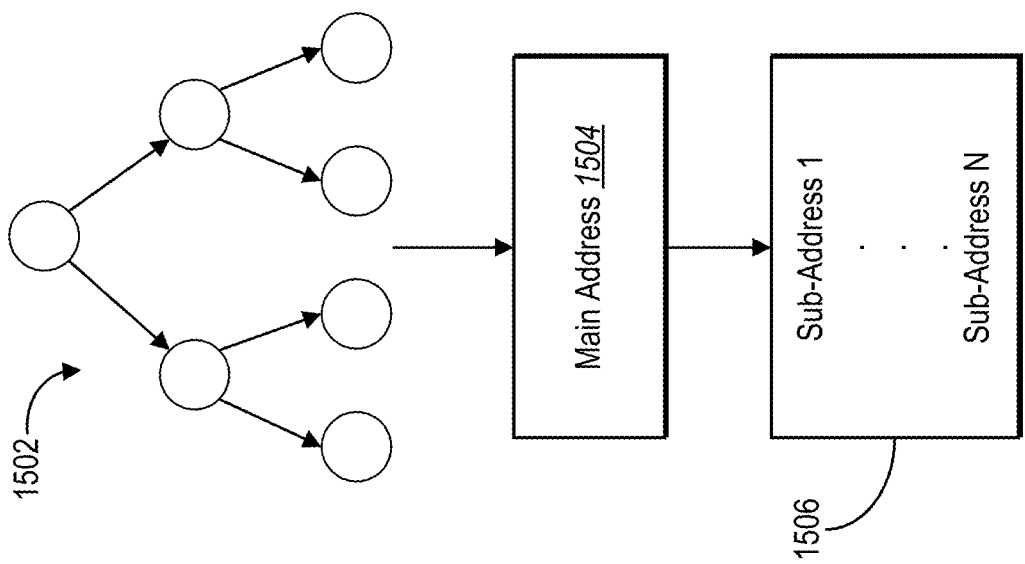
FIG. 15 illustrates a schematic diagram of addresses corresponding to user accounts of the distributed digital ledger transaction network in accordance with one or more embodiments.

As previously mentioned, the ledger transaction system 106 utilizes addresses to specify and identify user accounts on the distributed digital ledger transaction network. For example, the ledger transaction system 106 can maintain an authenticated state structure that maps account address keys to account values. Moreover, the ledger transaction system 106 can utilize addresses (or keys) included in a transaction to identify the user accounts between which digital assets are to be transferred. The ledger transaction system 106 can further use addresses identified within queries for information in order to retrieve the appropriate information. FIG. 15 illustrates a schematic diagram of addresses corresponding to user accounts of the distributed digital ledger transaction network in accordance with one or more embodiments.

As shown in FIG. 15, the ledger transaction system 106 can utilize a state tree 1502 to determine addresses corresponding to user accounts. Specifically, as mentioned above, the leaf nodes of the state tree 1502 can correspond to user accounts of the distributed digital ledger transaction network. Thus, in one or more embodiments, the address of a user account is based, at least partially, on the location of the corresponding leaf node within the state tree.

In some embodiments, an account address is a 256-bit value. To create a new account, the ledger transaction system 106 generates a key-pair ($K_p$, $K_s$) for a signature scheme and uses the cryptographic hash of the public verification key $K_p$ as an account address a. The new account is created in the ledger state when a transaction sent from an existing account invokes the create_account(a) instruction. This typically occurs when a transaction attempts to send digital assets to an account address a that has not yet been created.

Once the new account is created at a, the user can sign transactions to be sent from that account using the private signing key $K_s$. As outlined below, the user can also rotate the key used to sign transactions from the account without changing its address.

As shown in FIG. 15, the address of a user account can include a main address 1504. In particular, the main address 1504 can include a main public address corresponding to the digital ledger (i.e., the public digital ledger). Indeed, the main address 1504 identifies the user account corresponding to a leaf node on the state tree 1502.

As further shown in FIG. 15, the main address 1504 can be associated with one or more sub-addresses 1506. In particular, a sub-address can identify a particular user account of a private digital ledger associated with the user account of the main address 1504. In other words, in one or more embodiments, a user account on the public digital ledger (i.e., a user account associated with a leaf node of the state tree 1502) manages a private digital ledger. For example, in some embodiments, the user account on the public digital ledger can include an account for a service, such as a third-party wallet or exchange service that serves a plurality of user accounts particular to that service. The service can maintain an internal database (referred to as the "private digital ledger") that tracks the digital assets and transactions associated with the user accounts particular to that service. Accordingly, the user account associated with the main address 1504 can utilize a sub-address to identify the particular user account within the corresponding internal database.

Thus, a user account can be associated with a main address that identifies the user account within the state tree of the distributed digital ledger transaction network. If a user account is associated with a private digital ledger, the user account can include both a main address and a sub-address, where the main address provides the address of an account on the public digital ledger (i.e., the account of the private digital ledger) and the sub-address identifies the user account from among the plurality of user accounts managed by the private digital ledger.

B. Utilizing Encrypted Sub-Addresses for Transaction Requests

Conventional blockchain systems typically utilize addresses associated with user accounts when generating and executing transactions. In particular, many conventional systems generate transactions that specify a main address and a sub-address to identify the public ledger account and the private ledger address, respectively, of the associated user accounts. Accordingly, when executing a transaction associated with particular user accounts, conventional blockchain systems ensure the correct user accounts are modified (e.g., digital assets are transferred to/from the correct user accounts).

However, conventional blockchain systems have a number of shortcomings, leading to inflexible and/or unsecure operation. For example, conventional blockchain systems typically execute transactions based on the addresses associated with user accounts of a network. Accordingly, the conventional systems are often rigid in requiring input that includes the addresses of the user accounts in order to generate a request for a transaction via the network. Users that seek to transact with a user account may not have access to specific addressing information.

Further, many conventional blockchain systems can introduce security concerns by publishing the addresses of user accounts associated with a transaction on the network, allowing external entities to access the network and identify those addresses. For example, even if these sub-addresses are encrypted, conventional systems may publish the same address to the network several times (e.g., if the address is associated with multiple transactions), allowing external entities to determine that the same user account has been involved in multiple transactions. Conventional systems fail to incorporate privacy measures to counteract tracking and potential manipulation of this information on the network.

One or more embodiments of the ledger transaction system 106 utilize encryption keys associated with user accounts for flexible and secure sub-address encryption when generating transaction requests. For example, the ledger transaction system 106 can generate a request for a transaction directed to a user account by identifying a main public address identifier, a sub-address identifier, and an encryption key associated with the user account. The ledger transaction system 106 can then generate a non-deterministic encrypted sub-address that is unique to the transaction by applying the encryption key to the sub-address with an added nonce value. Thus, for example, the ledger transaction system 106 can allow a recipient account to receive a variety of different digital assets via the distributed digital ledger transaction network at the same sub-address without publishing repeated account identifiers on the digital ledger.

For example, the ledger transaction system 106 can execute a transaction that transfers digital assets to the owner of a recipient account corresponding to a main address. The owner of the recipient account can identify that an event and corresponding transaction have occurred on the digital ledger. The owner of the recipient account can access (e.g., via event details or transaction details stored on event or transaction data structures) an encrypted sub-address. The recipient account can use a private encryption key to de-encrypt the encrypted sub-address to identify the sub-address corresponding to the transaction. The owner of the recipient account can then attribute the assets to a user (or account) corresponding to the sub-address. Thus, the owner of the recipient account can identify the user corresponding to the sub-address, but the digital ledger will not include a traceable (or repeatable) reference to the sub-address.

Furthermore, the ledger transaction system 106 can identify main addresses, sub-addresses, and/or encryption keys from a variety of different public sources while still executing secure, anonymous transactions. For instance, in one or more embodiments, the ledger transaction system 106 identifies the main public address identifier, the sub-address identifier, and/or the encryption key from a digital visual code. Moreover, in some embodiments, the ledger transaction system 106 identifies the main public address identifier and the sub-address identifier from an email address. In other words, the ledger transaction system 106 can generate a request for a transaction by receiving an email address associated with the user account. In this manner, the ledger transaction system 106 can utilize identifiers and encryption keys associated with a user account to flexibly and securely generate transaction requests on the distributed digital ledger transaction network.

Figure 16:
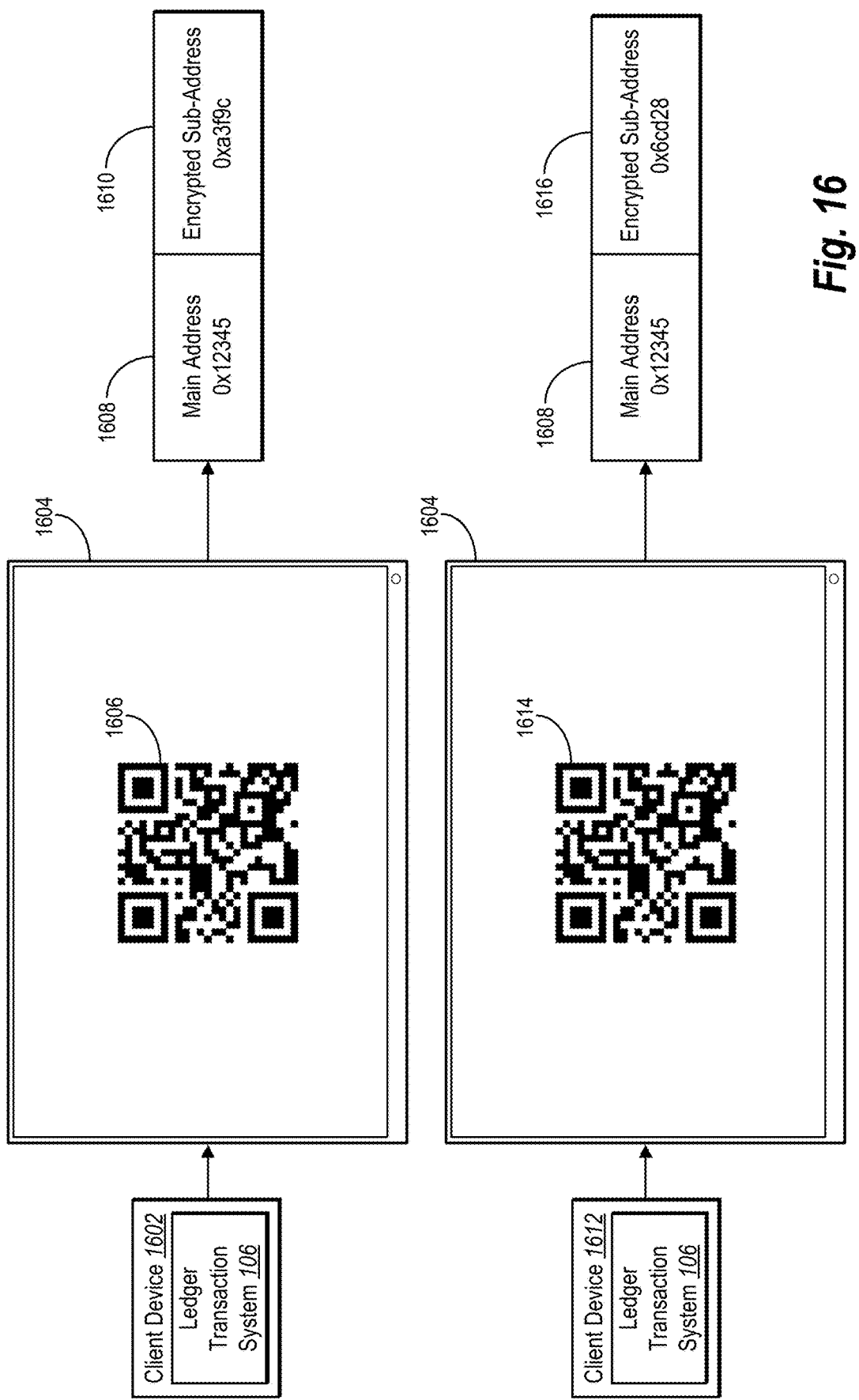
FIG. 16 illustrates a block diagram of the ledger transaction system identifying a main public address identifier and sub-address identifiers of a user account from a digital visual code in accordance with one or more embodiments.
Figure 17:
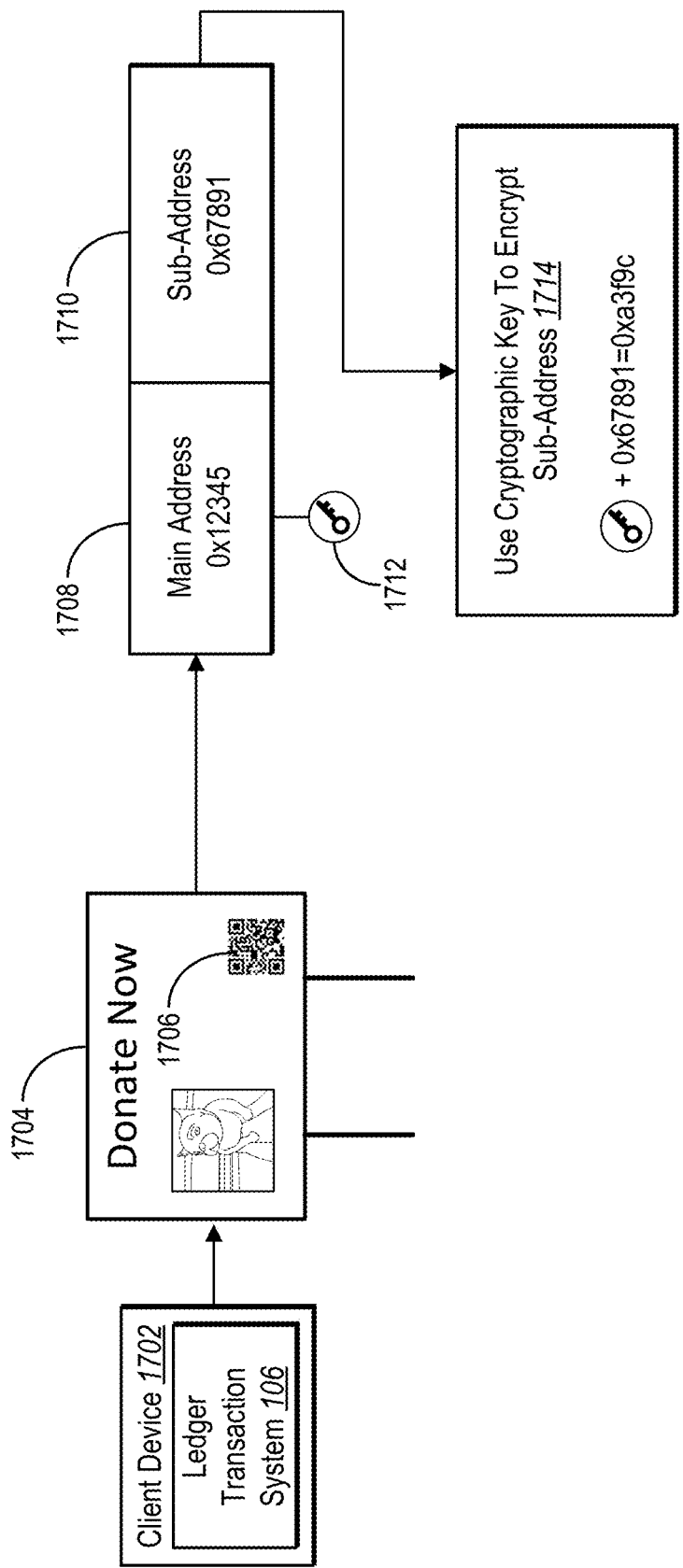
FIG. 17 illustrates a block diagram of the ledger transaction system identifying a main public address identifier, a sub-address identifier, and an encryption key associated with a user account from a digital visual code in accordance with one or more embodiments.
Figure 18:
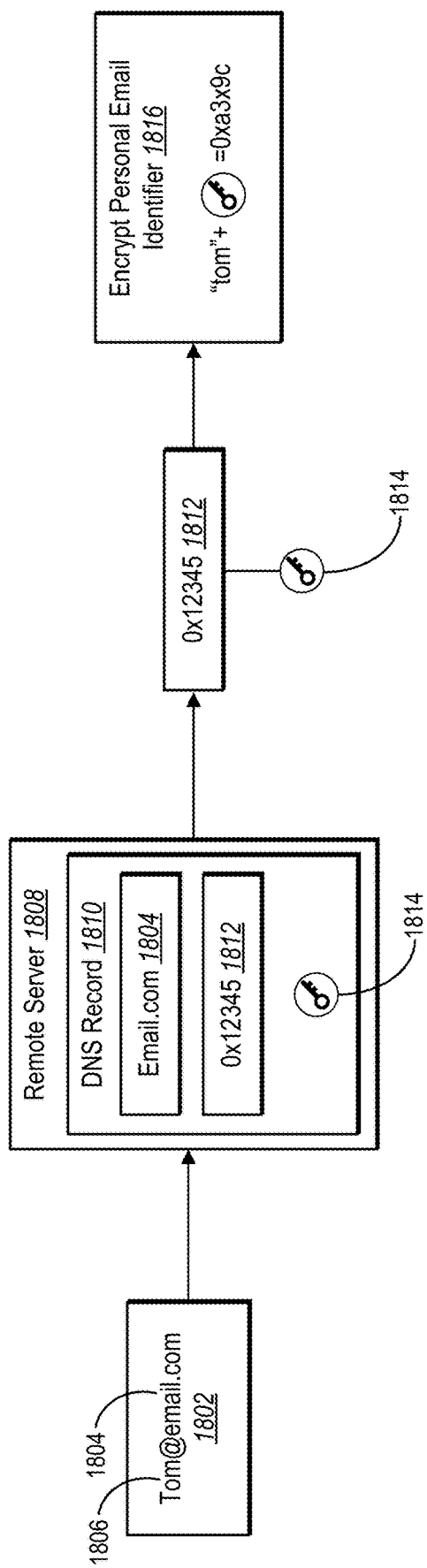
FIG. 18 illustrates a block diagram of the ledger transaction system identifying a main public address identifier, a sub-address identifier, and an encryption key of a user account based on an email address in accordance with one or more embodiments.

As mentioned above, in one or more embodiments, the ledger transaction system 106 utilizes a main public address identifier and a sub-address identifier of a user account to generate requests for transactions on the distributed digital ledger transaction network. FIGS. 16-18 illustrate the ledger transaction system 106 identifying the main public address identifier and the sub-address identifier of a user account for use in a transaction in accordance with one or more embodiments. Though FIGS. 16-18 show the ledger transaction system 106 operating on a client device, the ledger transaction system 106 can function similarly on any device of the distributed digital ledger transaction network.

FIG. 16 illustrates a block diagram of the ledger transaction system 106 identifying a main public address identifier and sub-address identifiers of a user account (i.e., a payee or recipient account) from a digital visual code in accordance with one or more embodiments. In particular, FIG. 16 illustrates the ledger transaction system 106 identifying the main public address identifier and the sub-address identifiers by scanning dynamically generated digital visual codes that encode the main public address identifier and the sub-address identifiers.

For example, the ledger transaction system 106 can scan, at the client device 1602, a digital visual code 1606 displayed by a computing device 1604. As shown in FIG. 16, in one or more embodiments, the digital visual code 1606 includes a quick response ("QR") code. The ledger transaction system 106 (or a third-party system) can encode, within the digital visual code 1606, a main public address identifier and a sub-address identifier. The digital visual code 1606 can include a variety of different types of visual representations capable of encoding data. Further, the computing device 1604 can include a variety for computing device capable of generating and/or displaying digital visual codes (e.g., via the ledger transaction system 106).

Upon scanning the digital visual code 1606, the ledger transaction system 106 identifies (e.g., extracts or decodes) a main public address identifier 1608 and a sub-address identifier 1610 associated with a user account of the distributed digital ledger transaction network. As shown in FIG. 16, the main public address identifier 1608 includes a main address associated with a user account of the distributed digital ledger transaction network, and the sub-address identifier 1610 includes an encrypted sub-address associated with the user account. In one or more embodiments, the sub-address identifier 1610 includes an unencrypted sub-address associated with the user account.

By identifying, from the digital visual code 1606, the main public address identifier 1608 and the sub-address identifier 1610, the ledger transaction system 106 can generate a request for a transaction associated with the user account (e.g., a transaction between the user account and another user account). The ledger transaction system 106 can then submit the request for the transaction for execution via the distributed digital ledger transaction network utilizing the main public address identifier 1608 and the sub-address identifier 1610.

The ledger transaction system 106 can dynamically generate digital visual codes unique to particular transactions (even when the transactions involve the same destination account). For example, in relation to as shown in FIG. 16, the ledger transaction system 106 can further scan, at the client device 1612, the digital visual code 1614. In particular, the digital visual code 1614 reflects information for the same recipient account, but utilizes a different digital visual code. Specifically, the ledger transaction system 106 (or a third-party system) encodes, within the digital visual code 1614, an indicator of the main-address and a separate encrypted sub-address for the same account. The client device 1612 can be the same as or different than the client device 1602.

Upon scanning the digital visual code 1614, the ledger transaction system 106 can identify the main public address identifier 1608 and a sub-address identifier 1610 associated with the user account. As illustrated by FIG. 16, while the main public address identifier 1608 includes the same main address associated with the user account obtained by scanning the digital visual code 1606, the sub-address identifier 1616 includes a different encrypted sub-address. Indeed, the digital visual codes 1606, 1614 can each provide a unique encryption for the sub-address associated with the user account. Thus, by scanning dynamically generated digital visual codes, the ledger transaction system 106 can generate transaction requests using the main public address identifier associated with a user account and encrypted sub-addresses that are unique to each transaction request.

Moreover, by initiating transactions utilizing this approach, the digital ledger can avoid duplicate sub-addresses trackable by external entities. Indeed, even though multiple transactions on the digital ledger involve the same account, the digital ledger will reflect two different encrypted sub-addresses that would not allow for tracking and manipulation of repeat payments to the same account by parties external to the transaction. Specifically, a transaction executed via the distributed digital ledger transaction network utilizing the sub-address identifier 1610 would not be traceable to another transaction executed via the distributed digital ledger transaction network utilizing the sub-address identifier 1616 (even though both transactions are directed to the same account).

In addition to using dynamically generated digital visual codes that change with each scan, the ledger transaction system 106 can utilize a static digital visual code when generating a request for a transaction associated with a user account. Further, as mentioned above, the ledger transaction system 106 can utilize an encryption key associated with a user account when generating a request for a transaction associated with that user account. FIG. 17 illustrates a block diagram of the ledger transaction system 106 identifying a main public address identifier, a sub-address identifier, and an encryption key associated with a user account from a digital visual code in accordance with one or more embodiments.

As shown in FIG. 17, the ledger transaction system 106 scans, using the client device 1702, a document 1704 that includes a digital visual code 1706. The ledger transaction system 106 generates the digital visual code 1706 by encoding a main public address identifier, a sub-address identifier, and an encryption key corresponding to a user account. For example, in relation to FIG. 17, the document 1704 reflects a bill board seeking public donations of digital assets.

Although FIG. 17 illustrates the document 1704 as a printed or electronic bill board containing a representation the digital visual code 1706, the document 1704 can include a variety of different physical or electronic documents that include a scannable representation of the digital visual code 1706. As mentioned above, however, in one or more embodiments, the digital visual code 1706 is static. In other words, the digital visual code 1706 remains on the document 1704, unchanged (even after having been scanned multiple times).

Upon scanning the digital visual code 1706, the ledger transaction system 106 can identify (e.g., decode or extract from the digital visual code 1706) a main public address identifier 1708, a sub-address identifier 1710, and an encryption key 1712 associated with a user account of the distributed digital ledger transaction network. As shown in FIG. 17, the main public address identifier 1708 includes a main address associated with a user account of the ledger transaction system 106, and the sub-address identifier 1710 includes a sub-address associated with the user account. In one or more embodiments, the sub-address identifier 1710 includes an encrypted sub-address for the user account. In one or more embodiments, the encryption key 1712 includes a public key associated with the main address (i.e., associated with the user account).

As shown in FIG. 17, after scanning the digital visual code 1706, the ledger transaction system 106 can use the encryption key 1712 to encrypt the sub-address 1714 (or the encrypted sub-address). In one or more embodiments, the ledger transaction system 106 adds a nonce value to the sub-address (or encrypted sub-address) and applies the encryption key 1712 to the sub-address (or encrypted sub-address) with the nonce value. By adding a nonce value before applying the encryption key 1712, the ledger transaction system 106 can generate an encrypted sub-address that is unique to a particular transaction. Indeed, the ledger transaction system 106 can utilize a different nonce value for subsequent scans of the digital visual code 1706 (either at the client device 1702 or another client device) to generate different encryptions for the sub-address identifier 1710.

Thus, the ledger transaction system 106 can utilize the main public address identifier 1708, the sub-address identifier 1710, and the encryption key 1712 to generate a request for a transaction associated with a user account. In particular, the request for the transaction can include an encrypted sub-address that is unique to the requested transaction. The ledger transaction system 106 can then submit the request for the transaction for execution via the distributed digital ledger transaction network. Moreover, by utilizing the encryption key 1712 and nonce value, transactions initiated from the digital visual code 1706 will not repeat encrypted sub-addresses that can be tracked by entities external to the transactions. Thus, for recurring payments to the same address, which may have the same encrypted sub-address (and be recognizable as going to the same place), the ledger transaction system 106 can use the encryption key (e.g., a re-encryption key) to double-encrypt.

As mentioned above, the ledger transaction system 106 can also flexibly and securely identify sub-addresses to initiate transactions utilizing a variety of different sources (aside from the document 1704). In particular, the ledger transaction system 106 can identify addresses to initiate a transaction via the distributed digital ledger transaction network utilizing an email address. For example, FIG. 18 illustrates a block diagram of the ledger transaction system 106 identifying a main public address identifier, a sub-address identifier, and an encryption key of a user account of the distributed digital ledger transaction network based on an email address. As shown, the ledger transaction system 106 can identify an email address 1802 of a user corresponding to a user account of the distributed digital ledger transaction network. The email address 1802 can include a domain name 1804 and a personal email identifier 1806.

In one or more embodiments, the ledger transaction system 106 can determine the main address of the user account based on the domain name 1804 of the email address 1802. For example, in one or more embodiments, the ledger transaction system 106 (or a third-party system such as a domain name managing system) generates domain name system text records that reflect main addresses of the distributed digital ledger transaction network. In particular, the ledger transaction system 106 can generate DNS records that associate the main address of an entity within the distributed digital ledger transaction network with a domain address corresponding to the entity on the web. The ledger transaction system 106 can utilize DNSSEC to verify provenance of the data correspondence between the domain and the corresponding main address.

As illustrated in FIG. 18, upon identifying the email address 1802, the ledger transaction system 106 accesses a domain name system ("DNS") record 1810 corresponding to the domain name 1804 stored on a remote server 1808. The DNS record 1810 corresponding to the domain name 1804 stores the main address 1812 of the user account. Accordingly, the ledger transaction system 106 can identify the main address 1812 of the user account from the DNS record 1810 based on the domain name 1804.

As shown in FIG. 18, the ledger transaction system 106 can further identify an encryption key 1814 associated with the user account from the DNS record 1810 (e.g., a text record or another record storage at the DNS). In some embodiments, however, the ledger transaction system 106 identifies the encryption key 1814 independently from the DNS record 1810. For example, in some embodiments, the ledger transaction system 106 provides the personal email identifier 1806 to a remote server corresponding to the domain name 1804 (e.g., the remote server 1808 or a different remote server). To illustrate, the ledger transaction system 106 can transmit a REST request to an API endpoint of the remote server for data associated with the user account. In response, the ledger transaction system 106 can receive the encryption key 1814 from that remote server.

Although FIG. 18 illustrates the main address 1812 and the encryption key 1814 at the remote server 1808, the ledger transaction system 106 can access additional information from the remote server 1808. For example, the ledger transaction system 106 can also obtain a different sub-address identifier from the remote server 1808 utilizing the personal email identifier 1816.

Upon retrieving the main address 1812 and the encryption key 1814 associated with the user account, the ledger transaction system 106 can encrypt the personal email identifier 1816 (or a different sub-address identifier received from the remote server 1808). In particular, the ledger transaction system 106 can apply the encryption key 1814 to the personal email identifier 1816 to generate an encrypted sub-address. The ledger transaction system 106 can then submit a request for a transaction associated with the user account based on the main address 1812 identified from the DNS record 1810 and the encrypted sub-address generated by applying the encryption key 1814 to the personal email identifier 1806.

Utilizing this approach, the ledger transaction system 106 allows for transactions utilizing the distributed digital ledger transaction network based on the email address of a user account. For example, users can transfer digital assets utilizing the distributed digital ledger transaction network by sharing email addresses. Moreover, the ledger transaction system 106 can perform these transactions without sharing confidential account information. In addition, for repeated transactions involving the same payee, the ledger transaction system 106 can avoid publishing repeat/trackable address information corresponding to the transactions on the digital ledger.

Though FIG. 18 illustrates the ledger transaction system 106 identifying the main address and sub-address of a user account based on an email address of the user associated with the user account, the ledger transaction system 106 can identify address information based on other identifiers. For example, in one or more embodiments, the ledger transaction system 106 can identify the main address and sub-address of a user account based on a telephone number of the user associated with the user account. In some embodiments, the ledger transaction system 106 can identify the main address and sub-address based on a user ID (e.g., a social networking user ID) of the user. For example, the ledger transaction system 106 can access repositories (e.g., repositories stored on remote servers) that associate telephone numbers (or user IDs) with corresponding addresses and encryption keys. To illustrate, the ledger transaction system 106 can provide the telephone number (or user ID) to the remote server, receive a sub-address together with an encryption key, and utilize the sub-address and the encryption key to generate an encrypted sub-address. The ledger transaction system 106 can use the encrypted sub-address to initiate a transaction via the distributed digital ledger transaction network.

By using encryption keys to encrypt sub-addresses associated with user accounts, the ledger transaction system 106 can manage the visibility of user accounts associated with transactions more flexibly than conventional systems. In particular, by adding a unique nonce value to the sub-address of a user account before encryption, the ledger transaction system 106 can flexibly generate a unique sub-address encryption for each transaction associated with that user account. Accordingly, the ledger transaction system 106 can prevent identification of the user account from external entities observing transactions on the distributed digital ledger transaction network. Further, by identifying address information from address identifiers (e.g., included in an email address) associated with a user account, the ledger transaction system 106 can generate transaction requests more flexibly than conventional systems.

C. Separating and Storing Smart Contract Code and Smart Contract Data

Conventional blockchain systems are generally inflexible and rigid with regard to storage, implementation, and use of smart contracts. For example, many conventional blockchain systems utilize smart contracts to define and implement programs utilizing singleton objects particular to each program. Consequently, the smart contracts used by the conventional systems are inflexible in that they cannot be used or repeated across a network (i.e., the smart contracts are not reusable). For instance, in conventional blockchain systems, a device implementing a subsequent smart contract that depends on a previous smart contract would be unable to flexibly interact or reference the common dependencies between contracts because each smart contract implements code and singleton objects particular to each contract. In other words, conventional systems cannot rely on a common type class to flexibly and efficiently reference digital assets across the distributed digital ledger transaction network.

Additionally, conventional blockchain systems generally store associated smart contracts inflexibly. For example, many conventional blockchain systems store smart contracts under an address that corresponds to the hash value resulting from applying a hash function to the smart contract code. Accordingly, the address under which a smart contract is stored is typically unique to that smart contract. As a result, conventional systems typically store one smart contract per address.

One or more embodiments of the ledger transaction system 106 separates smart contract code and smart contract data for flexible reuse of smart contract code. Indeed, in one or more embodiments, the ledger transaction system 106 utilizes smart contract code (referred to as "modules") to define attributes and procedures implemented by smart contract data (i.e., referred to as "resources"). Thus, the ledger transaction system 106 can flexibly utilize a module to create multiple resources having duplicate properties and being governed by the same procedures.

Further, one or more embodiments of the ledger transaction system 106 implement an addressing scheme for storing multiple smart contracts under a single user account. Indeed, the addressing scheme allows a user account to store multiple modules and resources while allowing for clear identification of a particular module or resource. Thus, the ledger transaction system 106 can more flexibly implement smart contracts across the distributed digital ledger transaction network.

Figure 19:
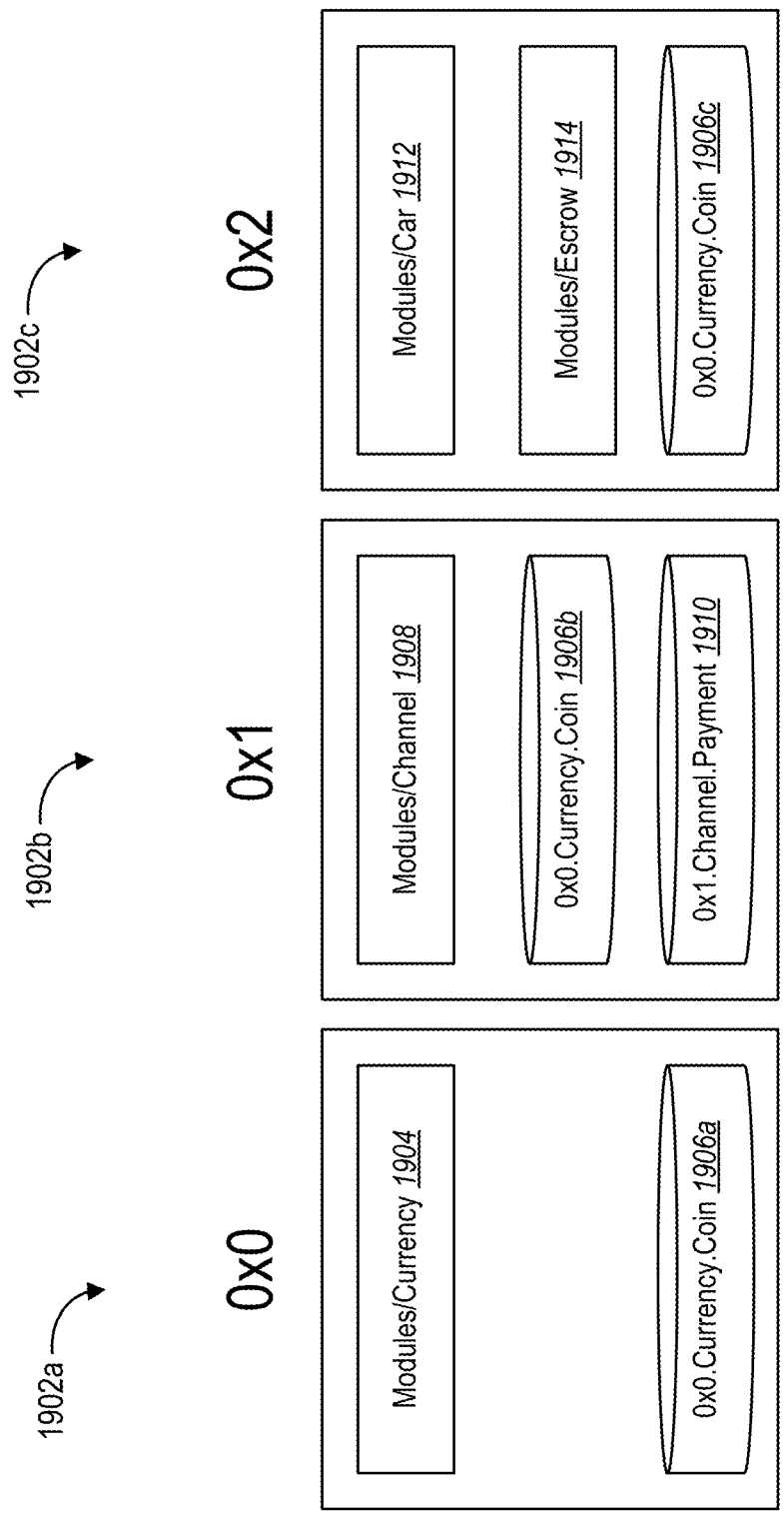
FIG. 19 illustrates a schematic diagram of user accounts storing modules and resources in accordance with one or more embodiments.

FIG. 19 shows a schematic diagram of several user accounts 1902a-1902b storing modules and resources in accordance with one or more embodiments. As mentioned above, in one or more embodiments the ledger transaction system 106 deconstructs smart contracts into separate modules (representing smart contract code) and resources (representing smart contract data). Indeed, in one or more embodiments, all of the values stored at a user account are represented as either a module or a resource.

In one or more embodiments, the ledger transaction system 106 treats a module as immutable. In other words, the ledger transaction system 106 can protect the module from modification or deletion. In some embodiments, however, the ledger transaction system 106 allows such actions. The ledger transaction system 106 can generate a module that invokes procedures in one or more other modules. In some embodiments, however, the ledger transaction system 106 limits modules to invoking procedures defined within other modules that were generated previously on the distributed digital ledger transaction network.

In one or more embodiments, the ledger transaction system 106 can generate multiple resources utilizing the same module. Indeed, the ledger transaction system 106 can utilize a module as a template from which to generate multiple resources. For example, as shown in FIG. 19, the ledger transaction system 106 stores a Currency module 1904. Using the Currency module 1904, the ledger transaction system 106 generates the Coin resources 1906a-1906c shown stored under different account addresses. Indeed, as the Coin resources 1906a-1906c were generated from the same module (i.e., the Currency module 1904), the Coin resources 1906a-1906c share the same characteristics (e.g., are of the same data type). Similarly, the ledger transaction system 106 can transfer, manipulate, or otherwise interact with the Coin resources 1906a-1906c using the same procedures defined within the Currency module 1904. In one or more embodiments, the ledger transaction system 106 can generate any number of resources using the same module (subject to the creation limits defined within the module).

Thus, by implementing smart contracts as separate modules and resources, the ledger transaction system 106 implements smart contracts more flexibly than conventional systems. Indeed, the ledger transaction system 106 can flexibly reuse a single module to generate multiple resources that behave similarly. Thus, the ledger transaction system 106 avoids creating an entirely new smart contract to create an object having the same properties and behavior as a previously created smart contract.

Additionally, as mentioned above, the ledger transaction system 106 can implement an addressing scheme with reference to modules and resources. Indeed, in one or more embodiments, the ledger transaction system 106 can store zero or more modules and one or more resources under the same user account. In one or more embodiments, the ledger transaction system 106 utilizes these modules and resources via transaction scripts (e.g., submitted as part of a transaction request). For example, a transaction script can include calls to one or more procedures of a module with reference to a particular resource. In executing the transaction script, the ledger transaction system 106 executes the procedure calls defined within the module and modifies, moves, or otherwise interacts with the referenced resource (transaction scripts will be discussed in more detail below with reference to FIG. 23). By implementing the addressing scheme, the ledger transaction system 106 can clearly identify a specific module and/or a specific resource. For example, the ledger transaction system 106 can distinguish between two modules having a similar name but stored under different addresses.

To provide an illustration, FIG. 19 shows the ledger transaction system 106 storing multiple modules and/or resources within the user accounts 1902*a*-1902*c*. Specifically, the ledger transaction system 106 stores the Currency module 1904 and the Coin resource 1906*a* under the user account 1902*a*. Additionally, the ledger transaction system 106 stores the Channel module 1908, the Coin resource 1906*b*, and the Payment resource 1910 under the user account 1902*b*. Further, the ledger transaction system 106 stores the Car module 1912, the Escrow module 1914, and the Coin resource 1906*c* under the user account 1902*c*.

In one or more embodiments, the ledger transaction system 106 implements the addressing scheme by defining a module namespace usable for uniquely identifying modules. In one or more embodiments, the ledger transaction system 106 defines the module namespace for a particular module as the combination of the address of the user account storing the module and an identifier for the module itself. To illustrate, the ledger transaction system 106 can define the module namespace for the Currency module stored at the user account 1902*a* as "0x0.Currency." Therefore, upon receiving a transaction script that includes the namespace "0x0.Currency" (e.g., as part of a call to a procedure) the ledger transaction system 106 can identify the Currency module stored at the user account 1902*a* having the address 0x0.

More specifically, the ledger transaction system 106 can utilize the module namespace to identify a module that corresponds to a particular resource. Indeed, in one or more embodiments, the ledger transaction system 106 extends the module namespace by appending a resource identifier to the end of the module namespace. Indeed, the extended module namespace identifies the type of the resource (i.e., the type defined by the module). Accordingly, when referencing a particular resource, the ledger transaction system 106 can utilize the extended module namespace to identify the module (i.e., the type) that corresponds to that resource. In one or more embodiments, the extended module namespace represents an access path for a resource stored at a given user account.

For example, as shown in FIG. 19, the ledger transaction system 106 can identify the Currency module 1904 that corresponds to the Coin resource 1906*a* stored at the user account 1902*a* using the extended module namespace "0x0.Currency.Coin." As further shown in FIG. 19, the ledger transaction system 106 can also store the Coin resources 1906*b*-1906*c* from the Currency module 1904 under the user accounts 1902*b*-1902*c*, respectively. Indeed, in one or more embodiments, the ledger transaction system 106 can store a resource under a user account that is different from the user account storing the corresponding module. Thus, using the extended module namespace, the ledger transaction system 106 can identify the Currency module 1904 stored at the user account 1902*a* even when referencing the Coin resource 1906*b* stored at the user account 1902*b* or the Coin resource 1906*c* stored at the user account 1902*c*. Effectively, the extended module namespace indicates that the Coin resource 1906*b* and 1906*c* are subject to the attributes of the types and procedures defined by the Currency module 1904.

In one or more embodiments, to identify a resource stored at a particular user account, the ledger transaction system 106 can prefix the extended module namespace with the address of the desired user account. For example, to identify the Coin resource 1906*b* stored at the user account 1902*b*, the ledger transaction system 106 can utilize the call "0x1/0x0.Currency.Coin." Thus, the ledger transaction system 106 can further differentiate among resources that have been generated using the same module.

In one or more embodiments, the ledger transaction system 106 limits the number of resources of a given type stored under the same user account. For example, in some embodiments, the ledger transaction system 106 only stores one resource of a given type (e.g., one Coin resource from the Currency module 1904) within a particular user account. This approach provides a predictable schema for top-level account values—that is, every account should store its currency.coin resource in the same place. This design is not restrictive, because programmers can define wrapper resources that organize resources in a custom way (e.g., resource TwoCoin{coin1: 0x181BD55:currency.coin, coin2: 0x181BD55:currency.coin}).

Additionally, in one or more embodiments, the ledger transaction system 106 only stores one module of a given name at an address. Otherwise, using the module namespace would not uniquely identify a particular module. However, the ledger transaction system 106 can store two modules having the same name under different user accounts. For example, the ledger transaction system 106 can store an additional Currency module at the user account 1902*b*. Using the module namespace "0x1.Currency," the ledger transaction system 106 could uniquely identify that additional Currency module.

In sum, a resource value, or resource, can include a record that binds named fields to simple values (such as integers) or complex values (such as other resources embedded inside this resource). In some embodiments, every resource has a type declared by a module. Moreover, in one or more embodiments, resource types are nominal types which consist of the name of the type and the name and address of the resource's declaring module. Resources can be both mutated or deleted, and, in one or more embodiments, the rules for mutating, deleting, and publishing a resource are encoded in the module that created the resource and declared its type.

Similarly, a module value, or module, can include bytecode that declares resource types and procedures. Like a resource type, in some embodiments a module is identified by the address of the account where the module is declared. Further, in some embodiments, a module is uniquely named within an account (e.g., each account can declare at most one module with a given name). Moreover, in some embodiments modules are immutable.

By implementing this address scheme to differentiate between modules and/or resources stored at different user accounts, the ledger transaction system can store and use smart contracts more flexibly than conventional systems.

Indeed, as mentioned, the ledger transaction system 106 can flexibly store a variety of different modules and resources at user accounts. The ledger transaction system 106 can then use the addressing scheme to define a module namespace usable for identifying the correct module when referencing a resource. Thus, when a transaction script utilizes the module namespace (or the extended module namespace) to modify or otherwise interact with a resource, the ledger transaction system 106 can correctly identify the attributes of the types and procedures that govern that resource. Further, the ledger transaction system can flexibly and efficiently reference and utilize resources across the distributed digital ledger transaction network in executing various smart contracts that utilize the resources.

D. Utilizing Resources to Delegate Account Permissions

Figure 20:
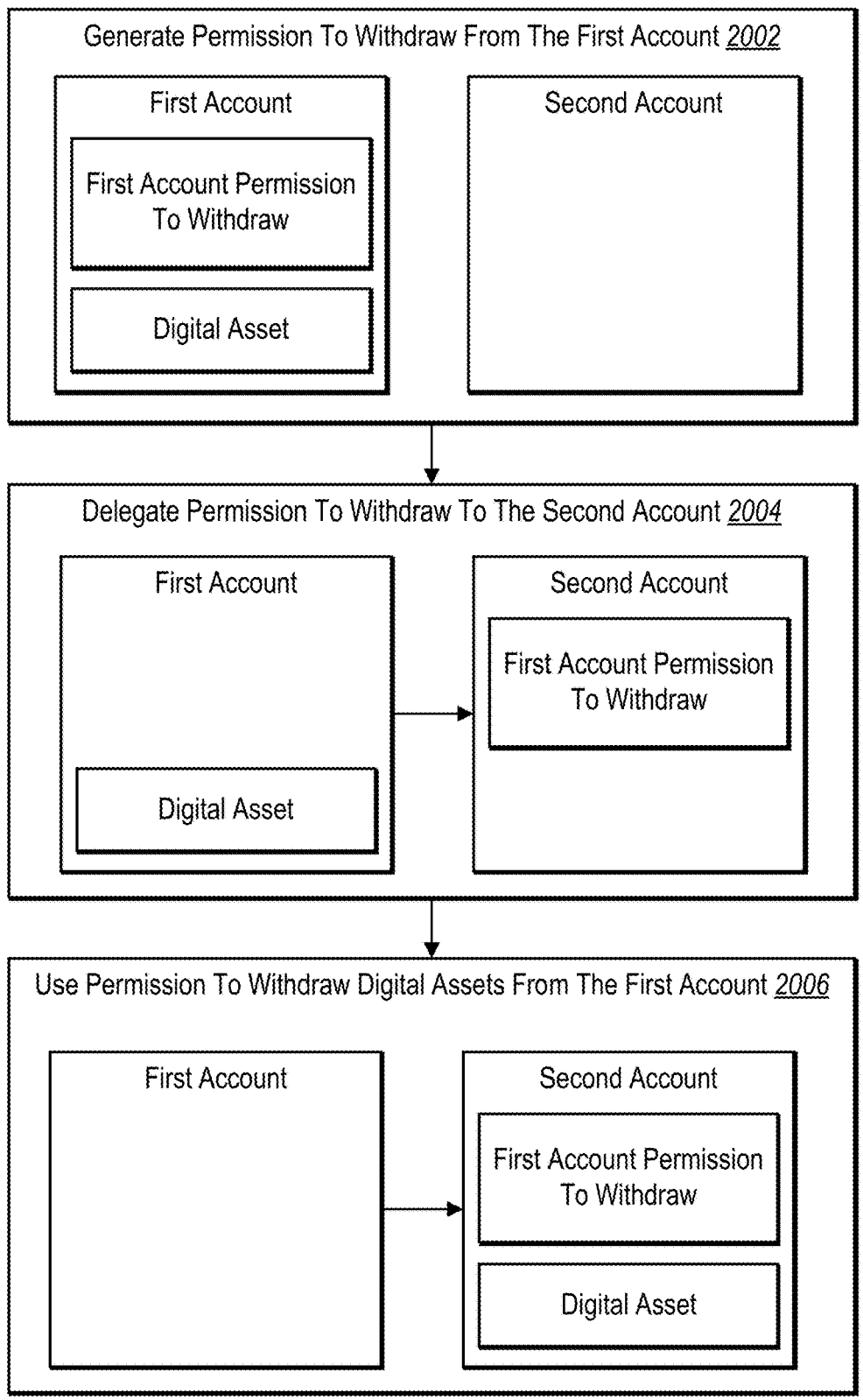
FIG. 20 illustrates a block diagram of the ledger transaction system transferring permission resources between user accounts in accordance with one or more embodiments.

As mentioned above, unlike conventional blockchain systems, the ledger transaction system 106 can flexibly delegate account permissions to different user accounts. Indeed, as just discussed the ledger transaction system 106 can store one or more resources in a user account and can execute transactions that modify these resources (e.g., by transferring digital assets from one user account to another user account). In some embodiments, the ledger transaction system 106 generates a resource reflecting user account withdrawal permissions and moves the resource to another account to flexibly delegate permissions across accounts. FIG. 20 illustrates a block diagram of the ledger transaction system 106 utilizing a resource to transfer the withdrawal permissions of a first user account to a second user account in accordance with one or more embodiments.

As shown in FIG. 20, the ledger transaction system 106 performs an act 2002 of generating a permission (i.e., a permission resource) to withdraw from the first user account. The permission to withdraw can include, for example, a permission to withdraw digital assets from the first user account (e.g., to transfer digital assets from the first user account to another user account). Indeed, in one or more embodiments, the ledger transaction system 106 generates the permission to withdraw by generating a resource that grants the permission to withdraw from the first user account. The ledger transaction system 106 can then store the resource granting the permission to withdraw (i.e., the resource providing the permission) at the first user account.

In one or more embodiments, the ledger transaction system 106 limits the ability to withdraw from the first user account based on the permission to withdraw. In other words, in some embodiments, the ledger transaction system 106 requires that a transaction attempting to withdraw from the first user account be associated with the permission to withdraw. For example, when the first user account submits a transaction request to transfer digital assets from the first user account to another user account, the ledger transaction system 106 can access the first user account to determine that the first user account has the resource granting the permission to withdraw.

As shown in FIG. 20, the ledger transaction system 106 performs the act 2004 of delegating the permission to withdraw to a second user account. Indeed, in one or more embodiments, the ledger transaction system 106 delegates the permission to withdraw by transferring the resource granting the permission to withdraw to the second user account. For example, the ledger transaction system 106 can execute a transaction across the distributed digital ledger transaction network, submitted by the first user account, that transfers the resource granting the permission to withdraw to a second user account.

As shown in FIG. 20, once the resource granting the permission to withdraw has been transmitted to the second user account (e.g., the resource has been transferred on the state ledger), the first user account no longer has that resource. Accordingly, the first user account no longer includes the permissions resource (and the ledger transaction system 106 will reject subsequent transactions initiated from the first account seeking to withdraw digital assets from the first account) Indeed, in one or more embodiments, the ledger transaction system 106 generates only one resource granting permission to withdraw for a particular user account. In some embodiments, however, the ledger transaction system 106 can generate multiple resources granting permission, allowing a user account to distribute the permission to multiple recipients as desired.

As further shown in FIG. 20, the ledger transaction system 106 then performs the act 2006 of using the permission to withdraw from the first user account. Indeed, the second user account can submit a transaction request to withdraw digital assets, for example, from the first user account. Upon receiving the transaction request, the ledger transaction system 106 can access the second user account, determine that the second user account has the resource granting the permission to withdraw from the first user account, and then transfer the digital assets from the first user account to the second user account accordingly.

In one or more embodiments, the ledger transaction system 106 can delegate the permission to withdraw from a user account in order to subject that user account to certain withdrawal limitations. For example, the ledger transaction system 106 can generate a cold wallet (i.e., from a cold wallet module published on the distributed digital ledger transaction network) and transfer the resource granting the permission to withdraw from the user account to the cold wallet. As used herein, the term "cold wallet" refers to an offline reserve of digital assets. Having the resource granting the permission to withdraw, the cold wallet can take digital assets out of the user account and store them within the cold wallet. The digital assets, therefore, become subject to the constraints (and protections) of the cold wallet. Though FIG. 20 illustrates utilizing a resource to delegate a permission to withdraw, the ledger transaction system 106 can utilize resources to transfer other permissions (or resources) associated with user accounts as well.

E. Decoupling Account Addresses from Cryptographic Keys

Many conventional blockchain systems use authentication keys to authenticate user accounts sending transactions to a network. However, conventional blockchain systems are inflexible in managing these authentication keys. For example, conventional systems typically tie authentication keys of a user account directly to the user account address (e.g., the authentication key is the address of the user account). However, this presents security issues for which the conventional systems fail to offer flexible solutions. For example, if the authentication key of a user account becomes compromised, the conventional systems may require a user to move a user account to a new address to avoid account interference from a malicious party.

One or more embodiments of the ledger transaction system 106 decouples authentication keys from user account addresses to allow for flexible authentication key rotation. In particular, in one or more embodiments, the ledger transaction system 106 generates an attribute for the user account that stores the authentication key of the user account. Accordingly, the ledger transaction system 106 can store new authentication keys at the user account when desired or necessary. In this manner, the ledger transaction system 106 can provide more flexible security that allows a user account to maintain security while avoiding the need to move the contents of the user account to a new address.

Figure 21:
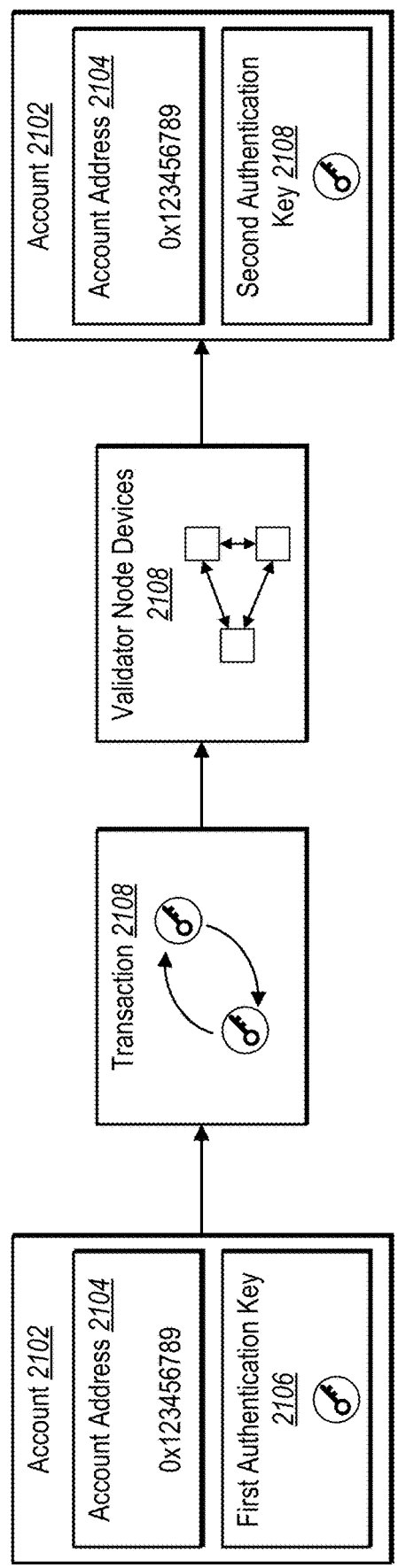
FIG. 21 illustrates a block diagram of the ledger transaction system rotating authentication keys of a user account in accordance with one or more embodiments.

FIG. 21 illustrates a block diagram of the ledger transaction system 106 rotating authentication keys of a user account in accordance with one or more embodiments. As shown in FIG. 21, the user account 2102 includes an account address 2104 and a first authentication key 2106. As mentioned above, in one or more embodiments, when the ledger transaction system 106 creates the user account 2102 on the distributed digital ledger transaction network, the ledger transaction system 106 sets the first authentication key 2106 to be the account address 2104.

In one or more embodiments, the first authentication key 2106 of the user account 2102 is further related to the public key (not shown) of the user account 2102. For example, in one or more embodiments, the ledger transaction system 106 determines the first authentication key 2106 by applying a hash function to the public key of the user account 2102 and setting the first authentication key 2106 to the resulting hash value. Indeed, in some embodiments, when creating the user account 2102 on the distributed digital ledger transaction network, the ledger transaction system 106 can first generate the public key (and private key) for the user account 2102 and then determine the first authentication key 2106 (and the account address 2104) by applying a hash function to the public key.

When a transaction is sent from the user account 2102, the ledger transaction system 106 can utilize the first authentication key 2106 to authenticate the user account 2102 as the sender of the transaction. For example, as mentioned above, upon receiving a transaction, the ledger transaction system 106 checks (e.g., utilizing the admission control of the receiving validator node device) that the first authentication key 2106 corresponds to the public key related to the private key used to sign the transaction. In one or more embodiments, the ledger transaction system 106 checks that the first authentication key 2106 corresponds to the public key by hashing the public key and determining that the resulting hash value matches the first authentication key 2106.

As shown in FIG. 21, the ledger transaction system 106 can send a transaction 2108 utilizing the first authentication key 2106, from the user account 2102, to rotate out the first authentication key 2106 (i.e., to get a new authentication key). As shown, the ledger transaction system 106 transmits the transaction 2108 (referencing the first authentication key 2106) to the validator node devices 2110 for execution. Then, as mentioned above, the ledger transaction system 106 utilizes the first authentication key 2106 to verify that the user account 2102 is the source of the transaction 2108.

Upon execution of the transaction 2108, the ledger transaction system 106 provides the user account 2102 with a second authentication key 2112. Indeed, in some embodiments, the ledger transaction system 106 generates the second authentication key 2112 by generating a new public key and private key for the user account 2102 and determining the second authentication key 2112 by applying a hash function to the new public key. For subsequent transactions sent by the user account 2102, the ledger transaction system 106 can verify that the user account 2102 sent the transaction using the second authentication key 2112.

In one or more embodiments, the ledger transaction system 106 can rotate the authentication key for a user account any number of times. For example, the ledger transaction system 106 can rotate the authentication key for a user account every time the user account sends a transaction. In some embodiments, however, the ledger transaction system 106 prevents the user account from rotating the authentication key multiple times in a single transaction.

Thus, by utilizing key rotation, the ledger transaction system 106 manages authentication keys more flexibly than conventional systems. In particular, the ledger transaction system 106 can generate a new authentication key for a user account without requiring the user account to move its contents to a new address. Accordingly, the ledger transaction system 106 provides for a flexibly security solution to prevent malicious attacks against a user account when the authentication key has been leaked keys while allowing for stability with regards to the user account address. Indeed, by implementing key rotation, the ledger transaction system 106 implements configurable keys for user accounts.

IV. Transactions

A. Overview

As mentioned above, the ledger transaction system 106 can execute transactions across the distributed digital ledger transaction network. Indeed, a user account may submit a transaction, and the ledger transaction system 106 can utilize validator node devices of the distributed digital ledger transaction network to execute the transaction, agree on the transaction results via consensus, and commit the transaction to storage. Indeed, through this process, the ledger transaction system 106 utilizes transactions to modify the ledger state of the distributed digital ledger transaction network.

Figure 22:
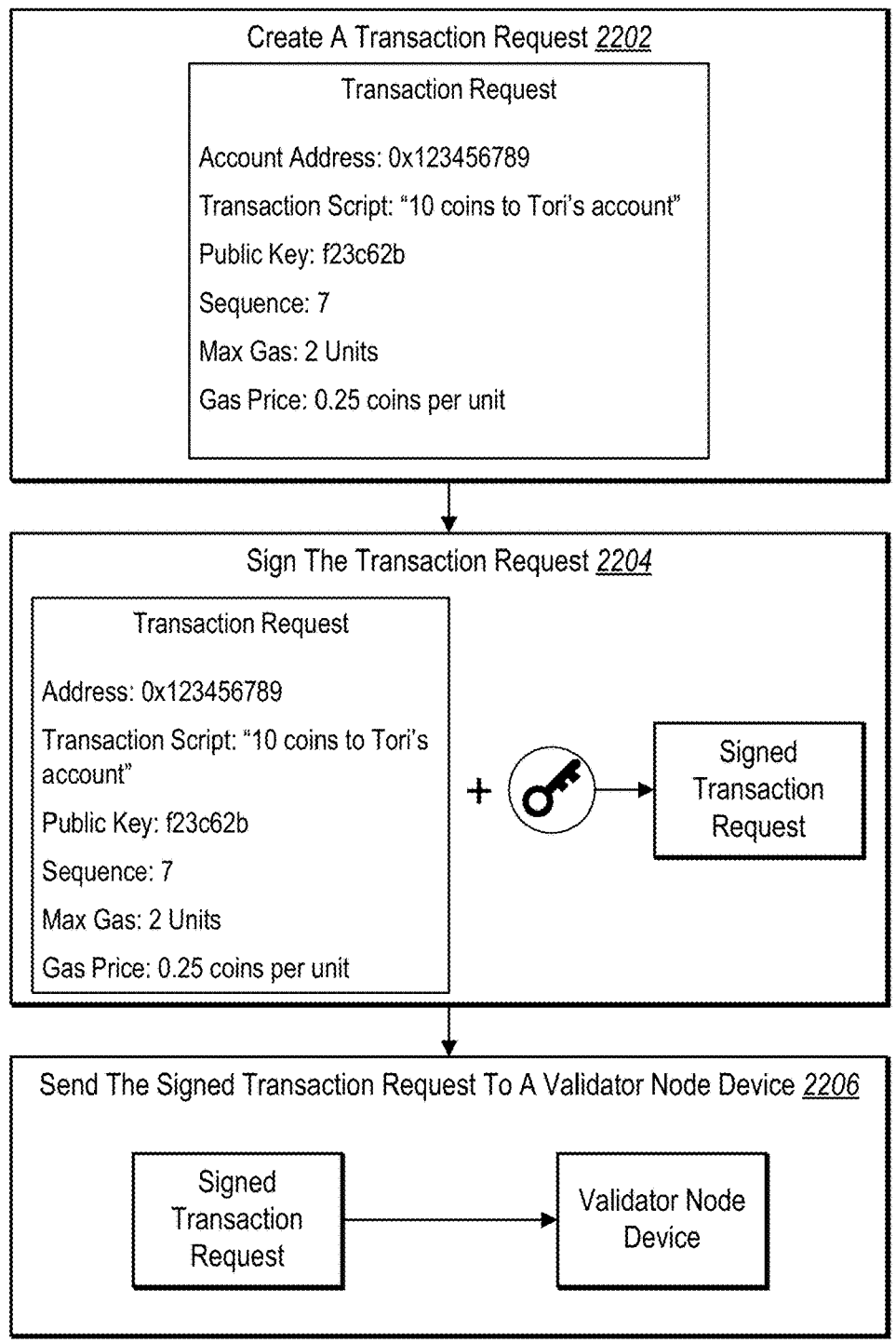
FIG. 22 illustrates a block diagram of submitting a transaction to the distributed digital ledger transaction network in accordance with one or more embodiments.

FIG. 22 illustrates a block diagram of submitting a transaction to the distributed digital ledger transaction network in accordance with one or more embodiments. As seen in FIG. 22, the ledger transaction system 106 can perform an act 2202 of creating a transaction object. Indeed, the ledger transaction system 106 can create the transaction object at a client device associated with the user account submitting the transaction request.

The transaction request can include several pieces of information. For example, the transaction request can include the account address corresponding to the user account submitting the transaction request, the transaction script used to executed the requested transaction, the public key associated with the user account submitting the transaction, the sequence number associated with the transaction request, a maximum amount of gas the user account is willing to spend in executing the transaction, the amount of digital assets (e.g., digital currency) the user account is willing to spend per unit of gas in order to execute the requested transaction. In one or more embodiments, a transaction request can include additional information, such as a client-specified expiration for the transaction request.

As further shown in FIG. 22, the ledger transaction system 106 can then perform an act 2204 of signing the transaction request. In particular, as discussed above, the user account submitting the transaction request can sign the transaction request using the private key associated with the user account. The ledger transaction system 106 can then perform the act 2206 of sending the signed transaction request to a validator node device of the distributed digital ledger transaction network. The ledger transaction system 106 then utilizes the validator node devices to execute the transaction request, achieve consensus with regard to the execution results, and commit the execution results to storage if consensus is achieved.

The ledger transaction system 106 can implement many features that improve the execution of transactions across the distributed digital ledger transaction network. For example, in one or more embodiments, the ledger transaction system 106 can implement more flexible transactions using arbitrary transaction scripts. Further, the ledger transaction system 106 can utilize smart contracts (i.e., modules and resources) to configure the operation of features surrounding transaction execution (such as rejecting invalid transactions, deducting and distributing gas upon transaction execution, or incrementing sequence numbers). Further, the ledger transaction system 106 can utilize access keys that limit access to digital assets via transactions.

B. Utilizing Transaction Scripts and Interacting with Modules and Resources

As mentioned above, one or more embodiments of the ledger transaction system 106 utilize arbitrary transaction scripts to implement flexible transactions across the distributed digital ledger transaction network. In particular, in one or more embodiments, a transaction script includes an arbitrary program composed using a programming language implemented by the ledger transaction system 106. The program can call out the resources to modify and the module procedures to be used to implement the modifications. Transaction scripts can be arbitrary in that they can invoke multiple procedures from various different modules within a single script. Additionally, transactions scripts can include conditional logic and can perform local computations. Accordingly, the ledger transaction system 106 can utilize transaction scripts to implement transactions more flexibly than conventional blockchain systems. Indeed, conventional blockchain systems generally limit the number of procedures invoked by a transaction and may only allow simple transactions that implement basic logic (e.g., transferring an asset). Indeed, by utilizing arbitrary transaction scripts, the ledger transaction system 106 can implement more complex and expressive one-off acts via the distributed digital ledger transaction network.

Figure 23:
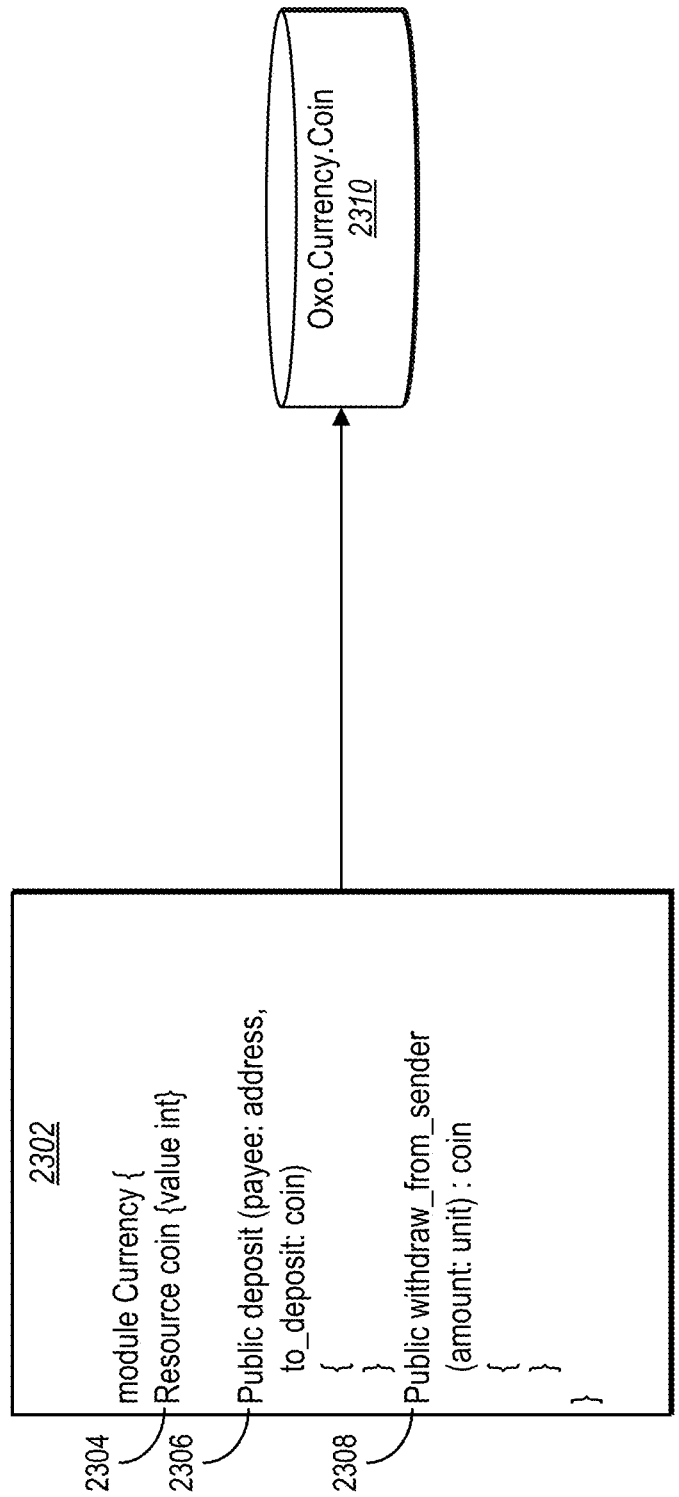
FIG. 23 illustrates module and a corresponding resource stored on the distributed digital ledger transaction network in accordance with one or more embodiments.

Indeed, one or more embodiments of the ledger transaction system 106 implement a scheme for allowing transaction scripts to call out resources and module procedures. As mentioned above, the ledger transaction system 106 can deconstruct smart contracts into resources and modules. Accordingly, the ledger transaction system 106 can implement a set of rules by which arbitrary transaction scripts can utilize module procedures to manipulate (e.g., modify) resources. FIG. 23 illustrates a module and a corresponding resource stored at the distributed digital ledger transaction network in accordance with one or more embodiments.

For example, FIG. 23 illustrates code of a programming language that defines a Currency module 2302. As shown in FIG. 23, the Currency module 2302 includes a resource type declaration 2304 of type Coin. Further, the Currency module 2302 defines procedures that a transaction script may call upon in order to user, modify, or otherwise interact with a resource generated based on the Currency module 2302. In particular, the Currency module 2302 defines a deposit procedure 2306 and a withdraw procedure 2038 (the code describing the details of these procedures is not shown in the figure). As shown in FIG. 23, the ledger transaction system 106 utilizes the Currency module 2302 to generate the Coin resource 2310.

In one or more embodiments, the Coin resource 2310 is opaque outside of the Currency module 2302. Indeed, in some embodiments, the ledger transaction system 106 limits the use of the Coin resource 2310 to procedures defined within the Currency module 2302 (and rejects transactions that seek to use or modify resources outside the procedures defined by the module). Specifically, in some embodiments, other modules and transaction scripts can only read or modify the value fields of the Coin resource 2310 using the public procedures defined within the Currency module 2302. Similarly, in one or more embodiments, only the procedures defined within the Currency module 2302 can create or destroy resources of type Coin. In other words, the Currency module 2302 provides an application programming interface (API) that has control over the access, creation, and destruction of the derived resources. In some embodiments, however, the ledger transaction system 106 defines a set of operations or procedures that can be used to interact with a resource, even though the operations and procedures are not defined within the corresponding module.

As an illustration, to execute a transaction that transfers the Coin resource 2310 from a first user account to a second user account, the ledger transaction system 106 can generate a transaction script that calls upon the withdraw procedure 2308 and the deposit procedure 2306 declared in the Currency module 2302. For example, the transaction script can include a call to the withdraw procedure 2308 (e.g., "let coin=0x0.Currency.withdraw_from_sender(copy (amount))") in order to withdraw a value of a specified "amount" from the Coin resource 2310. Further, the transaction script can include a call to the deposit procedure 2306 (e.g., "0x0.Currency.deposit(copy(payee), move(coin))") to deposit the withdrawn value to the user account specified by "payee."

C. Utilizing Smart Contracts to Reject Transactions, Deduct Gas Payments, Increment Sequence Numbers, And Distribute Gas to Computer Nodes Conventional blockchain systems perform a variety of tasks in conjunction with executing a transaction. For example, many conventional systems implement tasks, such as transaction validation, transaction fee withdrawal, and gas disbursement. Many conventional systems, however, hardcode these tasks. Indeed, many conventional systems define the implementation of these tasks within their source code. Consequently, this creates inflexibility within the conventional systems as modification of these tasks requires undesirable modification of the source code itself.

As mentioned above, one or more embodiments of the ledger transaction system 106 perform several transaction execution procedures (e.g., several acts in executing a transaction). For example, upon receiving a transaction request, the ledger transaction system 106 can perform a series of checks to determine whether the transaction request is valid. Additionally, as mentioned the ledger transaction system 106 can perform a variety of epilogue procedures. As will be discussed below, however, one or more embodiments of the ledger transaction system 106 utilize smart contracts (i.e., modules and resources) to perform these tasks and manage modifications or improvements to these tasks over time.

Figure 24:
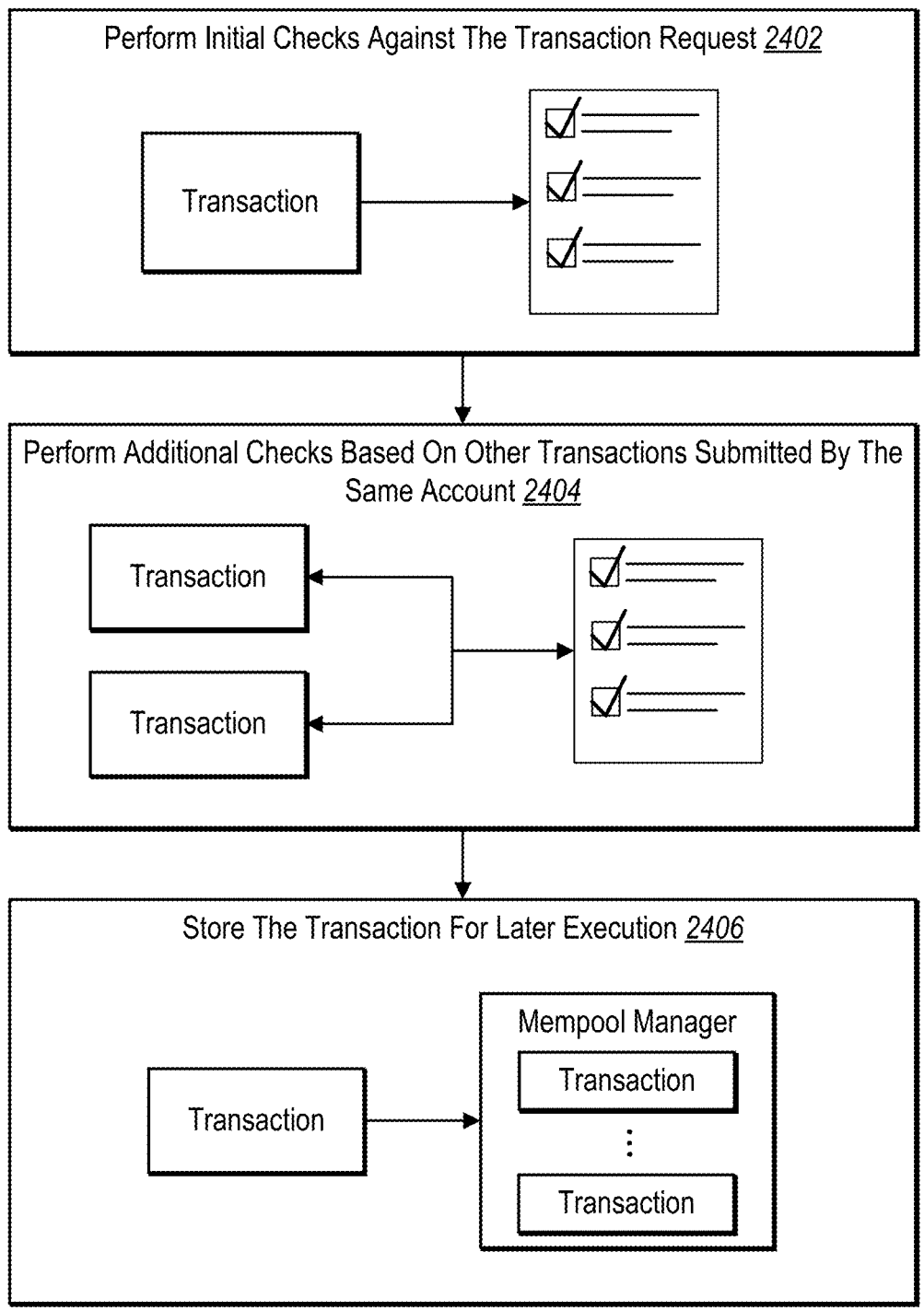
FIG. 24 illustrates a block diagram of the ledger transaction system utilizing a smart contract to perform a series of checks on a received transaction request in accordance with one or more embodiments.

As mentioned previously, as the ledger transaction system 106 receives transaction requests from client devices, the ledger transaction system 106 performs a series of checks before executing the transaction. Specifically, in one or more embodiments, the ledger transaction system 106 utilizes the admission control and mempool manager (each discussed above with regard to FIG. 2) to perform a series of checks on each received transaction. FIG. 24 illustrates a block diagram of the ledger transaction system 106 performing a series of checks on a received transaction request in accordance with one or more embodiments.

As shown in FIG. 24, the ledger transaction system 106 performs an act 2402 of performing initial checks against the transaction request. In particular, in some embodiments, the ledger transaction system 106 utilizes the admission control to perform the checks. More specific detail regarding the checks performed are provided above with regard to FIG. 2.

As shown in FIG. 24, the ledger transaction system 106 subsequently performs an act 2404 of performing additional checks based on other transactions submitted by the same account. Indeed, in one or more embodiments, the ledger transaction system 106 utilizes a mempool manager to perform these additional checks. As mentioned above, the ledger transaction system 106 can perform these additional checks before admitting the transaction from the transaction request into the mempool manager. More detail regarding these additional checks is provided above with regard to FIG. 2.

Additionally, as shown in FIG. 24, the ledger transaction system 106 performs an act 2406 of storing the transaction for later execution. In particular, if the transaction request satisfies the checks, the ledger transaction system 106 can store the transaction in the mempool manager for later execution. In one or more embodiments, however, if the transaction request fails to satisfy one or more of the checks performed, the ledger transaction system 106 rejects the transaction request. In some embodiments, the ledger transaction system 106 provides a notification of the rejection to the client device that submitted the transaction request.

In one or more embodiments, the ledger transaction system 106 can utilize a smart contract to manage the above-mentioned checks on received transaction requests. In particular, in one or more embodiments, the ledger transaction system 106 can generate a smart contract (e.g., a module) for performing checks and rejecting transactions, the smart contract including a list of procedures that are usable for performing the checks on transaction requests. The ledger transaction system 106 can then implement the smart contract upon receiving a transaction request.

In one or more embodiments, the smart contract is configurable (subject to the public procedures defining the smart contract and consensus protocols). Indeed, in some embodiments, the ledger transaction system 106 can modify or otherwise change the smart contract used for performing the checks and rejecting transactions via a transaction across the distributed digital ledger transaction network. For example, in some embodiments, the smart contract itself includes rules or procedures that are used to modify the smart contract. To illustrate, a smart contract can authorize a subset of validator nodes (e.g., authorized devices with cryptographic keys) to submit a transaction that modifies validation rules for transactions. Thus, the ledger transaction system 106 can submit a transaction to change the smart contract to the distributed digital ledger transaction network (e.g., via a client device or validator node device) and, if consensus is achieved, apply the changes accordingly.

Figure 25:
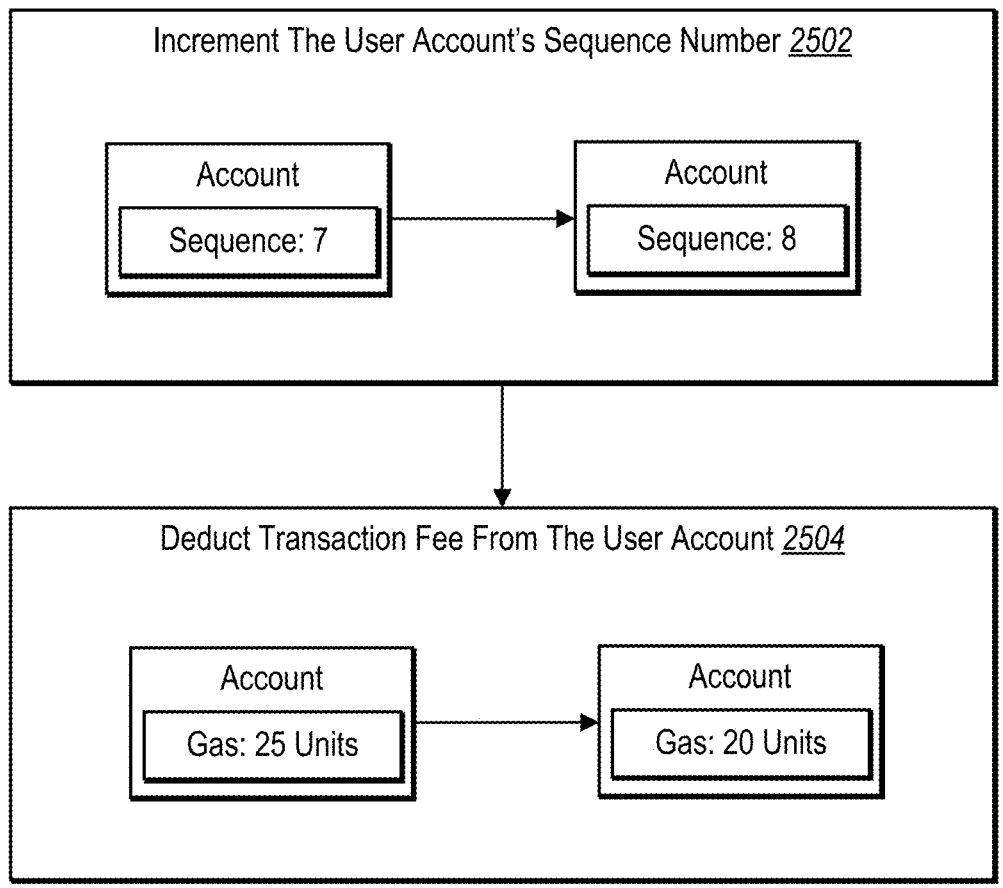
FIG. 25 illustrates a block diagram of the ledger transaction system utilizing a smart contract to perform execution epilogue tasks in accordance with one or more embodiments.

As further mentioned above, upon execution of a transaction, the ledger transaction system 106 can perform one or more epilogue tasks. FIG. 25 illustrates a block diagram of the ledger transaction system 106 performing one or more epilogue tasks in accordance with one or more embodiments. Though FIG. 25 illustrates acts performed in a specified order, it should be noted that these acts can be implemented in any order. In one or more embodiments, the ledger transaction system 106 performs the epilogue tasks as long as execution advances beyond the prologue tasks (e.g., authenticating the user account sending the transaction, ensuring the user account sending the transaction has sufficient digital currency to pay for the specified maximum gas, etc.) even if execution fails at subsequent execution steps (e.g., running the transaction script).

As shown in FIG. 25, the ledger transaction system 106 performs an act 2502 of incrementing the user account's sequence number. In particular, the ledger transaction system 106 increments the sequence number of the user account that sent the transaction request. As discussed above, the ledger transaction system 106 utilizes the sequence number of a user account as one of many checks to prevent a third-party from sending fraudulent transaction requests.

Further, as shown in FIG. 25, the ledger transaction system 106 performs an act 2504 of deducting the transaction fee from the user account. Indeed, upon executing a transaction, the ledger transaction system 106 can determine a cost of execution. Accordingly, the ledger transaction system 106 can deduct the determined amount from the user account that sent the transaction after the transaction is executed.

In one or more embodiments, the ledger transaction system 106 determines the transaction fee based on a gas price and a gas cost. In particular, as mentioned above, each transaction request can specify a price, in digital currency, that the user account submitting the transaction request is willing to pay per unit of gas (i.e., the gas price). Further, the ledger transaction system 106 can dynamically account for the computational power expended in executing the transaction, which is translated into gas cost. In one or more embodiments, validator node devices can prioritize executing transactions with higher gas prices and may drop transactions with low prices when the distributed digital ledger transaction network is congested.

In some embodiments, the ledger transaction system 106 tracks the number of gas units used during execution. If the maximum gas limit specified in the transaction request is reached before execution completes, the ledger transaction system 106 can halt execution immediately. In some embodiments, the ledger transaction system 106 refrains from committing the partial changes resulting from the execution performed to the ledger state, but the transaction still appears in the transaction history and the ledger transaction system 106 charges the sending user account for the gas used.

Similar to the transaction checks discussed above, the ledger transaction system 106 can utilize a smart contract to perform one or more of the aforementioned post-execution tasks. Indeed, in some embodiments, the ledger transaction system 106 generates a smart contract (e.g., a module) for performing the post-execution tasks, the smart contract including one or more procedure calls for performing the requisite tasks. As discussed above, the smart contract for performing the post-execution tasks can be configurable, allowing for changes or updates to the implementation of the smart contract.

Figure 26:
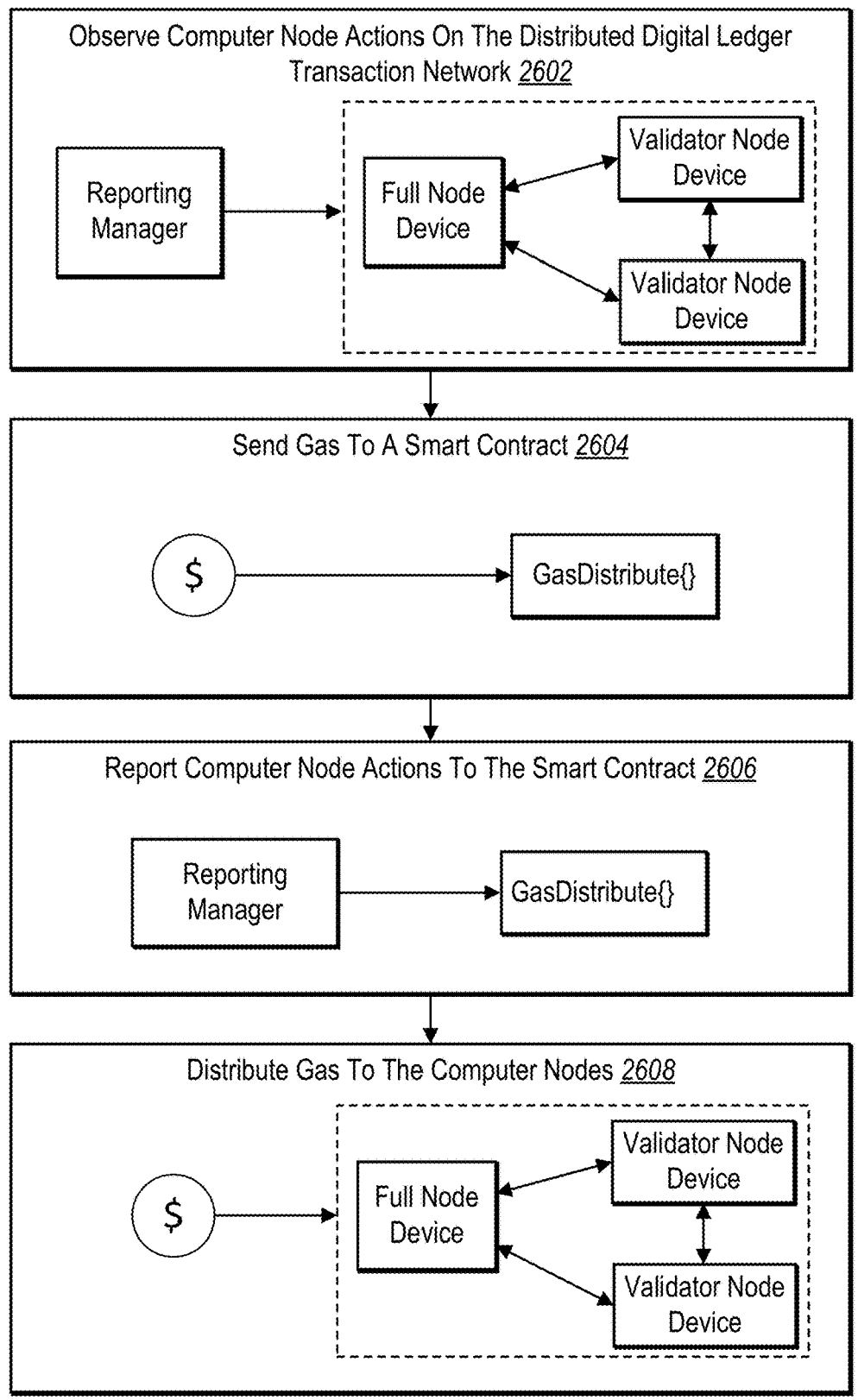
FIG. 26 illustrates a block diagram of the ledger transaction system utilizing a smart contract to distribute gas payments in accordance with one or more embodiments.

In addition to using smart contracts to perform checks against a transaction request and performing post-execution tasks, the ledger transaction system 106 can utilize smart contracts to distributed gas payments collected from client devices for executing transactions. FIG. 26 illustrates a block diagram of the ledger transaction system 106 utilizing a smart contract to distribute gas payments in accordance with one or more embodiments.

As shown in FIG. 26, the ledger transaction system 106 performs the act 2602 of observing computer node actions on the distributed digital ledger transaction network. As mentioned above, one or more embodiments of the ledger transaction system 106 utilize a reporting manager that observes the computer nodes of the distributed digital ledger transaction network and reports on any behavior for which rewards should be provided or fees extracted. Examples of such actions that may be reported on are discussed above with reference to FIG. 1. Indeed, the ledger transaction system 106 can utilize the reporting manager to observe actions by validator node devices and by full node devices.

As shown in FIG. 26, the ledger transaction system 106 can further perform an act 2604 of sending gas to a smart contract (e.g., referencing a gas amount in applying the procedures defined by a module). Indeed, as mentioned above, the ledger transaction system 106 can collect gas from a user account that submitted a transaction request as a transaction fee for executing the transaction. The ledger transaction system 106 can further generate a smart contract (e.g., a module) that governs the distribution of this gas among the computer nodes of the distributed digital ledger transaction network (e.g., as a reward for participating in the network). The ledger transaction system 106 can transmit the gas to the smart contract for distribution. In one or more embodiments, the ledger transaction system 106 can distributed the gas to the smart contract after executing the transaction script for a set of transactions. In some embodiments, the ledger transaction system 106 sends the gas to the smart contract using some other periodic transfer. In one or more embodiments, the ledger transaction system 106 can configure, update, or otherwise change the smart contract for distributing gas as described above.

As shown in FIG. 26, the ledger transaction system 106 can further perform an act 2606 of reporting computer node actions to the smart contract (e.g., referencing the reporting computer node actions in applying the procedures defined by a module). In particular, the ledger transaction system 106 can utilize the reporting manager to report the actions taken by the computer nodes on the distributed digital ledger transaction network. Indeed, in one or more embodiments, the ledger transaction system 106 configures the smart contract to distribute the gas to the computer nodes based on the actions of those computer nodes (e.g., whether the computer nodes acted appropriately or inappropriately). Thus, the ledger transaction system 106 uses the reporting manager to report the computer node actions so the smart contract can determine how to distribute the gas. As shown in FIG. 26, the ledger transaction system 106 can then perform an act 2608 of distributing the gas to the computer nodes (e.g., distribute to user accounts corresponding to the computer nodes). Indeed, the ledger transaction system 106 can utilize the smart contract to distribute the gas based on the reported computer node actions.

By utilizing smart contracts, the ledger transaction system 106 can perform tasks surrounding the execution of a transaction more flexibly than conventional systems. In particular, as mentioned above, using smart contracts allows the ledger transaction system 106 to change how these tasks are performed more flexibility than conventional systems. Indeed, the ledger transaction system 106 can flexibly modify or otherwise change the smart contracts that performs these tasks without needing to change source code. This allows the distributed digital ledger transaction network to flexibly modify certain transaction features over time to accommodate the needs of the community, address new malicious threats as they arise, and scale as the number and type of digital transactions grow.

D. Speculative Parallel Execution

Many conventional blockchain systems assemble, at one or more computer nodes, transactions that have been submitted for execution into transaction blocks and then share the assembled transaction blocks across the network (e.g., to other computer nodes). The conventional systems may then execute, at each computer node, the transactions within a particular transaction block and modify the digital ledger accordingly.

However, these conventional systems suffer from a variety of problems. For example, conventional blockchain systems are often inflexible in that they rigidly execute the transactions within a block of transactions sequentially. Indeed, when executing a given block of transactions, conventional systems are typically configured to progress through the block beginning with the first transaction and executing each subsequent transaction one at a time. Upon executing a transaction, the conventional systems generate a new state of the network and execute the next transaction based on that new state.

As a result of this rigid approach, conventional blockchain systems are also inefficient. In particular, because conventional blockchain systems execute transactions within a block sequentially, such systems require a significant amount of time and computing resources (e.g., processing time) to execute a block of transactions. Indeed, to execute a transaction block conventional systems generally require an amount of time equal to the collective sum of time needed to execute each transaction individually within the block.

One or more embodiments of the ledger transaction system 106 utilize parallel transaction execution to efficiently execute transactions via the distributed digital ledger transaction network. For example, in one or more embodiments, the ledger transaction system 106 determines a first state data structure (e.g., the most current state) of the distributed digital ledger transaction network, representing account states for the user accounts of the distributed digital ledger transaction network. The ledger transaction system 106 can then identify a plurality of transactions that include transactions associated with a set of the user accounts. Subsequently, the ledger transaction system 106 can perform a preliminary execution of the transactions in parallel relative to the first state data structure. Through this preliminary parallel execution, the ledger transaction system 106 can identify execution results of applying each transaction to the first state data structure. The ledger transaction system 106 can also determine dependencies of the transactions with regard to the set of user accounts. Based on the determined dependencies, the ledger transaction system 106 can apply the execution results to generate a second state data structure (e.g., a second state data structure equivalent to executing the plurality of transactions serially against the first state data structure).

To illustrate, the ledger transaction system 106 can identify a first set of transactions that are independent of other transactions. The ledger transaction system 106 can apply the transaction results of these transactions against the first state data structure to generate an intermediate state data structure. After applying the transaction results of the first set of independent transactions, the ledger transaction system 106 can identify a second set of transactions that are (now) independent. The ledger transaction system 106 can execute the second set of transactions against the intermediate data structure. The ledger transaction system 106 can iteratively identify independent transactions, execute these independent transactions against intermediate state structures until generating the second state data structure (that is equivalent to executing the plurality of transactions serially). In this manner, the ledger transaction system 106 can efficiently and flexibly execute transactions in parallel while still considering dependencies to achieve consistent and accurate state data structures across the distributed digital ledger transaction network.

Figure 27:
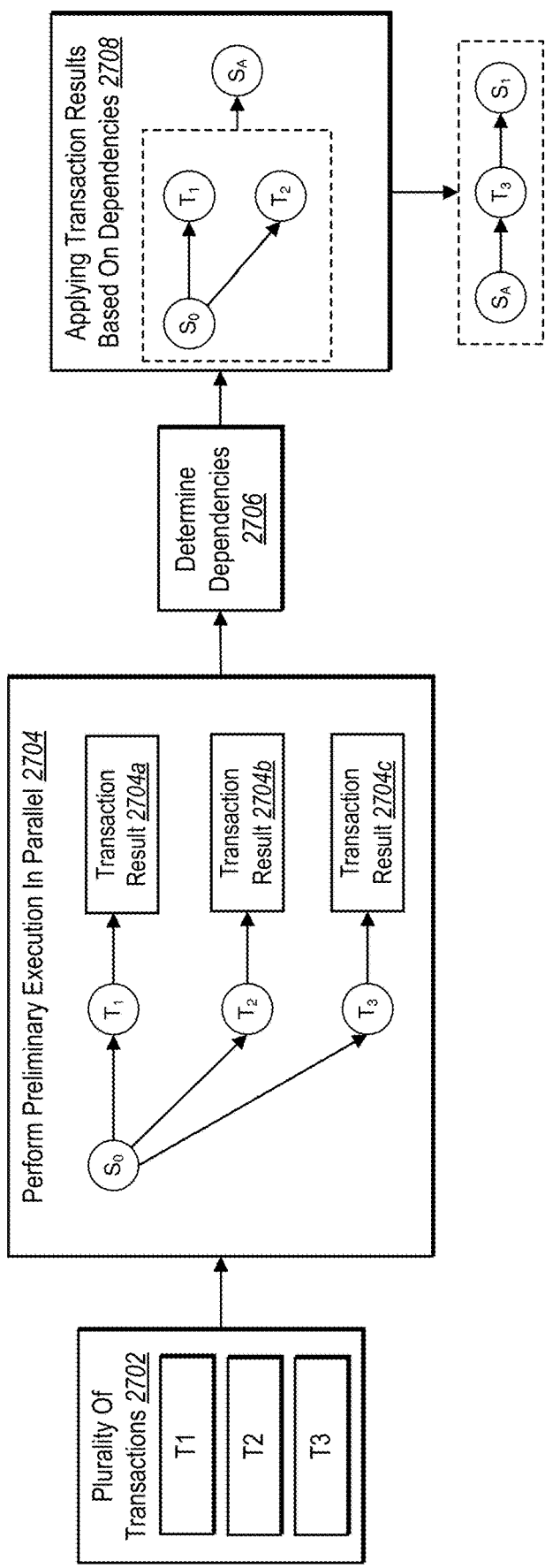
FIG. 27 illustrates a block diagram of the ledger transaction system executing transactions in parallel in accordance with one or more embodiments.

As mentioned above, the ledger transaction system 106 can perform a preliminary execution of transactions in parallel to determine transaction results and dependencies and then apply the transaction results based on the dependencies. FIG. 27 illustrates a block diagram of the ledger transaction system 106 executing transactions in parallel in accordance with one or more embodiments. In particular, FIG. 27 provides an overview of executing a plurality of transactions using parallel execution in accordance with one or more embodiments.

As shown in FIG. 27, the ledger transaction system 106 can identify a plurality of transactions 2702. FIG. 27 illustrates the plurality of transactions 2702 including three transactions, though the plurality of transactions 2702 can include any number of transactions. As mentioned, the plurality of transactions 2702 can include transactions associated with a set of user accounts of the distributed digital ledger transaction network. For example, in one or more embodiments, one or more of the transactions triggers a write command (e.g., a command to modify) and/or a read command (e.g., a command to extract data) associated with a user account.

As shown in FIG. 27, the ledger transaction system 106 can perform the act 2704 of performing preliminary execution of the transactions in parallel. In particular, the ledger transaction system 106 can identify a first state data structure of the distributed digital ledger transaction network (labeled "$S_0$" in FIG. 27) and perform the preliminary execution of the transactions relative to the first state data structure in parallel. In relation to FIG. 27, the first state data structure includes the most current state data structure of the distributed digital ledger transaction network, which provides the most current account states for the user accounts.

As shown, by performing the preliminary execution of the transactions, the ledger transaction system 106 can determine a plurality of transaction results 2704a-2704c relative to the state data structure. The plurality of transaction results 2704a-2704c reflect changes to accounts of the state data structure upon executing each of the transactions individually. Thus, for example, the transaction results 2704a reflect modifications to one or more user accounts upon executing the transaction "$T_1$."

By executing the transactions preliminarily (i.e., speculatively), the ledger transaction system 106 can identify how the transactions are associated with (e.g., interact with) the set of user accounts. For example, the ledger transaction system 106 can identify whether a transaction reads from and/or writes to a particular user account from the set of user accounts. Additionally, by executing the transactions preliminarily, the ledger transaction system 106 can determine whether the transaction has a valid signature, can pay the required transaction fee, and will not otherwise modify the distributed digital ledger transaction network.

As shown in FIG. 27, based on the preliminary execution, the ledger transaction system 106 can perform the act 2706 of determining dependencies between the transactions from the plurality of transactions 2702. Specifically, for a given transaction, the ledger transaction system 106 can determine whether that a transaction depends on a preceding transaction. To illustrate, the ledger transaction system 106 can determine that a given transaction depends on a preceding transaction when the given transaction reads from the same user account to which the preceding transaction writes (e.g., the preceding transaction withdraws digital assets from a user account and the given transaction reads the current value of the digital assets associated with the user account). As another example, the ledger transaction system 106 can determine that a given transaction does not depend on a preceding transaction when both transactions read from the same user account.

To illustrate, consider the following three transactions:
$T_1$: Send 1 coin from A to B [reads A, B; writes A, B]
$T_2$ Send 1 coin from X to Y [reads X, Y; writes X, Y]
$T_3$: If A's balance is less than 50, send 1 coin from C to D [reads A, C, D; writes C, D]

Based on performing a preliminary execution, the ledger transaction system 106 can determine that $T_1$ reads and writes to both accounts A and B (e.g., the transactions access A to determine digital assets, withdraw digital assets, accessing B, and deposit digital assets to B). Similarly, the ledger transaction system 106 can determine that $T_2$ reads and writes to both accounts X and Y. Further, the ledger transaction system 106 can determine that $T_3$ reads from A (i.e., accesses A to determine if the balance is less than 50) reads from C and D and writes to C and D. Accordingly, the ledger transaction system 106 determines that $T_3$ depends from $T_1$ (while $T_1$ and $T_2$ are independent of other transactions).

In one or more embodiments, the ledger transaction system 106 can further identify whether one or more transactions within the plurality of transactions 2702 will fail upon execution. To illustrate, the ledger transaction system 106 can determine that a transaction will fail upon if execution of the transaction triggers a withdrawal of digital assets from a user account and the value of the digital assets associated with that user account will be insufficient at the time of execution. In one or more embodiments, the ledger transaction system 106 rejects transactions that will fail upon execution.

As illustrated by FIG. 27, the ledger transaction system 106 subsequently performs the act 2708 of applying transaction results based on the dependencies. In particular, the ledger transaction system 106 can apply the transaction results 2704a-2704c based on the dependencies determines from performing the preliminary execution. Specifically, based on determining that the transactions $T_1$ and $T_2$ do not depend on each other (e.g., are independent), the ledger transaction system 106 applies the transaction results 2704a and 2704b to the state data structure, $S_0$, to generate an intermediate state data structure $S_A$. The intermediate state data structure $S_A$ thus reflects changes to accounts resulting from $T_1$ and $T_2$.

As shown in FIG. 27, the ledger transaction system 106 determines that the transaction $T_3$ depends on the transaction $T_1$. Upon determining that the ledger transaction system 106 has applied the transaction result for $T_1$, the ledger transaction system 106 can determine that the transaction $T_3$ is no longer dependent on a pending transaction. Accordingly, the ledger transaction system 106 executes the transaction $T_3$ relative to the intermediate data structure $S_A$. In relation to FIG. 27, the ledger transaction system 106 does not directly apply the transaction result 2704c because the transaction result 2704c is relative to the state data structure $S_0$ (which does not reflect the modifications from $T_1$ upon which $T_3$ depends).

As shown, upon executing the final transaction(s) from the plurality of transactions 2702, the ledger transaction system 106 can generate a second state data structure ("$S_1$") that includes modified account states that reflect the results of the transactions. In particular, the second state data structure includes the same state data structure that would have been reached had the ledger transaction system 106 executed each transaction within the plurality of transactions 2702 serially.

The ledger transaction system 106 can apply transaction results and execute dependent transactions to intermediate data structures in a variety of orders. For example, although FIG. 27 illustrates applying $T_1$ and $T_2$ against the first state data structure $S_0$, the ledger transaction system 106 can utilize a different order. To illustrate, the ledger transaction system 106 can apply $T_1$ against the first state data structure S0 to generate an intermediate state data structure SA. The ledger transaction system 106 can then execute $T_3$ against $S_A$ to generate a second intermediate data structure SB. The ledger transaction system 106 can then execute $T_2$ against SB to generate the second state data structure $S_1$. For instance, the ledger transaction system 106 can utilize this approach where there is some indication that the order of executing the transactions is important. For example, a validator node can provide an indication to execute transactions in a particular order.

In some embodiments, the ledger transaction system 106 performs the act 2706 of determining dependencies based on a dependency indicator. For example, a validator node can receive a dependency indicator from another validator node (e.g., a leader node for consensus) indicating one or more dependencies between the plurality of transactions. In some embodiments, the ledger transaction system 106 can use the dependency indicator in performing the preliminary execution and/or applying transaction results.

To illustrate, in some embodiments, the ledger transaction system 106 receives a dependency indicator that T3 depends from T1. In response, the ledger transaction system 106 can exclude T3 from the act 2704. Specifically, the ledger transaction system 106 can perform preliminary execution for T1 and T2 in parallel (without performing preliminary execution on T3). The ledger transaction system 106 can apply the transaction results 2704a, 2704b to generate the intermediate state data structure SA, and then execute T3 against the intermediate state data structure SA.

Thus, the ledger transaction system 106 can utilize the dependency indicator to determine a first subset of transactions (e.g., intermediate transactions) and a second subset of transactions (e.g., dependent transactions). The ledger transaction system 106 can perform preliminary parallel execution of the first subset of transactions relative to the first state data structure, and then execute the second subset of transactions against intermediate data structures.

In some embodiments, even upon receiving a dependency indicator, the ledger transaction system 106 can still perform a preliminary execution across all transactions to determine whether the dependency indicator is accurate. For instance, if a computer node determines that a dependency indicator is inaccurate, the ledger transaction system 106 can disregard the dependency indicator. Moreover, the ledger transaction system 106 can penalize the computer node that distributed the inaccurate dependency indicator (or refuse to vote for the block).

In one or more embodiments, the ledger transaction system 106 stores data structure the second state data structure in temporary storage and delays modifying the first state data structure in storage until consensus is achieved. To illustrate, though not shown in the figures, the ledger transaction system 106 can receive an indication of consensus among computer nodes of the distributed digital ledger transaction network with respect to the second state data structure ("$S_1$."). In one or more embodiments, receiving the indication of consensus includes receiving, at the lead validator node, the requisite votes to finalize the plurality of transactions 2702. In some embodiments, receiving the indication of consensus includes receiving, at another (i.e., non-lead) validator node, an indication that the plurality of transactions 2702 has been finalized (e.g., from the lead validator node). As discussed above, consensus with respect to the second state data structure can include consensus with respect to the root value of the transaction tree—which includes a representation of the second state data structure—as modified by the plurality of transactions 2702.

In response to receiving the indication of consensus, the ledger transaction system 106 can commit the second state data structure to storage. For example, the ledger transaction system 106, at each computer node of the distributed digital ledger transaction network, can modify the data structures (e.g., the first state data structure) stored at the respective computer node based on the second state data structure. In particular, the ledger transaction system 106 can modify the data structures based on the plurality of transactions 2702 as validated via consensus.

Figure 28:
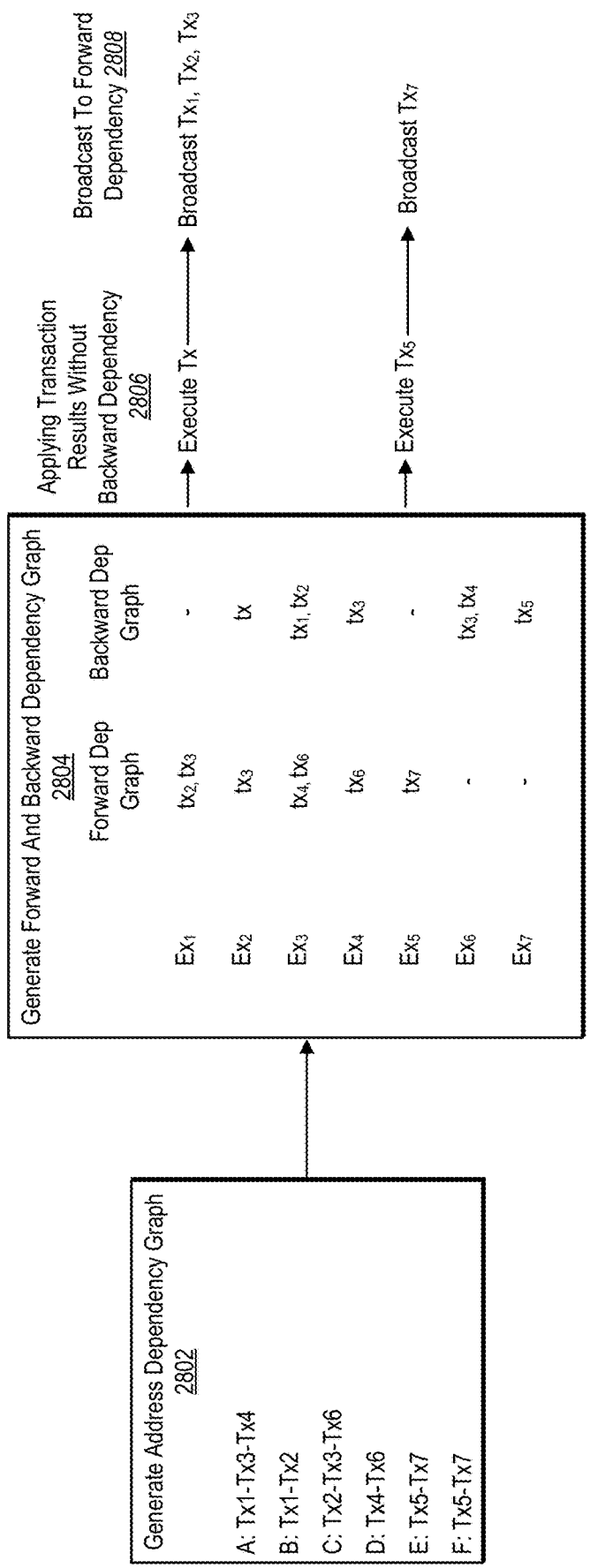
FIG. 28 illustrates a block diagram of the ledger transaction system executing transactions based on determined dependencies in accordance with one or more embodiments.

As mentioned above, the ledger transaction system 106 can determine the dependencies among transactions within a plurality of transactions and then apply transaction results based on those dependencies. FIG. 28 illustrates a block diagram of the ledger transaction system 106 determining dependencies and applying transaction results based on the dependencies in accordance with one or more embodiments.

For example, as shown in FIG. 28, the ledger transaction system 106 can perform the act 2802 of generating an address dependency graph. In particular, the ledger transaction system 106 can perform a preliminary execution of the transactions in parallel (as discussed above) and then determine the dependencies of those transactions based on the preliminary execution. The ledger transaction system 106 can then generate the address dependency graph. As shown in FIG. 28, the address dependency graph shows each transaction from the plurality of transactions that is associated with a particular user account of the distributed digital ledger transaction network.

As further shown in FIG. 28, the ledger transaction system 106 orders the transactions associated with each user account within the dependency graph. In one or more embodiments, the ledger transaction system 106 orders the transactions associated with each user account based on time of submission. In some embodiments, the ledger transaction system 106 orders the transactions based on one or more other factors.

As illustrated by FIG. 28, the ledger transaction system 106 subsequently performs the act 2804 of generating forward and backward dependency graphs. In particular, the ledger transaction system 106 utilizes the address dependency graph to generate the forward and backward dependency graphs. For example, the forward dependency graph shows, for a given transaction, the transactions that are directly dependent upon execution of that transaction (i.e., the transactions that immediately follow that transaction) as shown by the address dependency graph. To illustrate, the forward dependency graph illustrated in FIG. 28 shows that both tx2 and tx3 are directly dependent upon the execution of tx1. In other words, tx1 is associated with at least one user account that is also associated with tx2 and tx3, but tx1 is ordered to immediately precede both tx2 and tx3 as shown by the address dependency graph.

The backward dependency graph shows, for a given transaction, the transactions upon which that transaction directly depends as shown by the address dependency graph. To illustrate, the backward dependency graph illustrated in FIG. 28 shows that tx2 is directly dependent upon tx1. In other words, tx2 is associated with at least one user account that is also associated with tx1 but tx2 is ordered to immediately follow tx1 as shown by the address dependency graph.

As shown by FIG. 28, the ledger transaction system 106 can then perform the act 2806 of applying transaction results without a backward dependency. In particular, in one or more embodiments, the ledger transaction system 106 applies transaction results determined form the preliminary parallel execution if the backward dependency graph shows that the backward dependency slot for that transaction is empty. For example, as shown in FIG. 28, the ledger transaction system 106 can apply the transaction results for tx1 as the backward dependency slot for tx1 is empty in the backward dependency graph.

As shown in FIG. 28, the ledger transaction system 106 can further perform the act 2808 of broadcasting the execution to the forward dependent transactions. In one or more embodiments, in response to the broadcast, the ledger transaction system 106 removes the transaction from the backward dependency graph. The ledger transaction system 106 can then determine which transactions no longer have a backward dependency and can execute those transactions accordingly (e.g., execute those transactions relative to an intermediate state data structure). Thus, the ledger transaction system 106 can iteratively execute transactions, broadcast their execution, and then identify transactions that are newly available for execution until all of the transactions have been executed.

In one or more embodiments, the ledger transaction system 106 includes one or more execution managers that each manage execution of one or more of the transactions. The execution manager associated with a given transaction can additionally manage a forward dependency graph and a backward dependency graph specific to that transaction. The execution manager can determine if the transaction has a backward dependency and, if not, can execute the transaction. If a backward dependency exists, the execution manager can wait to execute the transaction until after receiving a broadcast indicating that the transactions upon which the given transaction is forwardly dependent have been executed. Once the broadcast is received, the execution manager can remove the executed transaction from the backward dependency graph (if applicable). Upon determining that the transaction no longer has backward dependencies, the execution manager can execute the transaction. Upon executing a transaction, the associated execution manager can broadcast an indication of the execution to the other execution managers. In one or more embodiments, upon determining that a transaction will fail, the associated execution manager can still send a broadcast to the other execution managers for removal of the transaction from the associated backward dependency graphs.

In this manner, the ledger transaction system 106 provides more flexibility with respect to transaction execution when compared to conventional systems. In particular, the ledger transaction system 106 can flexibly execute and apply transaction results while still achieving the same resulting state data structure based on dependencies amongst the transactions. Additionally, the ledger transaction system 106 operates more efficiently than conventional systems. Indeed, by executing transactions in parallel, the ledger transaction system 106 reduces the amount of time required to execute a plurality of transactions.

E. Custody/Rate Limited Keys

Conventional blockchain systems often restrict access to the digital assets of a user account to the owner of the user account. However, such conventional systems generally provide the owner of a user account with unrestricted access to the digital assets stored therein. This generally poses a security risk as a malicious third party that have obtained access to a user account (e.g., by obtaining the private key associated with that user account) will have unhampered access to the account and corresponding digital assets.

One or more embodiments of the ledger transaction system 106 utilize access limits (e.g., a threshold number of keys from a group of keys or access limited keys) to provide security protection to digital assets stored at user accounts. For example, in one or more embodiments, the ledger transaction system 106 restricts access to the digital assets stored at a user account by generating one or more threshold access requirements (e.g., a threshold number of access keys required to access the account). When a transaction is submitted to utilize the digital assets of the user account, the ledger transaction system 106 can determine whether the threshold access requirements have been satisfied and provide access to the digital assets based on that determination.

In some embodiments, the ledger transaction system 106 can utilize access key limits that restrict how the digital assets of a user account may be used. In particular, the ledger transaction system 106 can use access keys with value key limits (i.e., limits on the value of digital assets that can be accessed via the access keys) and/or rate key limits (i.e., limits on the rate at with digital assets can be used via the access key). In this manner, the ledger transaction system 106 can protect the digital assets of a user account from unwanted access. Further, if such access if achieved, the ledger transaction system 106 can minimize the loss of digital assets achieved by the unwanted access.

In addition to improving security, the ledger transaction system 106 can also improve flexibility. For example, the ledger transaction system 106 can generate a variety of different access key limits for different access keys, such that a user account can user a first access key subject to a first access key limit and a second access key subject to a second access key limit. In this manner, the ledger transaction system 106 can provide protection for each individual access key, while allowing for flexible use of different access keys for different purposes (e.g., allow an untrusted agent to a use a first access key with a low value key limit and allow a trusted agent to use a second access key with a higher value key limit).

Figure 29:
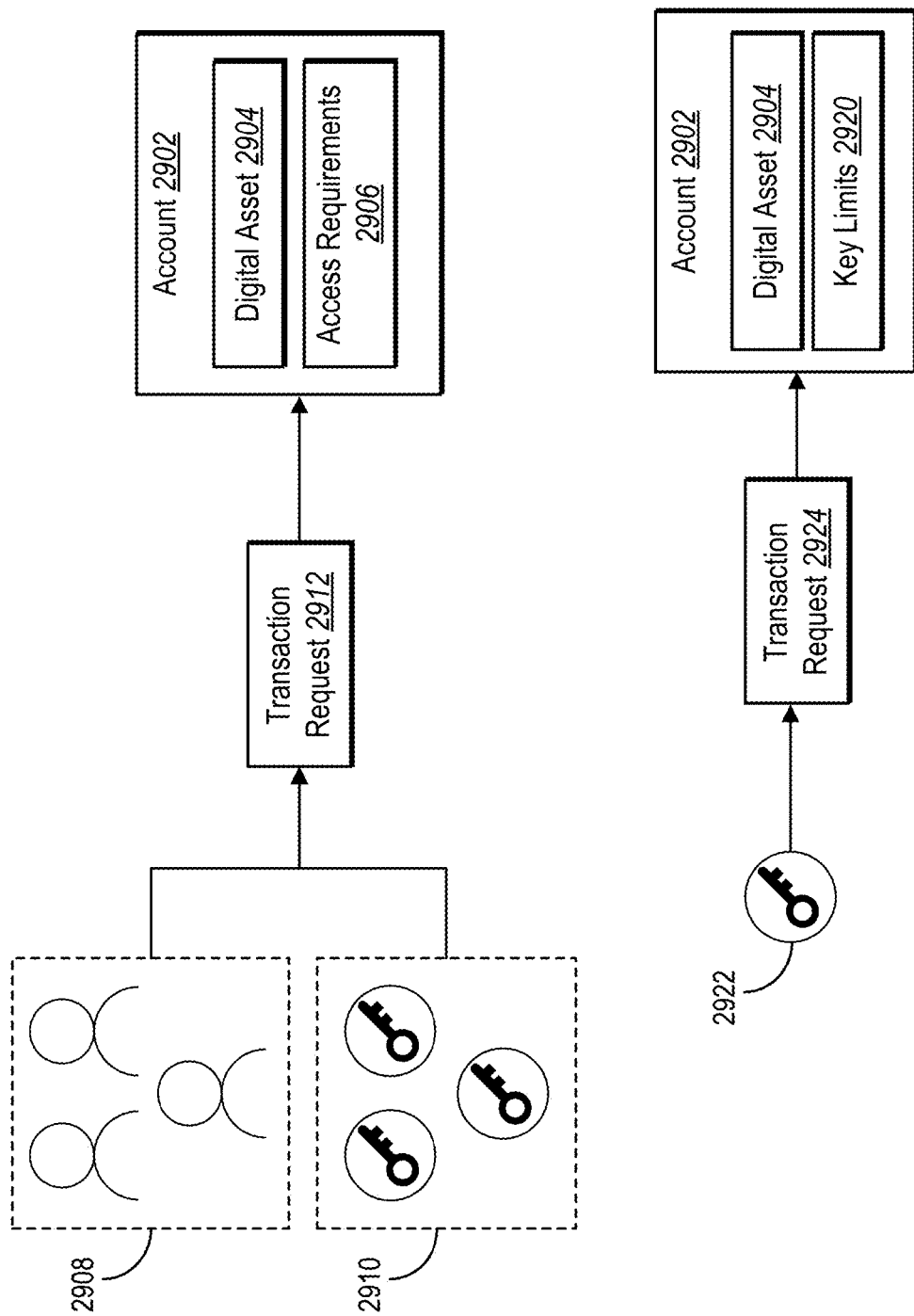
FIG. 29 illustrates the ledger transaction system implementing access limits on digital assets stored at a user account in accordance with one or more embodiments.

FIG. 29 illustrates the ledger transaction system 106 implementing access limits on digital assets stored at a user account in accordance with one or more embodiments. As shown in FIG. 29, the ledger transaction system 106 can associate access requirements 2906 with a user account 2902. The access requirements 2906 restrict access to digital assets 2904 stored at the user account 2902. When a transaction request 2912 that attempts to access (e.g., transfer) the digital asset 2904 is received, the ledger transaction system 106 can allow access depending on whether or not the access requirements 2906 have been met.

For example, the access requirements 2906 can include a threshold number of access keys (where threshold "number" includes a number, percentage, or ratio). For example, the access requirements 2906 can require that a minimum number of users from a group of users 2908 associated with the user account 2902 are associated with the transaction request 2912 to access the digital asset 2904. For example, each of the users can provide a digital signature associated with that user with the transaction request 2912. In one or more embodiments, the minimum number of users required by the ledger transaction system 106 includes all users from the group of users 2908. In some embodiments, the minimum number of users includes only a subset of users from the group of users 2908.

Additionally, the access requirements 2906 can require that a threshold number (i.e., a number, percentage, or ratio) of access keys from a group of access keys 2910 associated with the user account 2902 are associated with the transaction request 2912 to access the digital asset 2904. Indeed, the ledger transaction system 106 can generate one or more access keys to be used in accessing the digital asset 2904. In one or more embodiments, the minimum number of access keys required by the ledger transaction system 106 includes all access keys from the group of access keys 2910 associated with the user account 2902. In some embodiments, the minimum number of access keys includes only a subset of access keys from the group of access keys 2910. In one or more embodiments, the ledger transaction system 106 requires both a minimum number of users from the group of users 2908 and a minimum number of access keys from the group of access keys 2910 to be associated with the transaction request 2912 to access the digital asset 2904.

As mentioned, upon receiving the transaction request 2912 to access the digital asset 2904, the ledger transaction system 106 can determine whether the access requirements 2906 are satisfied. In one or more embodiments, if the access requirements 2906 are not satisfied, the ledger transaction system 106 can reject the transaction request 2912. However, if the access requirements 2906 are satisfied, the ledger transaction system 106 can accept the transaction request 2912 (and execute the corresponding transaction).

As mentioned above and as further showed in FIG. 29, the ledger transaction system 106 can utilize access key limits 2920 (e.g., value key limits and/or rate key limits) to restrict access to the digital asset 2904 stored at the user account 2902. In particular, the access key limits 2920 can restrict the degree of access provided to particular access keys (e.g., the access key 2922). To illustrate, in one or more embodiments, the access key limits 2920 limits the total amount or total value of the digital asset 2904 that can be accessed using the access key 2922 (e.g., value key limits that provide a maximum currency value of the digital asset 2904 that may be accessed using the access key 2922). In some embodiments, the access key limits 2920 provides a limit on a time period for which the access key is 2922 can successfully access the digital asset 2904 (e.g., the access key 2922 is rate limited key valid only for a day, a week, a month, etc.). In some embodiments, the access key limits 2920 limits the rate of total amount or total value of the digital asset 2904 that can be accessed by the access key 2922 within a recurring period of time (e.g., a rate key limit that defines a maximum currency value that can be accessed each day, each week, each month, etc.). In one or more embodiments, the ledger transaction system 106 can combine one or more of the aforementioned limits in a variety of ways (e.g., providing a currency value that can be accessed using the access key 2922 each week and further limiting the validity of the access key 2922 to a year).

In one or more embodiments, the ledger transaction system 106 can generate access keys based on other access keys. For example, the ledger transaction system 106 can generate one or more access keys (i.e., "sub access keys") based on the access key 2922 (i.e., a "parent access key"). Accordingly, the ledger transaction system 106 can generate access key limits corresponding to the sub access keys. In one or more embodiments, the access key limits corresponding to a sub access key are more limiting than the access key limits 2920 associated with the parent access key 2922. To illustrate, if the access key limits 2920 limited the total amount or value of the digital asset 2904 available to the parent access key 2922, the ledger transaction system could generate a set of sub access keys, each having access limited to a subset of the total amount or value accessible to the parent access key 2922.

Upon receiving a transaction request 2924 to access the digital asset 2904 using the access key 2922, the ledger transaction system 106 can determine whether the access key limits 2920 associated with the access key 2922 have been met. Indeed, the ledger transaction system 106 can track the activity of the access key 2922 to determine when the access key has reached the limit of its accessibility. In some embodiments, upon determining that the access key limits 2920 have been met, the ledger transaction system 106 can reject the transaction request 2924.

In one or more embodiments, the ledger transaction system utilizes a smart contract (i.e., a module) to handle transactions requests subjected to access limits. Indeed, in some embodiments, ledger transaction system 106 can generate a smart contract that defines the access limits (i.e., the access requirements and/or access key limits) associated with a user account. Upon receiving a transaction request subject to the access limits, the ledger transaction system 106 can use the smart contract to determine whether to accept or reject the transaction request. For example, the ledger transaction system 106 can utilize a smart contract to track the access of digital assets of a user account by a particular access key. When a transaction request that uses the access key is received, the ledger transaction system 106 can then use the smart contract to determine whether or not the access key limits for that access key have already been met.

Thus, by utilizing access limits, the ledger transaction system 106 provides additional security and flexibility relative to conventional systems. For example, by implementing access requirements with respect to digital assets, the ledger transaction system 106 prevents unwanted access to those digital assets. Additionally, by providing access key limits, the ledger transaction system 106 mitigates potential malicious access of digital assets upon a third party obtaining one or more access keys. Moreover, by allowing users to define a variety of different combinations of access limits (e.g., a threshold number of keys, rate limited keys, and/or value limited keys), the ledger transaction system 106 allows users accounts to flexibly allow different degrees of access (e.g., to different agents or for different purposes).

F. Transaction Events

Many conventional systems maintain one or more data repositories that store transactions for individual transactions (e.g., who received assets, who transmitted assets, the values of the assets exchanged, etc.). Upon execution of a transaction, the conventional systems may generate new entries for one or more of these data repositories to store the details of that transaction. The conventional systems may further user these data repositories to locate and provide transaction details.

However, conventional blockchain systems are often inefficient and inaccurate in tracking and reporting transaction details. For example, conventional blockchain systems often employ inefficient methods of providing transaction details in response to a query. To illustrate, in response to receiving a query from a client device for details associated with a particular transaction, many conventional systems provide header (e.g., summary) data for every block of transactions that has been executed. Subsequently, the conventional systems may provide transaction receipts for every transaction within a block identified by the client device as potentially containing the particular transaction. The conventional systems may then provide a list of log entries for a transaction identified from the transaction receipts by the client device as potentially containing the desired details. Accordingly, the conventional systems often utilize a significant amount of computing resources (e.g., processing time and power) to locate and transmit data that does not satisfy the query.

In addition to efficiency concerns, conventional blockchain systems are often inaccurate. In particular, many conventional systems utilize bloom filters to store and provide transaction details. Such bloom filters risk generating false positives when determining whether desired transaction details are included within the data stored therein. Accordingly, the conventional systems may inaccurately respond to a query for transaction details by providing data that is unrelated to the query. In addition, even though conventional systems can search for historical transactions, they do not provide negative proofs to establish the lack of transactions. For example, conventional systems cannot conclusively prove the absence of a transaction touching a particular count. This is a significant shortcoming inasmuch as many account holders within a distributed digital ledger transaction network often seek verification that no events have occurred with regard to digital assets within their accounts.

One or more embodiments of the ledger transaction system 106 utilize transaction events and an event data structure to accurately and efficiently provide transaction event details, including negative proofs establishing that events have not touched user accounts. As mentioned above, the ledger transaction system 106 can generate an event data structure that stores event data corresponding to transaction events. Upon execution of a transaction associated with a user account, the ledger transaction system 106 can generate one or more transaction events within the event data structure. Additionally, the ledger transaction system 106 can modify a count value of a transaction event counter corresponding to the user account. In one or more embodiments, the ledger transaction system 106 maintains a plurality of transaction event counters corresponding to a user account, where each transaction event counter tracks a count value for a particular class of transaction event. The ledger transaction system 106 can utilize the count values of the transaction event counter to provide transaction event data corresponding to transaction events specified in a request. In this manner, the ledger transaction system 106 can accurately and efficiently manage queries for transaction event data.

For example, consider, $E_i$, as the list of events emitted during the execution of $T_i$, (stored in an event Merkle tree as described in relation to FIG. 4). In some embodiments, the leaves of this event Merkle tree are tuples of the form (access path; data payload; counter value)$_j$. These tuples can be indexed by the order j in which the events were emitted. The authenticator for $E_i$ is included in TransactionInfo$_i$ (e.g., a transaction data structure). Thus, a validator can construct proofs that within the ith transaction the jth event was emitted on access path A, had counter value c, and had data payload p.

Clients can make use of these proofs to access events on a given access path. For example, suppose a client wants to know all events that have ever been emitted on access path A. The client holds a recent quorum certificate at version i. Using $S_i$, the client can make an authenticated query for c, the counter value of A at version i. For j∈0 . . . c the client can make an authenticated query for the event tuple emitted on A with counter j. The client can determine that there is exactly one such event since transaction execution generates events with sequential counter numbers. Therefore, proof that there exists some historical event emitted on A with counter j is sufficient as a proof that that event is the only such event.

This approach allows the client to hold an authenticated subscription to events on access path A. The client can periodically poll to determine if the subscription is up-to-date. For example, a client can use this to maintain a subscription to incoming payment transactions on an address it is watching.

At first glance, events might seem redundant. Instead of querying for the events emitted by a transaction $T_i$, a client could ask whether the transaction $T_i$ has been included in the digital ledger. However, this approach is error-prone because the inclusion of $T_i$ does not imply successful execution (e.g., it might have run out of gas). In a system where transactions can fail, an event provides evidence not only that a particular transaction has executed but also that it has successfully completed with the intended effect.

Figures 30A, 30B:
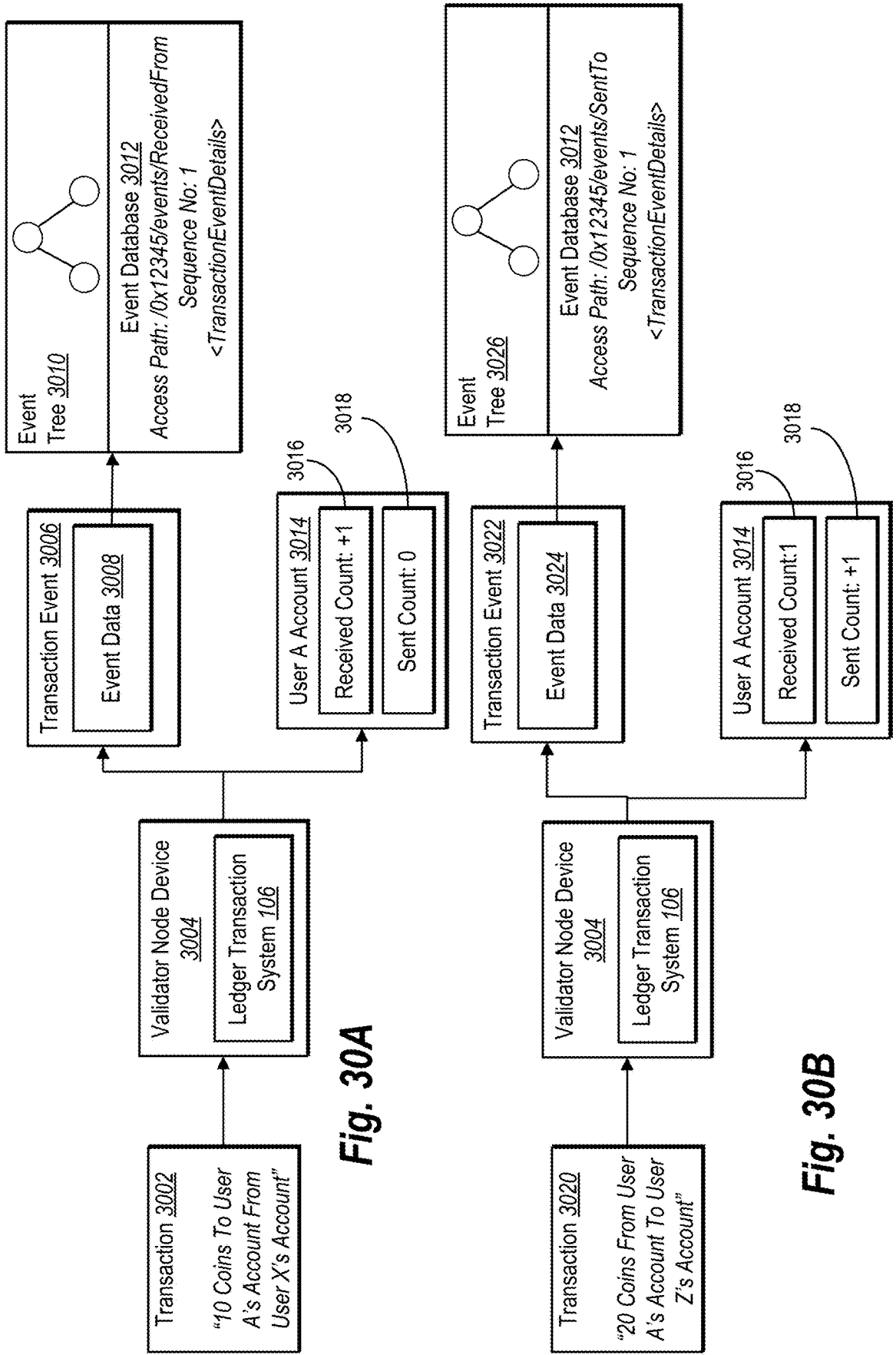
FIGS. 30A-30B illustrate a block diagram of the ledger transaction system generating transaction events in accordance with one or more embodiments.

As just mentioned, upon execution of a transaction, the ledger transaction system 106 can generate one or more transaction events. FIGS. 30A-30B illustrate a block diagram of the ledger transaction system 106 generating transaction events associated with a user account in accordance with one or more embodiments. In particular, FIG. 30A illustrates a transaction 3002 (moving "10 coins to User A's Account from User X's Account") and FIG. 30B illustrates a transaction 3020 (moving "20 coins from User A's Account to User Z's Account"). Though FIGS. 30A-30B illustrate the ledger transaction system 106 generating transaction events fort particular transaction types (e.g., receiving or sending currency), it should be noted that the ledger transaction system 106 can generate transaction events for any class of transaction (e.g., execution of a variety of smart contracts).

As shown in FIG. 30A, the ledger transaction system 106 (e.g., operating on a validator node device 3004) receives or otherwise identifies a transaction 3002 (e.g., within a block of transactions). For purposes of illustration, the transaction 3002 includes a transfer of coins to a particular user account. The ledger transaction system 106 executes the transaction 3002.

In response to execution of the transaction 3002, the ledger transaction system 106 generates the transaction event 3006. As shown in FIG. 30A, the transaction event 3006 includes event data 3008. As mentioned above, in one or more embodiments, the event data 3008 includes the address, within the state data structure, of the user account associated with the transaction event. In particular, the ledger transaction system 106 can include the address of the user account as part of an access path used to access the transaction event counter corresponding to the transaction event. To illustrate, the access path "/0x12345/events/ReceivedFrom" includes the address of the user account (i.e., "0x12345") and the transaction event counter to be accessed within the account (i.e., "events/ReceivedFrom").

The event data 3008 can further include the count value of the transaction event counter of the user account after the transaction event (also referred to as the "sequence number") and details of the transaction event. Examples of transaction event details can include, but are not limited to, the parties involved in the particular transaction event and the value represented by the transaction event (e.g., the value of the digital assets transferred via the transaction 3002). In one or more embodiments, the event data 3008 further includes the height of the transaction 3002 within the transaction tree.

In one or more embodiments, the ledger transaction system 106 generates the transaction event 3006 within an event data structure (e.g., as described above in relation to FIG. 4). In particular, the ledger transaction system 106 can add the event data 3008 to the event database 3012. Further, the ledger transaction system 106 can add the event data 3008 to an event tree 3010 (e.g., an event Merkle tree) corresponding to the transaction 3002. In particular, the ledger transaction system 106 can generate the event tree 3010 to reflect all transaction events corresponding to the transaction 3002. Specifically, in one or more embodiments, the ledger transaction system 106 adds a leaf node to the event tree 3010 for each transaction event corresponding to the transaction 3002.

In one or more embodiments, the ledger transaction system 106 adds the event data 3008 to the event tree 3010 by storing, within the leaf node corresponding to the transaction event 3006, a hash value corresponding to the event data 3008. For example, the ledger transaction system 106 can apply a hash function to the transaction event details of the event data 3008 and store the resulting hash value within the leaf node corresponding to the transaction event 3006. In some embodiments, the ledger transaction system 106 applies the hash function to the event data 3008 in its entirety and stores the resulting hash value within the leaf node.

In one or more embodiments, after generating the event tree 3010 corresponding to the transaction 3020, the ledger transaction system 106 determines the root value of the event tree 3010. As described above, the ledger transaction system 106 can determine the root value by iteratively combining and hashing node values beginning at the bottom of the event tree 3010 and moving upwards. The ledger transaction system 106 can then store the root value of the event tree 3010 within the transaction tree of the distributed digital ledger transaction network (e.g., as described above in relation to FIG. 5).

As shown in FIG. 30A, the ledger transaction system 106 further modifies a count value of the transaction event counter 3016 of the user account 3014 in response to (as part of) execution of the transaction 3002. In particular, the ledger transaction system 106 can access the transaction event counter 3016 via the state data structure using the access path that includes the address of the user account 3014. The ledger transaction system 106 can then modify the count value of the transaction event counter 3016 by incrementing the count value.

In one or more embodiments, the ledger transaction system 106 can provide the count value of the transaction event counter 3016 upon request. For example, the ledger transaction system 106 (via a validator node or full node) can receive an event count request (e.g., from one of the client devices 112a-112n or from one of the computer nodes 108a-108d). The event count request can include an access path, which includes the address of the user account 3014 and the transaction event counter 3016. In response to receiving the event count request, the ledger transaction system 106 can provide the count value of the transaction event counter.

Because of the different data structures utilized by the ledger transaction system 106, the ledger transaction system 106 can verify the existence of events (or a lack of events) based on the count values of an event counter. Indeed, as mentioned above (e.g., in relation to FIGS. 3-6), the ledger transaction system 106 can store event counters and corresponding count values within a state data structure (e.g., a state database and corresponding state Merkle tree). Moreover, the ledger transaction system 106 can determine a root of the state Merkle tree, utilize the root of the state Merkle tree in generating a transaction Merkle tree, and utilize a root of the transaction Merkle tree to get consensus on the digital ledger. Accordingly, the count values of event counters are verified as part of consensus across the distributed digital ledger transaction network. Thus, the event counters can provide an accurate proof of the events (or a lack of events) for an account.

In some embodiments, the ledger transaction system 106 can provide event details of the transaction event 3006 from the event data structure upon request. For example, the ledger transaction system 106 can receive a transaction event detail request (e.g., from one of the client devices 112a-112n or from one of the computer nodes 108a-108d). The transaction event detail request can include the count value of the transaction event counter and the access path used to access the transaction event counter. In response to receiving the transaction event detail request, the ledger transaction system 106 can provide the event data 3008 of the transaction event 3006 (e.g., the event details of the transaction event) from the event data structure. In one or more embodiments, the ledger transaction system 106 further provides a Merkle proof corresponding to the transaction event 3006 along with the event data 3008.

In one or more embodiments, the ledger transaction system 106 can provide a set of transaction event data corresponding to a sequence of events. For example, the ledger transaction system 106 can receive a transaction event sequence request for details regarding a sequence of transaction events corresponding to a user account. The transaction event sequence request can include the access path to the transaction event counter as well as a sequence of count values. The sequence of count values can correspond to a sequence of events corresponding to a user account. In response to receiving the transaction event sequence request, the ledger transaction system 106 can provide a set of transaction event data corresponding to the sequence of events.

To provide an example of providing transaction event data in response to a request, in one or more embodiments, the event data structure can include a transaction event index database. The transaction event index database can include a mapping between each transaction event tracked by a particular transaction event counter and the location of the transaction event data corresponding to the transaction events within the event data structure. In particular, the transaction event index database can map each transaction event to the particular transaction that triggered the transaction. Further, the transaction event index database can indicate the event number corresponding to that transaction event out of all transaction events triggered by that transaction.

In one or more embodiments, the transaction event detail request (or transaction event sequence request) can include an access path for the transaction event counter corresponding to the target transaction event as well as the sequence number corresponding to the transaction event. The ledger transaction system 106 can utilize the transaction event index data to identify the location of the transaction event data based on the access path of the transaction event counter and the sequence number of the transaction event.

The ledger transaction system 106 can subsequently retrieve and provide the transaction event data from the event data structure.

As illustrated by FIG. 30B, the state data structure can include multiple transaction event counters for the user account 3014. For example, each of the transaction event counters 3016, 3018 correspond to a particular transaction event type. For example, the transaction event counter 3016 corresponds to a first transaction event type (e.g., the user account 3014 receiving digital assets). Moreover, the transaction event counter 3018 corresponds to a second transaction event type (the user account 3014 transmitting digital assets). In response to executing a transaction that generates a transaction event, the ledger transaction system 106 can determine the transaction event type of the transaction event. The ledger transaction system can then modify the count value of the transaction event counter that corresponds to that transaction event type. Thus, the ledger transaction system 106 can maintain an accurate count of each class of transaction event that is associated with a particular user account.

Though FIGS. 30A-30B illustrate two transaction event counters corresponding to the user account 3014, the state data structure can include any number of transaction event counters corresponding to a user account. And the transaction event counters can correspond to a variety of transaction event types (e.g., different counters for different smart contracts). However, in some embodiments, the state data structure includes a single transaction event counter corresponding to a user account, and the ledger transaction system 106 increments the corresponding count value upon the generation of any transaction event type.

As the ledger transaction system 106 continues to execute transactions, the ledger transaction system 106 can generate transaction events and modify count values of the corresponding transaction event counters. For example, as shown in FIG. 30B, the ledger transaction system 106 (e.g., operating either on the validator node device 3004 or on another computer node of the distributed digital ledger transaction network) receives or otherwise identifies the transaction 3020. The transaction 3020 can be included in the same block of transactions or a different block of transactions as the transaction 3002. For purposes of illustration, the transaction 3020 includes a transfer of coins from a user account (i.e., the user account 3014). The ledger transaction system 106 executes the transaction 3020.

In response to execution of the transaction 3020, the ledger transaction system 106 generates the transaction event 3022. As mentioned above, in some embodiments, the ledger transaction system 106 generates the transaction event 3022 within the event data structure. In particular, the ledger transaction system 106 can add the event data 3024 of the transaction event 3022 to the event database 3012. Further, the ledger transaction system 106 can add the event data 3024 to an event tree 3026 (e.g., an event Merkle tree). As the transaction event 3022 corresponds to a different transaction (i.e., different from the transaction event 3006), the ledger transaction system 106 adds the event data 3024 to a different event tree (i.e., different from the event tree 3010). The ledger transaction system 106 generates the event tree 3026 based on transaction events corresponding to the transaction 3020 and stores data within the leaf nodes corresponding to those transaction events. As mentioned above, the ledger transaction system 106 can add the event data 3024 to the event tree 3026 by storing, within the leaf node corresponding to the transaction event 3022, a hash value corresponding to the event data 3024. The ledger transaction system 106 can store the root value of the event tree 3026 within the transaction tree of the distributed digital ledger transaction network.

In response to execution of the transaction 3020, the ledger transaction system 106 further modifies the count value of the transaction event counter 3018 of the user account 3014. In particular, the ledger transaction system 106 accesses the transaction event counter 3018 via the state data structure using the corresponding access path. The ledger transaction system 106 then increments the count value of the transaction event counter 3018.

Figure 31:
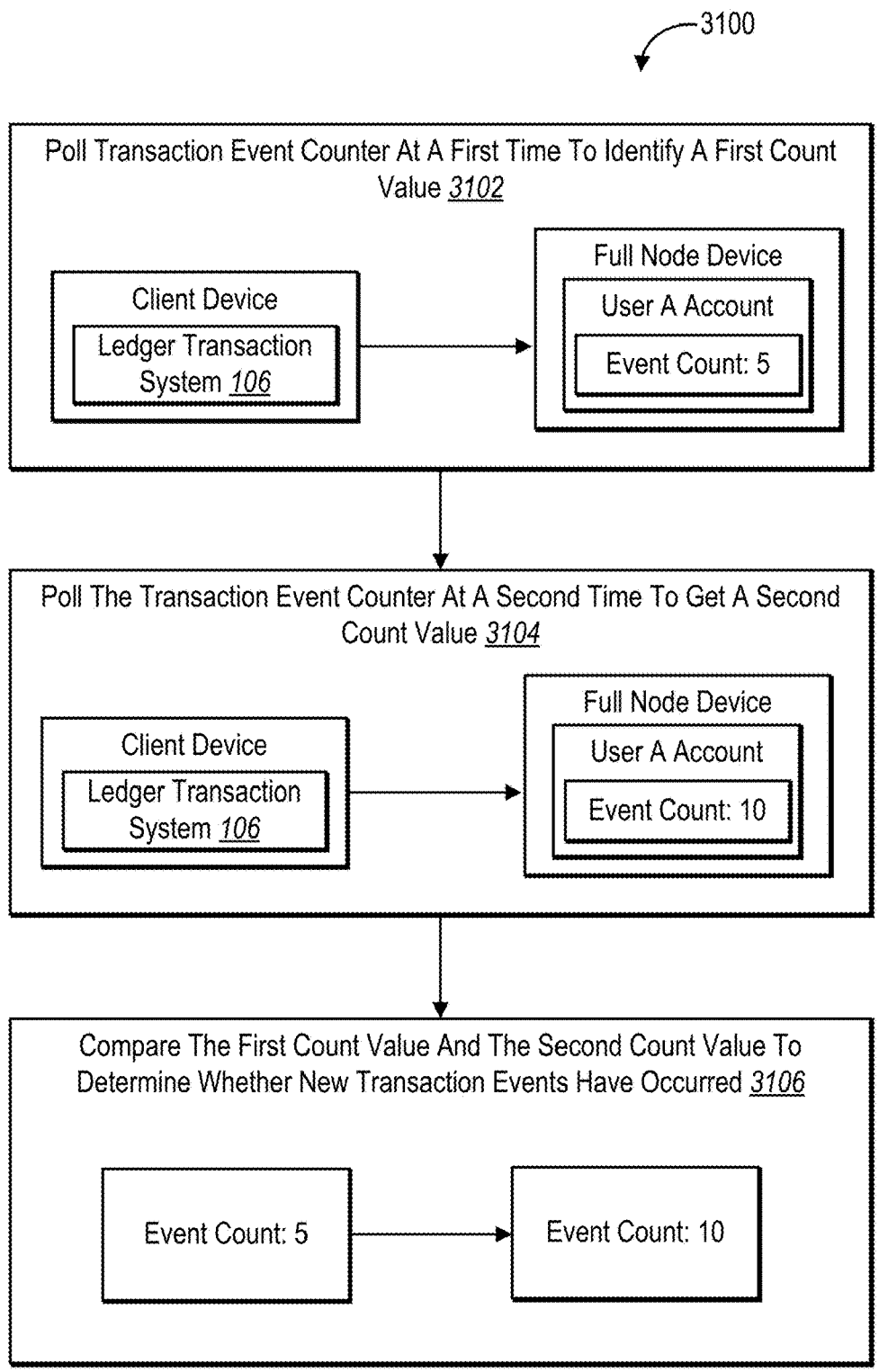
FIG. 31 illustrates a series of acts for determining new transaction events corresponding to a user account in accordance with one or more embodiments.
Figure 32:
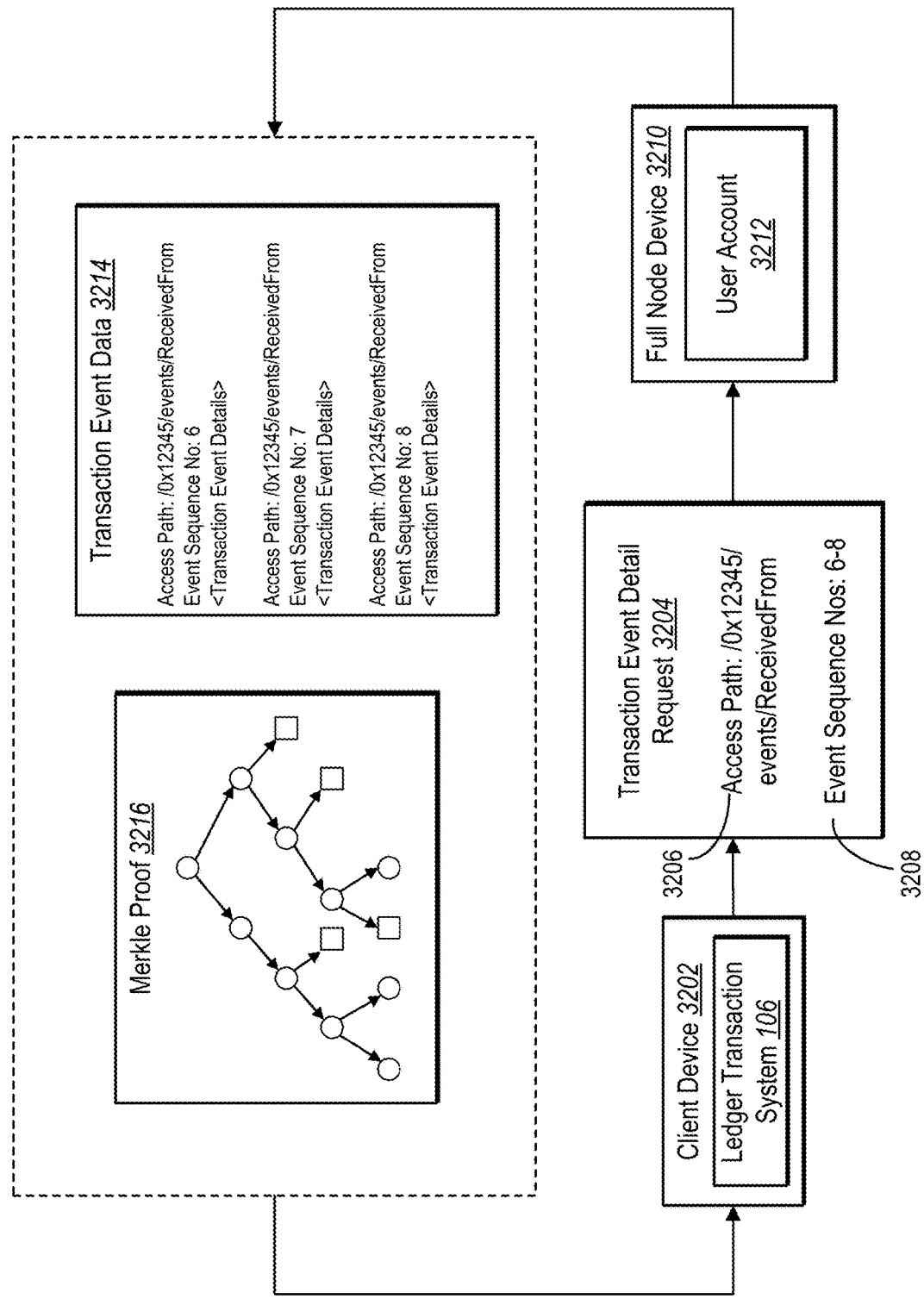
FIG. 32 illustrates a block diagram for retrieving event details for a sequence of events in accordance with one or more embodiments.

As mentioned above, the ledger transaction system 106 can manage queries for transaction event data. As further mentioned, the ledger transaction system 106 can be implemented in whole, or in part, by any of the individual elements of distributed digital ledger transaction network. For example, while much of the disclosure discusses the ledger transaction system 106 as implemented on one of the computer nodes 108a-108d of the distributed digital ledger transaction network, the ledger transaction system 106 can also be implemented on one or more of the client devices 112a-112n (e.g., as part of the client device). As such, in one or more embodiments, the ledger transaction system 106 (or one or more components thereof) implemented on a client device can detect the occurrence of new transaction events and generate requests for transaction event data corresponding to those transaction events. FIGS. 31-32 illustrates the ledger transaction system 106 monitoring transaction event updates and retrieving transaction event data in accordance with one or more embodiments.

FIG. 31 shows an example of a series of acts 3100 for determining the occurrence of new transaction events corresponding to a user account in accordance with one or more embodiments. Though FIG. 31 shows the ledger transaction system 106 performing one or more acts from the series of acts 3100 by communicating with a full node device, it should be noted that the ledger transaction system 106 can perform the one or more acts by communicating with any computer node of the distributed digital ledger transaction network. Further, though, FIG. 31 shows the ledger transaction system 106 performing the series of acts 3100 at a client device, the ledger transaction system 106 can also perform the series of acts 3100 at another device of the distributed digital ledger transaction network (e.g., one of the computer nodes 108a-108d).

As illustrated by FIG. 31, the ledger transaction system 106 can perform the act 3102 of polling a transaction event counter at a first time to identify a first count value. For example, in one or more embodiments, the ledger transaction system 106 submits an event count request for the first count value to a computer node storing the state data structure. In particular, the ledger transaction system 106 submits the event count request to a computer node that stores the most current state data structure, which includes the most current count value for a transaction event counter corresponding to a user account. In one or more embodiments, the event count request for the first count value includes an access path, identifying the address of the user account of the state data structure and the transaction event counter. In response to polling the transaction event counter, the ledger transaction system 106 can determine the count value of the transaction event counter at the first time.

As shown in FIG. 31, the ledger transaction system 106 also performs the act 3104 of polling the transaction event counter at a second time to get a second count value. For example, in one or more embodiments, the ledger transaction system 106 submits an additional event count request for the second value to a computer node storing the state data structure. The computer node can be the same computer node to which the ledger transaction system 106 submitted the event count request for the first count value or a different computer node of the distributed digital ledger transaction network. In response to polling the transaction event counter, the ledger transaction system 106 can determine the count value of the transaction event counter at the second time.

Further, as shown in FIG. 31, the ledger transaction system 106 performs the act 3106 of comparing the first count value and the second count value to determine whether new transaction events have occurred. For example, in comparing the first count value and the second count value, the ledger transaction system 106 can determine a difference in the count values (e.g., the second count value is higher than the first count value). The ledger transaction system 106 can determine, based on the difference in count values, that at least one new transaction event has occurred.

In some embodiments, however, the ledger transaction system 106 can compare the first count value and the second count value and determine that the first count value and the second count value are the same count value. By determining that the count values are the same, the ledger transaction system 106 can verify that there is an absence transaction events corresponding to the user account between the first time and the second time. In other words, by periodically polling a transaction event counter, the ledger transaction system 106 can provide a negative proof that transaction events of a particular type have not occurred with regard to a particular account.

In one or more embodiments, based on comparing the first count value of the transaction event counter at the first time and the second count value of the transaction event counter at the second time, the ledger transaction system 106 determines or identifies a sequence of count values. In particular, a sequence of count values can include a difference of count values greater than one. A sequence of account values indicates that a sequence of events corresponding to the user account have occurred via the distributed digital ledger transaction network.

In some embodiments, the ledger transaction system 106 can poll for transaction event updates without submitting multiple requests. In particular, the ledger transaction system 106 can submit a request to a computer node or configure a user account of the state data structure to provide a notification whenever a transaction event or sequence of events associated with the user account is generated. In further embodiments, the ledger transaction system 106 can submit a request to a computer node or configure the user account to provide transaction event updates periodically.

In addition to polling for transaction event updates, the ledger transaction system 106 can operate on a client device (or other device on the distributed digital ledger transaction network) to retrieve event details for one or more transaction events associated with a user account. FIG. 32 illustrates a block diagram for retrieving event details for transaction events in accordance with one or more embodiments. Though FIG. 32 illustrates the ledger transaction system 106 retrieving event details for a sequence of events, it should be noted that the ledger transaction system 106 can function similarly to retrieve event details for a single transaction event.

As shown in FIG. 32, the ledger transaction system 106 (e.g., operating on the client device 3202) transmits a transaction event detail request 3204 for transaction event data associated with a user account 3212 of the distributed digital ledger transaction network. The ledger transaction system 106 submits the transaction event detail request 3204 to a computer node (e.g., the full node device 3210) of the distributed digital ledger transaction network. In one or more embodiments, the ledger transaction system 106 transmits the transaction event detail request 3204 in response to polling a transaction event counter and determining that at least one new transaction event associated with the user account 3212 has occurred. In some embodiments, however, the ledger transaction system 106 submits the transaction event detail request 3204 as part of an independent request for event details (e.g., a request for event details without polling the transaction event counter).

Further, in some embodiments, the ledger transaction system 106 transmits the transaction event detail request 3204 to the same computer node to which the ledger transaction system 106 transmitted the event count request for count values. In particular, in one or more embodiments, the event count request submitted for polling the transaction event counter and the transaction event detail request are part of a combined request to the computer node. For example, a client device can submit a request that indicates if a change in event count is detected the transaction event details should be returned to the client device. In some embodiments, however, the ledger transaction system 106 transmits the transaction event detail request 3204 to a different computer node.

The transaction event detail request 3204 can include an access path 3206 of the transaction event counter corresponding to the user account 3212 and a count value of the transaction event counter. However, as shown in FIG. 32, the transaction event detail request 3204 can include a sequence of count values 3208 in addition to, or instead of, a single count value. Indeed, a transaction event detail request 3204 can include a transaction event sequence request for event details corresponding to a sequence of events.

As shown in FIG. 32, the full node device 3210 has access to the user account 3212 corresponding to the transaction event detail request 3204. In particular, in one or more embodiments, the computer node stores the state data structure (i.e., the most current state data structure) of the distributed digital ledger transaction network. Further, the computer node can store the event data structure storing the transaction event data as well as any other data structure of the distributed digital ledger transaction network.

In response to transmitting the transaction event detail request 3204, the ledger transaction system 106 can receive, via a computer node of the distributed digital ledger transaction network, the transaction event data 3214. In particular, as shown in FIG. 32, the transaction event data 3214 includes a set of transaction event data corresponding to a plurality of events. The transaction event data 3214 can include data retrieved from the event data structure. Specifically, as shown in FIG. 32, the transaction event data 3214 can include the access path of the transaction event counter corresponding to each transaction event. The transaction event data 3214 can further include the count value of the transaction event counter (labeled as the "event sequence no.") when the corresponding transaction event occurred. Additionally, the transaction event data 3214 can include the transaction event details corresponding to the particular transaction event.

As shown in FIG. 32, the ledger transaction system 106 can further generate a Merkle proof 3216 as part of the transaction event data 3214 (though shown separately). Indeed, as mentioned, the event data structure can include an event Merkle tree and the state data structure can include a state Merkle tree. The ledger transaction system 106 can utilize the Merkle proof to verify that the transaction event data 3214 is accurate. Additional detail regarding generating a Merkle proof is provided above.

In one or more embodiments, the ledger transaction system 106 receives the transaction event data 3214 from the full node device 3210 (i.e., the same computer node to which the ledger transaction system 106 submitted the transaction event detail request 3204). In some embodiments, however, the ledger transaction system 106 receives the transaction event data 3214 from a different computer node of the distributed digital ledger transaction network. In further embodiments, the ledger transaction system 106 receives the transaction event data 3214 from multiple computer nodes of the distributed digital ledger transaction network (e.g., receives different components of the transaction event data 3214 from different computer nodes).

In one or more embodiments, the ledger transaction system 106 compares the set of transaction event data corresponding to the plurality of events with the sequence of count values 3208. In particular, the ledger transaction system 106 can utilize the comparison to determine satisfaction of the transaction event detail request 3204. For example, based on the comparison, the ledger transaction system 106 can determine whether the plurality of events included in the transaction event data 3214 includes a complete set of the sequence of events associated with the transaction event detail request 3204 or an incomplete set. To illustrate, if the plurality of events is missing data for a transaction event having a sequence number included in the sequence of count values 3208 of the transaction event detail request 3204, the ledger transaction system 106 can determine that the plurality of events is incomplete.

Although the foregoing examples illustrate particular transactions, events, and requests, the ledger transaction system 106 can identify a variety of different events with regard to a variety of different transactions through a variety of different requests. For example, in addition to (or in the alternative to) repeatedly polling a transaction event counter, a client device can monitor a transaction event counter by sending a single call to a computer node to inform the client device when a transaction event counter has changed. Similarly, rather than polling a transaction event counter and then transmitting an event detail request, a client device can send a single call to both monitor a transaction event counter and then return transaction event details upon determining a change to the transaction event counter. Thus, the system can monitor a transaction event counter and (in response) receive transaction event details reflecting a change to the transaction event counter.

By maintaining, at a computer node, transaction event counters that track the occurrence of particular transaction events, the ledger transaction system 106 can provide transaction event data more efficiently than conventional systems. In particular, the ledger transaction system 106 can receive transaction event detail requests that specify the transaction events for which event details should be provided. Accordingly, the ledger transaction system 106 can locate and provide the precise event details requested, reducing the amount of computing resources (e.g., processing time and power) required to respond to a query. By specifying, at a client device, the particular transaction events for which event details are desired when submitting a query, the ledger transaction system 106 avoids utilizing significant amounts of computing resources typically required to analyze the excessive amounts of data received in response to the query.

Further, the ledger transaction system 106 is more accurate than conventional systems. Specifically, by maintaining transaction event counters, the ledger transaction system 106 can more accurately provide, to a client device, updates to the occurrence of transaction events. Indeed, the ledger transaction system 106 avoids providing the false positives that are possible under conventional systems. Further, by polling, at a client device, a transaction event counter corresponding to a user account of a state data structure stored at a computer node, the ledger transaction system 106 can obtain negative proofs and accurately determine whether new transaction events have occurred. Specifically, by determining that a count value has not changed in response to polling the transaction event counter, the ledger transaction system 106 can accurately determine the absence of new events corresponding to a user account.

V. Consensus

A. Overview

Figure 33:
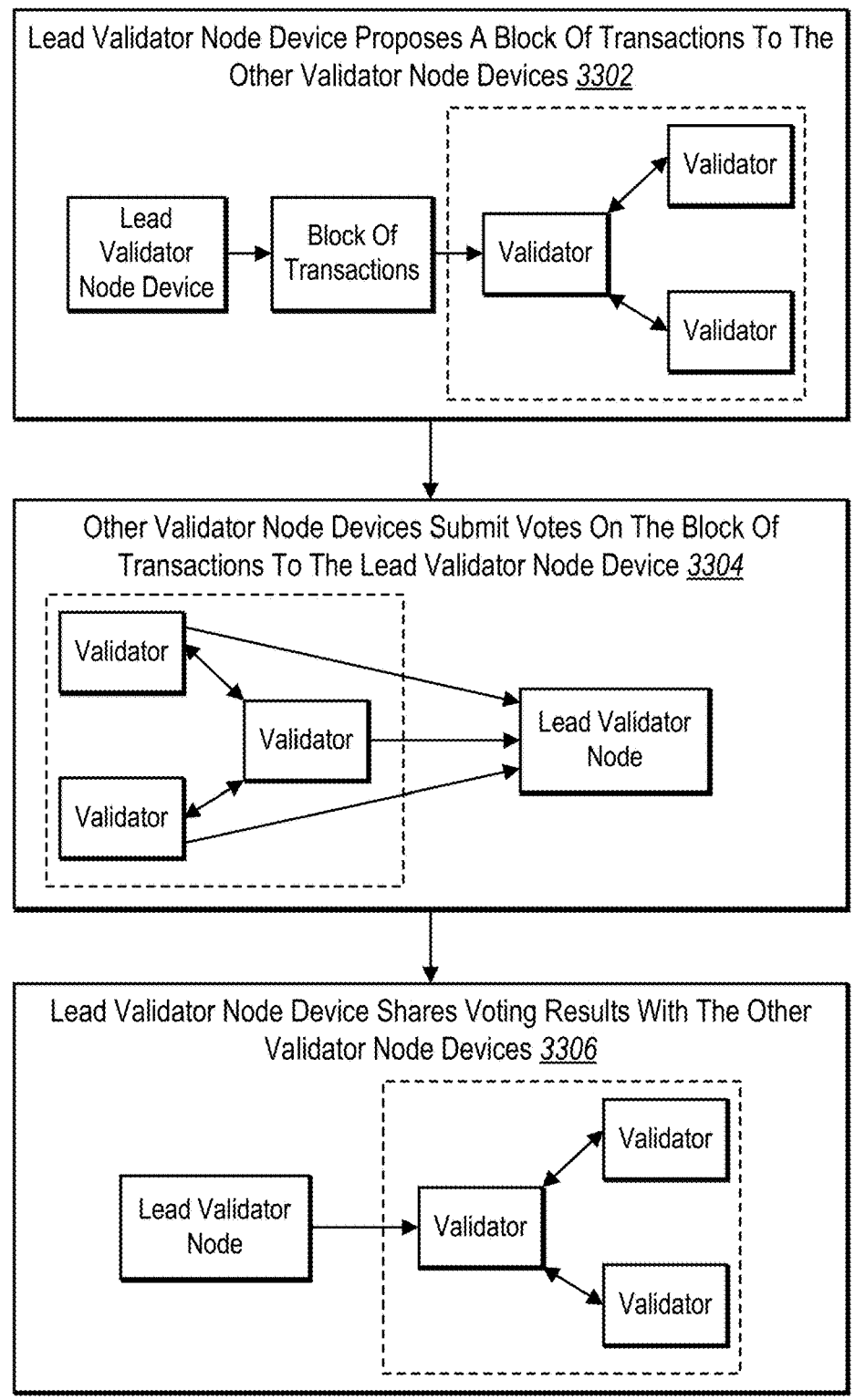
FIG. 33 illustrates a block diagram of the ledger transaction system utilizing validator node devices to achieve consensus in accordance with one or more embodiments.

As mentioned above, the ledger transaction system 106 can utilize validator node devices of the distributed digital ledger transaction network to implement a consensus protocol that concludes in committing execution results of a transaction block to storage. FIG. 33 shows a block diagram of the ledger transaction system 106 using validator node devices to achieve consensus in accordance with one or more embodiments. As shown in FIG. 33, the ledger transaction system 106 performs an act 3302 of utilizing a lead validator node device to propose a block of transactions to the other validator node devices. The ledger transaction system 106 then performs an act 3304 of utilizing the validator node devices to submit votes on the block of transactions to the lead validator node device. Subsequently, the ledger transaction system 106 performs an act 3306 of utilizing the lead validator node device to share the voting results with the other validator node devices. If consensus has been achieved, the ledger transaction system 106 can commit the execution results to storage.

As discussed previously, in some embodiments, the ledger transaction system 106 utilizes a modified HotStuff protocol for consensus, as described by M. Yin, D. Malkhi, M. K. Reiter, G. G. Golan, and A. Ittai, "Hotstuff: Bft consensus in the lens of blockchain," arXiv preprint arXiv:1803.05069 (2018), which is incorporated by reference herein in its entirety. The ledger transaction system 106 can improve on this protocol in a variety of ways. For example, the ledger transaction system 106 the ledger transaction system 106 can vote, at the validator node devices, on the results of executing a transaction block rather than the transaction block itself. By having validators collectively sign the full resulting state of the block (rather than just the sequence of transactions), the ledger transaction system 106 is more resistant to non-determinism bugs. This approach also allows clients to use quorum certificates to authenticate reads from the database.

In addition, the ledger transaction system 106 can utilize a pacemaker that emits explicit timeouts, and validators rely on a quorum of those to move to the next round (without requiring synchronized clocks). Moreover, the ledger transaction system 106 can implement an unpredictable leader election mechanism in which the leader of a round is determined by the proposer of the latest committed block using a verifiable random function. This mechanism limits the window of time in which an adversary can launch an effective DoS attack against a leader. Furthermore, the ledger transaction system 106 uses aggregate signatures that preserve the identity validators who sign quorum certificates. This allows the ledger transaction system 106 to provide incentives to validators that contribute to quorum certificates without requiring a complex threshold key setup.

In addition, as mentioned, the ledger transaction system 106 can provide for pipelining of the consensus protocol. Further, the ledger transaction system 106 can implement security measures that enable the validator node devices to correctly resume the consensus protocol, allowing for stability on the distributed digital ledger transaction network even after all of the computer nodes have crashed. Additionally, the ledger transaction system 106 can utilize smart contracts to manage voting rights among the validator node devices. In this manner, the ledger transaction system 106 can improve the accuracy and efficiency of consensus, as will be discussed in greater detail below.

B. Performing Consensus on Execution Results

Many conventional blockchain systems perform consensus with regard to blocks of transactions. After achieving consensus, the conventional systems utilize computing devices participating in the network to execute the agreed-upon transactions and commit the execution results to storage. This method of post-consensus execution, however, can introduce inaccuracies in the stored execution results. For example, implementing post-consensus execution of transaction blocks assumes that the execution will be deterministic. In other words, the conventional systems often assume that every computer node will obtain the same results by executing the same block of transactions. However, technical bugs or errors in execution can result in execution result differences among the different computer nodes. Accordingly, some computer nodes store different versions of the digital ledger, providing an inaccurate portrayal of the digital ledger across the network.

Figure 34:
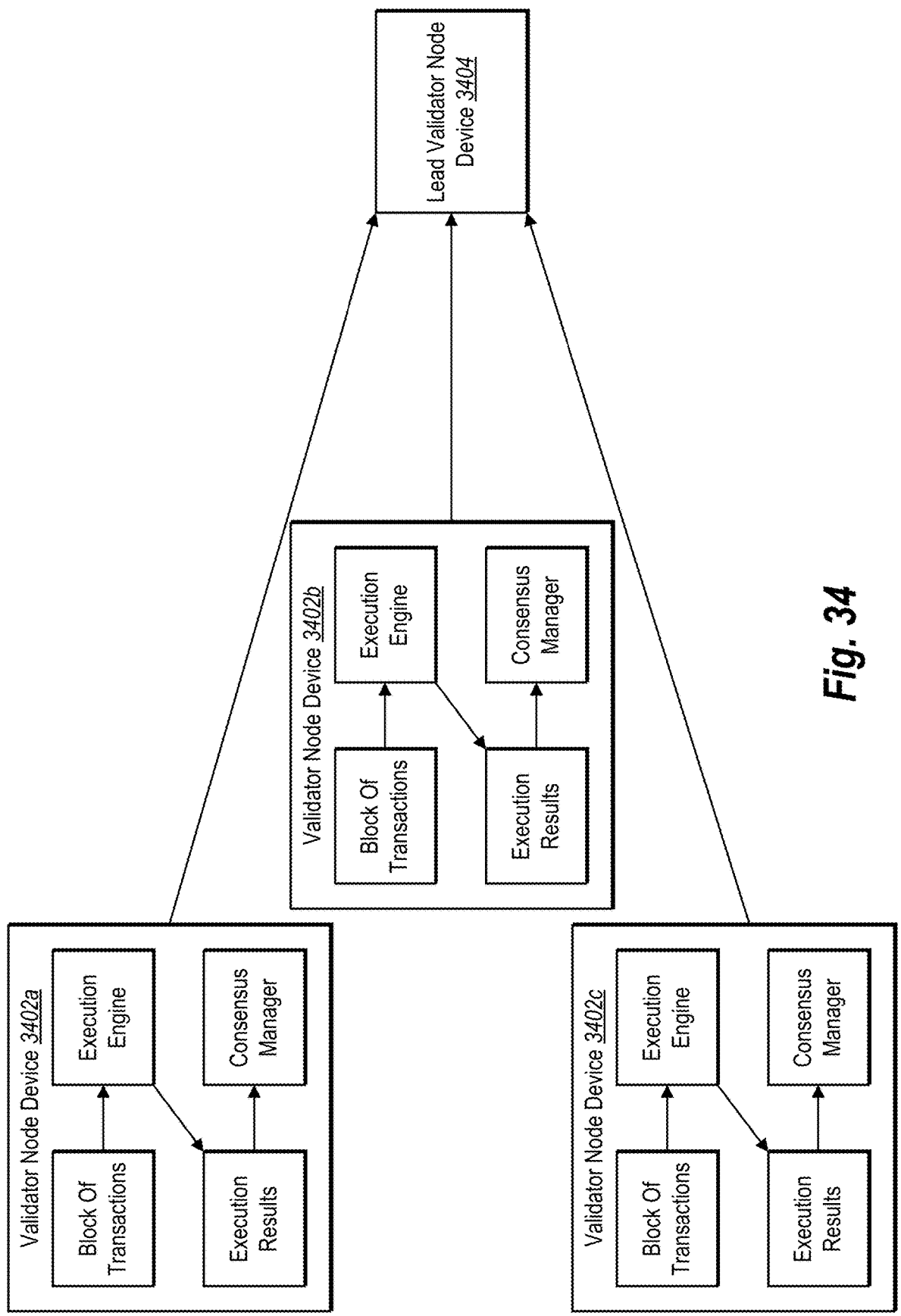
FIG. 34 illustrates a block diagram of the ledger transaction system performing consensus on execution results in accordance with one or more embodiments.

As mentioned above, one or more embodiments of the ledger transaction system 106 perform consensus on execution results. Indeed, FIG. 34 illustrates a block diagram of the ledger transaction system 106 performing consensus on execution results in accordance with one or more embodiments. In particular, as shown in FIG. 34 and as described above, the ledger transaction system 106 can, at the validator node devices 3042a-3042c, receive a block of transactions from the lead validator node device 3404, execute the block of transactions and vote on the execution results. Upon determining that the execution results have achieved consensus (e.g., that votes on the execution result from validator nodes satisfies a consensus threshold), the ledger transaction system 106 can commit the results to storage at each of the validator node devices 3402a-3402c.

By achieving consensus on the execution results of transactions, rather than the transactions themselves, the ledger transaction system 106 operates more accurately. Indeed, the ledger transaction system 106 anticipates the possibility of non-deterministic execution of transactions at the validator node devices. Accordingly, the validator node devices only write execution results that have been agreed upon into storage, allowing for a more accurate representation of the digital ledger across the distributed digital ledger transact network.

C. Pipelining Consensus

Additionally, as mentioned above, one or more embodiments of the ledger transaction system 106 integrate methods of pipelining into the consensus process. In particular, the ledger transaction system 106 can implement a contiguous 3-chain commit rule as part of the consensus protocol. In particular, utilizing this approach a block at round n (and its full history of blocks) is committed when the "contiguous 3-chain" commit rule is met. Namely, if there exists a chain of three blocks with respective quorum certificates at contiguous rounds n, as well as subsequent rounds n+1, n+2, then the block at round n and previous linked blocks are committed. The commit rule eventually allows honest validators to commit a block. For instance, suppose a malicious validator hides a quorum certificate that causes a commit of $B_0$. $B_0$ will eventually be committed, but it could take some time. This approach (as part of the byzantine fault tolerance approach) can guarantee that all honest validators will eventually accept a common history up to that block to avoid any possibility of forks.

Figure 35:
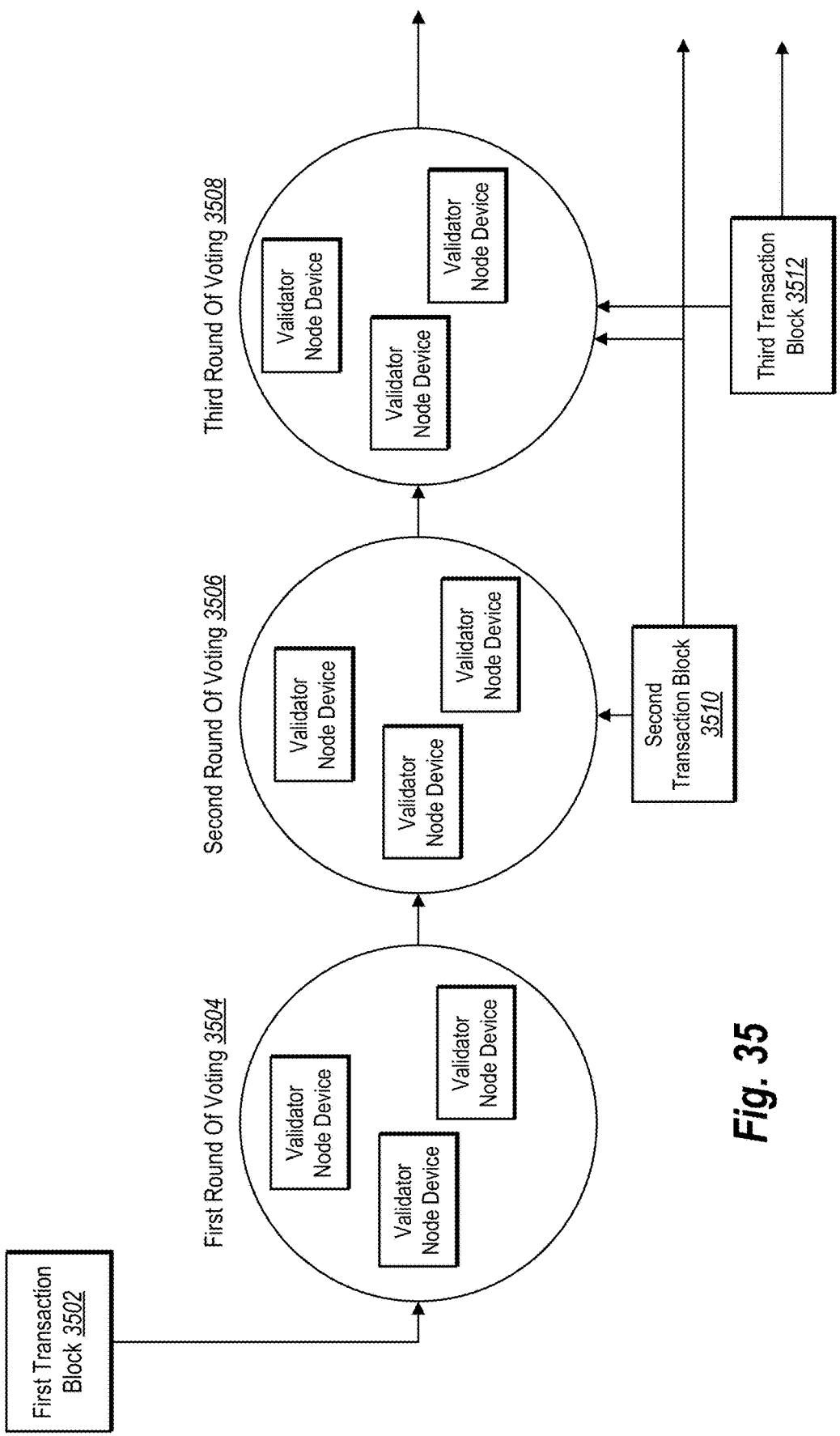
FIG. 35 illustrates a block diagram of the ledger transaction system utilizing pipelining for consensus in accordance with one or more embodiments.

FIG. 35 illustrates a block diagram of the ledger transaction system 106 utilizing pipelining for consensus in accordance with one or more embodiments. As shown in FIG. 35, the ledger transaction system 106 can utilize multiple rounds of consensus before committing a transaction block (i.e., the execution results of the transaction block) to storage. In particular, as shown, the ledger transaction system 106 takes a first transaction block 3502 through a first round of voting 3504, a second round of voting 3506, and a third round of voting 3508. Indeed, upon receiving 2f+1 votes agreeing upon the first transaction block 3502 from each voting round, the ledger transaction system 106 can commit the first transaction block 3502 to storage. In some embodiments, the ledger transaction system 106 generates a new consensus certificate with each round of voting. In some embodiments, however, the ledger transaction system 106 generates the consensus certificate for a transaction block after the third round of voting (i.e., when the transaction block is ready to be committed). In one or more embodiments, the ledger transaction system 106 utilizes more or less voting rounds.

As shown in FIG. 35, with each new round of voting, the ledger transaction system 106 begins voting on a new transaction block (i.e., voting on a new authenticated data structure reflecting a new state resulting from execution of the new transaction block). For example, as shown, the ledger transaction system 106 begins voting on a second transaction block 3510 during the second round of voting 3506 and begins voting on a third transaction block 3512 during the third round of voting 3508.

In one or more embodiments, the validator node devices do not expressly vote separately on transaction blocks during a given round of voting. Rather, as discussed above, validator nodes can vote on an authenticated data structure that reflects current and historical transactions and/or states. Thus, by voting on a transaction block during a given round of voting, the validator node devices implicitly vote for the preceding transaction blocks. Indeed, as mentioned above, when voting on a transaction block to reach consensus, the validator node devices can vote on the root value of the transaction tree resulting from execution of the transactions within the transaction block. Accordingly, the validator node devices vote on the entire history of the digital ledger (i.e., the entire transaction tree). This history of the digital ledger inherently includes the execution results obtained from executing the transactions within the previous transaction blocks. Thus, in one or more embodiments, by voting on the second transaction block 3510 during the second round of voting 3506, the validator node devices implicitly vote on the first transaction block 3502. Similarly, by voting on the third transaction block 3512 during the third round of voting 3508, the validator node devices implicitly vote on the second transaction block 3510 and the first transaction block 3502 (and every preceding transaction block).

As shown in FIG. 35, the ledger transaction system 106 can obtain consensus on the states resulting from execution of each transaction block. Moreover, the ledger transaction system 106 can commit resulting authenticated data structures to memory. For instance, after obtaining consensus on a first authenticated data structure (after the first round of voting 3504), obtaining consensus on a second authenticated data structure (after the second round of voting 3506) and obtaining consensus on a third authenticated data structure (after the third round of voting 3608) the ledger transaction system 106 can commit the first authenticated data structure to memory.

By utilizing multiple rounds of voting before committing state reflecting a transaction block to storage, the ledger transaction system 106 provides security against changes to the transaction block. Indeed, with each round of voting, the agreed upon execution results (and how those execution results modify the transaction tree) become more stable. Specifically, the execution results of a particular transaction block receive stronger confirmation with regard to their validity. Thus, the ledger transaction system 106 can use pipelining to improve safety/accuracy of states (prior to committing states to memory) and prevent the occurrence of hard forks.

D. Safety Upon a System Restart

Figure 36:
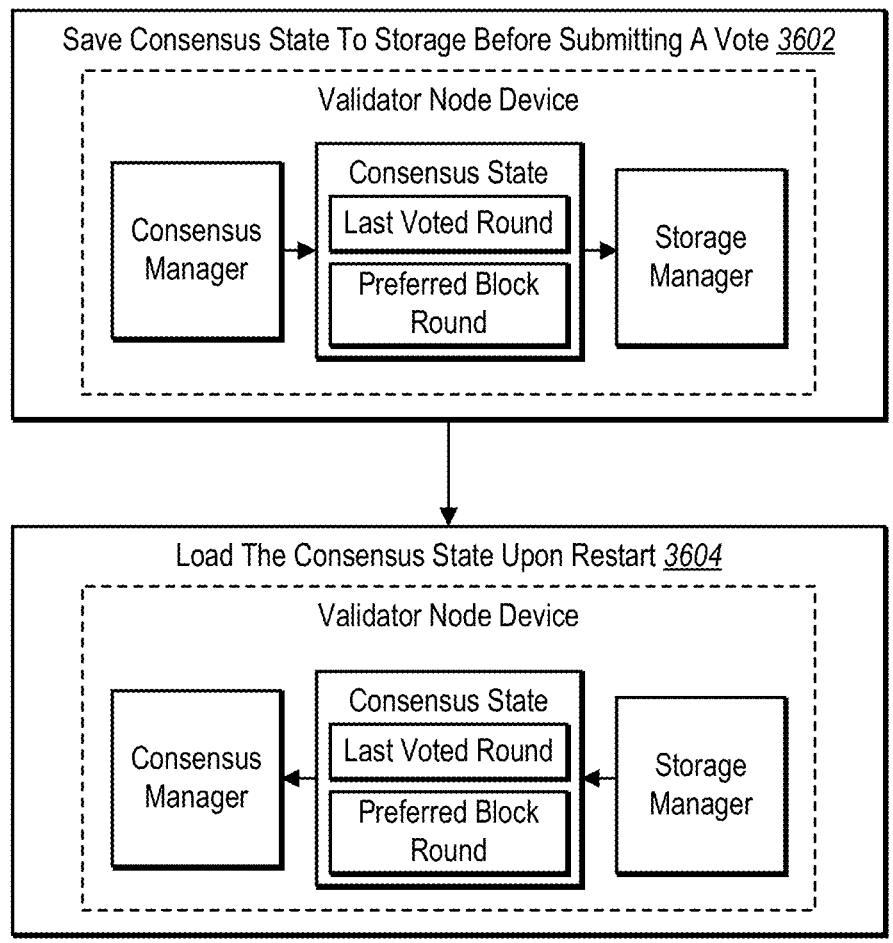
FIG. 36 illustrates a block diagram utilizing a consensus state to provide consensus safety in the event of a system restart in accordance with one or more embodiments.

In one or more embodiments, the ledger transaction system 106 further improves safety of the digital ledger by utilizing consensus restart rules that preserve consensus safety, even against a system reboot. Indeed, the ledger transaction system 106 can reduce the risk of a hard fork, even upon the reboot of all of the honest validator nodes on the distributed digital ledger transaction network. FIG. 36 illustrates a block diagram of the ledger transaction system 106 operating to provide safety against a system restart in accordance with one or more embodiments.

As shown in FIG. 36, the ledger transaction system 106 performs an act 3602 of saving the consensus state to storage before submitting a vote. Specifically, each validator node device generates and stores the consensus state of that validator node device. The consensus state can include last voted round data and preferred block round data. In particular, the last voted round data includes data regarding the last voting round in which the particular validator node device voted (i.e., the last voting round for which the validator node device voted on a transaction block). The preferred block round data can include data regarding the head transaction block of a two-chain of consecutive transaction blocks, the two-chain of transaction blocks including the transaction blocks that have consensus certificates to the last committed transaction block. In some embodiments, the ledger transaction system 106 stores the last committed transaction block (i.e., the root value of the transaction tree resulting from the last committed transaction block) and its two-chain (i.e., the transaction blocks that carry the consensus certificate to the last commit). In one or more embodiments, upon submitting a vote in a round of voting, the ledger transaction system 106 updates the consensus state in storage.

As shown in FIG. 36, the ledger transaction system 106 can also perform an act 3604 of loading the consensus state upon restart. Indeed, the ledger transaction system 106 can store a consensus restart rule at the validator node that requires loading the consensus state upon restart (and prior to any additional voting). Upon restart, the validator node can apply the consensus restart rule and load their respective saved consensus state upon a restart. The validator node devices can then continue participating in consensus based on their loaded consensus state.

To provide an example of the recovery process, in one or more embodiments, the ledger transaction system 106 recovers the consensus state upon system restart. In some embodiments, the ledger transaction system 106 can further recover the stored transaction blocks and quorum certifications mentioned above. The ledger transaction system 106 can then recover the last ledger information recorded in the state data structure. The ledger transaction system 106 can utilize the last ledger information as the root of a newly restarted tree (e.g., state tree). The ledger transaction system 106 can then rebuild the tree from all the transaction blocks stored by the consensus manager in anticipation of a system restart using a given root.

Thus, the validator node devices can continue participating in consensus without violating safety. For example, by having a validator node device store consensus states and load the consensus states upon restart (in accordance with consensus restart rules imposed at each validator node), the ledger transaction system 106 prevents a validator node device voting in a voting round in which the validator node device already participated (i.e., voting on a transaction block twice). Further, the ledger transaction system 106 prevents a validator node device from voting on a transaction block from a previous voting round. The ledger transaction system 106 can also avoid malicious attacks that seek to undermine consensus across validator nodes when restarting. Accordingly, the ledger transaction system 106 can improve (or guarantee) safety, even against the restart of all validator node devices in the distributed digital ledger transaction network.

E. Managing Epochs of Voting Rights

As mentioned above, the ledger transaction system 106 can utilize validator node devices to achieve consensus with regard to transaction blocks. In one or more embodiments, the ledger transaction system 106 implements stake-based voting to determine which computer nodes participate as validator node devices. In one or more embodiments, the ledger transaction system 106 determines which computer nodes participate as validator node devices based on the user accounts of the distributed digital ledger transaction network. For example, in some embodiments, the ledger transaction system 106 provides user accounts that own digital assets (e.g., Coin resources) with votes to choose the validator node devices (i.e., stake-based voting). The ledger transaction system 106 can, in some embodiments, provide votes based on the value of the digital assets held by each account (e.g., more votes for owning digital assets of higher value). The ledger transaction system 106 can maintain a vote index that maps the addresses of potential validator node devices with the number of votes submitted for those validator node devices. In one or more embodiments, the ledger transaction system 106 selects a predetermined number of validator node devices based on the addresses having the highest votes according to the vote index.

In one or more embodiments, upon initialization, the vote index maintained by the ledger transaction system 106 includes a single user account with a number of votes that corresponds to the total value of digital assets (e.g., the total value of the Coin resources) in the distributed digital ledger transaction network. In some embodiments, the single user account is associated with one or more authorized devices. Having all available votes, the authorized devices can select the initial set of validator node devices. As digital assets are transferred to other user accounts, however, those user account obtain votes to select validator node devices.

In one or more embodiments, the ledger transaction system 106 utilizes a smart contract (e.g., a module) to implement and manage the stake-based voting. Indeed, in some embodiments, when a user account votes for validator node devices, the ledger transaction system 106 locks (i.e., disables access to) the digital assets associated with the votes submitted (i.e., "locks" the digital assets). The ledger transaction system 106 can utilize a smart contract to manage the locked digital assets (e.g., an amount or timing of locked digital assets). The ledger transaction system 106 can further utilize the smart contract to provide penalties to user accounts that act maliciously (e.g., by extracting a fee from the locked digital assets associated with user accounts that act maliciously). For example, if a validator node devices violates one or more validator rules, the ledger transaction system 106 can penalize validator node devices that act maliciously (e.g., by withholding locked digital assets of the user account).

Additionally, the ledger transaction system 106 can utilize the smart contract to implement and/or modify a "cool-off" period. Indeed, in one or more embodiments, the ledger transaction system 106 utilizes the validator node devices voted for by user accounts to participate in consensus for one epoch. In some embodiments, the ledger transaction system 106 avoids releasing locked digital assets of user account at the end of an epoch (i.e., when the validator set changes) to discourage malicious behavior near the end of the epoch. Rather, the ledger transaction system 106 implements a "cool-off" period (e.g., one additional epoch) and, at the end of the cool-off period, releases the locked digital assets.

In one or more embodiments, the ledger transaction system 106 can also utilize the smart contract to implement changes to the stake-based voting. Indeed (based on the parameters of the smart contract and consensus of the distributed digital ledger transaction network), the ledger transaction system 106 can implement changes that configure the smart contract to modify the stake-based voting. For example, ledger transaction system 106 can utilize the smart contract to adjust the length of the cool-off period or adjust the penalties extracted from user accounts that have acted maliciously. Although the foregoing description mentions various parameters that the ledger transaction system 106 can manage or modify by smart contract, the ledger transaction system 106 can utilize smart contracts to manage and/or modify various additional features, such as selected validator nodes, the length of an epoch, the number of validator nodes, validator qualifications (e.g., qualifications for user accounts to become validator nodes), validator rules (e.g., rules to determine whether nodes should be penalized), or the value of locked digital assets.

As mentioned above, the ledger transaction system 106 can utilize the selected set of validator node devices to implement a modified HotStuff leader-based consensus protocol. However, in one or more embodiments, the validator node devices can implement a variety of other consensus protocols. For example, the validator node devices can implement a proof-of-work protocol or other proof-of stake protocols.

Figure 37:
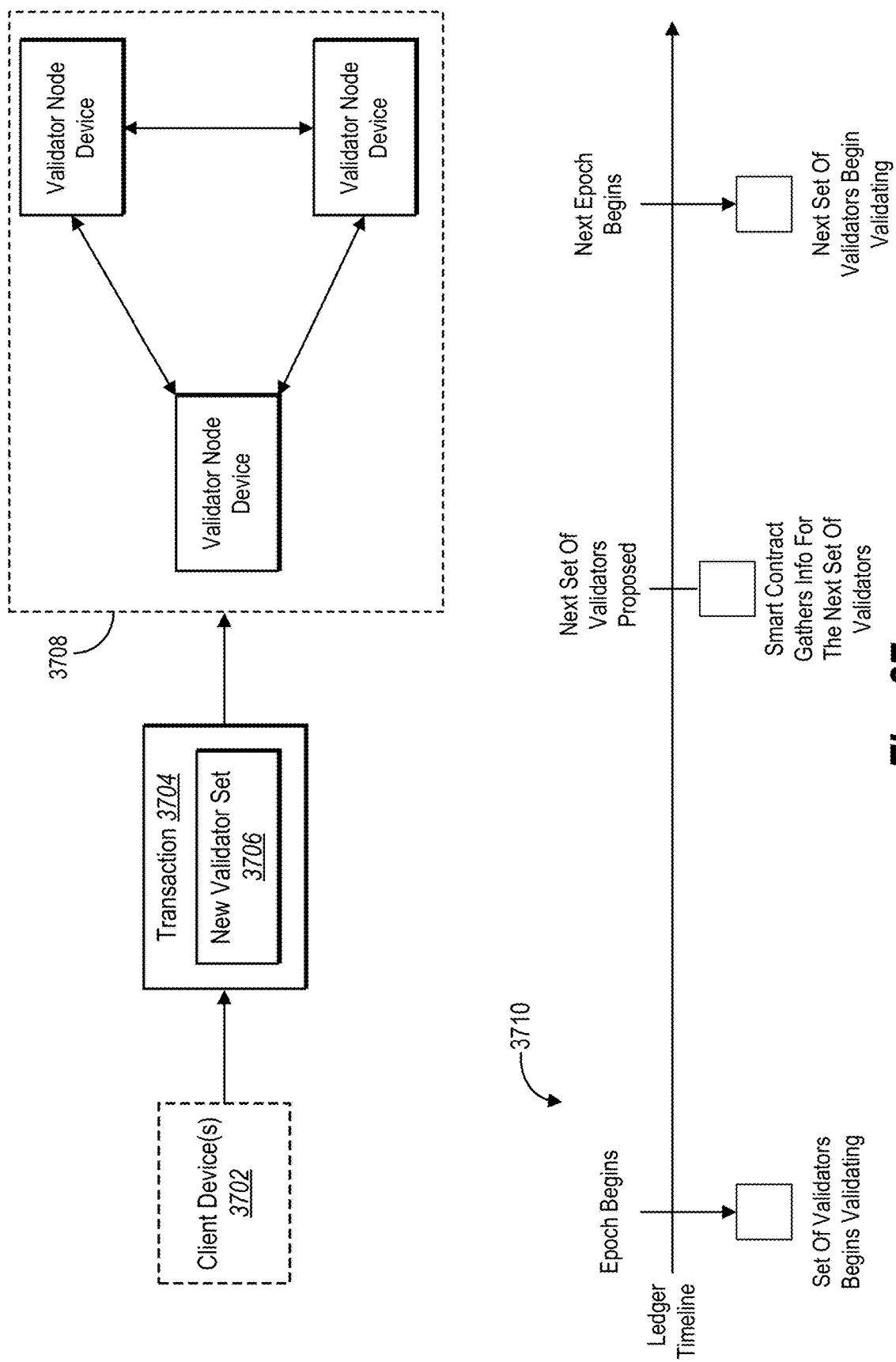
FIG. 37 illustrates a diagram of the ledger transaction system changing a set of validator node devices in accordance with one or more embodiments.

As mentioned, in one or more embodiments, the ledger transaction system 106 can change the computer nodes on the distributed digital ledger transaction network that participate as validator node devices. FIG. 37 illustrates a block diagram of the ledger transaction system 106 changing validator sets in accordance with one or more embodiments. As shown in FIG. 37, in one or more embodiments, client device(s) 3702 (e.g., authorized devices discussed above) can submit a transaction 3704 proposing a new validator set 3706. Though FIG. 37 shows the client device(s) 3702 submitting the transaction 3704, in some embodiments, other network participants can submit transactions to propose new validator sets. Once submitted, the current set of validator node devices 3708 votes on the transaction 3704 to achieve consensus. In some embodiments, the lead validator node device from the current set of validator node devices 3708 places the transaction 3704 in a block of its own. In some embodiments, the lead validator node device places the transaction 3704 at the end of the transaction block to be proposed.

As further mentioned above, in some embodiments a given set of validator node devices is fixed through an epoch. In one or more embodiments, an epoch begins upon execution of a particular transaction (e.g., a "start epoch" transaction) and ends upon committing the execution results of a transaction that agrees on the validator set of the next epoch. In one or more embodiments, upon receiving the transaction 3704, the current set of validator node devices 3708 checks to ensure that the transaction 3704 was sent from a user account having authority to propose a new set of validator node devices. The current set of validator node devices can further check that an epoch has lapsed since the last change to the set of validator node devices. In some embodiments, the ledger transaction system 106 requires the transaction 3704 to satisfy both checks before the set of validator node devices can be changed.

In some embodiments, the ledger transaction system 106 utilizes a smart contract (e.g., a module) to enforce a change in the set of validator node devices at the epoch boundary (instead of afterwards). For example, FIG. 37 further illustrates a timeline 3710 of the digital ledger. As shown in FIG. 37, when an epoch begins, a set of validator node devices begins validating (i.e., participating in consensus). During the epoch, the smart contract can gather information for the next change in the set of validator node devices (e.g., gathers votes for the new set of validator node devices). The smart contract can then enforce the validator set change at the time the next boundary begins, if the transaction proposing the new set of validator node devices has been agreed upon.

Indeed, in one or more embodiments, the ledger transaction system 106 requires at least one validator node device (e.g., the lead validator node device) to submit a transaction (e.g., at a predetermined blockchain time or for a predetermined version of the transaction tree), proposing to accept the validator set change from the smart contract. In some embodiments, the ledger transaction system 106 prevents submission of other proposed transaction blocks until that particular transaction has been committed. In some embodiments, if the transaction proposing the validator set change is rejected, the lead validator node device (or the next lead validator node device) continues to make the same proposal until the change is accepted.

In one or more embodiments, upon changing the set of validator node devices, the ledger transaction system 106 drops (i.e., treats as invalid) all proposed transaction blocks that have not been committed. Indeed, in some embodiments, the ledger transaction system 106 treats the transaction block that included the proposed change to the validator similar to a genesis block. In other words, the ledger transaction system 106 requires that all subsequent transaction block proposals include the transaction block proposing the validator set change as an ancestor block.

In one or more embodiments, the ledger transaction system 106 maintains validator set data that includes data for each validator node device in the set. For example, the ledger transaction system 106 can maintain account information for user accounts associated with the set of validator node devices, the public keys used for signing transaction block proposals, the votes for the validator node devices, and metadata corresponding to the validator node devices (e.g., the IP addresses of the validator node devices, the vote shares of the user accounts associated with the validator node devices, etc.). The ledger transaction system 106 can update this data with each new validator set.

In this manner, the ledger transaction system 106 can flexibly and securely manage and modify parameters for obtaining consensus across the distributed digital ledger transaction network. Indeed, in contrast to conventional blockchain systems, the ledger transaction system 106 can securely manage voting rights (and other consensus parameters) via smart contracts that can change to meet the demands of the distributed digital ledger transaction network and address threats that arise over time.

VI. Synchronization

A. Overview

New computer nodes can join the distributed digital ledger transaction network (or rejoin after having been disconnected) to participate as either a validator node device or a full node device. Upon joining the distributed digital ledger transaction network, a computer node can synchronize with one or more other computer nodes to download relevant data (e.g., the data structures of the distributed digital ledger transaction network). In one or more embodiments, the computer node does not inherently trust the data downloaded from the one or more other computer nodes; therefore, the computer node verifies the data upon download. For example, the computer node can identify the current set of validator node devices and their public keys. The computer node can then obtain the root value of the transaction tree having 2f+1 signatures obtained via consensus. Thus, when downloading the desired data from the one or more other computer nodes, the computer node can further download proof of the data and can verify the downloaded data and proof against the root value of the transaction tree.

One or more embodiments of the ledger transaction system 106 implement various features that improve synchronization. For example, the ledger transaction system 106 can utilize incremental verification to improve the efficiency with which a computer node downloads data. The ledger transaction system 106 can further improve efficiency using parallel synchronization. Additionally, the ledger transaction system 106 can utilize waypoints to guide computer nodes in synchronizing to the correct version/branch of the digital ledger.

B. Utilizing Incremental Verification and Parallel Synchronization

Under many conventional blockchain systems, a computer node downloading data via synchronization with a network may download the data in its entirety and then verify the data. However, upon verification, the computer node may discover that the downloaded data is incorrect. Therefore, the computer node may repeat the download and verification process, downloading the desired data from one or more other computer nodes. The computer node may iteratively repeat this process until the correct data has been downloaded. Thus, the conventional blockchain systems may utilize a significant amount of computing resources (e.g., process power and time), both at the receiving computer node and the transmitting computer nodes, in order for the computer node to receive the desired data.

Additionally, many conventional blockchain systems synchronize to the network, at a computer node, serially in a manner that requires a significant computing time to do so. To illustrate, a computer node may seek to generate a historical representation of the distributed digital ledger transaction (e.g., a representation of account states from the network over a particular period of time). To accomplish this result, conventional systems often download transactions and then execute the transactions, one at a time, to determine the state of the network after the execution of that transaction. Accordingly, the conventional systems require a substantial amount of time to fully synchronize to the network.

Figure 38:
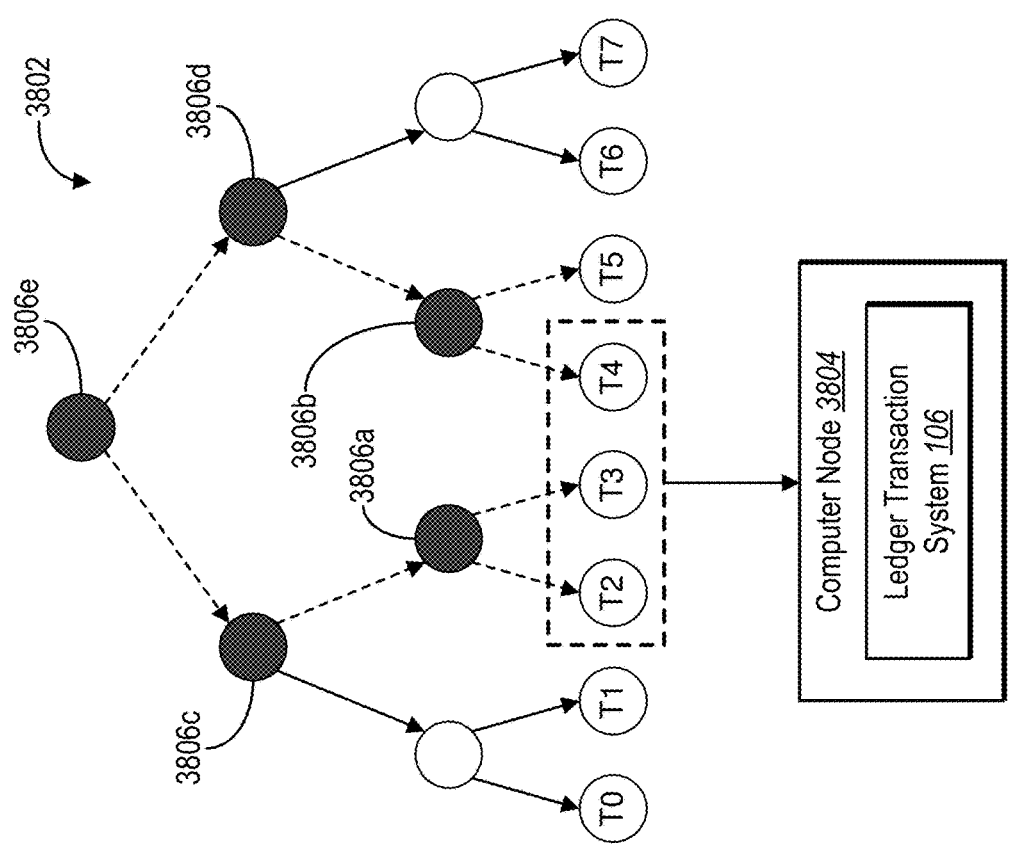
FIG. 38 illustrates a block diagram of the ledger transaction system utilizing incremental verification to download segments of data to a computer node in accordance with one or more embodiments.

One or more embodiments of the ledger transaction system 106 utilize incremental verification at a computer node synchronizing to the distributed digital ledger transaction network to download data more efficiently than conventional systems. FIG. 38 illustrates a block diagram of the ledger transaction system 106 utilizing incremental verification to download segments of data to a computer node 3804 in accordance with one or more embodiments. In particular, FIG. 38 illustrates the ledger transaction system 106 downloading data associated with a data tree 3802. Though not shown in FIG. 38, the data tree 3802 is stored at another computer node of the distributed digital ledger transaction network.

Although the ledger transaction system 106 can utilize incremental verification for any data structure described herein, in relation to FIG. 38, the data tree 3802 is a transaction tree. In particular, the data tree 3802 is a transaction tree storing data corresponding to transactions executed across the distributed digital ledger transaction network. As further shown, the ledger transaction system 106 downloads the data from the data tree 3802 to the computer node 3804 in segments. As an example, FIG. 38 shows the computer node 3804 downloading a segment of data from the data tree 3802 that corresponds to transactions labeled "T2" through "T4." Additionally, as shown in FIG. 38, the computer node 3804 downloads a proof for the data corresponding to transactions T2 through T4. In particular, the proof consists of all nodes of the data tree 3802 included at or within the boundaries provided by the dashed lines (i.e., the nodes 3806a-3806e).

Thus, the ledger transaction system 106 can download data to the computer node 3804 from the data tree 3802 in segments (or portions). The ledger transaction system 106 also downloads, to the computer node 3804, a proof corresponding to each segment (or portion) of downloaded data. Accordingly, after downloading a segment of data and the corresponding proof, the ledger transaction system 106 can verify the downloaded data to determine its accuracy. Based on determining that the downloaded data is accurate, the ledger transaction system 106 can download the next segment of data and its corresponding proof. Moreover, upon verifying the different segments (using the different proofs corresponding to each segment), the computer node 3804 can generate or recreate the authenticated data structure (e.g., by combining the different segments).

In one or more embodiments, based on determining that the downloaded data is inaccurate, the ledger transaction system 106 can identify an additional computer node from which to request the desired data. Thus, the ledger transaction system 106 incrementally downloads data (from various devices) and verifies the data before continuing the download.

Figure 39:
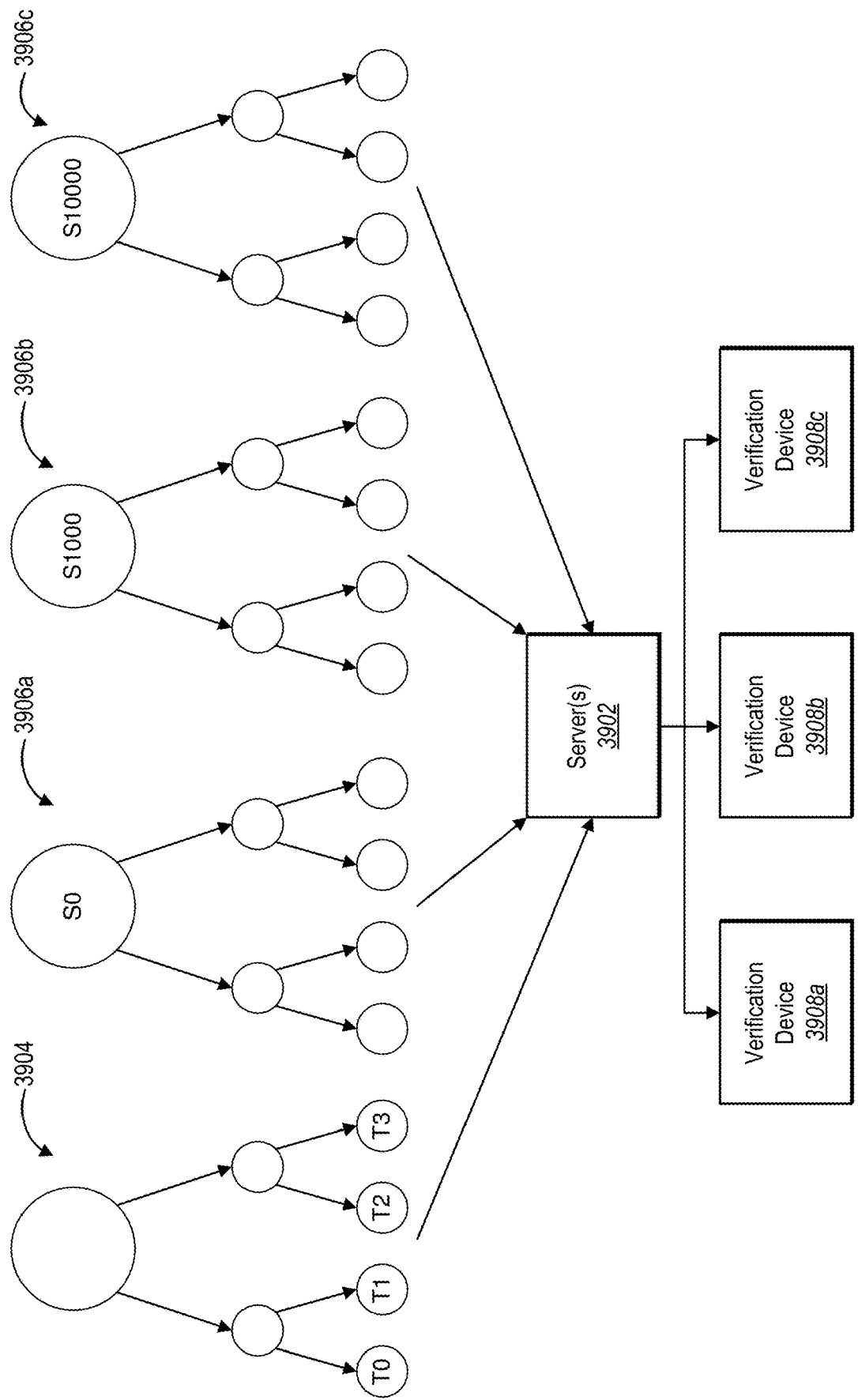
FIG. 39 illustrates a block diagram of the ledger transaction system downloading and verifying data in parallel in accordance with one or more embodiments.

In one or more embodiments, the ledger transaction system 106 further utilizes parallel synchronization to improve synchronization efficiency. For example, the ledger transaction system 106 can parallelize the incremental verification discussed above with regards to FIG. 38 in order to improve synchronization. FIG. 39 illustrates the ledger transaction system 106 downloading and verifying data in parallel in accordance with one or more embodiments.

As shown in FIG. 39, the ledger transaction system 106 uploads data to server(s) 3902. Specifically, the ledger transaction system 106 can upload the data to the server(s)

3902 from one or more computer nodes of the distributed digital ledger transaction network. As shown, the ledger transaction system 106 uploads transaction data (e.g., from the transaction tree 3904) and state data (e.g., from the state trees 3906a-3906c) to the server(s) 3902. In one or more embodiments, the ledger transaction system 106 uploads the transaction data to the server(s) 3902 in transaction data batches of predetermined size. For example, the ledger transaction system 106 can upload a transaction data batch to the server(s) 3902 after every ten thousand transactions executed across the distributed digital ledger transaction network.

As further shown in FIG. 39, the ledger transaction system 106 can upload the state data to the server(s) 3902 by uploading state data snapshots. For example, as shown, the state tree 3906a stores data corresponding to "S0" of the distributed digital ledger transaction network. The state tree 3906b stores data corresponding to "S1000" and the state tree 3906c stores data corresponding to "S2000." Thus, as shown in FIG. 39, the ledger transaction system 106 stores state data snapshots representing every one thousandth state of the distributed digital ledger transaction network.

The ledger transaction system 106 can, however, configure the snapshots in a variety of other ways (i.e., configure how often a state data snapshot is uploaded to the server(s) 3902). In some embodiments, the ledger transaction system 106 uploads state data snapshots based on time (e.g., once a week, every day at noon, at the end of every month, etc.). In some embodiments, the ledger transaction system 106 coordinate the transaction data batches to include transaction data for all of the transactions executed on the distributed digital ledger transaction network in between the state data snapshots. For example, the ledger transaction system 106 can upload a first transaction data batch that includes all transactions between S0 and S1000 and a second transaction data batch that includes all transactions between S1000 and S2000. In sum, the state data snapshots (e.g., state data structures) reflect period states of the distributed digital ledger transaction network As shown in FIG. 39, the ledger transaction system 106 can access and download the data from the server(s) 3902. As illustrated, the ledger transaction system 106 can download the data form the server(s) 3902 to the verification devices 3908a-3908c. Indeed, the ledger transaction system 106 can utilize the verification devices 3908a-3908c to download and verify batches of transaction data and state data. For example, the ledger transaction system 106 can utilize the verification device 3908a to download the state data snapshot corresponding to S0 and one or more transaction data batches containing the transactions executed between S0 and S1000. The verification device 3908a can then execute every transaction in the transaction data batches to determine the state data between S0 and S1000. In some embodiments, the verification device 3908 further downloads a proof corresponding to the downloaded data (e.g., as discussed above with reference to FIG. 38) and verifies the downloaded data using the proof.

Meanwhile, as shown in FIG. 39, the ledger transaction system 106 utilizes the verification devices 3908b-3908c to download, execute, and verify other transaction data batches in parallel. For example, the ledger transaction system 106 can utilize the verification device 3908b to download the state data snapshot corresponding to S1000 and one or more transaction data batches containing the transactions executed between S1000 and S2000. The verification device 3908b can then execute the transactions in the transaction data batches and further verify the downloaded data using a proof corresponding to the downloaded data in parallel to the downloading, execution, and verification of the verification device 3908a.

Though not shown in FIG. 39, the ledger transaction system 106 can then download the verified data from each of the verification devices 3908a-3908c to a computer node. Indeed, in one or more embodiments, the ledger transaction system 106 analyzes the data from the server(s) 3902 in parallel in response to a request from a computer node (e.g., a full node seeking to synchronize its storage and generate a historical representation of the distributed digital ledger transaction network). The computer node can access the data structures stored at the server(s) 3902, utilize the verification devices 3908a-3908c to analyze the data structures in parallel and build a historical representation of the distributed digital ledger transaction network. In particular, computer node can combine data received from each of the verification devices 39089a-3908c to synchronize storage at the computer node. Thus, the ledger transaction system 106 enables the computer node to synchronize to the distributed digital ledger transaction network in a fraction of the time that would be necessary if downloading and verifying the data serially.

In one or more embodiments, the ledger transaction system 106 determines to download only a portion of the data associated with the distributed digital ledger transaction network to a computer node. For example, the ledger transaction system 106 can determine to download transaction data and state data associated with the last decade to the computer node. Accordingly, the ledger transaction system 106 can identify the state data snapshots that correspond to that time frame and the transaction data batches that include the transactions within those state data snapshots. Thus, the ledger transaction system 106 can enable a computer node to download any segment of the data associated with the distributed digital ledger transaction network independent of the other stored segments (i.e., independent of the other state data snapshots or transaction data batches).

By utilizing incremental verification, the ledger transaction system 106 operates more efficiently than conventional systems to synchronize a computer node to the distributed digital ledger transaction network. Indeed, by downloading and verifying data in segments, the ledger transaction system 106 can catch and respond to inaccuracies earlier in the synchronization process—before the entire set of desired data has been downloaded. Accordingly, the ledger transaction system 106 reduces the amount of computing resources required to synchronize a computer node to the distributed digital ledger transaction network.

Additionally, by utilizing parallel synchronization, the ledger transaction system 106 further improves the efficiency of synchronization. Specifically, the ledger transaction system 106 avoids downloading and verifying the data serially. Thus, the ledger transaction system 106 reduces the amount of computing time required for a computer node to synchronize to the distributed digital ledger transaction network.

C. Utilizing Waypoints for Synchronization

In one or more embodiments, the ledger transaction system 106 utilizes waypoints to facilitate synchronization of computer nodes to the distributed digital ledger transaction network. The ledger transaction system 106 can utilize waypoints to guide synchronization in a variety of circumstances, such as adoption of a genesis block, assisting computer nodes coming back on line, and/or resolving (e.g., generating or preventing) hard forks. For example, the ledger transaction system 106 can utilize waypoints to guide a computer node that has been disconnected from the distributed digital ledger transaction network or a new computer node joining the distributed digital ledger transaction network. The ledger transaction system 106 can utilize waypoints to verify a particular version of the digital ledger that has been agreed upon via the consensus protocol (and thus avoid synchronizing to a different, disputed version of the digital ledger). Thus, utilizing waypoints allows the ledger transaction system 106 to avoid the inaccuracies, inefficiencies, and security concerns that result from disputed versions of the digital ledger (e.g., hard forks or other disputed transactions) in conventional blockchain systems. Waypoints also provide flexibility to allow the distributed digital ledger transaction network to implement transactions and select branches as necessary to address threats or evolving needs of the community.

Figure 40:
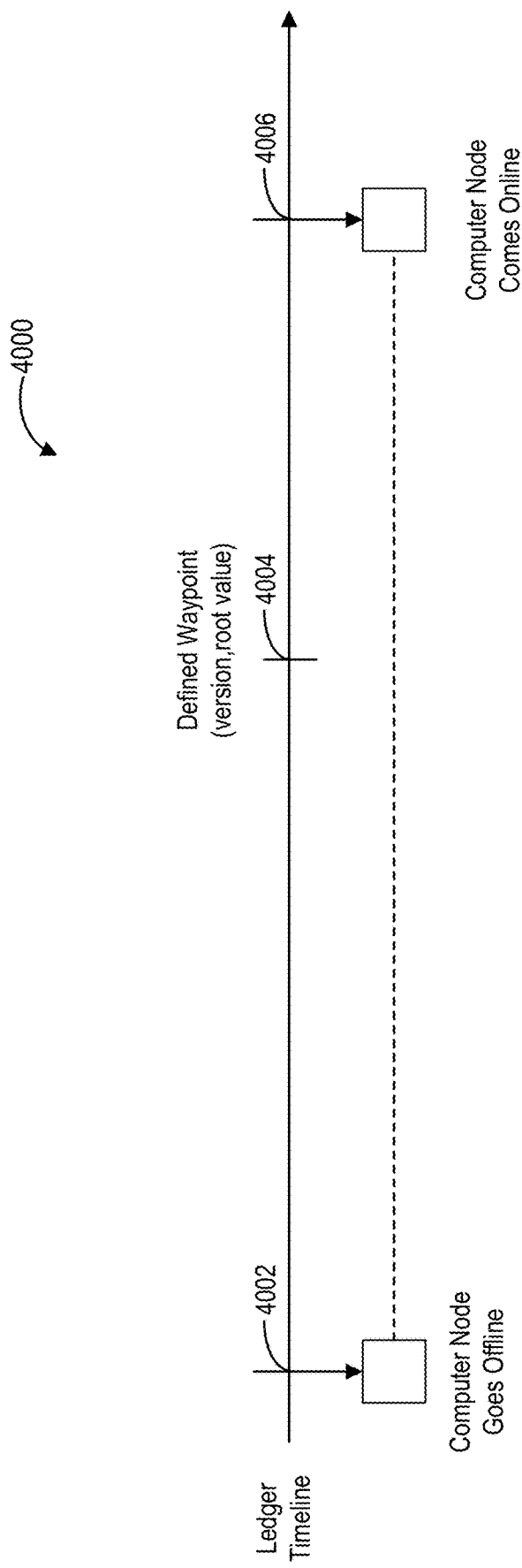
FIG. 40 illustrates a time line of the digital ledger and an associated waypoint in accordance with one or more embodiments.

For example, FIG. 40 illustrates utilizing waypoints in accordance with one or more embodiments. In particular, FIG. 40 illustrates a timeline 4000 of the digital ledger. In particular, FIG. 40 illustrates a waypoint at the point 4004 of the timeline 4000 established to indicate the correct branch of the digital ledger (e.g., the branch agreed upon via the consensus protocol) to be downloaded by computer nodes synchronizing to the distributed digital ledger transaction network. For example, as shown in FIG. 40, a computer node disconnects from the distributed digital ledger transaction network at point 4002 of the timeline 4000 and attempts to reconnect or rejoin at point 4006. Upon reconnecting, the computer node can synchronize to the distributed digital ledger transaction network by downloading all data (e.g., data structures) related to the digital ledger generated between the point 4002 and the point 4006 of the timeline.

The ledger transaction system 106 utilizes the waypoint at point 4004 to provide a state of the distributed digital ledger transaction network to which the computer node can synchronize. In particular, as shown in FIG. 40, the waypoint can include a version reference and a root value reference (e.g., a reference to an authenticated data structure). Indeed, the waypoint indicates that the correct branch of the digital ledger contains the root value indicated by the root value reference at the version of the digital ledger (i.e., version of the transaction tree) indicated by the root value reference. In one or more embodiments, the computer node identifies the branch of the digital ledger corresponding to the waypoint and then downloads that version of the digital ledger. In some embodiments, the computer node can utilize the waypoint to verify a branch of the digital ledger that has already been downloaded.

Specifically, the ledger transaction system 106 can analyze proposed data structures with the waypoint. For example, the computer node illustrated in FIG. 40 can download proposed data structures from another node of the distributed digital ledger transaction network. The computer node can verify the accuracy of the proposed data structures using the waypoint. In particular, the computer node can compare a proposed data structure from the point 4004 with the waypoint at the point 4004. If the waypoint aligns with the proposed data structure (e.g., the version and root value align for the waypoint match the version and root value of the proposed data structure), the computer node can verify the accuracy of the proposed data structure (and commit the proposed data structure to memory). If the waypoint does not align with the proposed data structure, the computer node can determine that the proposed structure is not valid (and not commit the proposed data structure to memory). Moreover, the computer node can obtain alternate proposed data structures (e.g., from another computer device) to identify proposed data structures that match the waypoint. In this manner, the computer node can synchronize to the current state of the ledger transaction system 106 while using the waypoint to verify the accuracy of proposed data structures.

The ledger transaction system 106 provide waypoints to the computer node in a variety of ways. For example, the ledger transaction system 106 can transmit an indication (e.g., a push notification) to the computer node with the waypoint. The ledger transaction system 106 can provide the waypoint in response to a query received from the computer node. In some embodiments, the ledger transaction system 106 provides the waypoint to the computer node via a hexadecimal code that can be copied by the computer node or a digital visual code scannable by the computer node. In further embodiments, the computer node can receive manual input associated with the waypoint (the user providing the input can receive the waypoint in a variety of ways, such as by word of mouth or printed advertisement). In sum, the ledger transaction system 106 can publish the waypoint in a variety of ways to allow computer nodes of the distributed digital ledger transaction network to accurately and efficiently synchronize to a particular version of the digital ledger.

Figure 41:
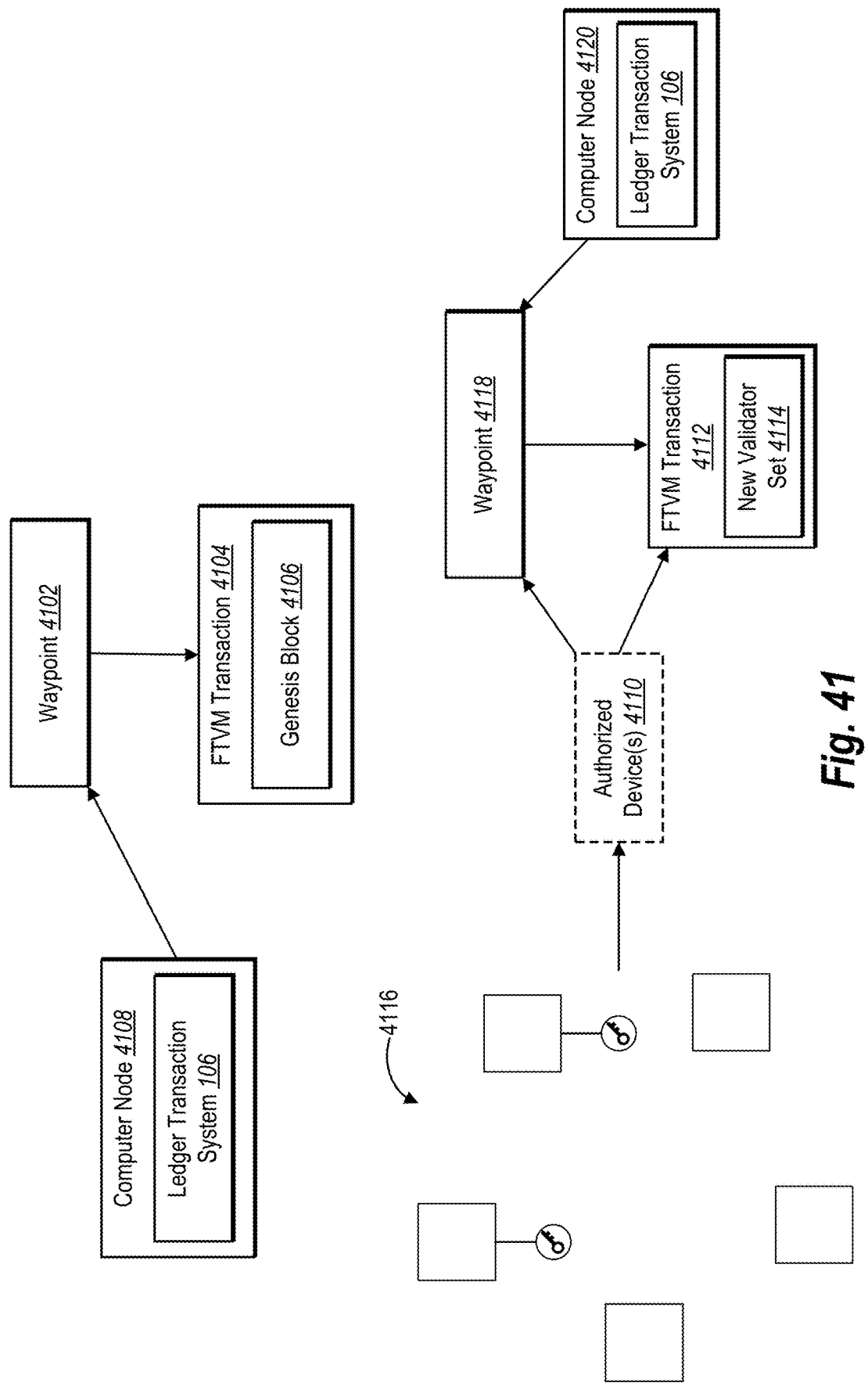
FIG. 41 illustrates block diagrams of the ledger transaction system utilizing waypoints associated with FTVM transactions in accordance with one or more embodiments.

Although FIG. 40 illustrates using a waypoint for a computer node that goes offline, the ledger transaction system 106 can utilize waypoints to assist in a variety of additional circumstances. For example, the ledger transaction system 106 can further utilize waypoints to facilitate acceptance of FTVM transactions (i.e., "forget the virtual machine" transactions that may not pass transaction verification procedures of the virtual machine). FIG. 41 illustrates a block diagram of the ledger transaction system 106 utilizing waypoints associated with FTVM transactions in accordance with one or more embodiments. In particular, as mentioned above, the ledger transaction system 106 generally executes transactions based on the attributes and procedures of modules invoked by the corresponding transaction script. In one or more embodiments, the virtual machine rejects transaction scripts that do not adhere to these attributes and procedures. An FTVM transaction includes a transaction that explicitly violates the rules established by the attributes and procedure (i.e., transaction procedures). In particular, an FTVM transaction can describe a set of write operations to be performed on the distributed digital ledger transaction network, that are prohibited by transaction procedures. Accordingly, computer nodes of the distributed digital ledger transaction network may reject such transactions.

However, in one or more embodiments, the ledger transaction system 106 utilizes waypoints to indicate, to the computer nodes of the distributed digital ledger transaction network, that FTVM transactions should be accepted. Indeed, upon identifying a waypoint associated with an FTVM transaction, a computer node can accept the FTVM transaction and synchronize to the distributed digital ledger transaction network so that the FTVM transaction is included in the data. Specifically, in one or more embodiments, the validator node devices vote to confirm FTVM transactions via the consensus protocol. If an FTVM transaction achieves consensus among the validator node devices, the ledger transaction system 106 can implement the FTVM transaction on the distributed digital ledger transaction network. In one or more embodiments, the FTVM transaction achieves consensus when a threshold number of validator node devices (e.g., 2f+1 validator node devices) have accepted the FTVM transaction.

For example, in one or more embodiments, the ledger transaction system 106 can utilize waypoints to facilitate initialization of the distributed digital ledger transaction network. For example, as shown in FIG. 41, the ledger transaction system 106 can generate a waypoint 4102 associated with an FTVM transaction 4104 that describes a genesis block 4106 (i.e., an initial block that publishes a digital currency module, generates the initial set of validator node devices, etc.). Indeed, because the genesis block 4106 creates digital currency, the genesis block 4106 will violate procedures for managing digital assets on the distributed digital ledger transaction network. The ledger transaction system 106, operating at a computer node 4108, can identify the waypoint 4102 and accept (e.g., vote to confirm) the FTVM transaction 4104 based on the waypoint 4102. Thus, the ledger transaction system 106 can utilize the waypoint 4102 to indicate that the genesis block—a block that may otherwise be rejected by computer nodes synchronizing to the distributed digital ledger transaction network—is a legitimate transaction.

As shown in FIG. 41, the ledger transaction system 106 can also use a waypoint to facilitate consensus of a hard fork. In particular, the ledger transaction system 106 can utilize an FTVM transaction to generate a hard fork and then generate a waypoint associated with the FTVM transaction so that computer nodes synchronizing to the digital ledger transaction network will accept the branch of the digital ledger established by the FTVM transaction.

For example, as shown in FIG. 41, administrator device(s) 4110 can submit an FTVM transaction 4112 that describes a new validator set 4114. To illustrate, the administrator device(s) 4110 can submit the FTVM transaction 4112 when a threshold number of the validator node devices 4116 of the distributed digital ledger transaction network have lost or leaked their corresponding private keys. The administrator device(s) 4110 can submit the FTVM transaction 4112 to generate a branch of the digital ledger separate from an undesirable branch potentially created by malicious computer nodes using the lost private keys. Though FIG. 41 shows the FTVM transaction 4112 submitted by the administrator device(s) 4110, in one or more embodiments, at least one of the computer nodes (e.g., validator node devices) of the distributed digital ledger transaction network can submit an FTVM transaction proposing a new validator set.

As shown in FIG. 41, the administrator device(s) 4110 (or other computer node on the distributed digital ledger transaction network) can further provide a waypoint 4118 associated with the FTVM transaction 4112. Thus, the ledger transaction system 106, operating at a computer node 4120, can identify the waypoint 4118 and accept (e.g., vote to confirm) the FTVM transaction 4112 based on the waypoint 4118. Thus, the ledger transaction system 106 can utilize waypoints to flag the desired branch of the digital ledger generated as the result of a hard fork. Indeed, the ledger transaction system 106 can utilize an FTVM transaction to generate a hard fork in order to avoid undesirable development of the digital ledger and then utilize a waypoint to flag the branch corresponding to the desired development.

As briefly mentioned above, in one or more embodiments, waypoints are configurable. Indeed, in one or more embodiments, the ledger transaction system 106 generates waypoints based on input (e.g., provided by the authorized device(s) 4110 as described in FIG. 1 or other computer nodes). Thus, the ledger transaction system 106 operates flexibly to accommodate waypoint proposals. If a transaction associated with a proposed waypoint achieves consensus, the ledger transaction system 106 can apply that transaction to the distributed digital ledger transaction network.

VII. Programming Language

A. Overview

As mentioned above, some of the inefficiency, insecurity, and rigidity of conventional systems comes as a result of implementing programming languages. Indeed, conventional systems utilize programming languages that can require excessive processes to implement, introduce opportunities for manipulation, and undermine the ability to flexibly implement different transactions and processes on a blockchain.

In one or more embodiments, the ledger transaction system 106 utilizes a programming language that improves the efficiency, security, and flexibility of implementing systems. For example, as discussed above with reference to FIG. 23, the ledger transaction system 106 can implement a programming language that utilizes transaction scripts that include arbitrary programs that perform a variety of operations (e.g., procedure calls) within a single script. The ledger transaction system 106 can utilize the transactions generated using the programming language to modify the state data structure of the distributed digital ledger network.

Additionally, as mentioned, the ledger transaction system 106 can utilize a programming language to improve data abstraction and configurability. Specifically, the ledger transaction system 106 can utilize the programming language to define modules and resources associated with user accounts. As mentioned above, the ledger transaction system 106 utilizes a module as a template from which to create one or more resources (i.e., instances of the module). As further mentioned above, a resource corresponding to a particular module is managed by that module (i.e., managed by the attributes and procedures defined within that module) and is generally inaccessible to the procedures defined outside of that module. Accordingly, the ledger transaction system 106 can improve data abstraction by defining modules—including the governing attributes and resources—providing control over the methods used for creating, destroying, and modifying the associated resources. Additionally, the ledger transaction system 106 can utilize the programming language to improve configurability by defining modules that can be generated, updated, and/or exchanged to accommodate changing needs on the distributed digital ledger transaction network.

Further, the ledger transaction system 106 can utilize the programming language to define custom resource types that enforce linearity. As will be discussed in more detail below with regards to FIG. 42, the ledger transaction system 106 can define resource types that encode programmable digital assets, which behave like program values (e.g., can be stored in data structures, passed as arguments to procedures, etc.). Additionally, the ledger transaction system 106 utilizes the programming language to provide safety guarantees for these resources (e.g., must be used exactly once in a transaction and cannot be copied). In one or more embodiments, the ledger transaction system 106 utilizes such features to implement a digital currency that can be exchanged on the distributed digital ledger transaction network.

In addition, as described in greater detail below, the ledger transaction system 106 can utilize a programming language that checks reference safety at the bytecode level. Moreover, the ledger transaction system 106 can implement this bytecode verification using an authenticated data structure (e.g., a tree structure). By utilizing a programming language coded on the bytecode level (e.g., without a compiler that introduces opportunities to undermine safety guarantees) together with a tree data structure, the ledger transaction system 106 can significantly improve security and flexibility relative to conventional systems.

B. Utilizing Linear Types and Data Abstraction to Represent Digital Assets

Many conventional blockchain systems utilize a programming language to represent digital assets on a network. However, these programming languages often hamper the flexibility and security of implementing computing devices. For example, many conventional systems rigidly represent digital assets as an integer value within a programming language. Consequently, conventional systems fail to flexibly allow digital assets to be stored in data structures, passed as an argument to a procedure, or returned from a procedure. Additionally, when generating a digital asset, the conventional systems generally hardcode, into the language semantics of the segments of code that define that digital asset, certain scarcity protections that are desirable when managing digital assets. Because these scarcity protections are hardcoded into the language semantics, the conventional systems require manual reimplementation of those scarcity protections when generating a new digital asset. Similarly, when generating a digital asset, conventional systems typically hardcode, into the language semantics, access controls for that digital assets, preventing flexible access control customization.

In addition to flexibility concerns, conventional blockchain systems are also error-prone and insecure. As mentioned, conventional blockchain systems represent digital assets as integer values, which inherently do not behave like assets (e.g., integer values may be copied freely, which is undesirable for some assets). Integer values inherently behave differently than assets; therefore, the conventional systems typically create special methods of handling integer values to imitate handling an asset. To illustrate, many conventional systems track the holdings of digital assets using owner-to-asset map sets. These systems may transfer an asset by invoking procedures that have side effects on these maps. Often, such procedures require two distinct steps: creating a side effect on the sender's side and then checking that the side effect occurred on the receiver's side. The separation of these steps allows for malicious actors to insert unexpected and undesired behavior (e.g., changing a balance between the receiver check and receiver reaction). Accordingly, conventional systems often expose the associated network (and the digital assets stored thereon) to attacks.

One or more embodiments of the ledger transaction system 106 utilize linear data types to more flexibly represent digital assets associated with the distributed digital ledger transaction network. In particular, the ledger transaction system 106 can utilize a programming language to define a digital asset (or a variety of other resources) using semantics associated with a linear data type. The ledger transaction system 106 can then utilize linear typing rules corresponding to the linear data type when managing (e.g., transferring) the digital asset. For example, the linear typing rules can include a first linear typing rule that requires the digital asset to be used a single time (i.e., exactly once) during a transaction and a second linear typing rule that prevents duplicating the digital asset via transaction. In this manner, the ledger transaction system 106 can more flexibly and efficiently manage digital assets on the distributed digital ledger transaction network.

To provide an illustration, the ledger transaction system 106 implements the linear typing rules to control modification of the state data structure of the distributed digital ledger transaction network. In particular, the ledger transaction system 106 can utilize the linear typing rules in executing a transaction. For example, the ledger transaction system 106 can identify a request for a transaction to transfer a digital asset via the distributed digital ledger transaction network from a first user account to a second user account on the state data structure. The ledger transaction system 106 can then determine (e.g., identify) the linear data type of the digital asset within the request for the transaction. Subsequently, the ledger transaction system 106 can execute the transaction utilizing the linear data type by transferring the digital asset from the first user to the second user account on the state data structure subject to the set of linear typing rules corresponding to the linear data type. In one or more embodiments, the digital asset includes a digital currency maintained within the state data structure of the distributed digital ledger transaction network.

Figure 42:
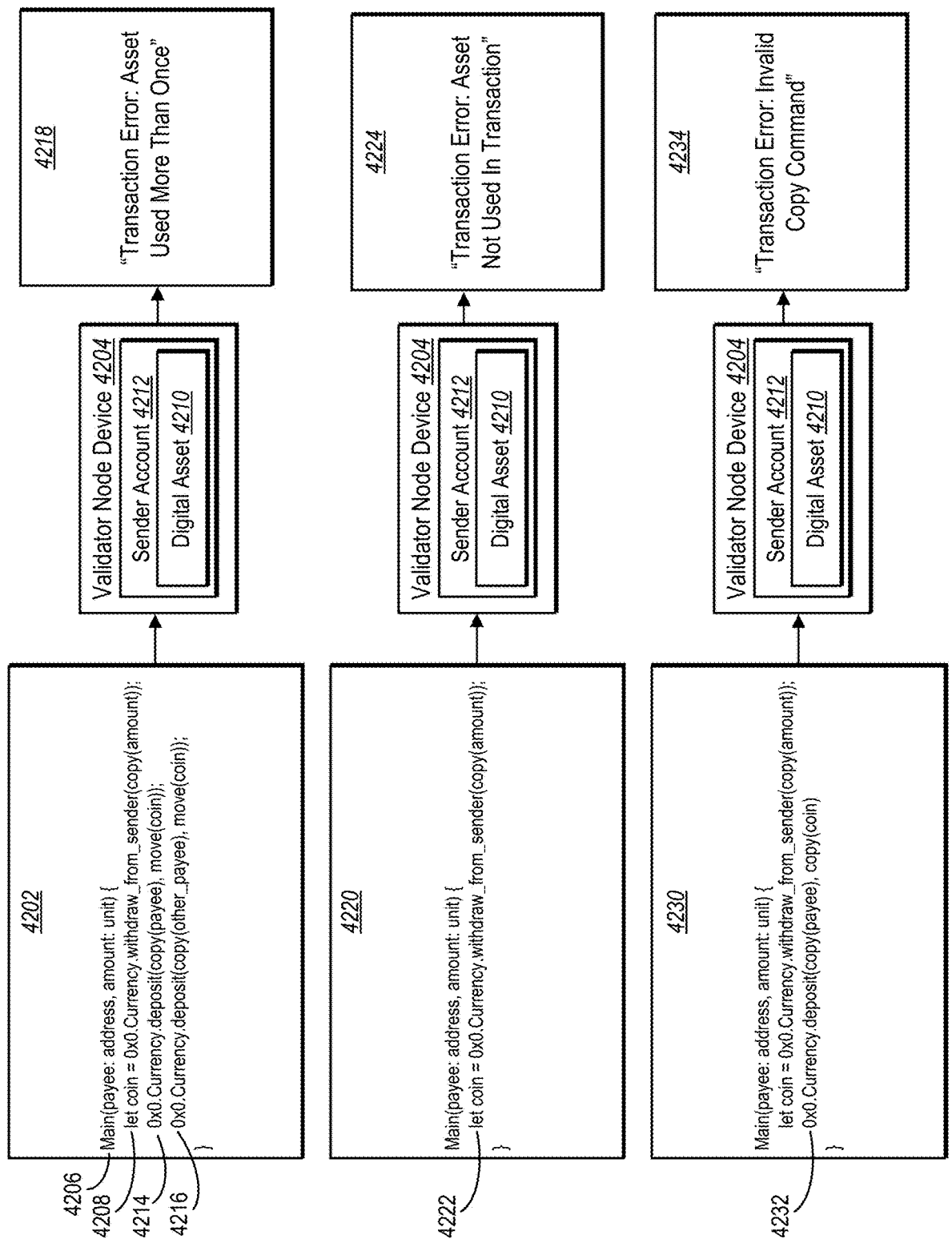
FIG. 42 illustrates block diagrams of the ledger transaction system implementing linear typing rules corresponding to a linear data type in accordance with one or more embodiments.

FIG. 42 illustrates block diagrams of the ledger transaction system 106 implementing linear typing rules corresponding to a linear data type in accordance with one or more embodiments. In particular, FIG. 42 illustrates the ledger transaction system 106 performing enforcement of the linear typing rules against requests for transactions that would violate the linear typing rules. In one or more embodiments, the ledger transaction system 106 utilizes load-time bytecode verification to check satisfaction of the linear typing rules.

As shown in FIG. 42, the ledger transaction system 106 identifies a transaction script 4202 (transaction scripts are discussed in more detail above with reference to FIG. 23). In particular, the transaction script 4202 can be included within a transaction request received at a validator node device 4204. As shown in FIG. 42, the transaction script 4202 provides instructions to be carried out by the validator node device 4204 (or any other validator node device) in order to implement (e.g., execute) a transaction. Specifically, the transaction script 4202 includes instructions for a transaction that transfers a digital asset from a user account on the state data structure of the distributed digital ledger transaction network. As shown in FIG. 42, the transaction script 4202 is composed of pseudocode representing a segment of bytecode that describes the transaction to be implemented. It should be noted that pseudocode is presented to simplify the illustration and that the ledger transaction system 106 operates similarly using the corresponding segment of bytecode.

For example, the transaction script 4202 includes the line 4206 of pseudocode indicating that two inputs are included: the address associated with the user account of the recipient and an unsigned integer representing the number of coins to be transferred to the recipient. In one or more embodiments, the inputs are provided by the client device at the time of submitting the corresponding transaction request. The transaction script 4202 also includes the line 4208 instructing the validator node device 4204 to withdraw a digital asset 4210 (referred to as "coin" in the pseudocode) from a user account (i.e., sender account 4212) associated with the sender of the transaction script 4202. The line 4214 instructs the validator node device 4204 to deposit the digital asset 4210 to a user account associated with an identified payment recipient (i.e., "payee").

As further shown in FIG. 42, the line 4216 instructs the validator node device 4204 to similarly deposit the digital asset 4210 to a user account associated with an additional payment recipient (i.e., "other_payee"). In other words, the transaction script 4202 includes instructions to transfer the same digital asset from the sender account 4212 to two different recipient user accounts of the distributed digital ledger transaction network (i.e., the transaction request associated with the transaction script 4202 attempts to spend the digital asset 4210 twice). Though FIG. 42 illustrates the transaction request attempting to spend the digital asset 4210 twice in the same request, it should be noted that referring to the same digital asset in two separate transactions requests would have the same effect.

Upon running the load-time bytecode verification, the ledger transaction system 106 can determine that the transaction request associated with the transaction script 4202 violates the linear typing rules corresponding to the linear data type of the digital asset 4210. In particular, the ledger transaction system 106 can determine that the digital asset 4210 is associated with a linear data type within the programming language, and therefore subject to the linear typing rules. The ledger transaction system 106 can further determine that, by attempting to utilize the linear data type (i.e., the digital asset 4210) twice, the transaction request violates the first linear typing rule to utilize the linear data type a single time in a transaction. As shown in FIG. 42, in response to determining that the transaction request violates the first linear typing rule, the ledger transaction system 106 generates the bytecode verification error 4218. In one or more embodiments, the ledger transaction system 106 transmits the bytecode verification error 4218 to the client device that sent the transaction script 4202.

As shown in FIG. 42, the ledger transaction system 106 also identifies the transaction script 4220. Similar to the transaction script 4202 and as shown in FIG. 42, the transaction script 4220 provides instructions for a transaction that transfers the digital asset 4210 from the sender account 4212. In particular, the transaction script 4220 includes a variation of the instructions included in the transaction script 4202.

Specifically, as shown in FIG. 42, the transaction script 4220 includes the line 4222 instructing the validator node device 4204 to withdraw the digital asset 4210 from the sender account 4212. However, the transaction script 4220 fails to include a line instructing the validator node device 4204 to deposit the digital asset 4210 into a recipient account. In short, the transaction script 4220 takes the digital asset 4210 from the sender account 4212 but takes no further steps to use the digital asset 4210. Indeed, execution of the transaction script 4220 may result in the complete loss of the digital asset 4210 (i.e., the sender of the corresponding transaction request cannot recover the digital asset 4210).

Upon running the load-time bytecode verification, the ledger transaction system 106 can determine that the transaction request associated with the transaction script 4220 violates the linear typing rules corresponding to the linear data type associated with the digital asset 4210. In particular, the ledger transaction system 106 can determine that, by failing to utilize the linear data type, the transaction request violates the first linear typing rule to utilize the linear data type a single time in a transaction (e.g., the "coin" is withdrawn but not used). As shown in FIG. 42, in response to determining that the transaction request violates the first linear typing rule, the ledger transaction system 106 rejects the transaction request and generates the bytecode verification error 4224. In one or more embodiments, the ledger transaction system 106 transmits the bytecode verification error_24 to the client device that sent the transaction request.

Additionally, as shown in FIG. 42, the ledger transaction system 106 further identifies the transaction script 4230. In particular, the transaction script 4230 provides instructions for a transaction that generates a copy the digital asset 4210 from the sender account 4212. As shown in FIG. 42, the transaction script 4230 includes the line 4232 instructing the validator node device to copy the digital asset 4210 (using the "copy(coin)" command) and depositing the copy of the digital asset 4210 into a recipient user account. Indeed, the transaction request associated with the transaction script 4230 attempts to duplicate the digital asset 4210.

Upon running the load-time bytecode verification, the ledger transaction system 106 can determine that the transaction request associated with the transaction script 4230 violates the linear typing rules corresponding to the linear data type associated with the digital asset 4210. In particular, the ledger transaction system 106 can determine that, by attempting to duplicate the linear data type, the transaction request violates the second linear typing rule against duplicating linear data types. As shown in FIG. 42, in response to determining that the transaction request violates the second linear typing rule, the ledger transaction system 106 rejects the transaction request and generates the bytecode verification error 4234. In one or more embodiments, the ledger transaction system 106 transmits the bytecode verification error 4234 to the client device that sent the transaction request.

In one or more embodiments, in addition to enforcing linear typing rules, the ledger transaction system 106 provides fungibility for digital assets. Indeed, as mentioned above, a digital asset can include a digital currency. As such, the ledger transaction system 106 can implement methods of dividing and merging digital currency units corresponding to digital assets. It should be noted, however, that the ledger transaction system 106 can provide fungibility for various types of digital assets. In one or more embodiments, the ledger transaction system 106 implements fungibility pursuant to the linear typing rules.

To provide an illustration, in one or more embodiments, the ledger transaction system 106 implements a "Currency" module that utilizes data abstraction to implement fungibility. Accordingly, the ledger transaction system 106 manages the access, creation, and destruction of resources that are created from the Currency module. For simplicity, the following will refer to instances of the Currency module—i.e., resources (e.g., digital assets) associated with the Currency module—as "coins."

Broadly, the ledger transaction system 106 can use a Currency module to restrict access to the "value" field of a coin and to restrict the ability to allocate new coins. For example, in one or more embodiments, the ledger transaction system 106 prevents incrementing the value field of a coin associated with a user account unless a coin owned by another account has been transferred to the user account via the "deposit" procedure. If the deposit procedure has been invoked, the ledger transaction system 106 can increment the value field of the coin by the value of the deposited coin (i.e., the ledger transaction system 106 adds the value of the owned coin to the value of the coin associated with the user account). As another example, in some embodiments, the ledger transaction system 106 prevents creating a new coin with value n unless the value field of an existing coin is decremented by n via the deposit procedure. Thus, the ledger transaction system 106 can provide fungibility for digital assets while preventing their arbitrary creation.

By using the programming language to represent digital assets as linear data types, the ledger transaction system 106 can manage digital assets more flexibly than conventional systems. In particular, the digital assets can behave like program values. For example, by using linear data types to represent digital assets, the ledger transaction system 106 can store digital assets in data structures, pass the digital assets as arguments to procedures, and return digital assets from procedures. Additionally, the ledger transaction system 106 can utilize a type system to implement flexible scarcity protections that are not available to conventional systems. Indeed, the ledger transaction system 106 can implement custom rules for creating and destroying assets. Further, by using linear data types, the ledger transaction system 106 can generate flexible access controls in the same way as ordinary program values (e.g., using conditional statements, etc.).

Additionally, the ledger transaction system 106 can manage digital assets more securely than conventional systems. Indeed, by representing digital assets as linear data types via the programming language, the ledger transaction system 106 avoids the special methods of handling used by many conventional systems. For example, as mentioned above, the ledger transaction system 106 can pass digital assets as arguments to procedures (i.e., via parameter binding). Using digital assets in such a way requires a single step. Consequently, the ledger transaction system 106 narrows the opportunities for a malicious actor to insert unexpected behavior and makes it easier to write safe code.

C. Utilizing Static and Dynamic Analysis to Determine Reference Safety

Conventional blockchain systems may perform checks on the programming language operating on the network to identify any errors (e.g., bugs) within the code. Moreover, many conventional systems analyze programs submitted for execution on the network to determine whether the programs adhere to reference safety (i.e., the programs always refer to valid memory). Many conventional systems reject programs determined to not adhere to reference safety.

As mentioned above, a number of technical problems exist, however, with regard to ensuring reference safety utilizing conventional blockchain systems. Indeed, under many conventional systems, memory includes a flat array with addresses and has an arbitrary graph shape that is difficult to utilize. This memory structure leads to difficulty in analyzing programs for reference safety (e.g., unless the analysis is done at the source code level). Indeed, conventional systems memory includes arbitrary pointers and it can be inefficient (or impossible) to verify that the pointers refer to valid memory. Additionally, many conventional blockchain systems perform reference safety checks at run-time. Accordingly, such conventional systems often wait until attempting to execute a program before determining whether it is safe for execution.

Though many conventional systems analyze programs for reference safety at the source code level, such systems generally execute programs at the machine code level (i.e., processing programs written in source code using a compiler to generate the corresponding machine code). Using a compiler, however, compromises memory safety because malicious actors can attack or bypass the compiler run on the machine code level.

One or more embodiments of the ledger transaction system 106 utilize a combination of static and dynamic analysis of transaction scripts and modules to more accurately preserve reference safety. In particular, in one or more embodiments, the ledger transaction system 106 receives and executes transaction scripts at the bytecode level. The ledger transaction system 106 can perform load-time bytecode verification to analyze such transaction scripts at the bytecode level, identifying reference safety issues even where a transaction script was written directly in bytecode. In one or more embodiments, the ledger transaction system 106 also performs bytecode verification on modules submitted for storage on the distributed digital ledger transaction network. Additionally, in one or more embodiments, the ledger transaction system 106 utilizes a programming language that references memory using a tree structure memory model. In this manner, the ledger transaction system 106 can more accurately and efficiently analyze for reference safety at the bytecode level, identifying reference safety issues with improved accuracy.

As mentioned above, in one or more embodiments, the ledger transaction system 106 executes transaction scripts at the bytecode level. For example, the ledger transaction system 106 can execute transaction scripts written directly in bytecode. In some embodiments, the ledger transaction system 106 receives transaction scripts written using source code or an intermediate representation (IR), compiles the transaction script into bytecode, and then executes the bytecode. Indeed, the transaction script executed by the ledger transaction system 106—whether the script is written in bytecode or compiled into bytecode—contains a sequence of bytecode operations.

As mentioned above, transaction scripts can invoke one or more procedures from one or more modules. In one or more embodiments, the code defining the procedure of a module also includes a sequence of bytecode operations. Thus, the ledger transaction system 106 maintains execution of bytecode when executing module procedures.

As further described above with regard to FIG. 2, in one or more embodiments, the ledger transaction system 106 executes the bytecode operations of a transaction script using a stack-based virtual machine. For example, the ledger transaction system 106 can implement an operation, which utilizes operands from the stack, and then push the results back onto the stack.

Additionally, the ledger transaction system can utilize the stack-based virtual machine to implement procedure calls (i.e., module procedures invoked by transaction scripts). To illustrate, in one or more embodiments, the ledger transaction system 106 provides a fixed vector of typed local variables to each procedure and stores the input parameters in the vector starting from position zero. The ledger transaction system 106 then loads the input arguments to the procedure call that were pushed on the stack by the caller into the vector of local variables. The ledger transaction system 106 can then utilize a bytecode interpreter to begin executing a sequence of bytecode operations corresponding to the procedure at a zero offset. The ledger transaction system 106 can proceed with execution by executing the bytecode operations in sequence unless a branch operation that causes a jump to a specific offset in the sequence is identified. By the return of the procedure call, the ledger transaction system 106 can place the output values on the stack.

In one or more embodiments, the ledger transaction system 106 can utilize Boolean, arithmetic, equality, and branching operators via the programming language. In some embodiments, the ledger transaction system 106 can utilize bytecode operations for loading constants and copying or moving values stored in a local variable onto the stack and for popping values from the stack into local variables. In further embodiments, the ledger transaction system 106 can implement bytecode operations for creating and dissolving structs and resources (structs and resources will be explained in more detail below). Indeed, the ledger transaction system 106 can utilize values from the stack to generate a struct and then push the struct onto the stack. The ledger transaction system 106 can perform the inverse bytecode operation by utilizing a struct at the top of the stack to push the values stored in the struct onto the stack.

In some embodiments, the ledger transaction system 106 utilizes the programming language to support two types of values: unrestricted and resource. Indeed, the ledger transaction system can support primitive types, such as Booleans, 64-bit unsigned integers, 256-bit account addresses, and fixed-size byte arrays. The ledger transaction system 106 can generate struct types and can further tag the struct type as a resource, generating a resource type. The ledger transaction system 106 can treat all other types, including untagged struct types and primitive types, as unrestricted types. In one or more embodiments, the ledger transaction system 106 implements resources, such as digital assets, as a linear data type using linear semantics provided by the programming language, as is discussed in more detail above with regard to FIG. 42.

In one or more embodiments, a variable of resource type is a resource variable, and a variable of unrestricted type is an unrestricted variable. As discussed above, in some embodiments, a resource variable cannot be copied and must always be moved (i.e., using a move operation). Further, variables and fields of resource kind cannot be mutated in some embodiments. By contrast, in one or more embodiments, a variable or field of unrestricted type can be both copied and mutated. In some embodiments, the type of a field of a struct can be either primitive or a struct. However, in some embodiments, an unrestricted struct type may not contain a field with a resource type, ensuring that an unrestricted struct does not result in copying of a nested resource. Resources are discussed in more detail above with reference to FIG. 19.

In further embodiments, the ledger transaction system 106 further uses the programming language to implement reference types. The ledger transaction system 106 can classify a reference type as either mutable or immutable. The ledger transaction system 106 can utilize references to global and local variables and to fields of struct variables.

Figure 43:
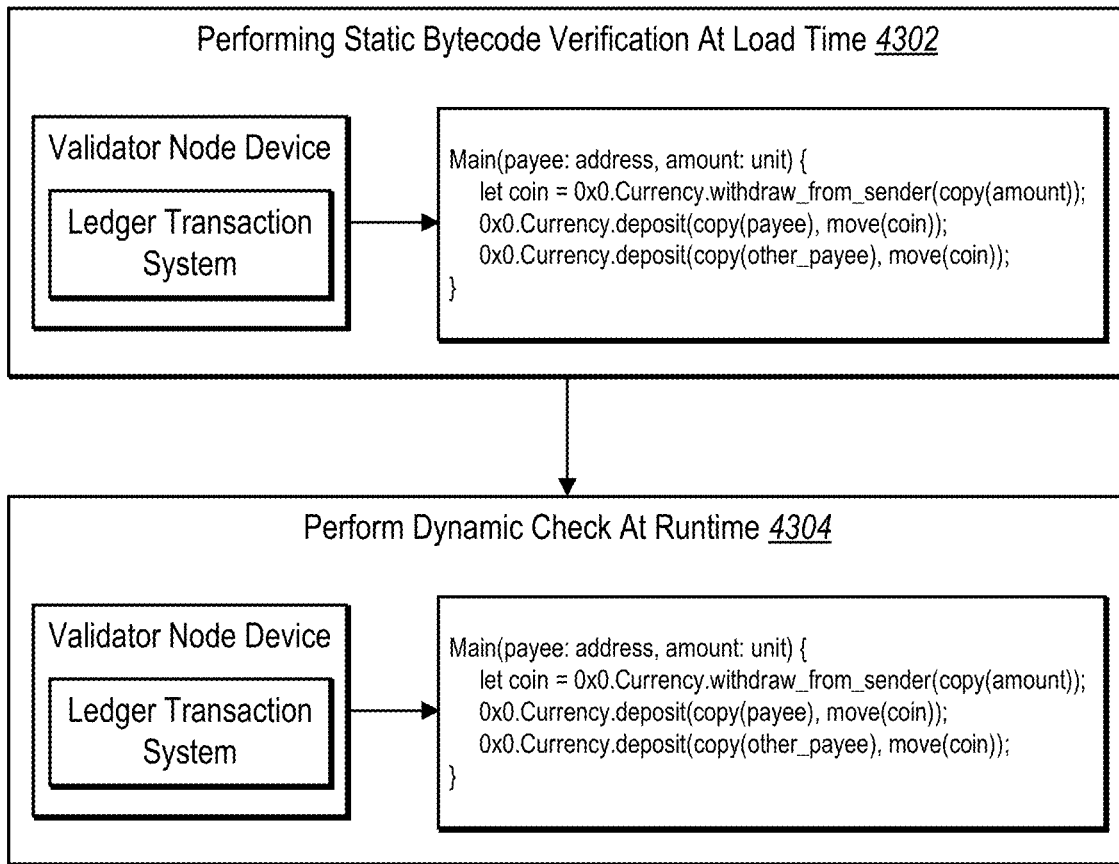
FIG. 43 illustrates a block diagram for performing a combined static and dynamic analysis to ensure reference safety in accordance with one or more embodiments.

As mentioned above, in one or more embodiments, the ledger transaction system 106 utilizes a combined static-dynamic analysis to enforce reference safety. In particular, the ledger transaction system can statically and dynamically analyze modules submitted for storage on the distributed digital ledger transaction network as well as transaction scripts submitted for execution. In performing the analysis, the ledger transaction system determines whether the transaction or module always refers to valid memory (i.e., never refers to memory that has been freed, never refers to memory that outside the bounds of the memory array, etc.). In one or more embodiments, the ledger transaction system 106 further uses the combined static-dynamic analysis to ensure that, if a live reference is an extension of (or equal to) another live reference in the same scope, that the references reside in variables of immutable reference type. FIG. 43 illustrates a block diagram for utilizing a combined static-dynamic analysis to enforce reference safety in accordance with one or more embodiments.

As shown in FIG. 43, the ledger transaction system 106 can perform an act 4302 of performing static bytecode verification at load time. Indeed, the ledger transaction system 106 can utilize a bytecode verifier to analyze a transaction script or module and enforce general properties of safety at load time.

To illustrate, in one or more embodiments, a module or transaction script encodes a collection of tables of entities, such as constants, type signatures, struct definitions, and procedure definitions. The ledger transaction system 106 can utilize the bytecode verifier to perform structural checks to ensure these tables are well-formed. In particular, the bytecode verifier can identify errors that include illegal table indices, duplicate table entries, illegal type signatures (e.g., a reference to a reference), etc. If the structural checks are satisfied, the ledger transaction system 106 can utilize the bytecode verifier to further perform semantic checking on procedure bodies. While performing the semantic checks, the bytecode verifier can identify errors that include incorrect procedure arguments, dangling references to deallocated objects, illegal copy of resources, etc.

In one or more embodiments, the ledger transaction system 106 utilizes the bytecode verifier to implement several phases of semantic verification. For example, in a CFG construction phase, the ledger transaction system 106 can construct a control-flow graph by decomposing the instruction sequence of the module or transaction script into a collection of instruction blocks. In particular, each instruction block can include a contiguous sequence of instructions. Indeed, the set of all instructions included in the transaction script or module can be partitioned among the instruction blocks. Additionally, each instruction block can end with a branch or return instruction. By decomposing the instruction sequence into instruction blocks, the ledger transaction system 106 ensures that branch targets land only at the beginning of an instruction block. In some embodiments, the decomposition can also ensure that the generated blocks are maximal.

The ledger transaction system 106 can additionally use the bytecode verifier to implement a stack checking phase. In particular, the bytecode verifier analyzes the instructions blocks to ensure that a particular invariant is maintained. In one or more embodiments, the invariant requires that, when execution lands at the beginning of an instruction block, the stack height is n (the height of the stack when the corresponding function begins executing) and that the stack height is n or n+1, depending on whether the function does not return or does return an argument, respectively. The bytecode verifier analyzes each instruction block separately, determining the effect of each instruction in the instruction block on the stack height. Indeed, the bytecode verifier determines that the stack height does not go below n (an undesirable result) and is left at either n or n+1 (depending on the final instruction of the block and the return type of the function) at the end of the instruction block.

The ledger transaction system 106 can further utilize the bytecode verifier to implement a type checking phase. In particular, the bytecode verifier can check that each operation and function (including both built-in functions and user-defined procedures) is invoked with arguments of appropriate types. In particular, the operands of an operation are values located either in a local variable or on the stack. In one or more embodiments, the bytecode already provides the types of local variables of a function. In some embodiments, however, the bytecode verifier infers the types of stack values. The bytecode verifier can perform this inference and the type checking of each operation separately for each instruction block. In one or more embodiments, because the stack height at the beginning of each instruction block is n and does not go below n during the execution of the block, the bytecode verifier models the suffix of the stack starting at n for type checking the instructions within the instruction block. Indeed, the bytecode verifier can model this suffix using a stack of types, on which types are pushed and popped as the instruction stream in a block is processed.

In one or more embodiments, the type stack and the statically-known types of local variables are enough to type check each instruction.

In one or more embodiments, the ledger transaction system 106 can utilize the bytecode verifier to further analyze the transaction script or module for additional constraints on operations performed on resources. For example, as mentioned above, resource variables and fields generally cannot be copied or updated. In one or more embodiments, the bytecode verifier performs these checks during the type checking phase. In one or more embodiments, the bytecode verifier utilizes borrow tracking at the bytecode level to perform the static, load-time verification.

As shown in FIG. 43, the ledger transaction system 106 additionally performs an act 4304 of performing a dynamic check at runtime. In particular, the ledger transaction system 106 can utilize a bytecode interpreter to perform the dynamic runtime check. In one or more embodiments, the ledger transaction system 106 performs one dynamic runtime check. Specifically, in one or more embodiments, the ledger transaction system 106 performs the dynamic check by counting the number of outstanding references to resource on the distributed digital ledger transaction network. Indeed, the ledger transaction system 106 performs the dynamic check to ensure that only one transaction or module has a reference checked out to a resource at a given time.

In one or more embodiments, upon determining that a module or transaction script is not memory safe, the ledger transaction system 106 can reject the module or transaction script. Indeed, if the ledger transaction system 106 determines the module or transaction script is not memory safe via bytecode verification, the ledger transaction system 106 can reject the module or transaction script before even attempting to execute the code (i.e., at runtime).

As mentioned above, the ledger transaction system 106 can utilize the programming language to implement a tree structure memory model. More detail regarding the tree structure memory model (e.g., the state tree, the event tree, and the transaction tree) is provided above with regard to FIGS. 3-6. In one or more embodiments, the ledger transaction system 106 prohibits a field of a struct to be a reference, ensuring that the tree structure memory model can be maintained (rather than requiring a directed acyclic graph).

By utilizing a programming language that references memory utilizing a tree structure memory model, the ledger transaction system 106 improves efficiency and security when compared to conventional systems. Indeed, the ledger transaction system 106 can uniquely name each node in the tree structure memory model based on the path from the root of the tree to the node. Consequently, the ledger transaction system 106 can implement the reference safety analysis at the bytecode level rather than being restricted to source code analysis. This improves accuracy in analyzing reference safety and reduces vectors for malicious attacks. Additionally, by performing the bulk of the reference safety analysis statically at load time, the ledger transaction system 106 can identify transaction scripts and modules that are not memory safe before attempting to execute the transaction script or module.

FIGS. 1-43, the corresponding text, and the examples provide a number of different methods, systems, devices, and non-transitory computer-readable media of the ledger transaction system 106. In addition to the foregoing, one or more embodiments can also be described in terms of flowcharts comprising acts for accomplishing the particular result, as shown in FIGS. 44-49. Each of FIGS. 44-49 may be performed with more or fewer acts. Further, the acts shown in each of FIGS. 44-49 may be performed in different orders. Additionally, the acts described in each of FIGS. 44-49 may be repeated or performed in parallel with one another or in parallel with different instances of the same or similar acts.

Figure 44:
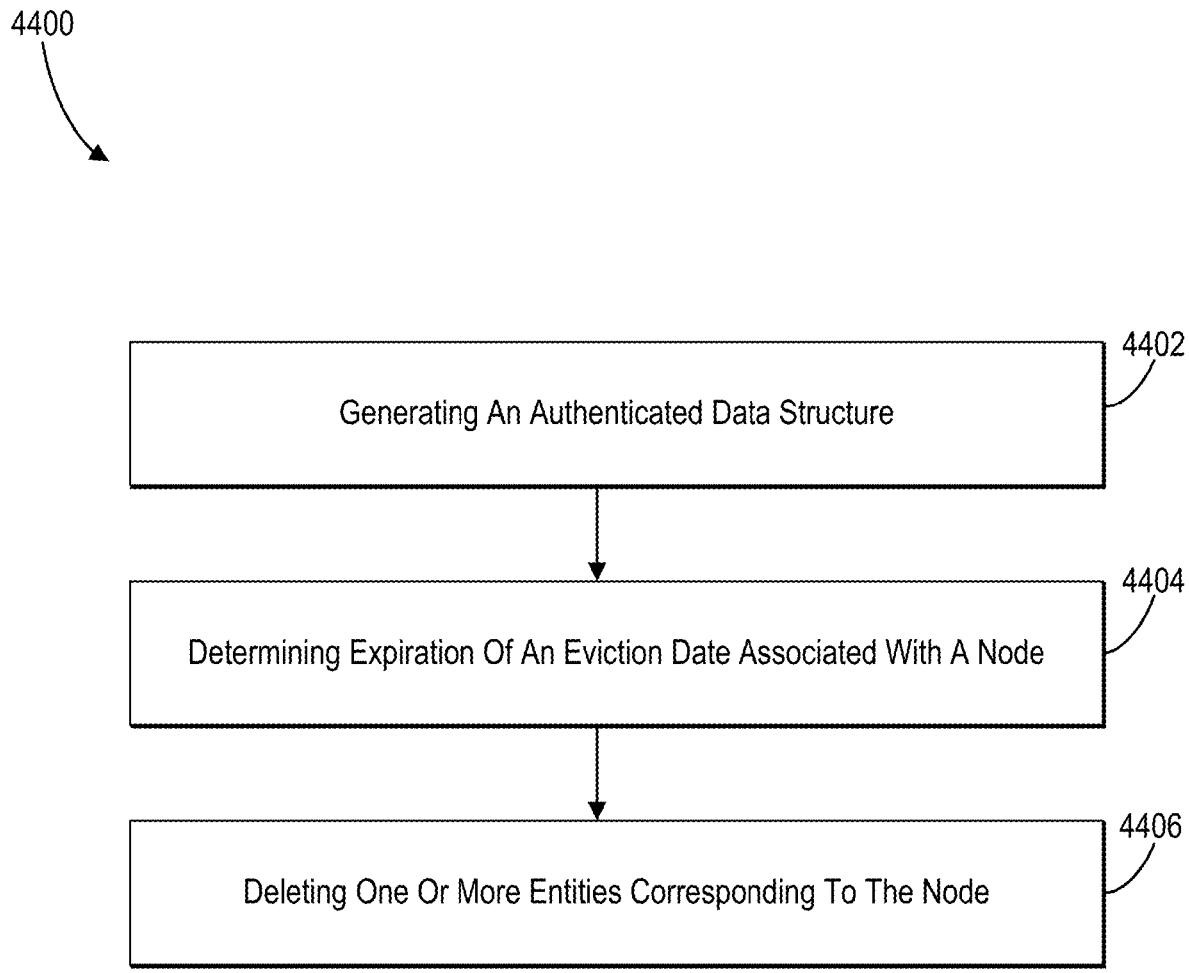
FIG. 44 illustrates a flowchart of a series of acts for performing account eviction in accordance with one or more embodiments.

For example, FIG. 44 illustrates a flowchart of a series of acts 4400 for performing account eviction in accordance with one or more embodiments. While FIG. 44 illustrates acts according to one embodiment, alternative embodiments may omit, add to, reorder, and/or modify any of the acts shown in FIG. 44. The acts of FIG. 44 can be performed as part of a method. Alternatively, a non-transitory computer-readable medium can store instructions that, when executed by at least one processor, cause a computing device to perform the acts of FIG. 44. In some embodiments, a system can perform the acts of FIG. 44. For example, in one or more embodiments, a system includes at least one processor and at least one non-transitory computer-readable medium storing instructions thereon that, when executed by the at least one processor, cause the system to perform the acts of FIG. 44.

The series of acts 4400 includes an act 4402 of generating an authenticated data structure. For example, the act 4402 involves generating an authenticated data structure of a distributed digital ledger transaction network, wherein the authenticated data structure comprises a data tree comprising nodes having data representations mapped to entries in a database. In one or more embodiments, the database comprises a state database and the data tree comprises a state tree.

The series of acts 4400 also include an act 4404 of determining expiration of an eviction date associated with a node. For example, the act 4404 involves performing lazy deletion of data from the authenticated data structure by accessing a data representation from a node of the data tree to determine expiration of an eviction date associated with node. In one or more embodiment, the node comprises an account state representation corresponding to the account data of a user account. The ledger transaction system 106 can generate the account state representation by applying a hash function to the account data corresponding to the user account in the state database to generate a hash value for the account data corresponding to the user account; and combining the hash value for the account data with the eviction date associated with the user account to generate the account state representation corresponding to the user account.

In one or more embodiments, the ledger transaction system 106 determines expiration of the eviction date based on at least one of: a rent deposit amount, a time of a last user account access, a time of a transaction that transfers digital assets from the user account, or a time of a transaction that transfers digital assets to the user account.

The series of acts 4400 further includes the act 4406 of deleting one or more entries corresponding to the node. For example, the act 4406 involves performing the lazy deletion of the data from the authenticated data structure by, in response to determining expiration of the eviction date, deleting one or more entries corresponding to the node from the database while maintaining the data representation within the data tree. In one or more embodiments, the one or more entries comprise account data corresponding to the user account.

In one or more embodiments, the series of acts 4400 further include acts surrounding the deletion of the one or more entries corresponding to the node. For example, in one or more embodiments, the acts include deleting the one or more entries corresponding to the node from the database without a transaction event request on the distributed digital ledger transaction network for deleting the one or more entries. In some embodiments, the acts include, prior to deleting the one or more entries corresponding to the node from the database: receiving a request from a client device, the request requiring use of the one or more entries; in response to receiving the request from the client device, accessing the data representation from the node of the data tree to determine expiration of the eviction date; and processing the request as if the one or more entries have been deleted. In further embodiments, the acts include, in response to receiving a transaction that references the user account, accessing the account state representation corresponding to the user account from the state tree to determine expiration of the eviction date and processing the transaction as if the user account had expired.

In some embodiments, the series of acts 4400 further includes acts for reinstating user accounts. For example, in one or more embodiments, the acts include identifying an account reinstatement request associated with the user account, wherein the account reinstatement request comprises proposed account data for the user account; and verifying the proposed account data for the user account based on the account state representation within the state tree. In some embodiments, the acts further include re-caching the proposed account data associated with the user account within the state database of the distributed digital ledger transaction network based on verifying the proposed account data for the user account. In some embodiments, the acts further include updating the eviction date associated with the node based on re-caching the proposed account data associated with the user account.

Figure 45:
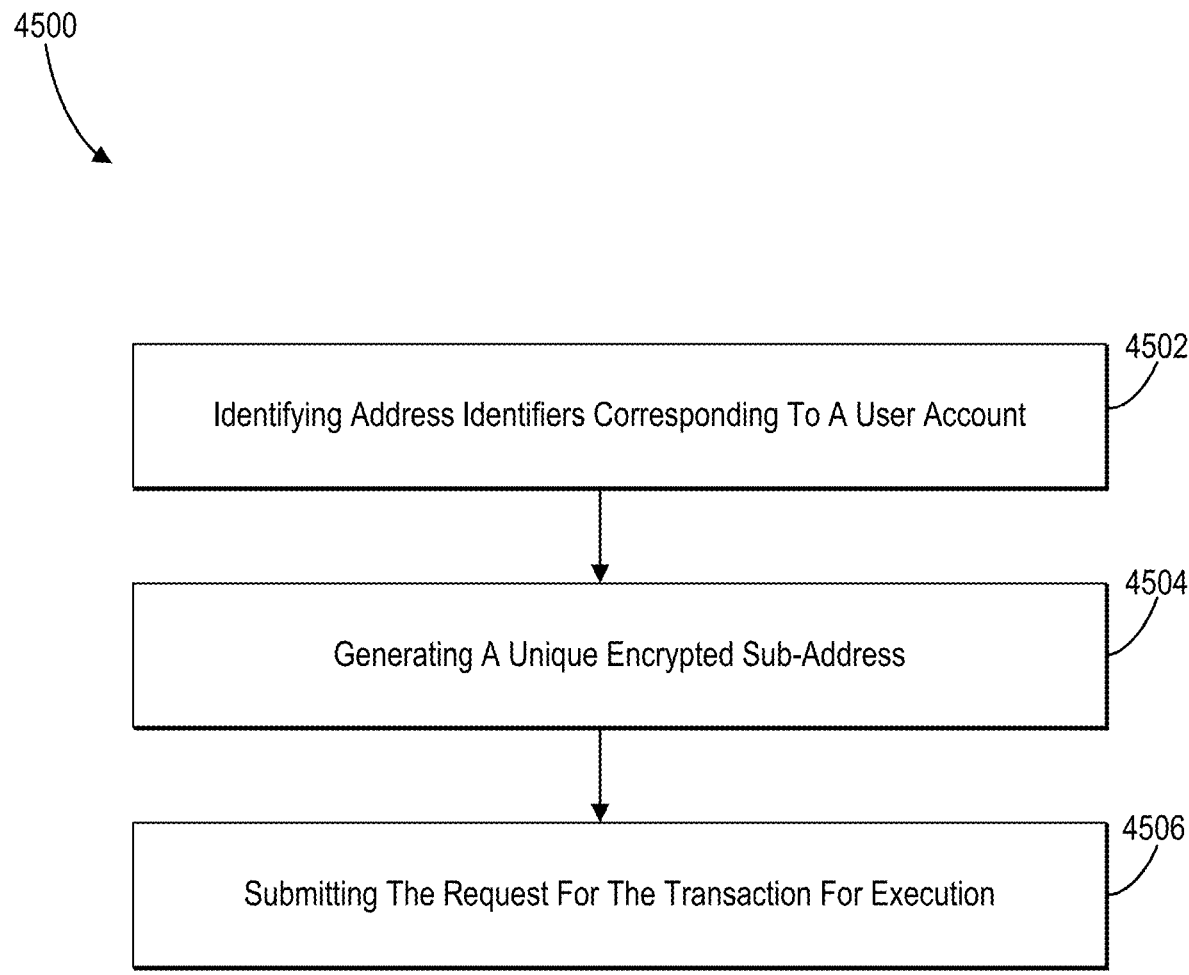
FIG. 45 illustrates a flowchart of a series of acts for generating an encrypted sub-address unique to a transaction in accordance with one or more embodiments.

FIG. 45 illustrates a flowchart of a series of acts 4500 for generating an encrypted sub-address unique to a transaction in accordance with one or more embodiments. While FIG. 45 illustrates acts according to one embodiment, alternative embodiments may omit, add to, reorder, and/or modify any of the acts shown in FIG. 45. The acts of FIG. 45 can be performed as part of a method. Alternatively, a non-transitory computer-readable medium can store instructions that, when executed by at least one processor, cause a computing device to perform the acts of FIG. 45. In some embodiments, a system can perform the acts of FIG. 45. For example, in one or more embodiments, a system includes at least one processor and at least one non-transitory computer-readable medium storing instructions thereon that, when executed by the at least one processor, cause the system to perform the acts of FIG. 45.

The series of acts 4500 includes an act 4502 of identifying address identifiers corresponding to a user account. For example, the act 4502 involves generating a request for a transaction between a first user account and a second user account of a distributed digital ledger transaction network by identifying a main public address identifier corresponding to the second user account, a sub-address identifier corresponding to the second user account, and a public encryption key. In one or more embodiments, identifying the main public address identifier corresponding to the second user account, the sub-address identifier corresponding to the second user account, and the public encryption key comprises scanning a digital visual code that encodes the main public address identifier, the sub-address identifier, and the public encryption key.

In one or more embodiments, the ledger transaction system identifies the main public address identifier, the sub-address identifier, and the public encryption key based on at least one of: a telephone number of a user corresponding to the second user account or a user ID of the user.

In some embodiments, the ledger transaction system 106 identifies the main public address identifier, the sub-address identifier, and the public encryption key based on an email address of a user corresponding to the second user account. For example, in some embodiments, identifying the main public address identifier, the sub-address identifier, and the public encryption key comprises: identifying a domain name and personal email identifier from the email address of the user corresponding to the second user account; determining the main public address identifier based on the domain name from the email address; and determining the sub-address identifier based on the personal email identifier from the email address. Indeed, in some embodiments, identifying the main public address identifier, the sub-address identifier, and the public encryption key comprises, in response to providing the personal email identifier from the email address to a remote server corresponding to the domain name, receiving the public encryption key from the remote server corresponding to the domain name.

In one or more embodiments, determining the main public address identifier based on the domain name comprises accessing a DNS record corresponding to the domain name to identify at least one of: the main public address identifier or the public encryption key. In some embodiments, the ledger transaction system 106 further utilizes DNSSEC to validate the main public address identifier or the public encryption key identified by accessing the DNS record corresponding to the domain name. In one or more embodiments, generating the encrypted sub-address comprises applying the public encryption key, determined by accessing the DNS record, to the sub-address identifier determined based on the personal email identifier.

The series of acts 4500 also includes an act 4504 of generating a unique encrypted sub-address. For example, the act 4502 involves generating the request for the transaction between the first user account and the second user account of the distributed digital ledger transaction network by generating an encrypted sub-address unique to the transaction applying the public encryption key to the sub-address identifier. In one or more embodiments, generating the encrypted sub-address unique to the transaction comprises adding a nonce value to the sub-address identifier; and applying the public encryption key to the sub-address identifier with the nonce value.

The series of acts 4500 further includes an act 4506 of submitting the request for the transaction for execution. For example, the act 4506 involves submitting, for execution via the distributed digital ledger transaction network, the request for the transaction between the first user account and the second user account using the main public address identifier and the encrypted sub-address unique to the transaction.

Figure 46:
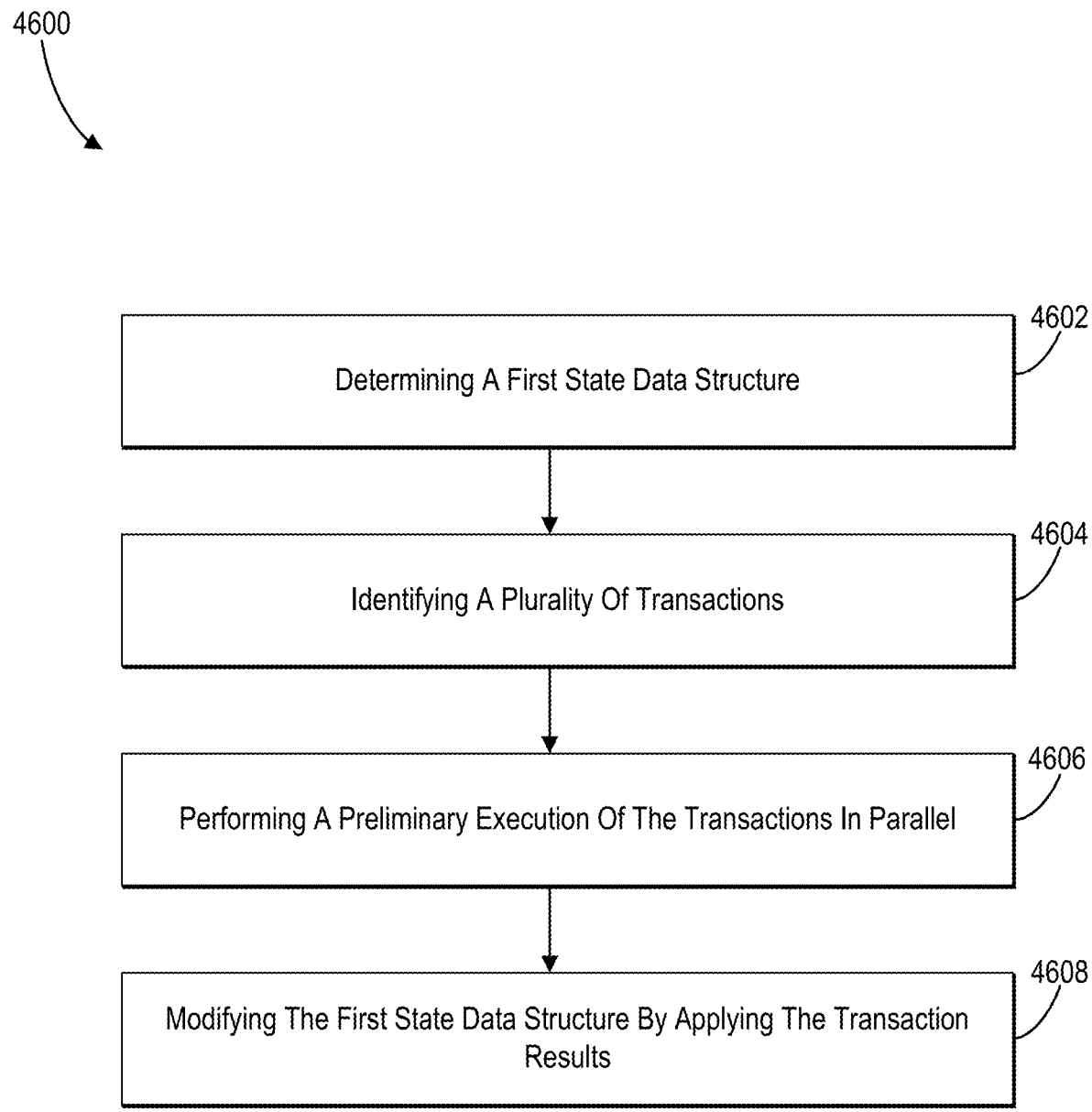
FIG. 46 illustrates a flowchart of a series of acts for performing parallel execution of transactions in accordance with one or more embodiments.

FIG. 46 illustrates a flowchart of a series of acts 4600 for performing parallel execution of transactions in accordance with one or more embodiments. While FIG. 46 illustrates acts according to one embodiment, alternative embodiments may omit, add to, reorder, and/or modify any of the acts shown in FIG. 46. The acts of FIG. 46 can be performed as part of a method. Alternatively, a non-transitory computer-readable medium can store instructions that, when executed by at least one processor, cause a computing device to perform the acts of FIG. 46. In some embodiments, a system can perform the acts of FIG. 46. For example, in one or more embodiments, a system includes at least one processor and at least one non-transitory computer-readable medium storing instructions thereon that, when executed by the at least one processor, cause the system to perform the acts of FIG. 46.

The series of acts 4600 includes an act 4602 of determining a first state data structure. For example, the act 4602 involves determining a first state data structure of a distributed digital ledger transaction network, wherein the first state data structure represents account states of a plurality of user accounts of the distributed digital ledger transaction network.

The series of acts 4600 also includes an act 4604 of identifying a plurality of transactions. For example, the act 4604 involves identifying a plurality of transactions comprising transactions associated with user accounts of the plurality of user accounts.

The series of acts 4606 further includes an act 4606 of performing a preliminary execution of the transactions in parallel. For example, the act 4606 involves performing a preliminary execution of the transactions in parallel relative to the first state data structure to determine a plurality of transaction results and dependencies of the transactions with regard to the user accounts.

In one or more embodiments, the transactions comprise a first transaction and a second transaction. Indeed, in some embodiments, performing the preliminary execution comprises determining a first transaction result reflecting application of the first transaction relative to the first state data structure; determining a second transaction result reflecting application of the second transaction relative to the first state data structure; and determining that the second transaction is not dependent upon the first transaction and the first transaction is not dependent upon the second transaction. In some embodiments, based on determining that the second transaction is not dependent upon the first transaction and the first transaction is not dependent upon the second transaction, the ledger transaction system 106 applies the first transaction result and the second transaction result relative to the first state data structure.

In one or more embodiments, the ledger transaction system 106 generates an intermediate state data structure by applying the first transaction result to the first state data structure. In some embodiments, the transactions further comprise a third transaction and performing the preliminary execution comprises: determining a third transaction result reflecting application of the third transaction relative to the first state data structure; and determining that the third transaction depends on the first transaction. Indeed, in some embodiments, in response to determining that the third transaction depends on the first transaction, the ledger transaction system 106 executes the third transaction against the intermediate state data structure to generate the second state data structure. In one or more embodiments, determining that the third transaction depends on the first transaction comprises determining that the third transaction and the first transaction are associated with a same user account from the user accounts.

Additionally, the series of acts 4600 includes an act 4608 of modifying the first state data structure by applying the transaction results. For example, the act 4608 involves modifying the first state data structure to a second state data structure by applying the plurality of transaction results based on the dependencies of the transactions. In one or more embodiments, the second state data structure is equivalent to executing the plurality of transactions serially against the first state data structure.

In one or more embodiments, the ledger transaction system 106 receives a dependency indicator for the plurality of transactions from a validator node and identifies a first subset of the plurality of transactions and a second subset of the plurality of transactions based on the dependency indicator. Accordingly, performing the preliminary execution of the transactions comprises performing a preliminary execution of the first subset of the plurality of transactions based on the dependency indicator. In some embodiments, the ledger transaction system 106 generates an intermediate state data structure based on transaction results from performing the preliminary execution of the first subset of the plurality of transactions; and generates the second state data structure by executing the second subset of the plurality of transactions relative to the intermediate state data structure.

Figure 47:
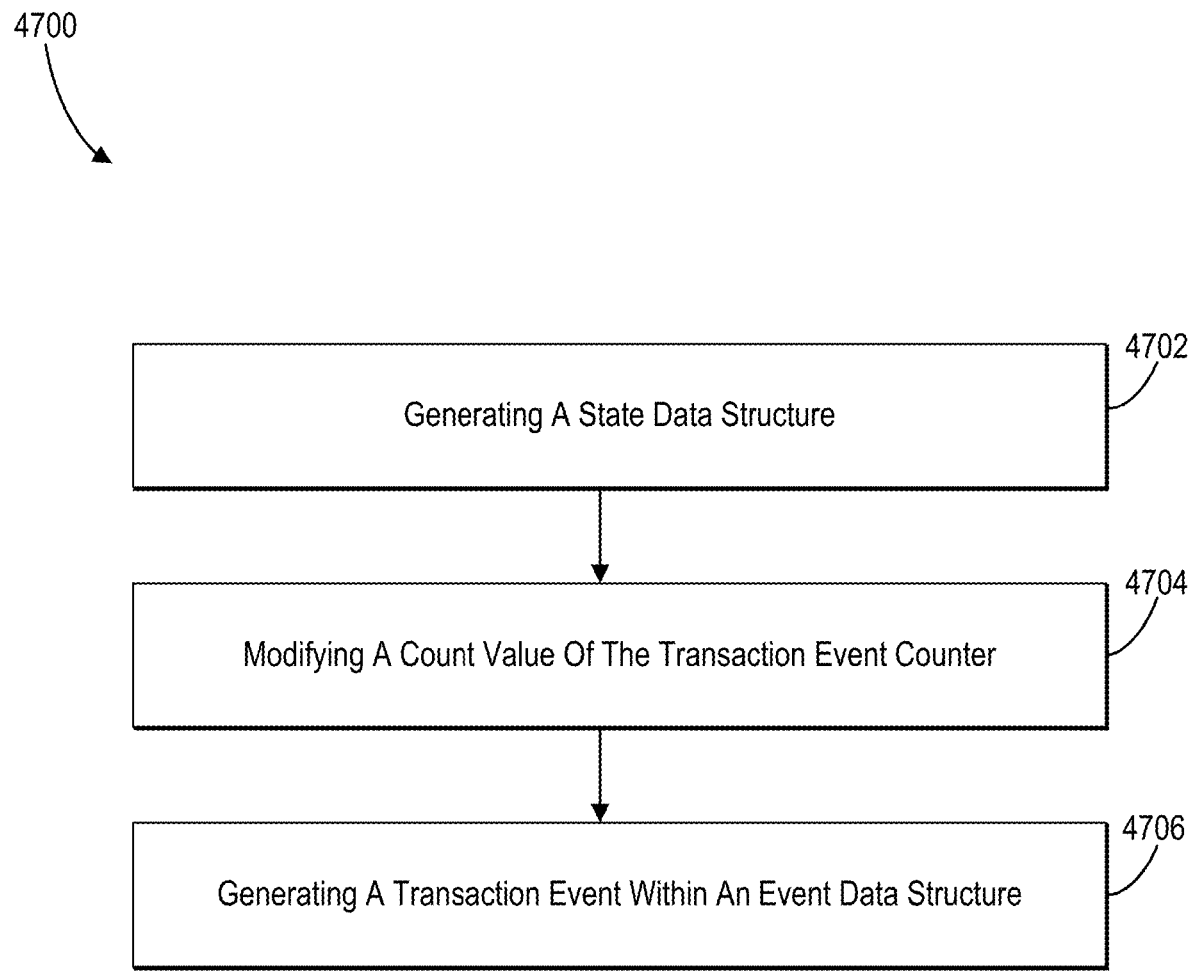
FIG. 47 illustrates a flowchart of a series of acts for generating transaction events in accordance with one or more embodiments.

FIG. 47 illustrates a flowchart of a series of acts 4700 for generating transaction events in accordance with one or more embodiments. While FIG. 47 illustrates acts according to one embodiment, alternative embodiments may omit, add to, reorder, and/or modify any of the acts shown in FIG. 47. The acts of FIG. 47 can be performed as part of a method. Alternatively, a non-transitory computer-readable medium can store instructions that, when executed by at least one processor, cause a computing device to perform the acts of FIG. 47. In some embodiments, a system can perform the acts of FIG. 47. For example, in one or more embodiments, a system includes at least one processor and at least one non-transitory computer-readable medium storing instructions thereon that, when executed by the at least one processor, cause the system to perform the acts of FIG. 47.

The series of acts 4700 includes an act 4702 of generating a state data structure. For example, the act 4702 involves generating a state data structure of a distributed digital ledger transaction network, wherein the state data structure comprises account data corresponding to a user account, a transaction event counter corresponding to the user account, and an address of the user account within the state data structure.

The series of acts 4700 also includes an act 4704 of modifying a count value of the transaction event counter. For example, the act 4704 involves, in response to execution of a transaction comprising an event corresponding to the user account of the distributed digital ledger transaction network, modifying a count value of the transaction event counter of the user account within the state data structure.

In one or more embodiments, the state data structure comprises an additional transaction event counter corresponding to the user account, the transaction event counter corresponds to a first transaction event type, and the additional transaction event counter corresponds to a second transaction event type. Accordingly, in some embodiments, modifying the count value of the transaction event counter of the user account comprises: determining that the transaction event corresponds to the first transaction event type; and modifying the count value of the transaction event counter based on determining that the transaction event corresponds to the first transaction event type.

Further, the series of acts 4700 includes an act 4706 of generating a transaction event within an event data structure. For example, the act 4706 involves, in response to execution of a transaction comprising an event corresponding to the user account of the distributed digital ledger transaction network, further generating a transaction event within an event data structure, the transaction event within the event data structure reflecting the address, the count value of the transaction event counter of the user account, and details of the event. In one or more embodiments, the event data structure comprises an event tree reflecting transaction events generated in response to the execution of the transaction. Indeed, in one or more embodiments, the ledger transaction system 106 determines a root value of the event tree reflecting the transaction events corresponding to the transaction; and stores the root value of the event tree in a transaction tree of the distributed digital ledger transaction network.

In one or more embodiments, the series of acts 4700 further includes acts for generating multiple transaction events in response to execution of a transaction. As mentioned above, in one or more embodiments, the state set data structure comprises an additional transaction event counter corresponding to a second transaction event type. Indeed, in some embodiments, the transaction comprises an additional event of the second transaction event type. Accordingly, in one or more embodiments, the ledger transaction system 106 modifies an additional count value of the additional transaction event counter of the user account within the state data structure; and generates an additional transaction event within the event data structure, the additional transaction event within the event data structure reflecting the address, the additional count value of the additional transaction event counter of the user account, and details of the additional event.

In some embodiments, the series of acts 4700 further includes acts for providing data in response to receiving a request. For example, in one or more embodiments, the acts include receiving an event count request from a client device, the event count request comprising a reference to the transaction event counter; and, in response to receiving the event count request from the client device, providing the modified count value of the transaction event counter from the state data structure to the client device. In one or more embodiments, the reference to the transaction event counter comprises an access path that reflects both the address and the transaction event counter. In some embodiments, the acts include receiving a transaction event detail request from a client device, the transaction event detail request comprising the count value of the transaction event counter and an access path comprising the address and the transaction event counter; and, in response to receiving the transaction event detail request, providing details of the event from the event data structure to the client device together with a Merkle proof corresponding to the transaction event.

Figure 48:
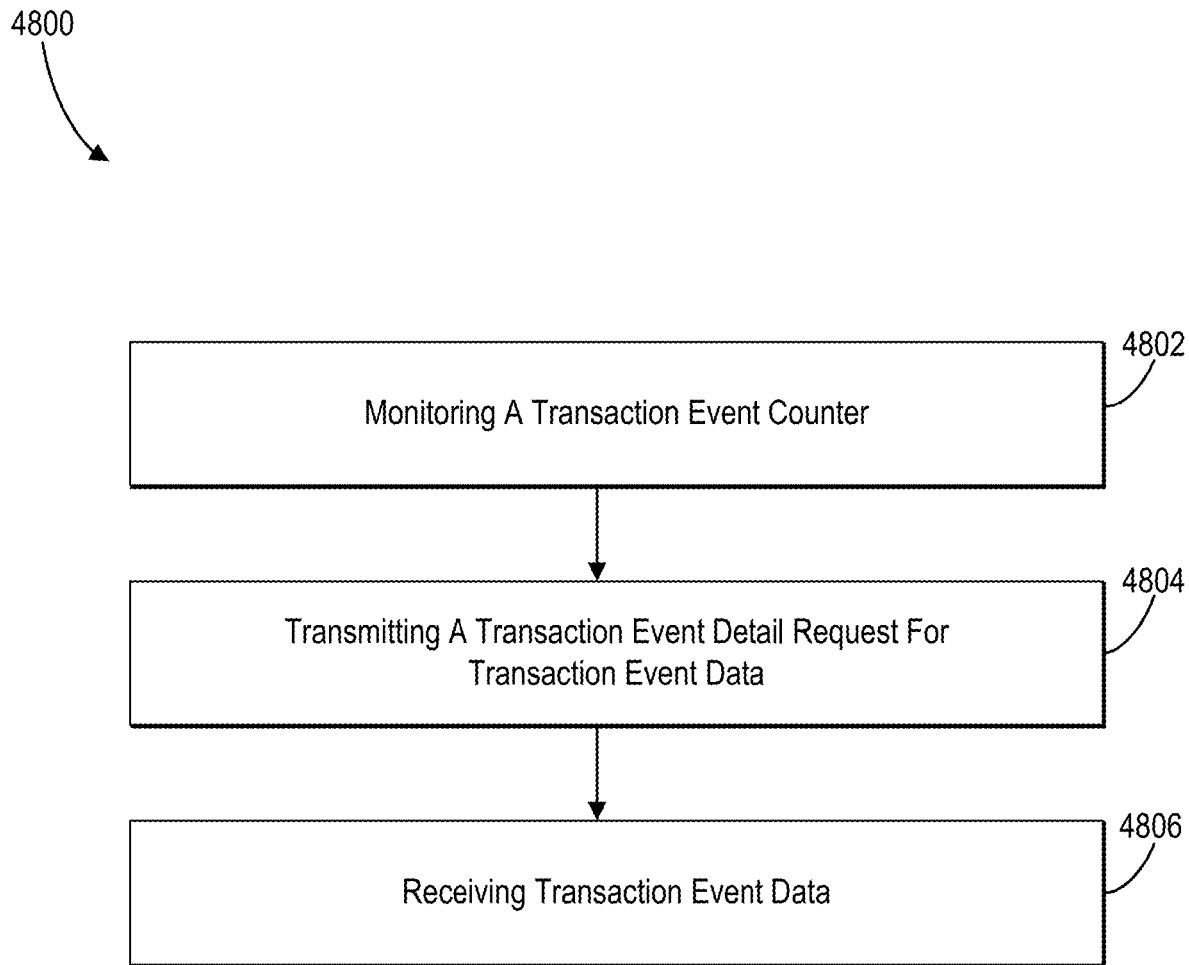
FIG. 48 illustrates a flowchart of a series of acts for receiving transaction event data in accordance with one or more embodiments.

FIG. 48 illustrates a flowchart of a series of acts 4800 for receiving transaction event data in accordance with one or more embodiments. While FIG. 48 illustrates acts according to one embodiment, alternative embodiments may omit, add to, reorder, and/or modify any of the acts shown in FIG. 48. The acts of FIG. 48 can be performed as part of a method. Alternatively, a non-transitory computer-readable medium can store instructions that, when executed by at least one processor, cause a computing device to perform the acts of FIG. 48. In some embodiments, a system can perform the acts of FIG. 48. For example, in one or more embodiments, a system includes at least one processor and at least one non-transitory computer-readable medium storing instructions thereon that, when executed by the at least one processor, cause the system to perform the acts of FIG. 48.

The series of acts 4800 includes an act 4802 of monitoring a transaction event counter. For example, the act 4802 involves monitoring a transaction event counter corresponding to a user account of a state data structure stored at a computer node of a distributed digital ledger transaction network. In one or more embodiments, based on monitoring the transaction event counter, the ledger transaction system 106 determines the count value of the transaction event counter.

In some embodiments, monitoring the transaction event counter comprises polling the transaction event counter at the computer node. Accordingly, in some embodiments, the ledger transaction system 106 determines the count value of the transaction event counter at a first time; and determines an additional count value of the transaction event counter at a second time. Indeed, in some embodiments, the ledger transaction system 106 verifies an absence of events corresponding to the user account between the first time and the second time by determining that the count value of the transaction event counter at the first time and the additional count value of the transaction event counter at the second time are the same count value.

The series of acts 4800 also includes an act 4804 of transmitting a transaction event detail request for transaction event data. For example, the act 4804 involves transmitting a transaction event detail request for transaction event data from an event data structure stored at one or more computer nodes of the distributed digital ledger transaction network. In some embodiments, the transaction event detail request comprises the count value of the transaction event counter and an access path of the transaction event counter corresponding to the user account within the state data structure. In one or more embodiments, monitoring the transaction event counter and transmitting the transaction event detail request are part of a combined request to the computer node (e.g., the computer node discussed with reference to the act 4602).

Further, the series of acts 4800 includes an act 4806 receiving transaction event data. For example, the act 4806 involves, in response to transmitting the transaction event detail request, receiving, via the one or more computer nodes, transaction event data corresponding to a count value determined from the transaction event counter. In one or more embodiments, the event data structure comprises an event Merkle tree and the state data structure comprises a state Merkle tree. Accordingly, in some embodiments, receiving the transaction event data comprises receiving, from the computer node of the distributed digital ledger transaction network, a Merkle proof in response to transmitting the transaction event detail request.

In one or more embodiments, the series of acts 4800 include acts for receiving transaction event data regarding a sequence of events. For example, as mentioned above, monitoring the transaction event counter can include determining the count value of the transaction event counter at a first time; and determining an additional count value of the transaction event counter at a second time. In some embodiments, based on comparing the count value of the transaction event counter at the first time and the additional count value of the transaction event counter at the second time, the ledger transaction system 106 determines a sequence of count values indicating that a sequence of events corresponding to the user account have occurred via the distributed digital ledger transaction network. Accordingly transmitting the transaction event detail request can comprise transmitting a transaction event sequence request for the sequence of events; and receiving the transaction event data can comprise receiving a set of transaction event data corresponding to a plurality of events. In some embodiments, the acts further include comparing the set of transaction event data corresponding to the plurality of events with the sequence of count values to determine: that the plurality of events are a complete set of the sequence of events; or that the plurality of events set are an incomplete set of the sequence of events.

Figure 49:
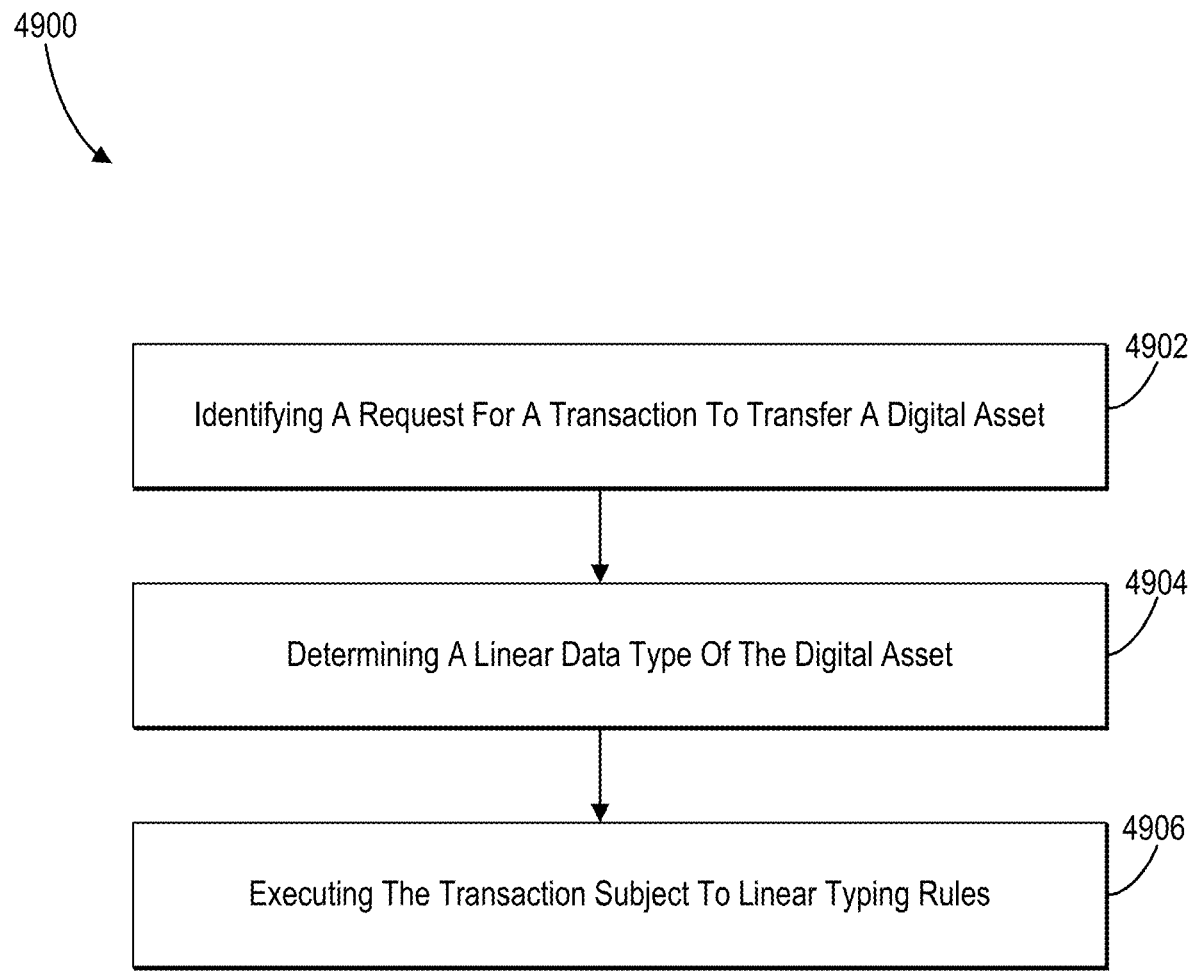
FIG. 49 illustrates a flowchart of a series of acts for executing a transaction utilizing linear data types subject to linear typing rules in accordance with one or more embodiments.

FIG. 49 illustrates a flowchart of a series of acts 4900 for executing a transaction utilizing linear data types subject to linear typing rules in accordance with one or more embodiments. While FIG. 49 illustrates acts according to one embodiment, alternative embodiments may omit, add to, reorder, and/or modify any of the acts shown in FIG. 49. The acts of FIG. 49 can be performed as part of a method. Alternatively, a non-transitory computer-readable medium can store instructions that, when executed by at least one processor, cause a computing device to perform the acts of FIG. 49. In some embodiments, a system can perform the acts of FIG. 49. For example, in one or more embodiments, a system includes at least one processor and at least one non-transitory computer-readable medium storing instructions thereon that, when executed by the at least one processor, cause the system to perform the acts of FIG. 49.

The series of acts 4900 includes an act 4902 of identifying a request for a transaction to transfer a digital asset. For example, the act 4902 involves identifying a request for a transaction to transfer a digital asset via a distributed digital ledger transaction network from a first user account to a second user account on a state data structure. In one or more embodiments, the digital asset comprises a digital currency maintained within the state data structure of the distributed digital ledger transaction network.

The series of acts 4900 also includes an act 4904 of determining a linear data type of the digital asset. For example, the act 4904 involves determining a linear data type of the digital asset within the request for the transaction.

Further, the series of acts 4900 includes an act 4906 of executing the transaction subject to linear typing rules. For example, the act 4906 involves executing the transaction utilizing the linear data type by transferring the digital asset from the first user account to the second user account on the state data structure subject to linear typing rules corresponding to the linear data type. In one or more embodiments, the linear typing rules are part of a programming language that is utilized to control modification of the state data structure of the distributed digital ledger transaction network. In some embodiments, the linear data type of the digital asset is divisible and mergeable pursuant to the programming language and the linear typing rules.

In some embodiments, the linear typing rules comprises a first linear typing rule to utilize the linear data type exactly once in the transaction. In further embodiments, the linear typing rules comprises a second linear typing rule against duplicating the linear data type.

To illustrate executing transactions subject to the linear typing rules corresponding to a linear data type, in one or more embodiments, the series of acts 4900 include additional acts, such as acts for identifying an additional request for an additional transaction to transfer an additional digital asset represented by the linear data type via the distributed digital ledger transaction network; determining the additional request for the additional transaction utilizes the additional digital asset represented by the linear data type more than once; and rejecting the additional request for the additional transaction based on determining that the linear data type of the additional request for the additional transaction violates the first linear typing rule from the linear typing rules. In some embodiments, the additional acts include identifying an additional request for an additional transaction to transfer an additional digital asset via the distributed digital ledger transaction network from the first user account, wherein the additional request for the additional transaction fails to identify a recipient user account; and rejecting the additional request for the additional transaction as a violation of the first linear typing rule from the linear typing rules.

In one or more embodiments, the ledger transaction system 106 performs a series of acts for applying configurable storage deletion rules. For example, the series of acts can include acts of generating an authenticated data structure of a distributed digital ledger transaction network, wherein the authenticated data structure comprises a data tree comprising nodes mapped to entries in a database; determining a configurable data structure deletion rule corresponding to the computing device; and deleting a portion of the authenticated data structure based on the configurable data structure deletion rule corresponding to the computing device. The series of acts can further include acts of providing options to modify the data structure deletion rules (including options for deleting data corresponding to particular events, times, accounts or transactions); deleting child nodes based on a determination that nodes in a sub-tree are full; generating an authenticated data structure that represents multiple states and deleting portions of the authenticated data structure that represents one of the states; and/or deleting data based on one or more characteristics of the computing device (e.g., whether the device is a validator node or full node).

In some embodiments, the ledger transaction system 106 performs a series of acts for tracking multiple writes in memory. For example, the series of acts can include acts of committing an authenticated state data structure of a distributed digital ledger transaction network to memory, wherein the state data structure comprises a state tree corresponding to a plurality of user accounts of the distributed digital ledger transaction network; identifying a transaction block comprising transactions associated with user accounts of the plurality of user accounts; generating a scratch pad data structure comprising a state data component reflecting modifications to the authenticated state data structure based on the transaction block; and upon obtaining an indication of consensus via the distributed digital ledger transaction network, committing a modified state data structure to memory based on the state data component. The series of acts can further include acts of clarifying that the state data component reflects only a subset of nodes corresponding to a subset of user accounts but includes pointers to the unchanged nodes of the authenticated data structure; identifying additional transactions (e.g., a second transaction and a third transaction); generating the scratch pad data structure to include additional state data components reflecting the additional transactions (e.g., the second transaction and the third transaction) prior to committing to memory; obtaining consensus on some but not all of the transactions stored in the scratch pad; and/or committing only the transactions that achieve consensus to memory.

In one or more embodiments, the ledger transaction system 106 performs a series of acts for separating and storing smart contract code and smart contract data. For example, the series of acts can include acts of identifying a transaction script for modifying a resource stored within a user account of an authenticated data structure of a distributed digital ledger transaction network, wherein: the transaction script comprises a resource identifier, and the resource identifier reflects the resource, a module utilized to generate the resource, and a particular user account storing the module; and based on the resource identifier, executing the transcript script by modifying the resource in accordance with procedures defined by the module. The series of acts can further include acts of clarifying that the module comprises bytecode declaring resource and procedures; clarifying that the resource comprises a data value (e.g., a record that binds named fields to values); storing multiple modules at the same user account; and/or storing multiple different resource types at the same user account. In some embodiments, the module is stored in the same user account as the resource. In further embodiments, the module is stored in a different user account than the user account storing the resource.

In some embodiments, the ledger transaction system 106 performs a series of acts for utilizing resources to delegate account permissions. For example, the series of acts can include acts of generating a permission resource stored within a first user account of an authenticated data structure of a distributed digital ledger transaction network, wherein the permission resource indicates one or more permissions to modify the first user account; executing a first transaction transferring the permissions resource to a second user account of the authenticated data structure; and executing a second transaction initiated by the second user account to modify the first user account based on the second user account having the permissions resource. The series of acts can further include acts of rejecting a transaction from the first user account (for no longer having the permissions resource). In one or more embodiments, the one or more permissions comprises a permission to withdraw digital assets from the user account. In some embodiments, the second user account comprises a cold wallet. In further embodiments, transferring the permissions resource moves the permissions resource to the second user account such that the first user account no longer comprises the permissions resource.

Additionally, in some embodiments, the ledger transaction system 106 performs a series of acts for decoupling account addresses from cryptographic keys (i.e., implementing key rotation features). For example, the series of acts can include acts of generating an authentication key corresponding to a user account of an authenticated data structure of a distributed digital ledger transaction network; identifying a transaction for modifying the authentication key; and upon authenticating the transaction utilizing the authentication key, executing the transaction by generating a new authentication key for the user account. The series of acts can further include acts of utilizing the new authentication key in a second transaction for the first user account; clarifying that the system generates the new authentication key without modifying an address of the user account within the authenticated data structure; and/or modifying the new authentication key to an additional authentication key based on an additional transaction.

Further, in one or more embodiments, the ledger transaction system 106 performs a series of acts for utilizing transaction scripts and interacting with modules and resources. For example, the series of acts can include acts of identifying a transaction comprising a transaction script for modifying a resource stored within a user account of an authenticated data structure of a distributed digital ledger transaction network, wherein: the resource is defined by a module, and the transaction script comprises a call to a procedure defined by the module to modify the resource; and executing the transcript script by modifying the resource in accordance with the procedure defined by the module. The series of acts can further include acts of clarifying modules (data code) and resources (data values); providing example procedures defined by the module, such as withdrawal or deposit procedures; and/or rejecting transactions that seek to modify the resource in a manner that fails to satisfy the procedures defined by the module.

In one or more embodiments, the ledger transaction system 106 performs a series of acts for utilizing smart contracts for performing tasks surrounding the execution of transactions. For example, the series of acts can include acts of defining a transaction execution procedure via a smart contract stored on an authenticated data structure of a distributed digital ledger transaction network; executing a transaction modifying the execution procedure of the smart contract to a new execution procedure; and executing a second transaction in accordance with the new execution procedure. The series of acts can further include acts of clarifying that the transaction execution procedure can include a procedure for validating transactions, deducting gas payments, incrementing sequence numbers, or distributing gas payments; identifying cryptographic keys associated with a subset of devices (e.g., authenticator devices) authorized to modify the transaction execution procedure; and/or executing the transaction modifying the smart contract based on the cryptographic keys.

In some embodiments, the ledger transaction system 106 performs a series of acts for implementing digital asset custody features. For example, the series of acts can include acts of generating access limits of a user account within an authenticated data structure of a distributed digital ledger transaction network, the access limits comprising an access key limit or a threshold number of access keys to access the account; identifying a transaction comprising one or more access keys; and executing the transaction based on determining that the one or more access keys satisfy the access key limit or the threshold number of access keys. The series of acts can further include acts of clarifying that the threshold number of access keys comprises a percentage or number of access keys from a group of access keys; clarifying that the access key limit comprises a value key limit that reflects a threshold value of digital assets accessible by utilizing a corresponding key; clarifying that the access key limit comprises a rate key limit that reflects a threshold value of digital assets accessible within a time period; and/or defining and utilizing sub-keys.

Additionally, in some embodiments, the ledger transaction system 106 performs a series of acts for performing consensus on execution results. For example, the series of acts can include acts of identifying, via a distributed digital ledger transaction network, a transaction block comprising a plurality of transactions; executing the transaction block relative to a state data structure to generate an execution result; and upon determining that a plurality of votes on the execution result from a plurality of validator nodes satisfies a consensus threshold, committing the execution results to storage via a modified state data structure.

Further, in one or more embodiments, the ledger transaction system 106 performs a series of acts for implementing pipelined consensus. For example, the series of acts can include acts of generating a first authenticated data structure for a first state of a distributed digital ledger transaction network upon execution of a first block of transactions; generating a second authenticated data structure for a second state contiguous to the first state upon execution of a second block of transactions; generating a third authenticated data structure for a third state contiguous to the second state upon execution of a third block of transactions; and in response to obtaining consensus on the first authenticated data structure, the second authenticated data structure, and the third authenticated data structure via the distributed digital ledger transaction network, committing the first authenticated data structure to memory.

In some embodiments, the ledger transaction system 106 performs a series of acts for providing safety upon a system restart. For example, the series of acts can include acts of generating a consensus state, at a validator node of a distributed digital ledger transaction network, the consensus state comprising last voted round data and preferred block round data; storing a consensus restart rule at the validator node; and in response to detecting a restart at the validator node, loading the consensus state in accordance with the consensus restart rule.

Additionally, in one or more embodiments, the ledger transaction system 106 performs a series of acts for managing epochs of voting rights. For example, the series of acts can include acts of obtaining consensus corresponding to a first transaction based on votes from a first set of validator nodes of a distributed digital ledger transaction network; identifying a second transaction referencing a module defining parameters for modifying validator nodes; and modifying the first set of validator nodes to a new set of validator nodes of the distributed digital ledger transaction network by executing the second transaction according to the parameters defined by the module, and obtaining consensus on the second transaction based on additional votes from the first set of validator nodes. The series of acts can further include acts of checking to ensure that an epoch defined by the module has passed before modifying the first set of validator nodes; holding digital assets from the first set of validator nodes during the epoch; holding the digital assets from the first set of validator nodes during the epoch and an additional cooling off period; identifying the second set of validator nodes based on votes from computing devices corresponding to user accounts of the distributed digital ledger transaction network; obtaining consensus corresponding to a third (later) transaction based on votes from the second set of validator nodes; and/or modifying one or more additional consensus parameters via an additional transaction. In one or more embodiments, the cooling off period comprises an additional epoch. In some embodiments, the number of votes for selecting the second set of validator nodes is based on digital assets maintained by each user account.

In some embodiments, the ledger transaction system 106 performs a series of acts for utilizing parallel synchronization. For example, the series of acts can include acts of accessing a plurality of state data structures and a plurality of transaction data structures corresponding to a distributed digital ledger transaction network, wherein the plurality of data structures reflect periodic states of the distributed digital ledger transaction network, and the transaction data structures reflect transactions between the period states; and building a historical representation of the distributed digital ledger transaction network by utilizing a plurality of computing devices to analyze the plurality of state data structures and the plurality of transaction data structures in parallel.

In further embodiments, the ledger transaction system 106 performs a series of acts for utilizing incremental verification. For example, the series of acts can include acts of downloading, at a computer node of a distributed digital ledger transaction network, a first portion of an authenticated data structure and a first proof corresponding to the first portion; downloading a second portion of the authenticated data structure and a second proof corresponding to the second portion; and upon verifying the first portion and the second portion based on the first proof and the second proof, generating, at the computer node, the authenticated data structure based on the first portion and the second portion.

In one or more embodiments, the ledger transaction system 106 performs a series of acts for utilizing waypoints to facilitate synchronization. For example, the series of acts can include acts of identifying a proposed data structure of a distributed digital ledger transaction network; determining a waypoint indicating an authenticated data structure of the distributed digital ledger transaction network; and verifying the proposed data structure by comparing the proposed data structure and the waypoint. The series of acts can also include acts of determining that a computer node coming online to the distributed digital ledger transaction network, and wherein verifying the proposed data structure comprises synchronizing the computer node to the current state of the distributed digital ledger transaction network; and/or identifying a second (e.g., invalid) proposed data structure and rejecting the second proposed data structure based on the waypoint. In some embodiments, the waypoint comprises a version reference and a root value of the proposed data structure. In further embodiments, the proposed data structure reflects one or more transactions that violate transaction procedures and further comprising committing the proposed data structure to memory based on the waypoint. In some embodiments, the proposed data structure reflects a genesis block of transactions.

Further, in one or more embodiments, the ledger transaction system 106 performs a series of acts for utilizing static and dynamic analysis to determine reference safety. For example, the series of acts can include acts of identifying a transaction comprising a transaction script for modifying a user account of a tree data structure of a distributed digital ledger transaction network; analyzing the transaction script at the bytecode level to verify reference safety with respect to the tree data structure; and executing the transaction script at the bytecode level to modify the user account of the tree data structure. In one or more embodiments, the transaction script is written using source code or an intermediate representation; and compiling the transaction script into bytecode before analyzing the transaction script to verify reference safety. In some embodiments, the transaction script invokes one or more modules stored at one or more user accounts of the tree data structure. In further embodiments, analyzing the transaction script comprises analyzing a sequence of bytecode operations defined by the one or more modules stored at the one or more user accounts of the tree data structure.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 50:
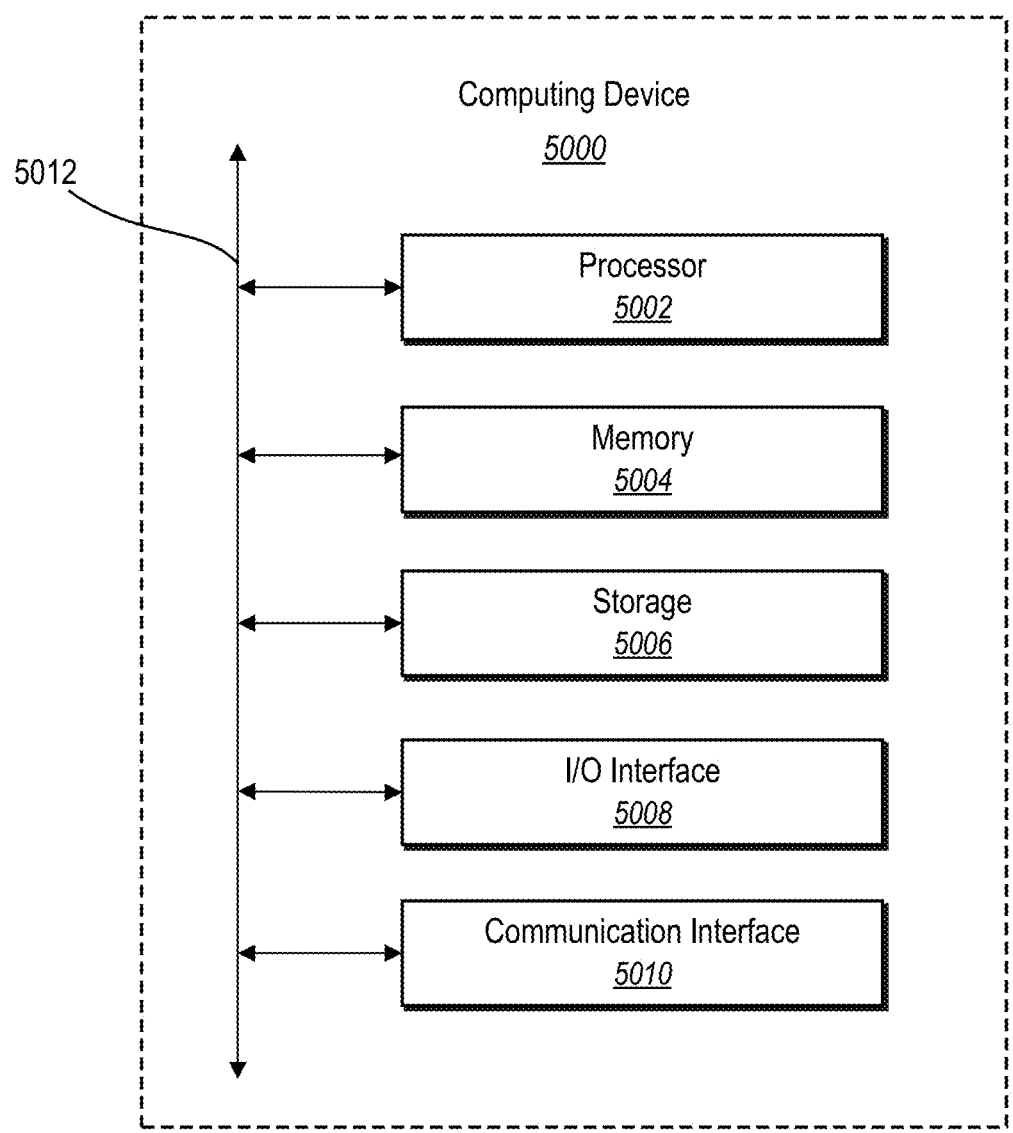
FIG. 50 illustrates a block diagram of an exemplary computing device in accordance with one or more embodiments.

FIG. 50 illustrates a block diagram of an example computing device 5000 that may be configured to perform one or more of the processes described above. One will appreciate that one or more computing devices, such as the computing device 5000 may represent the computing devices described above (e.g., the client devices 112*a*-112*n*, and the computer nodes 114). In one or more embodiments, the computing device 5000 may be a mobile device (e.g., a mobile telephone, a smartphone, a PDA, a tablet, a laptop, a camera, a tracker, a watch, a wearable device, etc.). In some embodiments, the computing device 5000 may be a non-mobile device (e.g., a desktop computer or another type of client device). Further, the computing device 5000 may be a server device that includes cloud-based processing and storage capabilities.

As shown in FIG. 50, the computing device 5000 can include one or more processor(s) 5002, memory 5004, a storage device 5006, input/output interfaces 5008 (or "I/O interfaces 5008"), and a communication interface 5010, which may be communicatively coupled by way of a communication infrastructure (e.g., bus 5012). While the computing device 5000 is shown in FIG. 50, the components illustrated in FIG. 50 are not intended to be limiting. Additional or alternative components may be used in other embodiments. Furthermore, in certain embodiments, the computing device 5000 includes fewer components than those shown in FIG. 50. Components of the computing device 5000 shown in FIG. 50 will now be described in additional detail.

In particular embodiments, the processor(s) 5002 includes hardware for executing instructions, such as those making up a computer program. As an example, and not by way of limitation, to execute instructions, the processor(s) 5002 may retrieve (or fetch) the instructions from an internal register, an internal cache, memory 5004, or a storage device 5006 and decode and execute them.

The computing device 5000 includes memory 5004, which is coupled to the processor(s) 5002. The memory 5004 may be used for storing data, metadata, and programs for execution by the processor(s). The memory 5004 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 5004 may be internal or distributed memory.

The computing device 5000 includes a storage device 5006 including storage for storing data or instructions. As an example, and not by way of limitation, the storage device 5006 can include a non-transitory storage medium described above. The storage device 5006 may include a hard disk drive (HDD), flash memory, a Universal Serial Bus (USB) drive or a combination these or other storage devices.

As shown, the computing device 5000 includes one or more I/O interfaces 5008, which are provided to allow a user to provide input to (such as user strokes), receive output from, and otherwise transfer data to and from the computing device 5000. These I/O interfaces 5008 may include a mouse, keypad or a keyboard, a touch screen, camera, optical scanner, network interface, modem, other known I/O devices or a combination of such I/O interfaces 5008. The touch screen may be activated with a stylus or a finger.

The I/O interfaces 5008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 5008 are configured to provide graphical data to a display for presentation to a user. The graphical data may be representative of one or more graphical user interfaces and/or any other graphical content as may serve a particular implementation.

The computing device 5000 can further include a communication interface 5010. The communication interface 5010 can include hardware, software, or both. The communication interface 5010 provides one or more interfaces for communication (such as, for example, packet-based communication) between the computing device and one or more other computing devices or one or more networks. As an example, and not by way of limitation, communication interface 5010 may include a network interface controller (NIC) or network adapter for communicating with an Ethernet or other wire-based network or a wireless NIC (WNIC) or wireless adapter for communicating with a wireless network, such as a WI-FI. The computing device 5000 can further include a bus 5012. The bus 5012 can include hardware, software, or both that connects components of computing device 5000 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method comprising:
generating, for a first user account of a distributed digital ledger transaction network and a second user account of the distributed digital ledger transaction network that maintains one or more sub-accounts within a private digital ledger, a request for a transaction between the first user account and the second user account by:
identifying a main public address identifier that locates the second user account within a state data structure of the distributed digital ledger transaction network, a sub-address identifier that locates a sub-account from the one or more sub-accounts within the private digital ledger maintained by the second user account, and a public encryption key associated with the second user account; and
generating an encrypted sub-address unique to the transaction by applying the public encryption key to the sub-address identifier; and
submitting, for execution via the distributed digital ledger transaction network, the request for the transaction between the first user account and the second user account using the main public address identifier and the encrypted sub-address unique to the transaction.

2. The method of claim 1, wherein generating the encrypted sub-address unique to the transaction comprises:
adding a nonce value to the sub-address identifier; and
applying the public encryption key to the sub-address identifier with the nonce value.

3. The method of claim 1, wherein identifying the main public address identifier, the sub-address identifier, and the public encryption key comprises scanning a digital visual code that encodes the main public address identifier, the sub-address identifier, and the public encryption key.

4. The method of claim 1, further comprising identifying the main public address identifier, the sub-address identifier, and the public encryption key based on an email address of a user corresponding to the second user account.

5. The method of claim 4, wherein identifying the main public address identifier, the sub-address identifier, and the public encryption key comprises:
identifying a domain name and personal email identifier from the email address of the user corresponding to the second user account;
determining the main public address identifier based on the domain name from the email address; and
determining the sub-address identifier based on the personal email identifier from the email address.

6. The method of claim 5, wherein determining the main public address identifier based on the domain name comprises accessing a DNS record corresponding to the domain name to identify at least one of: the main public address identifier or the public encryption key.

7. The method of claim 6, further comprising utilizing DNSSEC to validate the main public address identifier or the public encryption key identified by accessing the DNS record corresponding to the domain name.

8. The method of claim 6, wherein generating the encrypted sub-address comprises applying the public encryption key, determined by accessing the DNS record, to the sub-address identifier determined based on the personal email identifier.

9. The method of claim 5, wherein identifying the main public address identifier, the sub-address identifier, and the public encryption key comprises, in response to providing the personal email identifier from the email address to a remote server corresponding to the domain name, receiving the public encryption key from the remote server corresponding to the domain name.

10. The method of claim 1, further comprising identifying the main public address identifier, the sub-address identifier, and the public encryption key based on at least one of: a telephone number of a user corresponding to the second user account or a user ID of the user.

11. A non-transitory computer-readable medium storing instructions thereon that, when executed by at least one processor, cause a computing device to:
generate, for a first user account of a distributed digital ledger transaction network and a second user account of the distributed digital ledger transaction network that maintains one or more sub-accounts within a private digital ledger, a request for a transaction between the first user account and the second user account by:
identifying a main public address identifier that locates the second user account within a state data structure of the distributed digital ledger transaction network, a sub-address identifier that locates a sub-account from the one or more sub-accounts within the private digital ledger maintained by the second user account, and a public encryption key associated with the second user account; and
generating an encrypted sub-address unique to the transaction by applying the public encryption key to the sub-address identifier; and
submit, for execution via the distributed digital ledger transaction network, the request for the transaction between the first user account and the second user account using the main public address identifier and the encrypted sub-address unique to the transaction.

12. The non-transitory computer-readable medium of claim 11, wherein generating the encrypted sub-address unique to the transaction comprises:
adding a nonce value to the sub-address identifier; and
applying the public encryption key to the sub-address identifier with the nonce value.

13. The non-transitory computer-readable medium of claim 11, wherein identifying the main public address identifier, the sub-address identifier, and the public encryption key comprises scanning a digital visual code that encodes the main public address identifier, the sub-address identifier, and the public encryption key.

14. The non-transitory computer-readable medium of claim 11,
further comprising instructions that, when executed by the at least one processor, cause the computing device to identify the main public address identifier, the sub-address identifier, and the public encryption key based on an email address of a user corresponding to the second user account; and
wherein identifying the main public address identifier, the sub-address identifier, and the public encryption key comprises:
identifying a domain name and personal email identifier from the email address of the user corresponding to the second user account;
determining the main public address identifier based on the domain name from the email address; and
determining the sub-address identifier based on the personal email identifier from the email address.

15. The non-transitory computer-readable medium of claim 14, wherein:
determining the main public address identifier based on the domain name comprises accessing a DNS record corresponding to the domain name to identify at least one of: the main public address identifier or the public encryption key; and
generating the encrypted sub-address comprises applying the public encryption key, determined by accessing the DNS record, to the sub-address identifier determined based on the personal email identifier.

16. The non-transitory computer-readable medium of claim 14, wherein identifying the main public address identifier, the sub-address identifier, and the public encryption key comprises, in response to providing the personal email identifier from the email address to a remote server corresponding to the domain name, receiving the public encryption key from the remote server corresponding to the domain name.

17. A system comprising:
at least one processor; and
at least one non-transitory computer-readable medium storing instructions thereon that, when executed by the at least one processor, cause the system to:
generate, for a first user account of a distributed digital ledger transaction network and a second user account of the distributed digital ledger transaction network that maintains one or more sub-accounts within a private digital ledger, a request for a transaction between the first user account and the second user account by:
identifying a main public address identifier that locates the second user account within a state data structure of the distributed digital ledger transaction network, a sub-address identifier that locates a sub-account from the one or more sub-accounts within the private digital ledger maintained by the second user account, and a public encryption key associated with the second user account; and
generating an encrypted sub-address unique to the transaction by applying the public encryption key to the sub-address identifier; and
submit, for execution via the distributed digital ledger transaction network, the request for the transaction between the first user account and the second user account using the main public address identifier and the encrypted sub-address unique to the transaction.

18. The system of claim 17, wherein identifying the main public address identifier, the sub-address identifier, and the public encryption key comprises scanning a digital visual code that encodes the main public address identifier, the sub-address identifier, and the public encryption key.

19. The system of claim 17, further comprising instructions that, when executed by the at least one processor, cause the system to identify the main public address identifier, the sub-address identifier, and the public encryption key based on an email address of a user corresponding to the second user account.

20. The system of claim 17,
further comprising instructions that, when executed by the at least one processor, cause the system to identify the main public address identifier, the sub-address identifier, and the public encryption key based on an email address of a user corresponding to the second user account; and wherein identifying the main public address identifier, the sub-address identifier, and the public encryption key comprises:
identifying a domain name and personal email identifier from the email address of the user corresponding to the second user account;
determining the main public address identifier based on the domain name from the email address; and
determining the sub-address identifier based on the personal email identifier from the email address.

\* \* \* \* \*